US012188255B2

(12) United States Patent
Corn et al.

(10) Patent No.: US 12,188,255 B2
(45) Date of Patent: Jan. 7, 2025

(54) COMPACT UNIVERSAL GAS POOL HEATER AND ASSOCIATED METHODS

(71) Applicant: Hayward Industries, Inc., Charlotte, NC (US)

(72) Inventors: Benjamin Isaac Corn, Columbia, TN (US); Michael Damion Mercer, Nashville, TN (US); Vance Elliot Willis, Nunnelly, TN (US)

(73) Assignee: Hayward Industries, Inc., Charlotte, NC (US)

( * ) Notice: Subject to any disclaimer, the term of this patent is extended or adjusted under 35 U.S.C. 154(b) by 41 days.

(21) Appl. No.: 18/134,998

(22) Filed: Apr. 14, 2023

(65) Prior Publication Data

US 2023/0250662 A1 Aug. 10, 2023

Related U.S. Application Data

(63) Continuation of application No. 17/568,554, filed on Jan. 4, 2022, now Pat. No. 11,649,650, which is a
(Continued)

(51) Int. Cl.
*E04H 4/12* (2006.01)
*A61H 33/00* (2006.01)
*F24H 1/14* (2022.01)

(52) U.S. Cl.
CPC ............. *E04H 4/129* (2013.01); *F24H 1/145* (2013.01); *A61H 33/60* (2013.01)

(58) Field of Classification Search
CPC ......... E04H 4/129; F24H 1/145; A61H 33/60; A61H 33/063
(Continued)

(56) References Cited

U.S. PATENT DOCUMENTS

| | | | |
|---|---|---|---|
| 176,964 | A | 5/1876 | Johnson |
| 556,630 | A | 3/1896 | Hoberecht |

(Continued)

FOREIGN PATENT DOCUMENTS

| | | | |
|---|---|---|---|
| DE | 3239950 | A1 | 5/1984 |
| DE | 3703282 | A1 | 8/1988 |

(Continued)

OTHER PUBLICATIONS

Canadian Office Action dated Dec. 28, 2023, issued in connection with Canadian Application No. 3,107,466 (3 pages).

(Continued)

*Primary Examiner* — Lori L Baker
(74) *Attorney, Agent, or Firm* — McCarter & English, LLP

(57) ABSTRACT

Swimming pool or spa gas heaters, cabinets, water header manifolds, and heat exchangers include: gas heaters having an air gap between a cabinet and combustion chamber to reduce heat transfer to sides of the cabinet; gas heaters having a user interface that is repositionable on a top panel; gas heater cabinets including a removable top panel that can be hung on a side panel; gas heaters having a built-in dual junction box; gas heaters having a top-accessible igniter and burner that are interlocked to maintain positioning thereof; adaptable water manifolds including connectable inlet and outlet fittings that adjust effective inlet and outlet positions; heat exchangers having a plurality of tube-and-fin subassemblies arranged in a semi-circular configuration; and water manifolds including internal cartridges that divide the water manifold into a plurality of chambers for improved circulation through a heat exchanger.

15 Claims, 89 Drawing Sheets

Related U.S. Application Data continuation of application No. 16/522,362, filed on Jul. 25, 2019, now Pat. No. 11,225,807.

(60) Provisional application No. 62/703,270, filed on Jul. 25, 2018.

(58) Field of Classification Search
USPC .................................. 4/493, 488; 126/561
See application file for complete search history.

(56) References Cited

U.S. PATENT DOCUMENTS 753,250 A 3/1904 Ebinger
1,618,485 A 2/1927 Skinner
1,664,509 A 4/1928 Harper
1,690,501 A 11/1928 Potts
1,742,362 A 1/1930 Ludt
1,775,041 A 9/1930 Karmazin
1,836,242 A 12/1931 Harper
1,927,325 A 9/1933 Ritter
1,940,804 A 12/1933 Karmazin
2,042,812 A 6/1936 Tull et al.
2,055,499 A 9/1936 King
2,106,310 A 1/1938 Warrick
2,132,372 A 10/1938 Locke
2,184,345 A 12/1939 Hersey
2,259,433 A 10/1941 Kitto
2,335,085 A 11/1943 Roberts
2,381,215 A 8/1945 Hahn
2,884,197 A 4/1959 Whittell, Jr.
2,950,092 A 8/1960 DiNiro
2,994,123 A 8/1961 Kritzer
3,080,916 A 3/1963 Collins
3,182,481 A 5/1965 Oddy et al.
3,227,175 A 1/1966 Remington et al.
3,250,323 A 5/1966 Karmazin
3,250,324 A 5/1966 Hicks
3,349,755 A * 10/1967 Miller ...................... F24D 3/02 122/406.1
3,368,546 A * 2/1968 Wade ...................... F24H 1/40 165/142
3,457,620 A 7/1969 Ares
3,568,764 A 3/1971 Newman et al.
3,598,402 A 8/1971 Frenzl
3,630,175 A * 12/1971 Reid, Jr. ................ F24H 1/145 122/406.1
3,734,065 A * 5/1973 Reid, Jr. ................ F23D 91/02 122/250 R
3,828,575 A 8/1974 Malcosky et al.
3,840,175 A 10/1974 Jacuzzi
3,902,551 A 9/1975 Lim et al.
3,916,989 A 11/1975 Harada et al.
3,966,119 A 6/1976 Harter et al.
3,976,129 A 8/1976 Silver
4,008,732 A 2/1977 Fichter et al.
4,121,583 A 10/1978 Chen
4,126,905 A * 11/1978 Russell .................. E04H 4/129 4/492
4,147,182 A 4/1979 Akerblom
4,169,502 A 10/1979 Kluck
4,257,479 A 3/1981 Newton
4,266,604 A 5/1981 Sumikawa et al.
4,299,098 A 11/1981 Derosier
D264,500 S 5/1982 Beaton
D265,236 S 6/1982 Yamin
4,361,276 A 11/1982 Paige
4,434,843 A 3/1984 Alford
4,449,581 A 5/1984 Blystone et al.
4,456,059 A 6/1984 Cadars
4,465,128 A 8/1984 Krekacs et al.
4,495,560 A 1/1985 Sugimoto et al.
4,538,418 A 9/1985 Lawrence et al.
4,545,759 A 10/1985 Giles et al.
4,558,571 A 12/1985 Yoshinaga et al.
4,576,223 A 3/1986 Humpolik et al.
4,580,623 A 4/1986 Smitte et al.
4,588,026 A 5/1986 Hapgood
4,592,420 A 6/1986 Hughes
4,595,825 A 6/1986 Gordbegli
4,711,450 A 12/1987 McArthur
4,715,437 A 12/1987 Tanaka et al.
4,738,225 A 4/1988 Juang
4,759,405 A 7/1988 Metzger
4,856,824 A 8/1989 Clausen
4,907,418 A 3/1990 DeFazio
4,923,002 A 5/1990 Haussmann
5,054,774 A 10/1991 Belsito
5,094,224 A 3/1992 Diesch
5,178,211 A 1/1993 Bauer et al.
5,183,449 A 2/1993 DeCloux
5,190,101 A 3/1993 Jalilevand et al.
5,195,673 A 3/1993 Irish et al.
5,201,307 A 4/1993 Afshar
5,216,743 A 6/1993 Seitz
5,222,550 A 6/1993 Griffin et al.
5,228,618 A 7/1993 Afshar
5,318,007 A 6/1994 Afshar
5,318,112 A 6/1994 Gopin
5,470,018 A 11/1995 Smith
5,472,010 A 12/1995 Gonzalez
5,482,115 A 1/1996 Ikeya et al.
5,487,423 A 1/1996 Romero
5,660,230 A 8/1997 Obosu et al.
5,711,369 A 1/1998 Huddleston et al.
5,775,267 A 7/1998 Hou et al.
D397,191 S 8/1998 Kralovec et al.
5,802,864 A 9/1998 Yarbrough et al.
5,901,563 A 5/1999 Yarbrough et al.
5,906,104 A 5/1999 Schwartz et al.
D412,567 S 8/1999 Ward et al.
6,026,804 A * 2/2000 Schardt .................... F24H 1/40 165/173
6,082,993 A 7/2000 O'Leary et al.
6,293,335 B1 9/2001 Tawney et al.
6,295,980 B1 10/2001 Lopez et al.
6,321,833 B1 11/2001 O'Leary et al.
6,499,534 B1 12/2002 Tawney et al.
6,755,024 B1 6/2004 Mao et al.
6,793,483 B2 9/2004 Watanabe
6,910,666 B2 6/2005 Burr
6,920,892 B2 7/2005 Agresta et al.
7,063,133 B2 6/2006 Gordon et al.
7,311,740 B2 12/2007 Williams et al.
D574,938 S 8/2008 Martin et al.
7,434,447 B2 10/2008 Deng
7,527,069 B2 5/2009 Denike et al.
7,530,931 B2 5/2009 Amendola et al.
7,540,431 B2 6/2009 Kozdras et al.
7,543,456 B2 6/2009 Sinha et al.
7,607,426 B2 10/2009 Deng
7,654,820 B2 2/2010 Deng
7,677,236 B2 3/2010 Deng
7,730,765 B2 6/2010 Deng
7,814,934 B2 10/2010 Thelen
7,967,006 B2 6/2011 Deng
7,967,007 B2 6/2011 Deng
7,971,603 B2 * 7/2011 Willis ...................... F28F 9/02 137/454.6
8,011,920 B2 9/2011 Deng
8,152,515 B2 4/2012 Deng
8,235,708 B2 8/2012 Deng
8,241,034 B2 8/2012 Deng
8,281,781 B2 10/2012 Deng
8,297,968 B2 10/2012 Deng
8,317,511 B2 11/2012 Peng
8,465,277 B2 6/2013 Deng
8,506,290 B2 8/2013 Deng
8,516,878 B2 8/2013 Deng
8,517,718 B2 8/2013 Deng
8,545,216 B2 10/2013 Deng
8,563,180 B2 10/2013 Perry et al.
8,568,136 B2 10/2013 Deng
8,752,541 B2 6/2014 Deng

(56) References Cited

U.S. PATENT DOCUMENTS

| | | | | |
|---|---|---|---|---|
| 8,757,139 | B2 | 6/2014 | Deng | |
| 8,757,202 | B2 | 6/2014 | Deng | |
| 8,764,436 | B2 | 7/2014 | Deng | |
| 8,851,065 | B2 | 10/2014 | Deng | |
| 8,877,399 | B2 | 11/2014 | Weingaertner et al. | |
| 8,915,239 | B2 | 12/2014 | Deng | |
| 8,985,094 | B2 | 3/2015 | Deng | |
| 9,353,998 | B2 * | 5/2016 | Willis | F28F 9/02 |
| 9,388,976 | B2 | 7/2016 | Tilmont et al. | |
| 9,464,847 | B2 | 10/2016 | Maurer et al. | |
| 9,976,819 | B2 | 5/2018 | Nibler et al. | |
| 11,225,807 | B2 * | 1/2022 | Corn | E04H 4/129 |
| 11,649,650 | B2 * | 5/2023 | Corn | F24H 1/145 4/493 |
| 2002/0021742 | A1 | 2/2002 | Maskell et al. | |
| 2002/0157815 | A1 | 10/2002 | Sutter | |
| 2003/0111840 | A1 | 6/2003 | O'Neill et al. | |
| 2003/0209345 | A1 | 11/2003 | Zweig | |
| 2006/0084019 | A1 | 4/2006 | Berg et al. | |
| 2006/0108435 | A1 | 5/2006 | Kozdras et al. | |
| 2008/0223561 | A1 | 9/2008 | Li et al. | |
| 2008/0264617 | A1 | 10/2008 | Martin et al. | |
| 2010/0101509 | A1 | 4/2010 | Tanbour et al. | |
| 2010/0170452 | A1 * | 7/2010 | Ford | F24H 9/0036 122/18.1 |
| 2010/0330513 | A1 | 12/2010 | Deng | |
| 2012/0006091 | A1 | 1/2012 | Deng | |
| 2012/0178003 | A1 | 7/2012 | Venkataraman et al. | |
| 2012/0196194 | A1 | 8/2012 | Perry et al. | |
| 2013/0146250 | A1 | 6/2013 | Eller et al. | |
| 2013/0181152 | A1 | 7/2013 | Naumann | |
| 2013/0186492 | A1 | 7/2013 | Deng | |
| 2014/0080078 | A1 | 3/2014 | Albizuri | |
| 2014/0178786 | A1 | 6/2014 | Perry et al. | |
| 2014/0326197 | A1 | 11/2014 | Deivasigamani et al. | |
| 2015/0184855 | A1 | 7/2015 | Kang et al. | |
| 2015/0338099 | A1 | 11/2015 | Deng | |
| 2017/0356691 | A1 * | 12/2017 | Willis | F28F 21/086 |
| 2018/0038592 | A1 | 2/2018 | Willis et al. | |
| 2018/0106498 | A1 * | 4/2018 | Nishino | F24H 1/40 |
| 2019/0293320 | A1 * | 9/2019 | Kim | F24H 1/145 |
| 2020/0032536 | A1 | 1/2020 | Corn et al. | |

FOREIGN PATENT DOCUMENTS

| | | | |
|---|---|---|---|
| EP | 0067699 | A1 | 12/1982 |
| EP | 1336736 | A2 | 8/2003 |
| EP | 1691117 | A1 | 8/2006 |
| FR | 633229 | A | 1/1928 |
| FR | 859865 | A | 12/1940 |
| GB | 332455 | A | 7/1930 |
| JP | 60-48496 | A | 3/1985 |
| JP | 60-82785 | A | 5/1985 |
| JP | 60-188796 | A | 9/1985 |
| JP | 62-175591 | A | 8/1987 |
| JP | 63-3180 | A | 1/1988 |
| JP | 2004-137900 | A | 5/2004 |
| JP | 4229694 | B2 | 2/2009 |
| SU | 964422 | A2 | 10/1982 |
| WO | 2006/040053 | A1 | 4/2006 |
| WO | 2017/079104 | A1 | 5/2017 |

OTHER PUBLICATIONS

PCT Invitation to Pay Additional Fees dated Oct. 11, 2019, issued in connection with International Application No. PCT/US2019/043456 (3 pages).

International Search Report and Written Opinion of the International Searching Authority mailed on Dec. 5, 2019, issued in connection with International Application No. PCT/US2019/43456 (12 pages).

Eternal Advanced Hybrid Water Heating, Installation and Operation Manual, 157140081P, dated Jul. 22, 2013 (59 pages).

Pentair MASTERTEMP Pool and Spa Heater, Installation and User's Guide, Rev. M, dated Jan. 8, 2015 (55 pages).

Jandy Pro Series JXiTM Gas-Fired Pool and Spa Heater, Models 200, 260, 400, Installation and Operation Manual, Rev. G, marked © 2016 Zodiac Pool Systems, Inc. (48 pages).

Jandy Pro Series JXiTM Pool and Spa Heater, Product Brochure, Rev. F, marked © 2017 Zodiac Pool Systems, Inc. (4 pages).

Turbotec Brochure (Prior to Jan. 26, 2006) (6 pages).

MiniMax CH Pool and Spa Heaters, Operation and Installation Manual, Rev. C, dated Jan. 22, 2004, by Pentair Pool Products, Inc. (36 pages) and four photographs (taken prior to Jan. 26, 2007) of a device of the type shown at pp. 7, 11, 19, and A-10 thereof.

MiniMax NTTSI High Performance Natural Gas Heater, Product Brochure, marked © 2005 Pentair Water Pool and Spa, Inc. (2 pages).

Raypak Replacement Parts Catalog No. 9100.554, Sep. 16, 2005 (7 pages).

Raypak "Anything But Basic" Catalog No. 6000.12A, Feb. 15, 2005 (4 pages).

Jandy LX/LT Heaters, Product Brochure, Rev. H, marked © 2006 Jandy Pool Products, Inc. (2 pages).

Laars LX/LT Low NOx Parts List and Diagram, marked Mfg. 2003-Present (2 pages).

Laars LX and LT Gas-Fired Pool and Spa Heater, Installation and Operation Manual, marked © Water Pik Technologies 0401 (32 pages).

Reddy Heater Vent-Free Gas Wall Heater Owner's Operation and Installation Manual, Rev. A, Apr. 2015 (32 pages).

A. O. Smith Corporation, Brochure for Cyclone Mxi Modulating Water Heater, 2014 (2 pages).

A. O. Smith Corporation, Service Handbook, Commercial Gas High Efficiency Water Heaters, Models BTH 120-500 Series 300/301, Jan. 2017 (54 pages).

Raypak, Inc., Installation & Operating Instructions, X94 Professional Gas-Fired Pool & Spa Heater, Low NOx Model SR-410, dated Jun. 15, 2018 (52 pages).

Raypak, Inc., Replacement Parts Catalog, Model SR-410 X94 Professional, dated Jun. 15, 2016 (8 pages).

Office Action (Restriction Requirement) dated Sep. 29, 2020, issued in connection with U.S. Appl. No. 16/522,362 (9 pages).

Office Action dated Dec. 17, 2020, issued in connection with U.S. Appl. No. 16/522,362 (9 pages).

Notice of Allowance dated May 24, 2021, issued in connection with U.S. Appl. No. 16/522,362 (6 pages).

Notice of Allowance dated Aug. 12, 2021, issued in connection with U.S. Appl. No. 16/522,362 (8 pages).

Notice of Allowance dated Jan. 4, 2023, issued in connection with U.S. Appl. No. 17/568,554 (11 pages).

* cited by examiner

COMPACT UNIVERSAL GAS POOL HEATER AND ASSOCIATED METHODS

CROSS-REFERENCE TO RELATED APPLICATIONS

The present application is a continuation of, and claims the benefit of priority to, U.S. patent application Ser. No. 17/568,554 filed on Jan. 4, 2022, which is a continuation of, and claims the benefit of priority to, U.S. patent application Ser. No. 16/522,362 filed on Jul. 25, 2019, which claims the benefit of priority to U.S. Provisional Patent Application Ser. No. 62/703,270 filed on Jul. 25, 2018, the entire disclosures of which are all expressly incorporated by reference herein.

TECHNICAL FIELD

The present disclosure relates to a compact universal gas pool heater and associated methods and, in particular, to a compact universal gas pool heater that has enhanced adaptability to various installation requirements, enhanced serviceability, and optimized heat transfer capabilities.

BACKGROUND

Swimming pools and spas use various types of heaters for heating the fluid being circulated in the pool or spa. For example, one common type of heater is a gas heater that often implements a water tube heat exchanger. The water tube heat exchanger is generally positioned proximate a source of heat, e.g., a burner, that is ignited by an igniter, which may be a hot-surface igniter, spark igniter, pilot igniter, or a combination thereof. In many gas heaters, the burner and igniter, along with a flame sensor, will be mounted to the same panel in order to maintain constant dimensional relationship between the igniter and the burner to ensure constant ignition of gas by the igniter. If these components were to be mounted on separate panels, then dimensional tolerances could potentially "stack up" and negatively affect the dimensional consistency. If this dimensional relationship were not maintained, then the potential exists for too much gas to be dissipated by the burner prior to ignition, which can result in a louder than normal ignition.

Furthermore, water tube heat exchangers generally include one or more tubes through which pool or spa water to be heated is circulated. The tubes are positioned such that hot gases generated by the source of heat pass across the tubes. The tubes absorb heat from the hot gases and transfer the heat to the fluid flowing therethrough. Metal fins can be secured to the exterior of the tubes to maximize the exterior surface area exposed to the hot gases and increase the efficiency of heat transfer. The heat exchanger can be positioned within a combustion chamber canister, which itself, and in combination with the heat exchanger, can be placed in a cabinet to prevent individuals from touching the hot canister and to protect the canister and heat exchanger from the elements. Gas heaters may also have electrical components that are powered by both high-voltage wiring and low-voltage wiring. These wires will generally have to be routed to the interior of the cabinet. Furthermore, gas heaters can also have a user interface that allows a user to control and program the gas heater. The user interface can be accessible from the exterior of the gas heater.

Gas heaters for swimming pools have particular installation requirements to which an installer must adhere, such as national, state, or local codes. Included in these requirements is that the gas heater cannot raise the temperature of nearby structures a certain number of degrees above the ambient temperature. To ensure that the gas heater does not increase the temperature of nearby structures, e.g., walls, fences, etc., too much, installers will space the gas heater away from such structures, thus providing a clearance between the gas heater and the structure. To determine the minimum allowable clearance for a particular heater, pool heater manufacturers will often test their gas heaters by measuring the temperature on nearby structures during use. Pool heaters typically have minimum clearances of 6-18 inches. In addition to maintaining a suitably low temperature on nearby structures, the clearance allows for a service technician to access the portion of the pool heater cabinet that faces the structure in order to repair the pool heater. However, the required clearance essentially results in an increase in the overall footprint of the pool heater since one must account for the required clearance. This is undesirable since space is at a premium when installing a pool heater. As such, it is not only desirable to reduce the minimum clearance, but also to construct pool heaters as small as possible so that they weigh less and fit into smaller spaces.

Furthermore, to provide adaptability to the various challenges that may be present in a pool heater installation site, prior art pool heaters generally allow an installer to configure the heat exchanger of the pool heater so that the water inlet and outlet is on one of two sides that are opposite one another (e.g., 180° apart). Additionally, prior art pool heaters allow the installer to rotate the entire cabinet top panel to two or three possible positions, which effectively moves the user interface panel to a more accessible/convenient location. However, each of these methods requires a significant amount of effort that involves removing entire panels and/or the heat exchanger, and reinstalling them in a different configuration, which is not only cumbersome but also time consuming.

Pool heater installers also have to tackle wiring issues that may arise. As referenced above, pool heaters require electrical power to operate, which will often be 120V or 240V AC delivered through high-voltage wiring, for example. In some cases, pool heaters will also be connected to a pool/spa automation system via low-voltage wiring. It is required by code that the high-voltage wiring be separated from the low-voltage wiring. Typically, to adhere to these requirements and codes, electrical wiring will be routed through a conduit, which requires the installer to install a conduit fitting into a hole that extends into the pool heater. Installation in this fashion can be difficult for installers since they will have to pull stiff wires through the conduit and fitting into a junction box.

In addition to the above, pool heater installers may remove an old pool heater and replace it with a new one for an existing swimming pool needing a new pool heater. In such circumstances, the installer may be motivated to install a new pool heater from the same manufacturer of the old pool heater being replaced, or in some instances the same exact model pool heater that was previously installed. This is typically because the replacement is most likely to fit in the available space, and have the same water connection position and fittings. However, this limits the number of options available and could influence the pool owner away from buying the pool heater they actually desire with the functionalities they need. On the other hand, if the pool owner were to opt for a different pool heater, then they may have to replace all of the water connections, which would result in increased costs.

Not only are installers faced with issues in connection with pool heaters, but technicians that service pool heaters also have their own troubles they deal with. While servicing a pool heater, a technician often has to access the pool heater components and electronics through the top panel. This generally involves removing the entire top panel completely. However, electrical wiring will often run from components of the pool heater to the user interface in the top panel, which means that when the top panel is removed for service it cannot be placed very far away. Thus leaving the technician looking for a place where they can temporarily store the top panel during service that is nearby, but not in the way.

One such component that a pool heater technician may have to replace is the solenoid gas valve that controls the flow of gas into the combustion chamber. In prior art pool heaters, the gas valve is often attached using threaded pipe fittings. However, this method of attachment makes replacement of the gas valve difficult, tedious, and time consuming.

Thus, a need exists for a gas heater that allows for enhanced adaptability to various installation requirements, enhanced serviceability, and optimized heat transfer capabilities. These and other needs are addressed by the compact universal gas pool heater and associated methods of the present disclosure.

SUMMARY OF THE DISCLOSURE

In accordance with embodiments of the present disclosure, an exemplary gas heater is provided that includes a cabinet, a combustion chamber canister, an exhaust pipe, a heat exchanger, a burner, an igniter, and a water header manifold. The cabinet can include a first side panel, a second side panel, an exhaust side panel, a water header side panel, a bottom, and a top. The water header manifold can be positioned at the water header side panel and can be in fluidic communication with the heat exchanger such that it routes water through the heat exchanger. The heat exchanger includes at least one tube having a tube inlet and a tube outlet and can define a combustion chamber. The heat exchanger can be positioned within the combustion chamber canister and can be configured to extract heat from hot gases within the combustion chamber. In this regard, the burner can be positioned within the combustion chamber canister and the combustion chamber, and receive combustible gas from a combustion blower. The burner can dissipate the combustible gas, which can be ignited by the igniter. Gases can be discharged through the exhaust, which can be connected to the combustion chamber canister and extend through the exhaust side panel. The combustion chamber canister, the tube sheet, the heat exchanger, and the burner can be positioned within the cabinet such that the combustion chamber canister is spaced apart from the first side panel by a first gap having a first width, and is spaced apart from the second side panel by a second gap having a second width. The first and second gaps can be configured to minimize the transfer of heat from the combustion chamber canister to the first and second side panels, and prevent the first and second side panels from increasing in temperature more than a predetermined amount above the ambient temperature. The cabinet can be configured such that it can be installed with the first side panel or the second panel adjacent a structure with a clearance of six inches or less.

In some embodiments, the water header side panel and/or the exhaust side panel can include lower and upper vent openings. The lower and upper vent openings can circulate air through the first and second gaps, and lower the temperature in the cabinet. For example, the lower and upper vent openings can allow natural convection to circulate the air through the first and second gaps. The gas heater can be configured so that servicing can be performed through the top and water header side panel of the cabinet. The gas heater can also include insulation provided in the first and second gaps.

In other embodiments of the present disclosure, the cabinet of the gas heater can include a user interface module having a user interface, and the top can include a first lateral side, a second lateral side, and a channel extending between the first and second lateral sides that the user interface module can be removably positioned within. The user interface module can be removed from the top and positioned within the channel in a first orientation where it is accessible by a user from the first side of the cabinet, and in a second orientation where it is accessible by a user from a second side of the cabinet.

In some aspects, the channel can include first and second engagement mechanisms, and the user interface module can include a user interface engagement mechanism configured to engage the first and second engagement mechanisms. The user interface engagement mechanism can engage the first engagement mechanism to position the user interface module in the first orientation, and can engage the second engagement mechanism to position the user interface module in the second orientation. The user interface module can be secured in the first and second orientations by a fastener that extends through the user interface module and engages the top panel. The channel can also include a central hub that extends from the channel and through which an electrical cable can extend from an interior of the cabinet to an exterior. The central hub can prevent water from entering the cabinet.

In some embodiments, the top can include at least one hook that is configured to engage one of the first and second side panels and secure the top panel to the first or second side panels. The top panel can be removed from the cabinet and secured to the first or second side panel by the hook.

In other embodiments of the present disclosure, the cabinet can include a dual junction box. The dual junction box can have an elongated body, a first cover, and a second cover. The elongated body can have a first side, a second side, and an interior wall positioned between the first and second sides. The first cover can engage the first side of the elongated body and form a first chamber. The second cover can engage the second side of the elongated body and form a second chamber. The first and second chambers can be electrically isolated from each other by the interior wall. A first wire port can be positioned within the first chamber and extend through the cabinet. The first wire port can be configured to have a first wire of a first voltage level extend therethrough from an interior of the cabinet to the first chamber. A second wire port can be positioned within the second chamber and extend through the cabinet. The second wire port can be configured to have a second wire of a second voltage level extend therethrough from an interior of the cabinet to the second chamber. A first opening can be formed between the first cover and the body which can provide access to the first chamber and can be configured to receive a first cable of the first voltage level to extend into the first chamber and be connected with the first wire. A second opening can be formed between the second cover and the body which can provide access to the second chamber an can be configured to allow a second cable of the second voltage level to extend into the second chamber and be connected with the second wire.

In some aspects, the first chamber can be a low-voltage chamber and the second chamber can be a high-voltage chamber. In additional aspects, the first wire can be a low-voltage wire, the first cable can be a low-voltage cable, the second wire can be a high-voltage wire, and the second cable can be a high-voltage cable.

In other aspects, the first cover and the first side of the elongated body can form a first opening, and the second cover and the second side of the elongated body can form a second opening. The first opening can be configured to receive and secure the first wire in place, and the second opening can be configured to receive and secure the second wire in place.

In some embodiments of the present disclosure, the gas heater can also include a gas valve having an inlet and an outlet. The inlet of the gas valve can be connected to an outlet of a first component. The outlet of the gas valve can be connected to an inlet of a second component. The inlet of the gas valve can be secured to the outlet of the first component by a first quick disconnect fitting, while the outlet of the gas valve can be secured to the inlet of the second component by a second quick disconnect fitting. The first and second quick disconnect fittings can have a body, a first end, and a second end. The body can define first and second elongated slots that extend between the first and second ends. The first and second elongated slots can be configured to receive at least a portion of the gas valve inlet and at least a portion of the first component outlet. The first and second elongated slots can also be configured to receive at least a portion of the gas valve outlet and at least a portion of the second component inlet. In some embodiments, the inlet of the gas valve can include a piston-style connector that is received by the outlet of the first component, and the inlet of the second component can include a piston-style connected that is received by the outlet of the gas valve.

In accordance with embodiments of the present disclosure, an exemplary gas heater is provided that includes a cabinet, a combustion chamber canister, a tube sheet, a heat exchanger, a water header manifold, a combustion blower, a burner, an igniter, and a mount. The cabinet can include a first side panel, a second side panel, an exhaust side panel, a water header side panel, a bottom, and a top. The combustion chamber canister can have a top opening and an open end that is covered by the tube sheet which can be mounted to the combustion chamber canister. The heat exchanger, which includes at least one tube and can define a combustion chamber, can be positioned within the combustion chamber canister and configured to extract heat from hot gases within the combustion chamber. The water header manifold can be mounted to the tube sheet and can route water through the heat exchanger. The combustion blower discharges combustible gas through a pipe that extends from the combustion blower to a central opening in the tube sheet, thus providing the combustible gas to the burner that is mounted to the tube sheet opposite the pipe. The burner includes a positioning flange extending along a length thereof, and dissipates the combustible gas that it receives from the combustion blower via the pipe. The mount can include a body, a mounting flange surrounding the body, and igniter mount, and a spacing flange extending from the body. The mount can be mounted to the combustion chamber canister with a portion of the mount extending through the top opening of the combustion chamber canister and a gap being formed between the mounting flange and the combustion chamber canister. A gasket can be positioned in the gap between the mounting flange and the combustion chamber canister. The igniter can be mounted to the igniter mount, and can extend through the mount into the combustion chamber where it is positioned a first distance from the burner. The igniter is configured to ignite the gas mixture dissipated by the burner. When the mount is mounted to the combustion chamber canister, the spacing flange of the mount can engage the positioning flange of the burner to tie the burner and the mount together to maintain the first distance substantially constant. Additionally, engagement of the spacing flange with the mounting flange can allow the burner to move along its longitudinal axis, while preventing the burner from moving away from the mount and the igniter and alternating the first distance. The gasket can be configured to absorb an accumulation of tolerance variations of the gas heater and ensure that the spacing flange of the mount engages the positioning flange of the burner.

In some embodiments the gas heater can also include a flame sensor that is mounted to the mount. The flame sensor extends through the mount into the combustion chamber where it is positioned a second distance from the burner. Engagement of the spacing flange with the mounting flange can tie the burner and the mount together such that the second distance is substantially constant.

In some embodiments of the present disclosure, an adaptable water manifold for a pool or spa gas heater is provided that includes an inflow tube, an inlet, an outflow tube, and an outlet. The inflow tube is in fluidic communication with the inlet, and can be configured to engage and provide water to one or more heat exchanger tubes. The outflow tube is in fluidic communication with the outlet, and can be configured to engage and receive water from the one or more heat exchanger tubes. When the adaptable water manifold is mounted to the gas heater, the inlet is positioned at an inlet position, and the outlet is positioned at an outlet position. For example, the first position can include an inlet height, which can be the distance between the center of the inlet and the bottom of the gas heater, and the second position can include an outlet height, which can be the distance between the center of the outlet and the bottom of the gas heater. The inlet includes one or more inlet mounts, and is configured to have an inlet fitting connected thereto. The inlet fitting includes one or more inlet fitting mounts and an inlet fitting outlet in fluidic communication with an inlet fitting inlet configured to engage pre-existing piping. The inlet fitting can be connected to the inlet through engagement of the inlet fitting mounts with the inlet mounts such that the inlet fitting outlet is adjacent to and in fluidic communication with the inlet. The outlet includes one or more outlet mounts, and is configured to have an outlet fitting connected thereto. The outlet fitting includes one or more outlet fitting mounts and an outlet fitting inlet in fluidic communication with an outlet fitting outlet configured to engage pre-existing piping. The outlet fitting can be connected to the outlet through engagement of the outlet fitting mounts with the outlet mounts such that the outlet fitting inlet is adjacent to and in fluidic communication with the outlet. When the inlet fitting is connected to the inlet, the inlet fitting outlet is at the inlet position and the inlet fitting inlet is at an adjusted inlet position. When the outlet fitting is connected to the outlet, the outlet fitting inlet is at the outlet position and the outlet fitting outlet is at an adjusted outlet position. In some embodiments, the inlet fitting operatively changes the position of the inlet to the location of the inlet fitting inlet, and the outlet fitting operatively changes the position of the location of the outlet to the outlet fitting outlet. In other embodiments, the inlet fitting height can be different than the inlet height and the outlet fitting height can be different than the outlet height.

In some embodiments, the inlet fitting can have an inlet fitting body that extends between the inlet fitting inlet and the inlet fitting outlet that places them in fluidic communication, and the outlet fitting can have an outlet fitting body that extends between the outlet fitting inlet and the outlet fitting outlet that places them in fluid communication. In other embodiments, the inlet fitting inlet can include a connector and the outlet fitting outlet can include a connector. In still other embodiments, the inlet can include one or more mounting flanges, the outlet can include one or more mounting flanges, the inlet fitting can include one or more inlet mounts, and the outlet fitting can include one or more outlet mounts. The inlet mounts can be secured to the one or more mounting flanges of the inlet to mount the inlet fitting to the inlet. The outlet mounts can be secured to the one or more mounting flanges of the outlet to mount the outlet fitting to the outlet.

In accordance with embodiments of the present disclosure, a heat exchanger for a swimming pool or spa gas heater is provided that includes one or more heat exchanger tubes, upper insulation, and lower insulation, which form a combustion chamber. The one or more heat exchanger tubes include an interior tube and a plurality of fins extending from the interior tube, which in some aspects can be welded to the tube or extruded from the tube. The interior tube include an inlet, an outlet, and a U-shaped body that extends from the inlet to the outlet. The upper insulation can be positioned on the top of the one or more heat exchanger tubes, and the lower insulation can be positioned on the bottom of the one or more heat exchanger tubes. The upper insulation and the lower insulation can reduce heat loss and direct hot gasses across the fins of the one or more heat exchanger tubes. The one or more heat exchanger tubes can be configured to be connected to a water header manifold that can route water through the interior tube. In some embodiments, the heat exchanger can include a plurality of heat exchanger tubes that are in a stacked arrangement.

In some embodiments, the plurality of fins can have one or more bent edges and a rounded edge. In such embodiments, the one or more bent edges can include four bent edges, and each of the four bent edges can comprise $1/6^{th}$ of the circumference of the fin, and the one rounded edge can comprise $1/3^{rd}$ of the circumference of the fin. The bent edges can form first, second, third, and fourth sides of the heat exchanger tube. According to other aspects, such a heat exchanger can include a plurality of heat exchanger tubes that are stacked with a first side of a first heat exchanger tube being adjacent a second side of a second heat exchanger tube.

In accordance with embodiments of the present disclosure, a heat exchanger for a swimming pool or spa gas heater is provided that includes a plurality of tube-and-fin subassemblies. Each of the tube-and-fin subassemblies includes a first tube, a second tube, and a plurality of fins secured to the first and second tubes. The first tube can include a first leg, a second leg, and a curved portion extending between the first and second legs, while the second tube can include a third leg, a fourth leg, and a curved portion extending between the third and fourth legs. The fins can include a body having four holes extending therethrough. The holes can be surrounded by collars that assist in securing the fins to the first and second tubes. The first leg can extend through one of the four holes, the second leg can extend through the second of the four holes, the third leg can extend through the third of the four holes, and the fourth leg can extend through the fourth of the four holes. Each of the fins can also have a first sidewall and a second sidewall that are positioned on opposite sides of the body. Each of the fins can also include a plurality of flanges that form channels for hot gases to pass through. The flanges can be configured to slow down hot gases passing across the fins and direct the hot gases into the channels. The plurality of tube-and-fin subassemblies can be positioned adjacent to each other in a semi-circular configuration with the first sidewall of the first tube-and-fin subassembly fins abutting the second sidewall of the second tube-and-fin subassembly fins. The heat exchanger can also include a front manifold, a tube sheet, a first insulation, and a second insulation, which the first, second, third, and fourth legs extend through. The first insulation can be positioned adjacent an interior side of the front manifold, and the second insulation can be positioned adjacent an interior side of the tube sheet. The plurality of tube-and-fin subassemblies can be positioned with the plurality of fins thereof between the front manifold and the tube sheet.

In some embodiments, the heat exchanger can comprise a plurality of, e.g., five or more, tube-and-fin subassemblies that are positioned adjacent to each other in a semi-circular fashion. In such embodiments, the first sidewall of the fins can be at a first angle from a vertical axis and the second sidewall of the fin can be at a second angle from the vertical axis. The sum of the first and second angles can be equal to sixty degrees. In some embodiments, the sum of the first and second angles can be equal to three-hundred and sixty (360) divided by the number of tube-and-fin subassemblies required to form a complete circle.

In another embodiment, the fins can include one or more flow directors that are configured to enhance the heat transfer of the fins. The flow directors can be louvers, lances, bumps, holes, extrusions, embosses, or ribs.

In accordance with embodiments of the present disclosure, a gas heater for a swimming pool or spa is provided that includes a cabinet that defines an interior, a combustion chamber, a heat exchanger, a burner, and a water header manifold. The heat exchanger can include at least one tube having a tube inlet and a tube outlet, and can be positioned at least partially within the combustion chamber. The heat exchanger can be configured to extract heat from hot gases in the combustion chamber. The burner can be positioned within the combustion chamber, and can receive combustible gas from a combustion blower. The burner can be configured to dissipate the combustible gas. The water header manifold can have an inlet in fluidic communication with the tube inlet and an outlet in fluidic communication with the tube outlet. The water header manifold can circulate water through the at least one tube of the heat exchanger. The combustion chamber, the heat exchanger, and the burner can be positioned within the interior of the cabinet with a first gap between a first side of the cabinet and the combustion chamber, and a second gap between a second side of the cabinet and the combustion chamber. The first gap reduces the amount of heat transferred from the combustion chamber to the first side of the cabinet, while the second gap reduces the amount of heat transferred from the combustion chamber to the second side of the cabinet.

In accordance with embodiments of the present disclosure, a cabinet for a swimming pool or spa gas heater is provided that includes a main body, a top panel, and a user interface module. The main body can define an interior, while the top panel can be configured to be placed on the main body. The top panel can have a first lateral side, a second lateral side, a channel extending between the first lateral side and the second lateral side, a first engagement mechanism positioned at a first end of the channel, and a second engagement mechanism positioned at a second end of the channel. The user interface module can include an elongated body, a user interface, and a user interface engagement mechanism. The user interface module can be configured to be placed within the channel. Specifically, the user interface module can be positioned in the channel in a first orientation with the user interface engagement mechanism engaged with the first engagement mechanism and the user interface accessible by a user from a first side of the main body, and a second orientation with the user interface engagement mechanism engaged with the second engagement mechanism and the user interface accessible by a user from a second side of the main body opposite the first side of the main body.

In accordance with embodiments of the present disclosure, a gas heater for a swimming pool or spa is provided that includes a main body, a top panel, a heater subassembly, a user interface module, and a control cable. The main body can define an interior, while the top panel can be configured to be placed on the main body. The top panel can have a first lateral side, a second lateral side, a channel extending between the first lateral side and the second lateral side, a first engagement mechanism positioned at a first end of the channel, and a second engagement mechanism positioned at a second end of the channel. The heater subassembly can be positioned within the interior of the main body, and can include a combustion chamber, a heat exchanger positioned at least partially within the combustion chamber, a burner, a printed circuit board including a controller, a water header manifold that can be configured to circulate water through the heat exchanger. The heat exchanger can be configured to extract heat from hot gases in the combustion chamber. The burner can receive combustible gas from a combustion blower and can be configured to dissipate the combustible gas into the combustion chamber. The user interface module can include an elongated body, a user interface, and a user interface engagement mechanism. The control cable can be electrically connected between the printed circuit board and the user interface controller. The user interface module can be configured to be placed within the channel. Specifically, the user interface module can be positioned in the channel in a first orientation with the user interface engagement mechanism engaged with the first engagement mechanism and the user interface accessible by a user from a first side of the main body, and a second orientation with the user interface engagement mechanism engaged with the second engagement mechanism and the user interface accessible by a user from a second side of the main body opposite the first side of the main body.

In accordance with embodiments of the present disclosure, a gas heater for a swimming pool or spa is provided that includes a main body, a top panel having at least one hanging device, and a heater subassembly positioned within an interior of the main body. The top panel can be configured to be placed on the main body covering the interior, and can be removed from the main body and secured to a first side panel of the main body through engagement of the at least one hanging device with the first side panel to provide access to the heater subassembly contained within the interior of the main body.

In accordance with embodiments of the present disclosure, a cabinet for a swimming pool or spa gas heater is provided that includes a main body defining an interior, a dual junction box positioned on a side panel of the main body, a first wire port, and a second wire port. The dual junction box can include a body, a first cover, and a second cover. The body can define a first chamber and a second chamber, where the first chamber is electrically isolated from the second chamber. The first cover can be configured to removably engage the body and cover the first chamber, while the second cover can be configured to removably engage the body and cover the second chamber. A first hole can extend through the body into the first chamber, and can be configured to receive a first electrical cable of a first voltage level. A second hole can extend through the body into the second chamber, and can be configured to receive a second electrical cable of a second voltage level that is greater than the first voltage level. In some embodiments, the first hole can include a first grommet positioned therein, and the second hole can include a second grommet positioned therein. The first wire port can extend through the side panel of the main body from the interior of the main body to the first chamber, and can be configured to have a first wire extend therethrough from the interior of the main body into the first chamber. The second wire port can extend through the side panel of the main body from the interior of the main body to the second chamber, and can be configured to have a second wire extend therethrough from the interior of the main body into the second chamber.

In some embodiments, the first cover can define a portion of the first chamber when removably engaged with the body, and/or the second cover can define a portion of the second chamber when removably engaged with the body. In other aspects, the body can include a first open side and a second open side such that the first chamber is accessible through the first open side and the second chamber is accessible through the second open side.

In other embodiments, the first and second covers can be configured to be removably secured to the main body. In such embodiments, the main body can include a first slot and a second slot, while the first cover can include a first protrusion and the second cover can include a second protrusion. The first slot can be configured to receive the first protrusion to removably secure the first cover to the main body, and the second slot can be configured to receive the second protrusion to removably secure the second cover to the main body.

In some embodiments, the first chamber can be a low-voltage chamber and the second chamber can be a high-voltage chamber. In other embodiments, the first wire can be a low-voltage wire, the first electrical cable can be a low-voltage cable, the second wire can be a high-voltage wire, and the second electrical cable can be a high-voltage cable.

In accordance with embodiments of the present disclosure, a gas heater for a swimming pool or spa is provided that includes a main body defining an interior, a heater subassembly positioned within the interior of the main body, a dual junction box positioned on a side panel of the main body, a first wire port, and a second wire port. The heater subassembly can include one or more low-voltage components electrically connected with a low-voltage wire and one or more high-voltage components electrically connected with a high-voltage wire. The dual junction box can include a body, a first cover, and a second cover. The body can define a first chamber and a second chamber, where the first chamber is electrically isolated from the second chamber. The first cover can be configured to removably engage the body and cover the first chamber, while the second cover can be configured to removably engage the body and cover the second chamber. A first hole can extend through the body into the first chamber, and can be configured to receive a low-voltage electrical cable of a first voltage level. A second hole can extend through the body into the second chamber, and can be configured to receive a high-voltage electrical cable of a second voltage level that is greater than the first voltage level. In some embodiments, the first hole can include a first grommet positioned therein, and the second hole can include a second grommet positioned therein. The first wire port can extend through the side panel of the main body from the interior of the main body to the first chamber, and can be configured to have the low-voltage wire extend therethrough from the interior of the main body into the first chamber. The second wire port can extend through the side panel of the main body from the interior of the main body to the second chamber, and can be configured to have the high-voltage wire extend therethrough from the interior of the main body into the second chamber.

In some embodiments, the first cover can define a portion of the first chamber when removably engaged with the body, and/or the second cover can define a portion of the second chamber when removably engaged with the body. In other aspects, the body can include a first open side and a second open side such that the first chamber is accessible through the first open side and the second chamber is accessible through the second open side.

In other embodiments, the first and second covers can be configured to be removably secured to the main body. In such embodiments, the main body can include a first slot and a second slot, while the first cover can include a first protrusion and the second cover can include a second protrusion. The first slot can be configured to receive the first protrusion to removably secure the first cover to the main body, and the second slot can be configured to receive the second protrusion to removably secure the second cover to the main body.

In some embodiments, the first chamber can be a low-voltage chamber and the second chamber can be a high-voltage chamber.

In accordance with embodiments of the present disclosure, a gas heater for a swimming pool or spa is provided that includes a cabinet defining an interior, a combustion chamber enclosure, a heat exchanger, a water header manifold, a burner, a combustion blower, and an igniter. The combustion chamber enclosure can include a top having a burner opening, and can define a combustion chamber cavity. The heat exchanger can include at least one tube having a tube inlet and a tube outlet, can be positioned at least partially within the combustion chamber cavity, and can be configured to extract heat from hot gases in the combustion chamber. The water header manifold can include an inlet in fluidic communication with the tube inlet and an outlet in fluidic communication with the tube outlet, and can circulate water through the at least one tube of the heat exchanger. In some embodiments, the inlet of the water header manifold can be configured to receive water to be heated from a pool or spa, and the outlet can be configured to provide heated water back to the pool or spa. The burner can include a gas opening and a discharge plate, and can be mounted to the combustion chamber enclosure adjacent the burner opening. The burner can be configured to dissipate combustible gas from the discharge plate into the combustion chamber cavity. In some embodiments, the discharge plate can be a mesh plate. The combustion blower can be mounted to the burner and can be configured to discharge combustible gas through the gas opening and into the burner. The igniter can be mounted to the burner and can extend into the combustion chamber cavity. The igniter can be positioned a first distance from the discharge plate and can be configured to ignite the combustible gas dissipated by the burner into the combustion chamber cavity. Because the igniter is engaged with the burner, the first distance can be maintained substantially constant.

In some embodiments, the burner can include a box-like body that extends into the combustion chamber cavity, and the discharge plate can be positioned at a bottom of the box-like body. In such embodiments, the heat exchange can define a combustion region and the burner can dissipate the combustion gas into the combustion region. In other such embodiments, the heat exchanger can be a semi-circular heat exchanger that defines a top gap, and the box-like body of the burner can be positioned at least partially in the top gap. The heat exchange can include front insulation and rear insulation, and the front insulation can include a cutout configured to receive the igniter. In still other such embodiments, the burner can include a top plate that includes a gas opening, and the combustion blower can be mounted to the top plate with an outlet of the combustion blower being positioned adjacent the gas opening.

In other embodiments, the gas heater can include a flame sensor that is mounted to the burner and extends into the combustion chamber cavity where it can be positioned a second distance from the discharge plate. Engagement of the flame sensor with the burner can maintain the second distance substantially constant.

In still other embodiments, the gas heater can include a tube sheet that has a first side and a second side, and the combustion chamber enclosure can include an open side. In such embodiments, the combustion chamber enclosure can be secured to the first side of the tube sheet with the tube sheet covering the open end of the combustion chamber enclosure, and the tube inlet and the tube outlet can extend through the tube sheet from the first side to the second side. Additionally, in such embodiments, the water header manifold can be mounted to the second side of the tube sheet, and may be accessible from a water header side of the cabinet.

In additional embodiments, the gas heater can include an exhaust pipe that extends from the combustion chamber enclosure, and which can be configured to receive exhaust fumes from the combustion chamber cavity and discharge the exhaust fumes from the gas heater. In such embodiments, the exhaust pipe can extend from the combustion chamber enclosure to an exhaust side of the cabinet.

In some embodiments, the igniter and/or the burner can be accessible through a top of the cabinet. In other embodiments, the gas heater can include a controller positioned within the cabinet, and the controller can be accessible through a top of the cabinet.

In accordance with embodiments of the present disclosure, an adaptable water manifold for a swimming pool or spa gas heater is provided that includes an inlet, an outlet, an inflow section, an outflow section, an inlet fitting, and an outlet fitting. The inlet can be positioned at an inlet position when the adaptable water manifold is mounted to the gas heater. The outlet can be positioned at an outlet position when the adaptable water manifold is mounted to the gas heater. The inflow section can be in fluidic communication with the inlet and can be configured to provide water to one or more heat exchanger tubes, while the outflow section can be in fluidic communication with the outlet and can be configured to receive water from one or more heat exchanger tubes. The inlet fitting can have an inlet fitting inlet in fluidic communication with an inlet fitting outlet. The inlet fitting can be connectable to the inlet with the inlet fitting outlet adjacent the inlet. The outlet fitting can have an outlet fitting inlet in fluidic communication with an outlet fitting outlet. The outlet fitting can be connectable to the outlet with the outlet fitting inlet adjacent the outlet. When the inlet fitting is connected to the inlet, the inlet fitting outlet is at the inlet position and the inlet fitting inlet is at an adjusted inlet position. When the outlet fitting is connected to the outlet, the outlet fitting inlet is at the outlet position and the outlet fitting outlet is at an adjusted outlet position.

The adjusted inlet position can be associated with the inlet of a water manifold of a second heater that is different than the swimming pool or spa gas heater, while the adjusted outlet position can be associated with an outlet of the water manifold of the second heater that is different than the swimming pool or spa gas heater.

In accordance with embodiments of the present disclosure, a heat exchanger for a swimming pool or spa gas heater is provided that includes a plurality of tube-and-fin subassemblies. Each of the plurality of tube-and-fin subassemblies can include a first tube, a second tube, a third tube, a first plurality of fins, and a second plurality of fins. The first tube can extend through the first plurality of fins. The second tube can extend through the first plurality of fins and the second plurality of fins. The third tube can extend through the second plurality of fins. The first plurality of fins can be positioned adjacent the second plurality of fins, and the plurality of tube-and-fin subassemblies can be positioned in a semi-circular configuration.

In accordance with embodiments of the present disclosure, a water header manifold for a heat exchanger is provided that includes a main body, a circulation body, a first cartridge, and a second cartridge. The main body can include an inflow section and an outflow section. The inflow section can define an inflow chamber, and can include an inlet and a plurality of inlet ports in fluidic communication with the inflow chamber. The inlet can be configured to receive water to be heated from a pool or spa plumbing system, and the plurality of inlet ports can be configured to be placed in fluidic communication with a heat exchanger. The outflow section can define an outflow chamber, and can include an outlet and a plurality of outlet ports in fluidic communication with the outflow chamber. The outlet can be configured to provide heated water to the pool or spa plumbing system, and the plurality of outlet ports can be configured to be placed in fluidic communication with the heat exchanger. The circulation body can include a plurality of inlet ports, which can be configured to be placed in fluidic communication with the heat exchanger, and a plurality of outlet ports, which can be configured to be placed in fluidic communication with the heat exchanger. The first cartridge and the second cartridge can be positioned within the circulation body. The first cartridge, the second cartridge, and the circulation body can define a plurality of chambers, where each of the plurality of inlet ports can be configured to provide water to a heat exchanger tube from one of the plurality of chambers or the inflow chamber, and each of the plurality of outlet ports can be configured to receive water from a heat exchanger and discharge the received water into one of the plurality of chambers or the outflow chamber. Additionally, the plurality of chambers can direct water between the plurality of inlet ports and the plurality of outlet ports causing the water to circulate through an associated heat exchanger and from the inlet to the outlet.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed compact universal gas pool heater and associated methods, reference is made to the accompanying figures, wherein.

DETAILED DESCRIPTION OF THE PRESENT DISCLOSURE

In accordance with embodiments of the present disclosure, exemplary compact universal gas pool heaters are provided that allow for increased functionality and serviceability, as well as enhanced adaptability of the compact universal gas pool heater to various installation requirements and locations.

Figure 1:
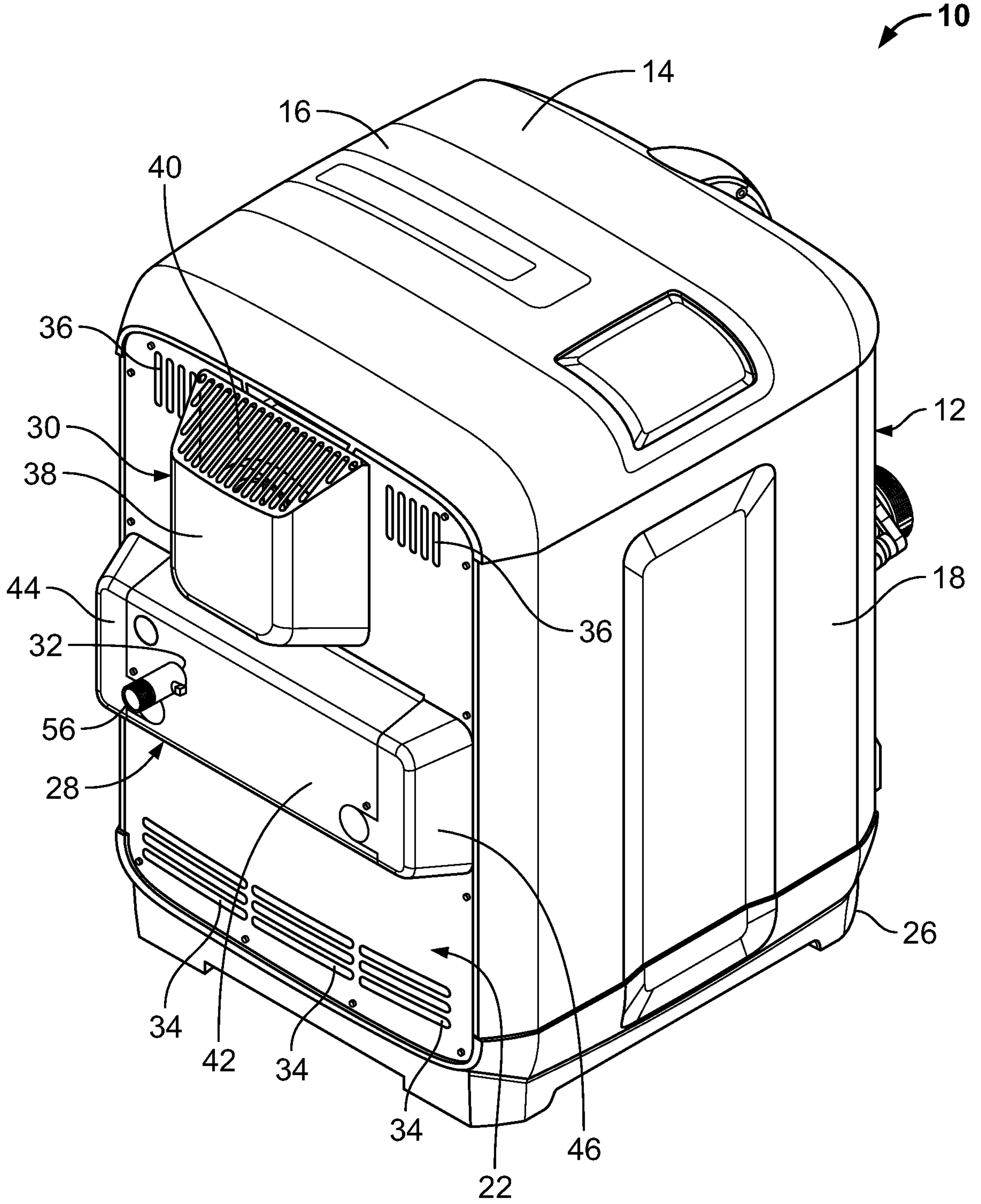
FIG. 1 is a first perspective view of an exemplary compact universal gas pool heater in accordance with embodiments of the present disclosure.

With initial reference to FIGS. 1-6, a compact universal gas pool heater 10 (hereinafter "gas heater 10") includes a cabinet 12 having a top panel 14 (e.g., a top), a user interface module 16, a first side panel 18 (e.g., a first side), a second side panel 20 (e.g., a second side), an exhaust side panel 22 (e.g., an exhaust side or a third side), a water header side panel 24 (e.g., a water header side or a fourth side), and a base 26 (e.g., a bottom). The first side panel 18, the second side panel 20, the exhaust side panel 22, and the water header side panel 24 can generally form a main body of the cabinet 12. As shown in FIGS. 1 and 4, which are, respectively, a first perspective view of the gas heater 10 and an elevational view of the exhaust side panel 22, the exhaust side panel 22 includes a dual junction box 28, an exhaust vent 30, a gas pipe opening 32, a plurality of lower vents 34, and a plurality of upper vents 36.

The exhaust vent 30 is generally positioned at, and extends outward from, an upper portion of the exhaust side panel 22. The exhaust vent 30 includes a body 38 having upper vents 40, and is configured to receive a portion of an exhaust pipe from the interior of the cabinet 12, allowing for exhaust fumes to exit the exhaust pipe and dissipate from the gas heater 10 through the top vents 40.

The dual junction box 28 includes an elongated body 42, a first cover 44, and a second cover 46. The elongated body 42 has a first open side 48 and a second open side 50 opposite the first open side 48. The first open side 48 includes a first notch 52 that extends inwardly towards the second open side 50, and the second open side 50 includes a second notch 54 that extends inwardly toward the first open side 48. Accordingly, the first and second notches 52, 54 are on opposite sides of the elongated body 42. The elongated body 42 also includes the gas pipe opening 32, through which a gas inlet pipe 56 extends from the interior of the cabinet 12 to the exterior. The first and second covers 44, 46 each, respectively, includes a body 58, 60 and a locking extension 62, 64 extending therefrom. The first cover 44 can be inserted into, or placed over, the first open side 48 of the elongated body 42 with the locking extension 62 adjacent to and cooperating with the first notch 52. Similarly, the second cover 46 can be inserted into, or placed over, the second open side 50 of the elongated body 42 with the locking extension 64 adjacent to and cooperating with the second notch 54. The locking extension 62 of the first cover 44 cooperates with the first notch 52 to form a first opening 66 into the dual junction box 28, while the locking extension 64 of the second cover 46 cooperates with the second notch 54 to form a second opening 68 into the dual junction box 28. The first and second openings 66, 68 allow for electrical cables to be inserted into the dual junction box 28 and connected with high-voltage and low-voltage electrical wires of the gas heater 10. The dual junction box 28 is discussed in greater detail in connection with FIGS. 12-14.

Figure 2:
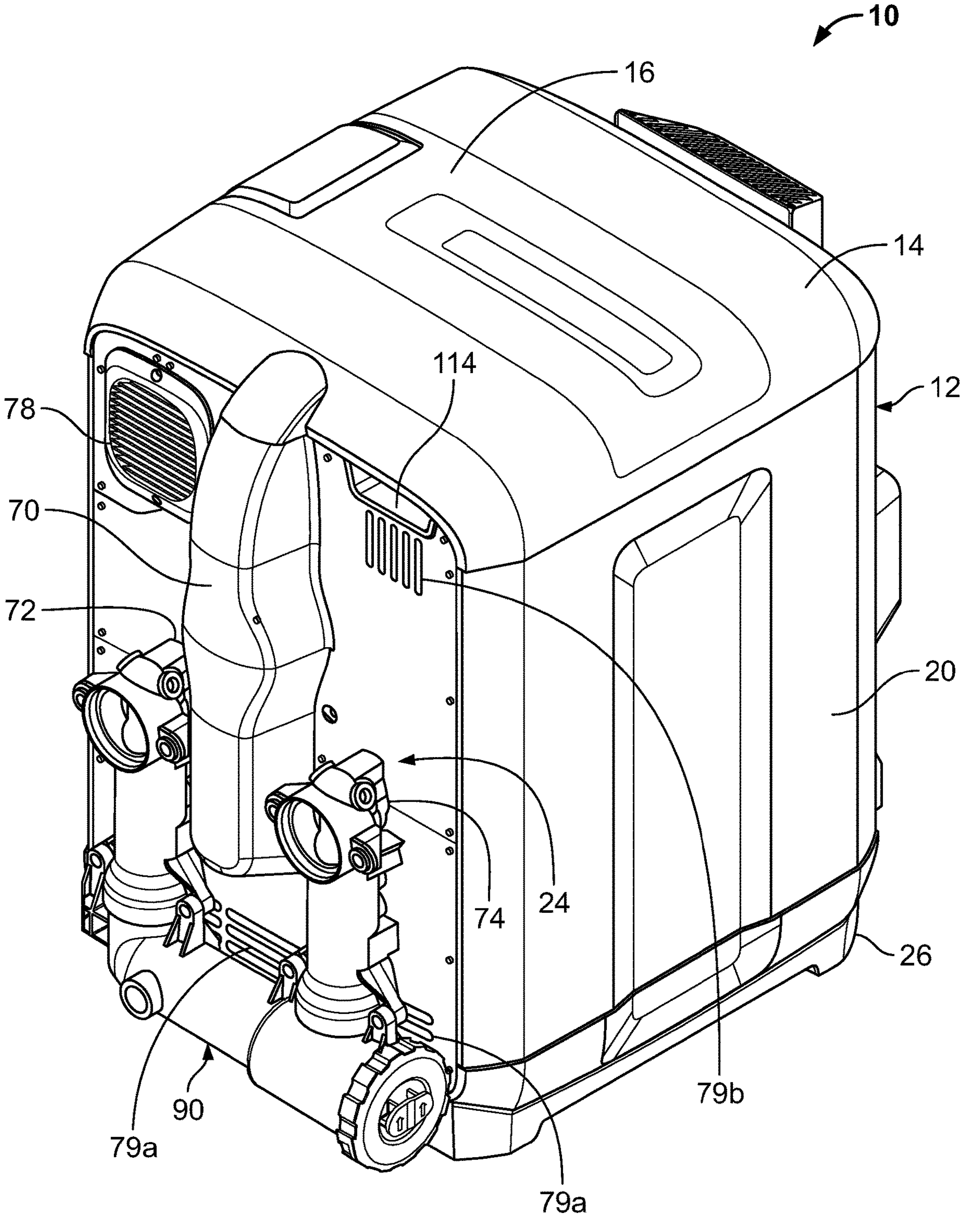
FIG. 2 is a second perspective view of the compact universal gas pool heater of FIG. 1.
Figure 3:
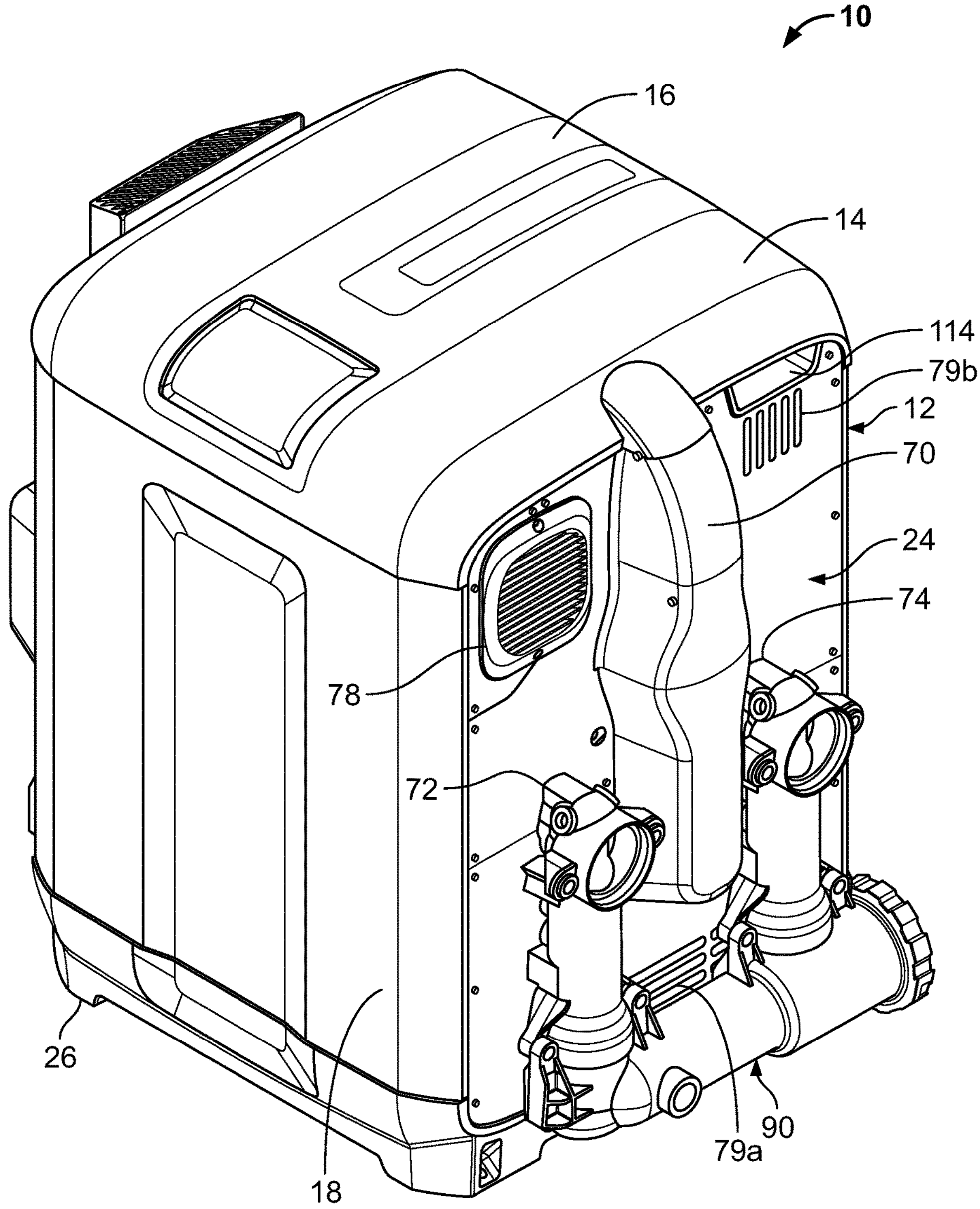
FIG. 3 is a third perspective view of the compact universal gas pool heater of FIG. 1.
Figure 4:
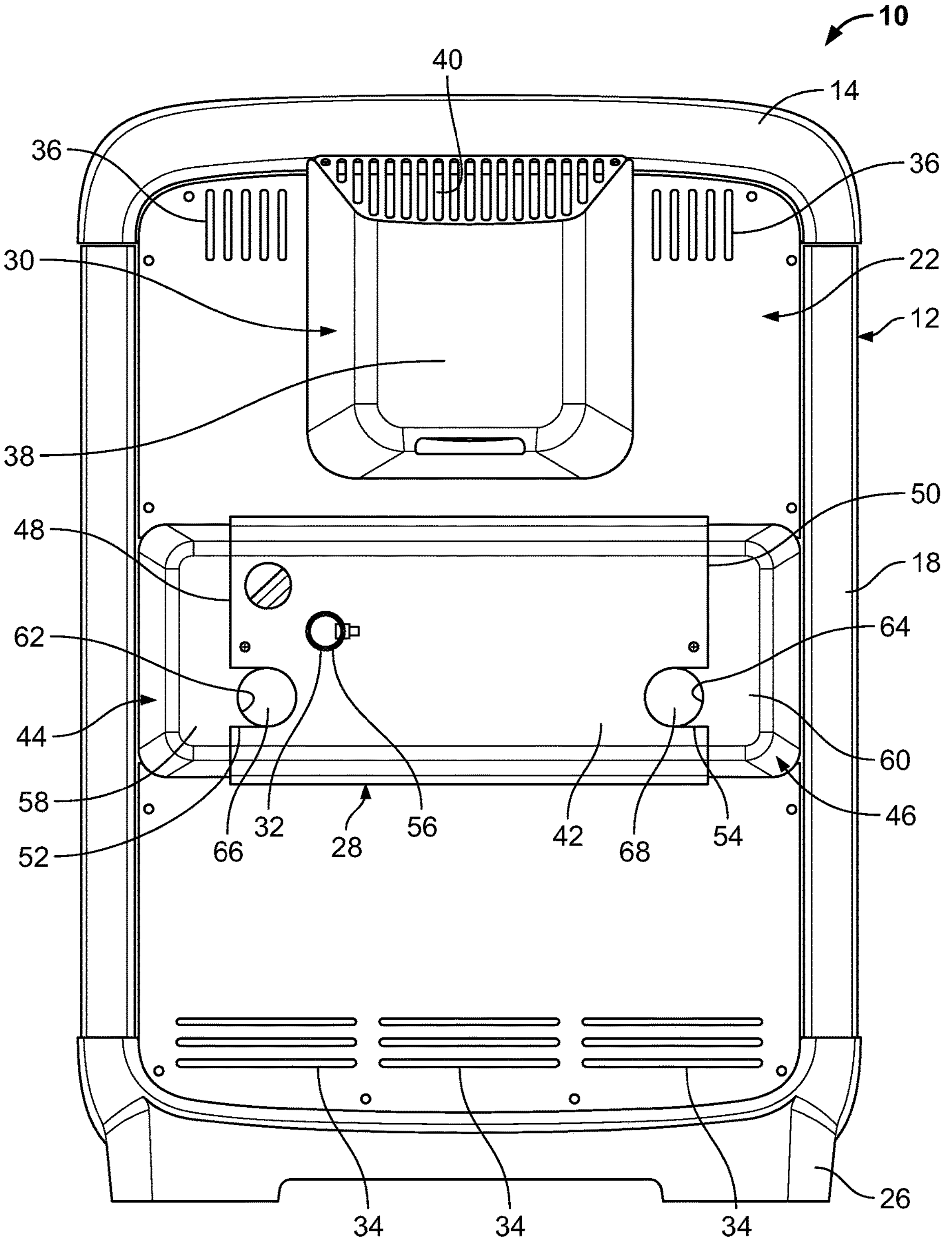
FIG. 4 is a first elevational view of the compact universal gas pool heater of FIG. 1 showing an exhaust side panel having an exhaust vent, a gas inlet, and electrical junction boxes.
Figure 5:
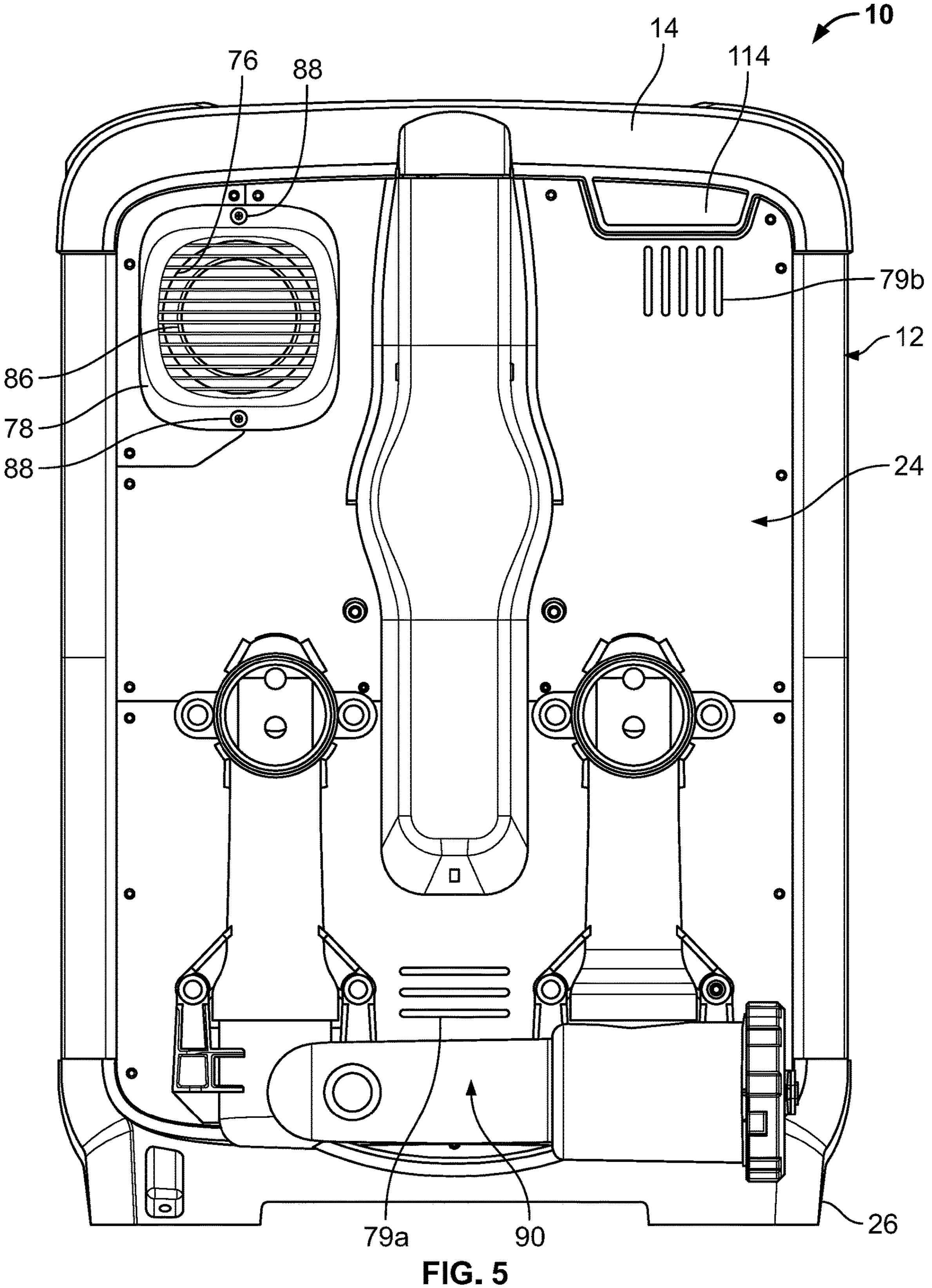
FIG. 5 is a second elevational view of the compact universal gas pool heater of FIG. 1 showing a water header side panel.

As shown in FIGS. 2, 3, and 5, which are second and third perspective views of the gas heater 10, and an elevational view of the water header side panel 24, respectively, the water header side panel 24 includes a piping cover 70, a water manifold inflow cutout 72, a water manifold outflow cutout 74, an air inlet opening 76 covered by a removable screen 78, a plurality of lower vents 79*a*, and a plurality of upper vents 79*b*. The piping cover 70 extends outward from the water header side panel 24 and provides space for a combustion blower 80 and gas-mixture pipe 82 (see, e.g., FIG. 15) that extends from the combustion blower 80 to a burner 84 (see, e.g., FIG. 22). The air inlet opening 76 is generally positioned adjacent an air inlet pipe 86 of the combustion blower 80, for example, it can be in the upper corner of the water header side panel 24 as shown in FIG. 5. The air inlet opening 76 allows for exterior air to be drawn therethrough, into the air inlet pipe 86, and into the combustion blower 80 to be used for combustion. The air inlet opening 76 can be covered by the screen 78, which can be removably secured to the water header side panel 24 by fasteners 88. The water manifold inflow cutout 72 and the water manifold outflow cutout 74 allow for a water header manifold 90 to extend into the interior of the cabinet 12 and be mounted to a tube sheet 91 (see, e.g., FIG. 23). The water header manifold 90 is discussed in greater detail in connection with FIGS. 31-38.

Figure 7:
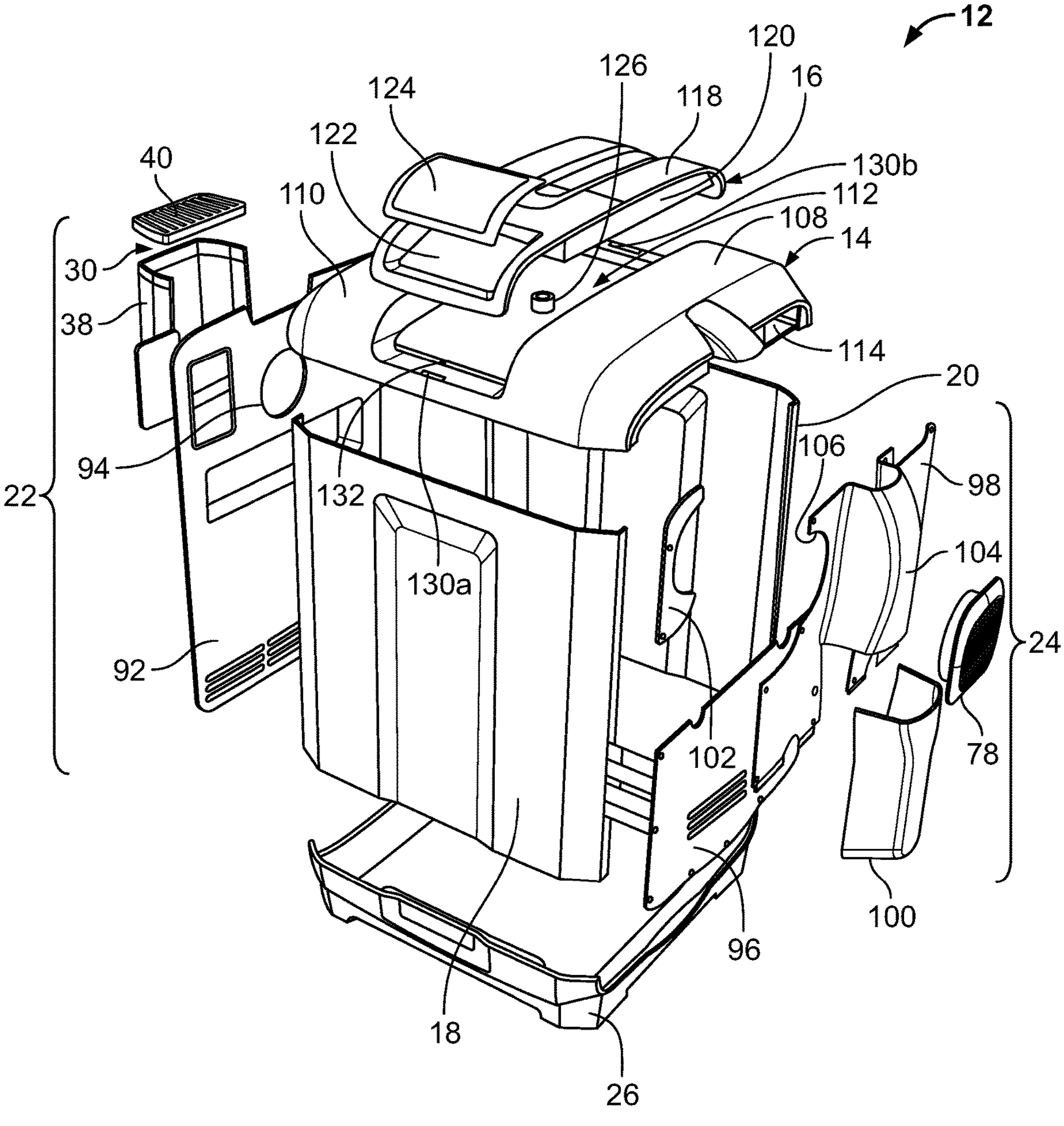
FIG. 7 is an exploded perspective view of a cabinet of the compact universal gas pool heater of FIG. 1.

FIG. 7 is an exploded perspective view of the cabinet 12. As shown in FIG. 7, the cabinet 12 includes the top panel 14, the user interface module 16, the first side panel 18, the second side panel 20, the exhaust side panel 22, the water header side panel 24, and the base 26. The exhaust side panel 22 includes an exhaust panel body 92 and the exhaust vent 30. The exhaust panel body 92 includes a circular opening 94 that receives a portion of an exhaust pipe from the interior of the cabinet 12, allowing for exhaust fumes to vent into the exhaust vent 30 and dissipate through the upper vents 36 of the exhaust vent 30. The water header side panel 24 can be a single panel or can be formed of multiple components including a bottom panel 96, a top panel 98, a bottom piping cover 100, and a first half 102 of the air inlet opening 76.

The top panel 98 can include a top piping cover 104 and a second half 106 of the air inlet opening 76. The top piping cover 104 cooperates with the bottom piping cover 100 to form the piping cover 70, as shown in and described in connection with FIG. 2. The first half 102 and the second half 106 cooperate to form the air inlet opening 76, as shown in and described in connection with FIG. 5, which the removable screen 78 is placed over. The top panel 14 generally includes a first lateral side 108, a second lateral side 110, and a central channel 112 that extends substantially the length of the top panel 14 between the first and second lateral sides 108, 110. The central channel 112 is generally a recess that extends between the first and second lateral sides 108, 110, and which is sized and configured to receive the user interface module 16. The top panel 14 also includes first and second handles 114, 116 on opposite sides thereof (see, e.g., FIGS. 1 and 7) for readily grasping the top panel 14 and removing it from the remainder of the cabinet 12, or for moving the entire gas heater 10. The user interface module 16 includes an elongated body 118, an electronics housing 120, a user interface 122, and a cover 124. The user interface module 16 is sized and shaped to fit within the central channel 112 of the top panel 14.

Figure 8:
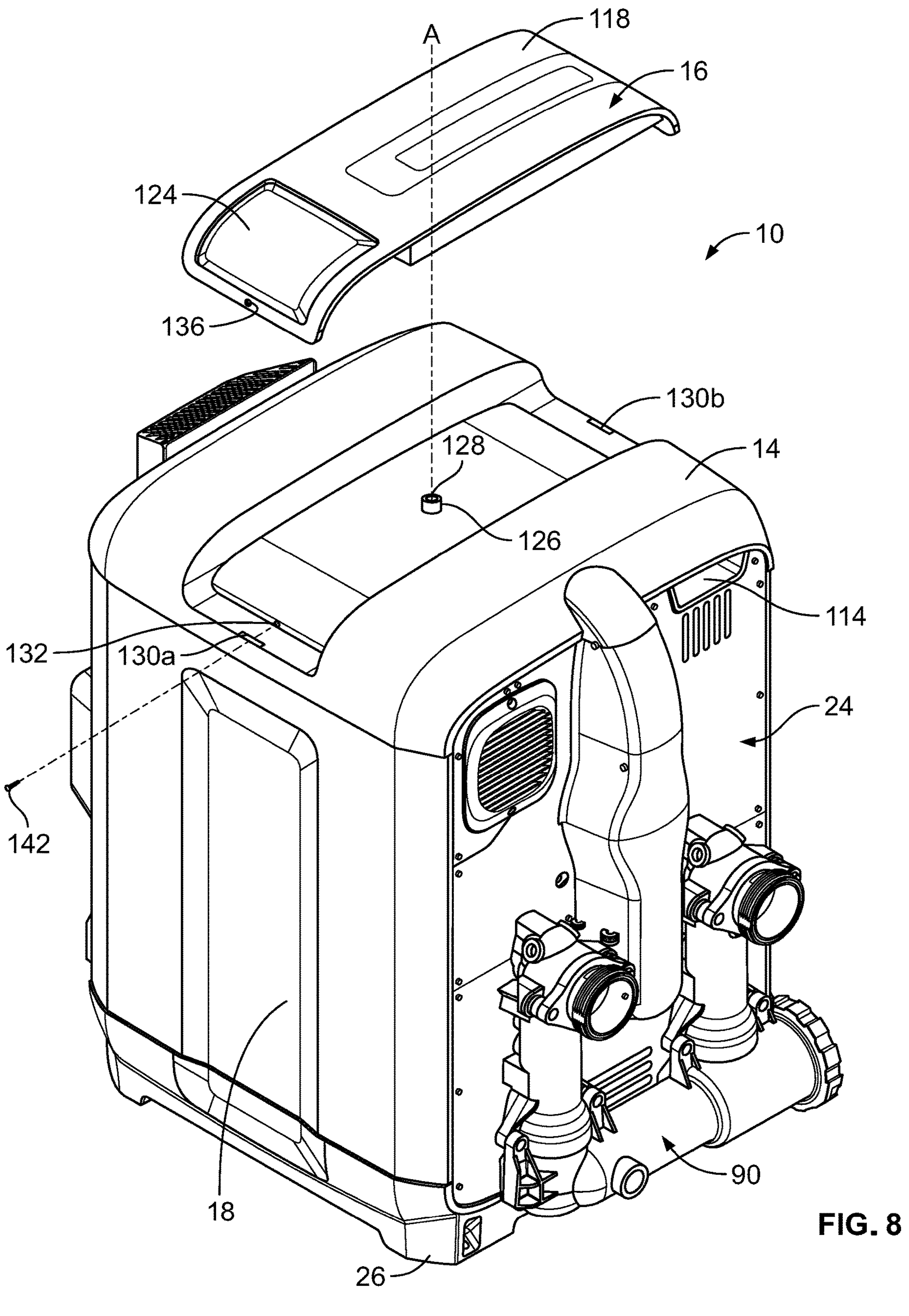
FIG. 8 is an exploded perspective view of the compact universal gas pool heater of FIG. 1 showing a user interface module separated from a cabinet top.
Figure 9:
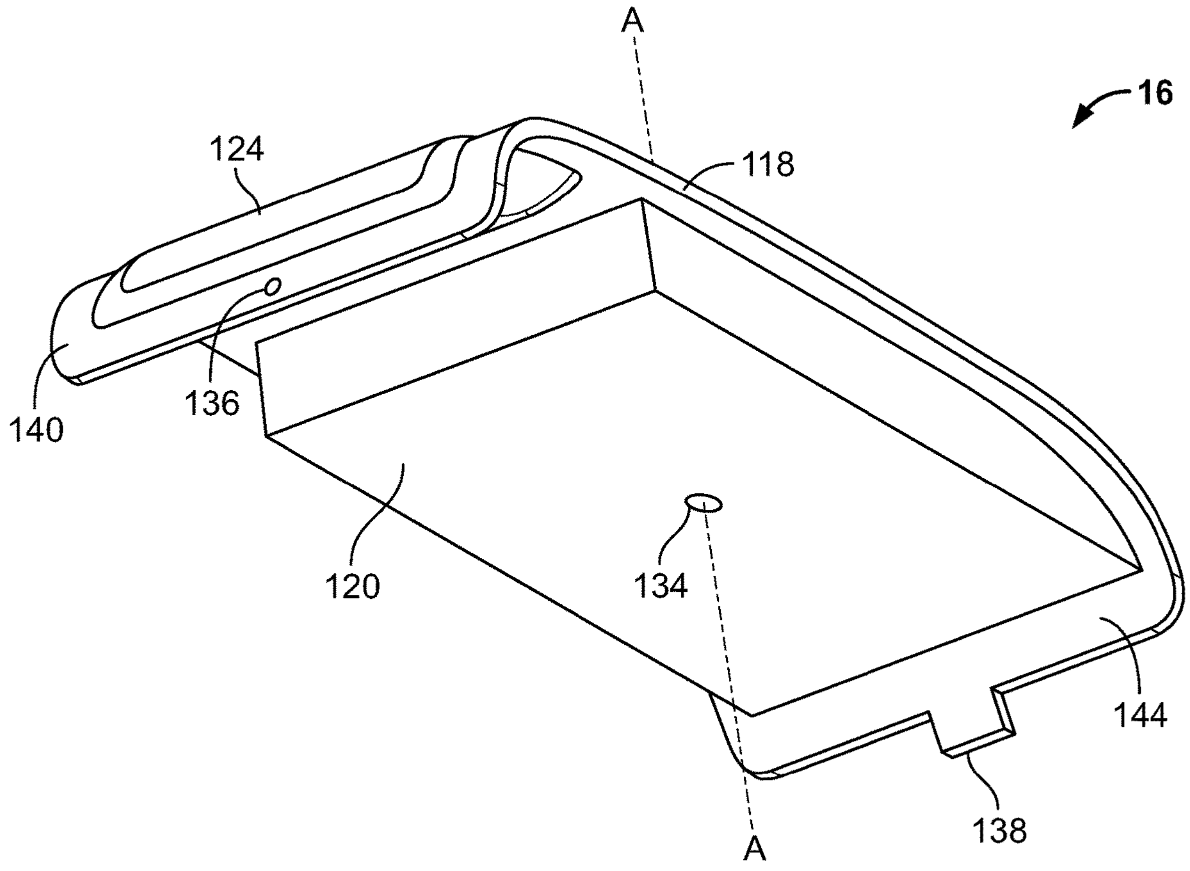
FIG. 9 is a bottom perspective view of the user interface module of FIG. 8.

FIGS. 8 and 9 illustrate the user interface module 16 and the top panel 14 in greater detail. Specifically, FIG. 8 is a partially exploded perspective view of the user interface module 16 separated from the top panel 14, and FIG. 9 is a bottom perspective view of the user interface module 16. According to aspects of the present disclosure, the orientation of the user interface module 16 on the top panel 14 can be reversed in order to suit different installation positions and requirements. As shown in FIG. 8, the top panel 14 includes a central hub 126 that is positioned in, and extends from, the center of the central channel 112. The central hub 126 defines a hole 128 that extends through the top panel 14 to the interior of the cabinet 12. The hole 128 is configured to receive a multi-conductor cable (not shown) that is routed through the hole 128 and the central hub 126, and connected to the user interface module 16, thus placing the user interface module 16 in electrical communication with the interior electronics of the gas heater 10. The central hub 126 is a raised wall that forces water, e.g., rain water, to flow there around, thus preventing water from flowing into the hole 128 and into the cabinet 12. Accordingly, the cabinet 12 is resistant to the entry of water, which it may be exposed to due to the gas heater 10 being located outdoors and in contact with the elements, such as rain and snow. Additionally, the central channel 112 can be sloped from the center to the outside ends thereof, which forces water to flow outward and off of the top panel 14, to prevent and/or inhibit pooling. The top panel 14 also includes first and second engagement mechanisms 130*a*, 130*b* (e.g., indentations or notches) on opposite ends of the central channel 112, along with two fastener holes 132. The engagement mechanisms 130*a*, 130*b* and fastener holes 132 are configured to assist with securing the user interface module 16 to the top panel 14.

As shown in FIG. 9, the user interface module 16 also includes a central recess 134, a fastener hole 136, and a user interface engagement mechanism 138 (e.g., a hook or extension). The central recess 134 is positioned in the center of the user interface module 16 and extends into the electronics housing 120. The central recess 134 is sized and configured to receive the central hub 126 of the top panel 14 when the user interface module 16 is mounted on the top panel 14. The central recess 134 allows for the multi-conductor cable extending out from the central hub 126 to extend into the electronics housing 120 and electrically connect with the electronics of the user interface module 16. The fastener hole 136 is generally positioned adjacent the cover 124 and extends through a curved front wall 140 of the elongated body 118. When the user interface module 16 is positioned on the top panel 14, the fastener hole 136 of the user interface module 16 will be aligned with either one of the fastener holes 132 of the top panel 14 such that a fastener 142, e.g., a screw, a Christmas tree retainer, etc., can be inserted through the fastener holes 132, 136 to secure the user interface module 16 to the top panel 14. The user interface engagement mechanism 138 extends from a curved rear wall 144 of the elongated body 118, and is sized and shaped to extend into and engage the engagement mechanisms 130*a*, 130*b* of the top panel 14.

To secure the user interface module 16 to the top panel 14, a user first places the user interface engagement mechanism 138 into one of the engagement mechanisms 130*a*, 130*b*, e.g., the second engagement mechanism 130*b*, of the top panel 14 to prevent the user interface module 16 from longitudinal movement. The user then lowers the user interface module 16 into the central channel 112 so that the central hub 126 is inserted into the central recess 134 and the fastener hole 136 of the user interface module 16 is aligned with the fastener hole 132 of the top panel 14. At this point, the user interface module 16 is positioned between the first and second lateral sides 108, 110 of the top panel 14, which prevent the user interface module 16 from moving laterally. The user then inserts the fastener 142 into the fastener holes 132, 136 to fully secure the user interface module 16 to the top panel 14. Specifically, the fastener 142 prevents vertical and rotational movement of the user interface module 16. At this point, the user interface module 16 is in a first position. To change the orientation of the user interface module 16 to a second position, a user removes the fastener 142, lifts the user interface module 16 vertically off of the top panel 14, and rotates the user interface module 16 one-hundred and eighty (180) degrees about central axis A. The user then repeats the steps for securing the user interface module 16 to the top panel 14, but instead of placing the user interface engagement mechanism 138 in the second engagement mechanism 130*b*, the user interface engagement mechanism 138 is placed in the first engagement mechanism 130*a*. The user then lowers the user interface module 16 until it rests in the central channel 112, and inserts the fastener 142 into the fastener holes 132, 136 to fully secure the user interface module 16 to the top panel 14. Thus, the user interface module 16 can be placed in two different configurations that are one-hundred and eighty (180) degrees opposite of each other without requiring the entire top 14 to be removed and rotated. That is, in the first position, the user interface 122 of the user interface module 16 is easily accessible by a user standing at the first side panel 18 of the cabinet 12, while in the second position the user interface 122 of the user interface module 16 is easily accessible by a user standing at the second side panel 20 of the cabinet 12.

When the user interface module 16 is secured to the top panel 14, the top portion of the elongated body 118 lies flush with first and second lateral sides 108, 110 of the top panel 14. However, the fit between the user interface module 16 and the first and second lateral sides 108, 110 of the top 14 need not be a rain-proof seal, instead a small gap can be provided that allows for water, e.g., rain water, to flow around and below the user interface module 16, where it is channeled to the edges of the top panel 14 and runs off the gas heater 10. As discussed above, the central hub 126 prevents the ingress of water into the cabinet 12.

Figure 10:
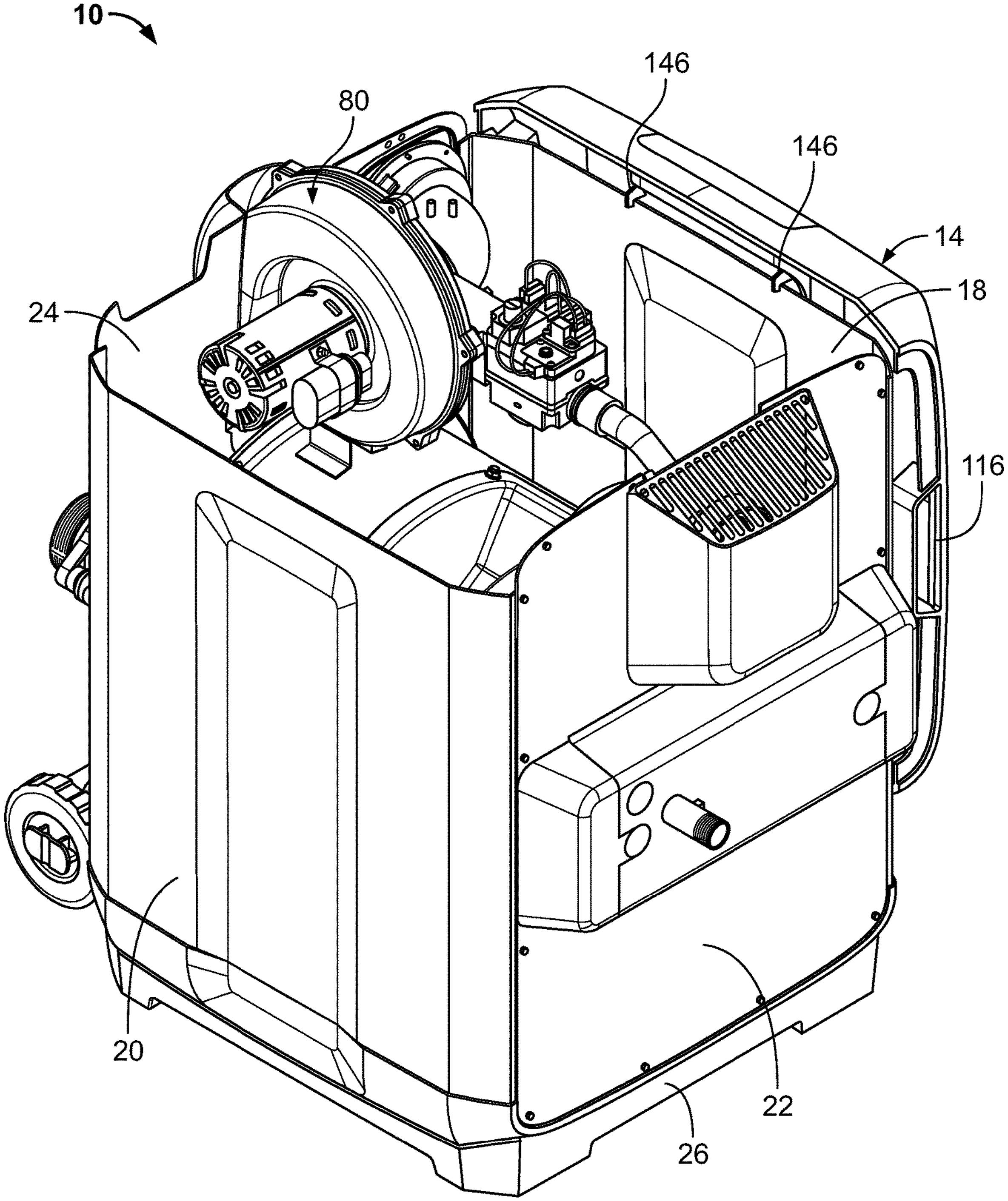
FIG. 10 is a perspective view of the compact universal gas pool heater of FIG. 1 showing the cabinet top removed and removably secured on a side of the cabinet.
Figure 11:
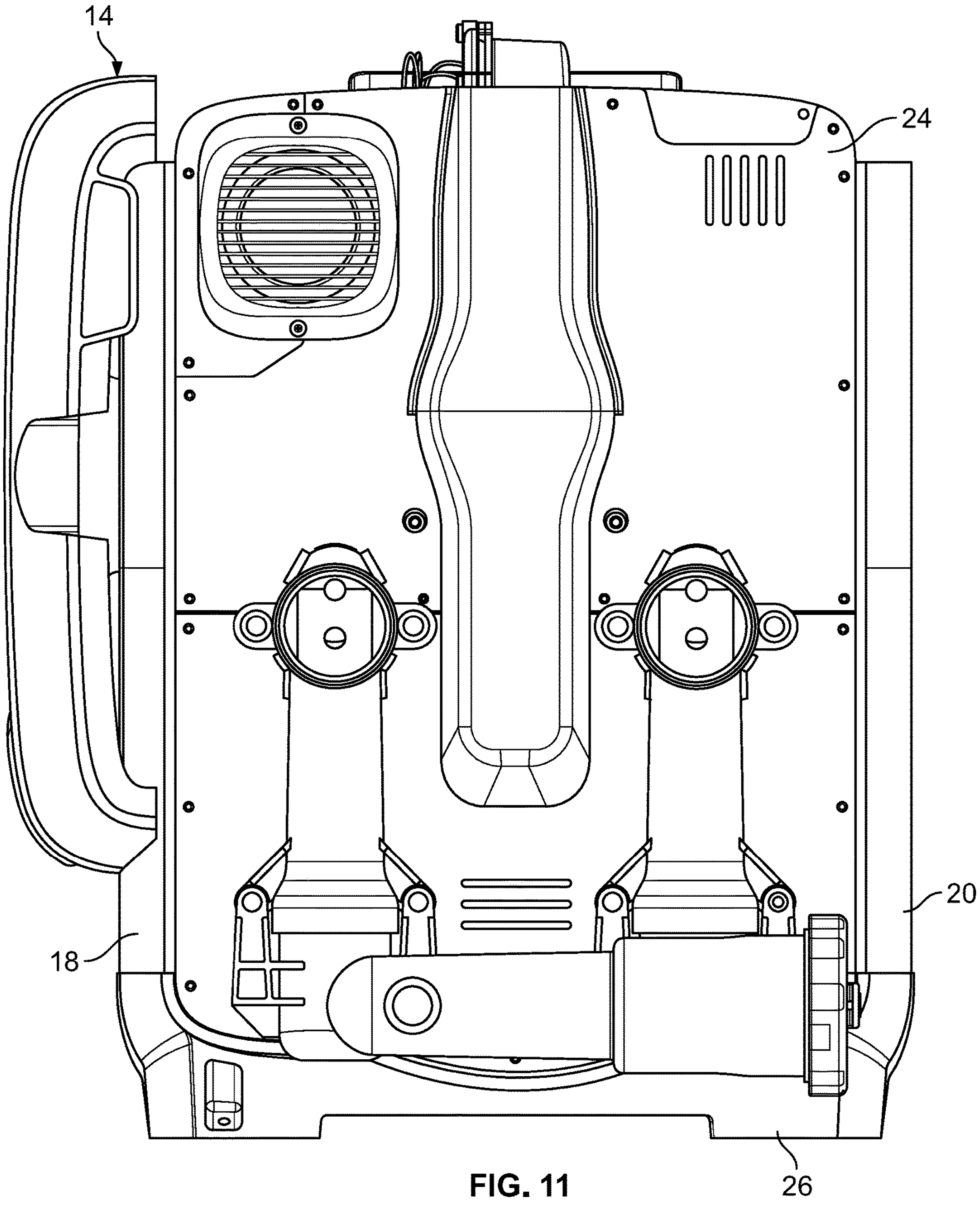
FIG. 11 is an elevational view of the compact universal gas pool heater of FIG. 10 showing the cabinet top removed and removably secured on a side of the cabinet.

Turning now to FIGS. 10 and 11, an easy storage aspect of the top panel 14 is shown. Specifically, FIGS. 10 and 11 are, respectively, perspective and side views showing the top panel 14 removed from the remainder of the cabinet 12 and hanged on the first side panel 18 so that the gas heater 10 can be serviced. As shown in FIGS. 10 and 11, the top panel 14 can have one or more hanging devices 146 extending from edges or underside thereof that facilitate hanging the top panel 14 from the first side panel 18 or the second side panel 20. For example, the hanging devices 146 can be hooks, ledges, blocks, or other suitable geometry to easily hang or removably attach the top panel 14 on the first side panel 18 or the second side panel 20. The hanging devices 146 can be on a single side of the top panel 14, or can be on multiple sides. This construction allows a user to perform a majority of repair and service on the internal components of the gas heater 10 by removing the top panel 14, and conveniently storing the top panel 14 on the cabinet 12 during such repair and service. Specifically, if a user desires to repair or service the gas heater 10, they can remove the top panel 14 and hang it on one of the first and second side panels 18, 20 by the hanging devices 146 so that it lies flush with the first or second side panel 18, 20 that it is hung from, thus maintaining the top panel 14 in an easily accessible location. Furthermore, since the multi-conductor cable (not shown) connects the user interface module 16 to the electrical components of the gas heater 10, the user interface module 16, which is connected to the top panel 14 as discussed in connection with FIGS. 8 and 9, must remain close by. This is made possible by allowing the top panel 14 to be hanged from the first and second side panels 18, 20.

Figure 6:
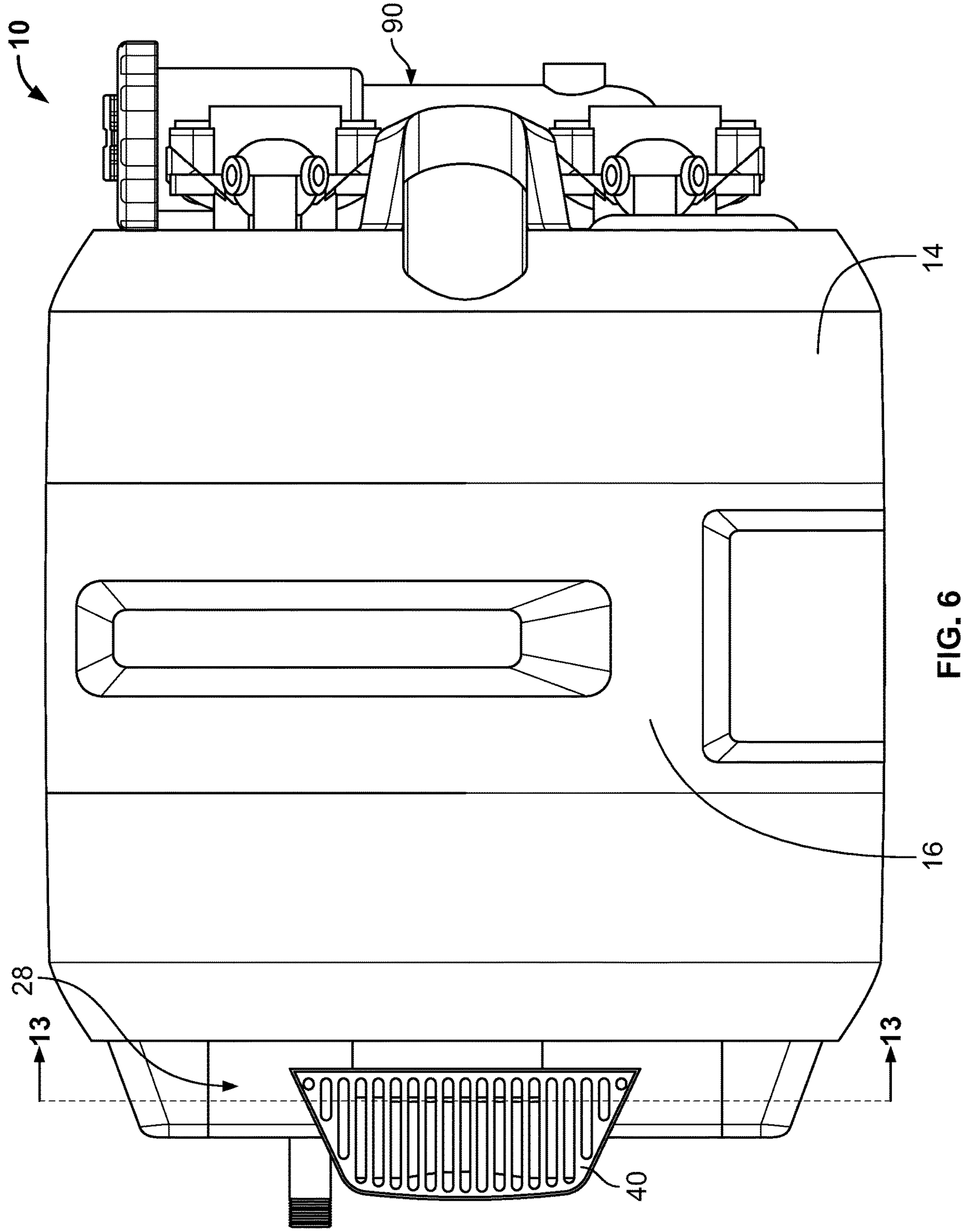
FIG. 6 is a top plan view of the compact universal gas pool heater of FIG. 1.
Figure 12:
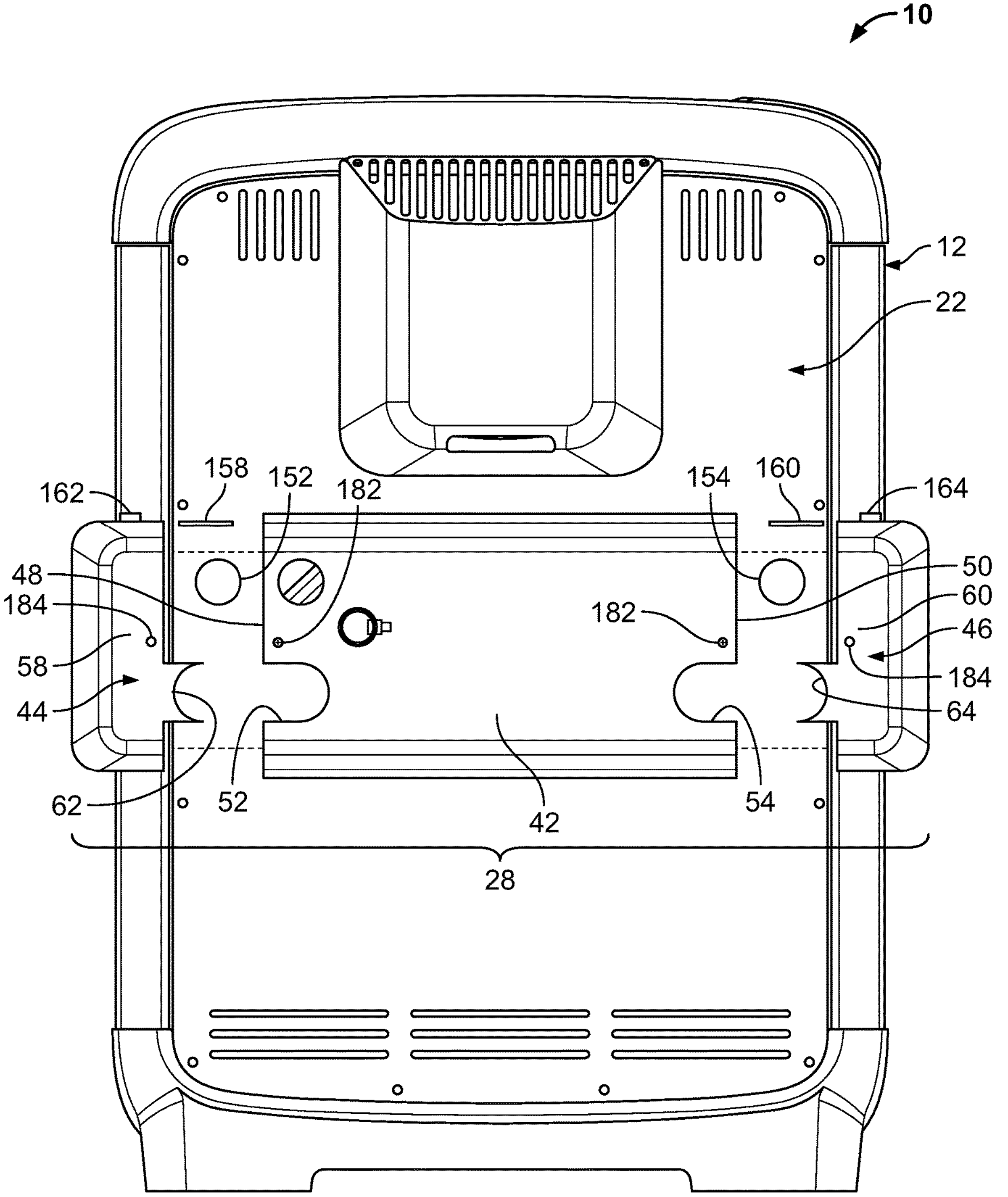
FIG. 12 is an exploded elevational view of the compact universal gas pool heater of FIG. 1 showing the exhaust side panel with first and second covers of a dual junction box exploded.
Figure 13:
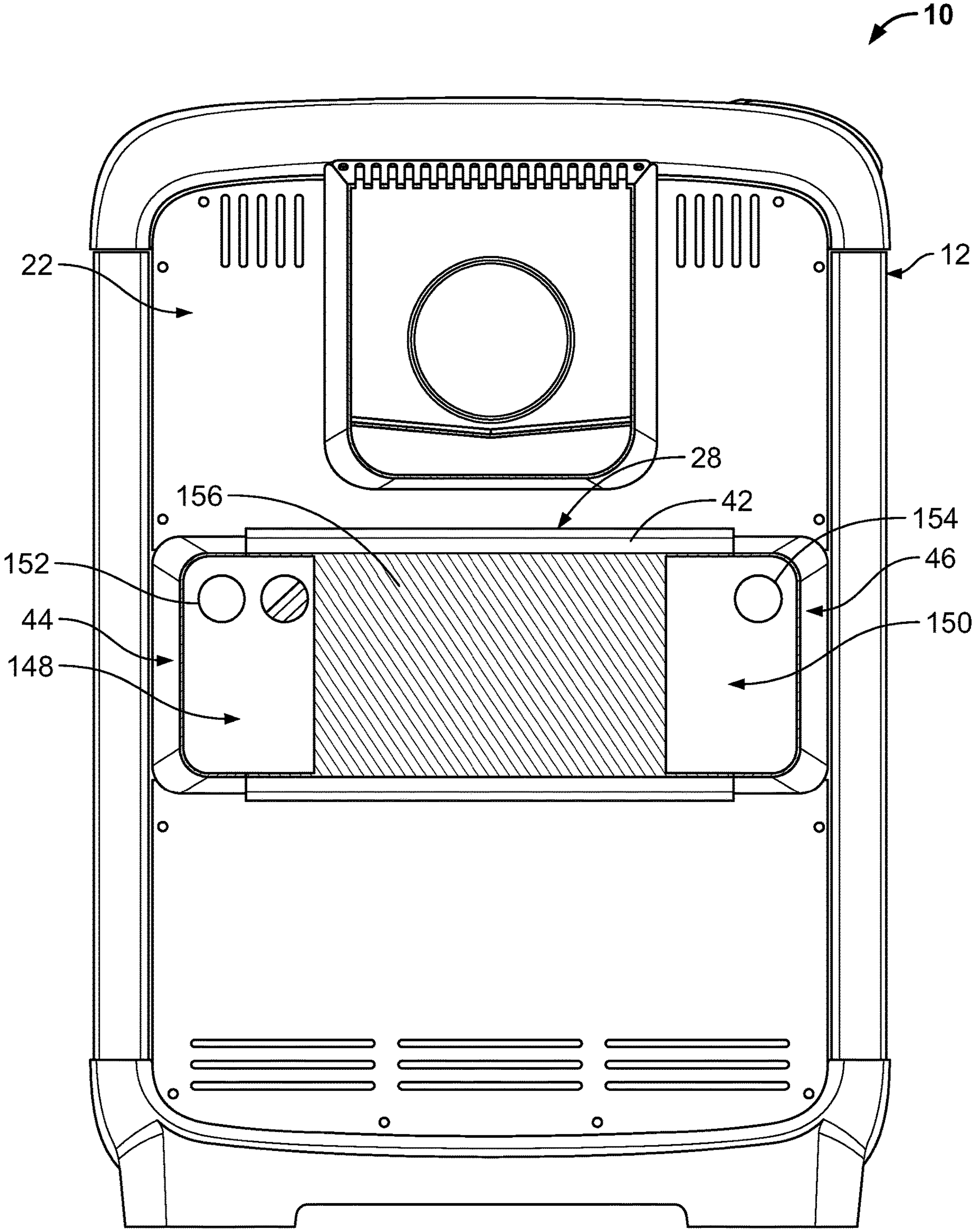
FIG. 13 is a sectional view of the compact universal gas pool heater taken along Line 13-13 of FIG. 6.
Figure 14:
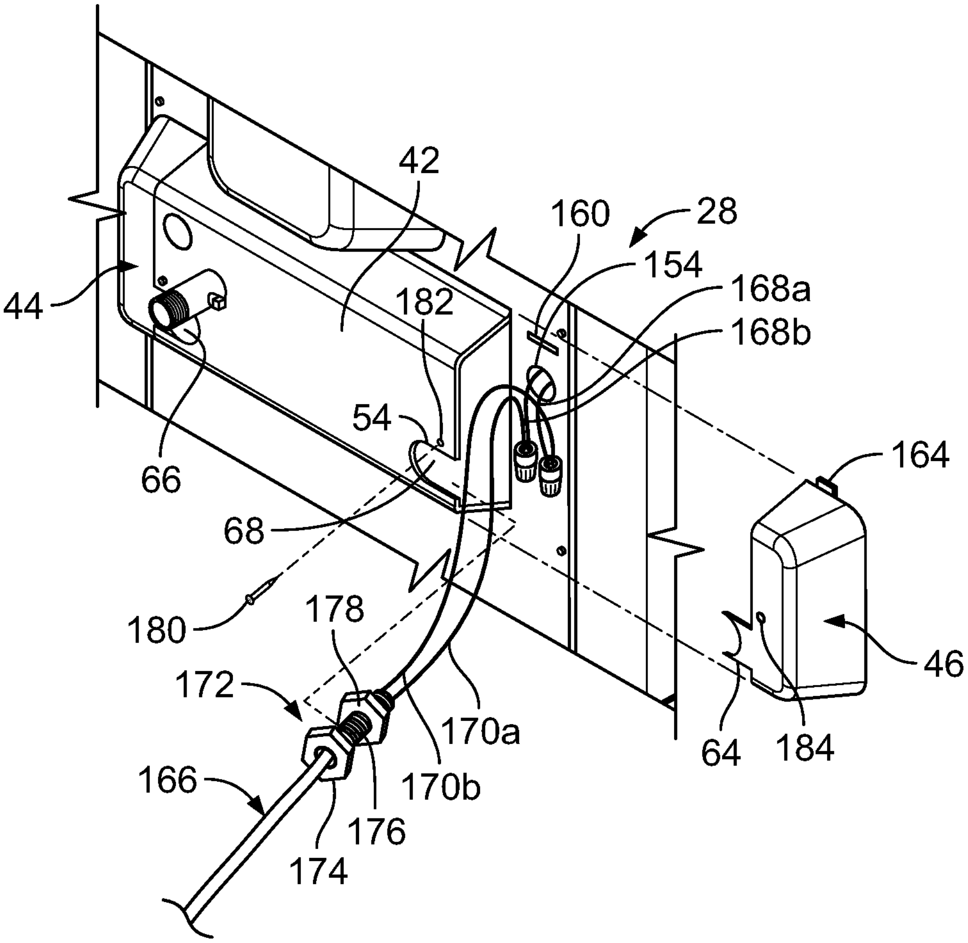
FIG. 14 is an exploded perspective view showing details of the dual junction box with the second cover exploded.

Turning to FIGS. 12-14, the dual junction box 28 is shown in greater detail. FIG. 12 is a partially exploded elevational view of the gas heater 10 showing the exhaust side panel 22 with the first and second covers 44, 46 exploded from the elongated body 44 of the dual junction box 28. FIG. 13 is a sectional view of the compact universal gas pool heater taken along Line 13-13 of FIG. 6 showing the interior of the dual junction box 28. As discussed in detail above in connection with FIG. 4, the dual junction box 28 includes the elongated body 42, the first cover 44, and the second cover 46. The first and second open sides 48, 50 are on opposite sides of the elongated body 42, with the first open side 48 providing access to a first chamber 148, e.g., a low-voltage chamber, and the second open side 50 providing access to a second chamber 150, e.g., a high-voltage chamber. As discussed above in connection with FIG. 4, the first cover 44 can be inserted into, or placed over, the first open side 48 of the elongated body 42 with the locking extension 62 adjacent to and cooperating with the first notch 52. Thus, when the first cover 44 is inserted into or placed over the elongated body 42 it forms part of the low-voltage chamber 148. Similarly, the second cover 46 can be inserted into, or placed over, the second open side 50 of the elongated body 42 with the locking extension 64 adjacent to and cooperating with the second notch 54. Thus, when the second cover 46 is inserted into or placed over the elongated body 42, it forms part of the high-voltage chamber 150.

The exhaust side panel 22 includes a first wire port 152, e.g., a low-voltage wire port, and a second wire port 154, e.g., a high-voltage wire port, that extend therethrough and into the interior of the cabinet 12. The low-voltage wire port 152 is generally positioned in the low-voltage chamber 148 such that low-voltage wires can extend into the low-voltage chamber 148 from the interior of the cabinet 12. The high-voltage wire port 154 is generally positioned in the high-voltage chamber 150 such that high-voltage wires can extend into the high-voltage chamber 150 from the interior of the cabinet 12. As shown in FIG. 13, the dual junction box 28 includes an interior wall 156 that separates and isolates the high-voltage chamber 150 from the low-voltage chamber 148. The interior wall 156 and the elongated body 42 of the dual junction box 28 can be constructed of metal, while the first and second covers 44, 46 can be constructed of plastic.

Additionally, the exhaust side panel 22 can include first and second slots 158, 160 on opposite sides of the elongated body 42, while the first and second covers 44, 46 can have first and second locking protrusions 162, 164, respectively. The first and second locking protrusions 162, 164 are configured to be inserted into the first and second slots 158, 160 during installation of the first and second covers 44, 46, and prevent the first and second covers 44, 46 from being pulled away from the exhaust side panel 22 when installed.

As discussed above, when the first and second covers 44, 46 are inserted into, or placed over, the elongated body 42, the locking extension 62 of the first cover 44 cooperates with the first notch 52 of the elongated body 42 to form the first opening 66 (e.g., a low-voltage opening) that accesses the low-voltage chamber 148 of the dual junction box 28, while the locking extension 64 of the second cover 46 cooperates with the second notch 54 to form the second opening 68 (e.g., a high-voltage opening) that accesses the high-voltage chamber 150 of the dual junction box 28. The first opening 66 allows for low-voltage electrical cables external to the gas heater 10 to be inserted into the low-voltage chamber 148 of the dual junction box 28 and connected with low-voltage electrical wires internal to the gas heater 10. The second opening 68 allows for high-voltage electrical cables external to the gas heater 10 to be inserted into the high-voltage chamber 150 of the dual junction box 28 and connected with high-voltage electrical wires internal to the gas heater 10.

FIG. 14 is a partially exploded perspective view of the dual junction box 28 with the second cover 46 exploded and showing installation of a high voltage cable 166. As shown in FIG. 14, to install the high voltage cable 166, the second cover 46 is removed from the elongated body 42, thus exposing high-voltage interior wires **168*a*, 168*b* that extend out from the high-voltage wire port 154. The high-voltage cable 166, which includes high-voltage exterior wires 170*a*, 170*b*, a conduit fitting 172 having a head 174, a threaded extension 176 extending from the head 174, and a locking nut 178, can be temporarily retained by the second notch 54 of the elongated body 42 while the operator connects the wiring. Specifically, the threaded extension 176 can be inserted into the second opening 68 of the second notch 54 such that the head 174 and locking nut 178 of the conduit fitting 172 engage the second notch 54 and thus retain the high-voltage cable 166 in place. This allows an installer to leave the conduit fitting 172 unmounted while making the wire connections within the junction box 28. The installer can then engage the first high-voltage interior wire 168*a* with the first high-voltage exterior wire 170*a*, and engage the second high-voltage interior wire 168*b* with the second high-voltage exterior wire 170*b*. Once the wiring is complete, the installer can tighten the nut 178 to secure the conduit fitting 172 to the dual junction box 28. Alternatively, the nut 178 and head 174 can be close enough together so that the nut 178 need not be tightened to secure the conduit fitting 172 to the dual junction box 28. Once the conduit fitting 172 is secured to the dual junction box 28, the installer can then cover the wires with the second cover 46 by inserting the second locking protrusion 164 into the second slot 160 and sliding the second cover 46 into the elongated body 42. A fastener 180 (e.g., a screw, Christmas tree retainer, etc.) can be inserted through a hole 182 of the elongated body 42 and a hole 184 of the second cover 46 to secure the second cover 46 and the elongated body 42 together. When the second cover 46 is installed, the locking extension 64 of the second cover 46 cooperates with the second notch 54 to form the second opening 68 in which the conduit fitting 172 is mounted, thus retaining the conduit fitting 172. It should be understood by a person of ordinary skill in the art that a similar installation procedure can be performed for the first cover 44** and associated low-voltage wires.

Figure 15:
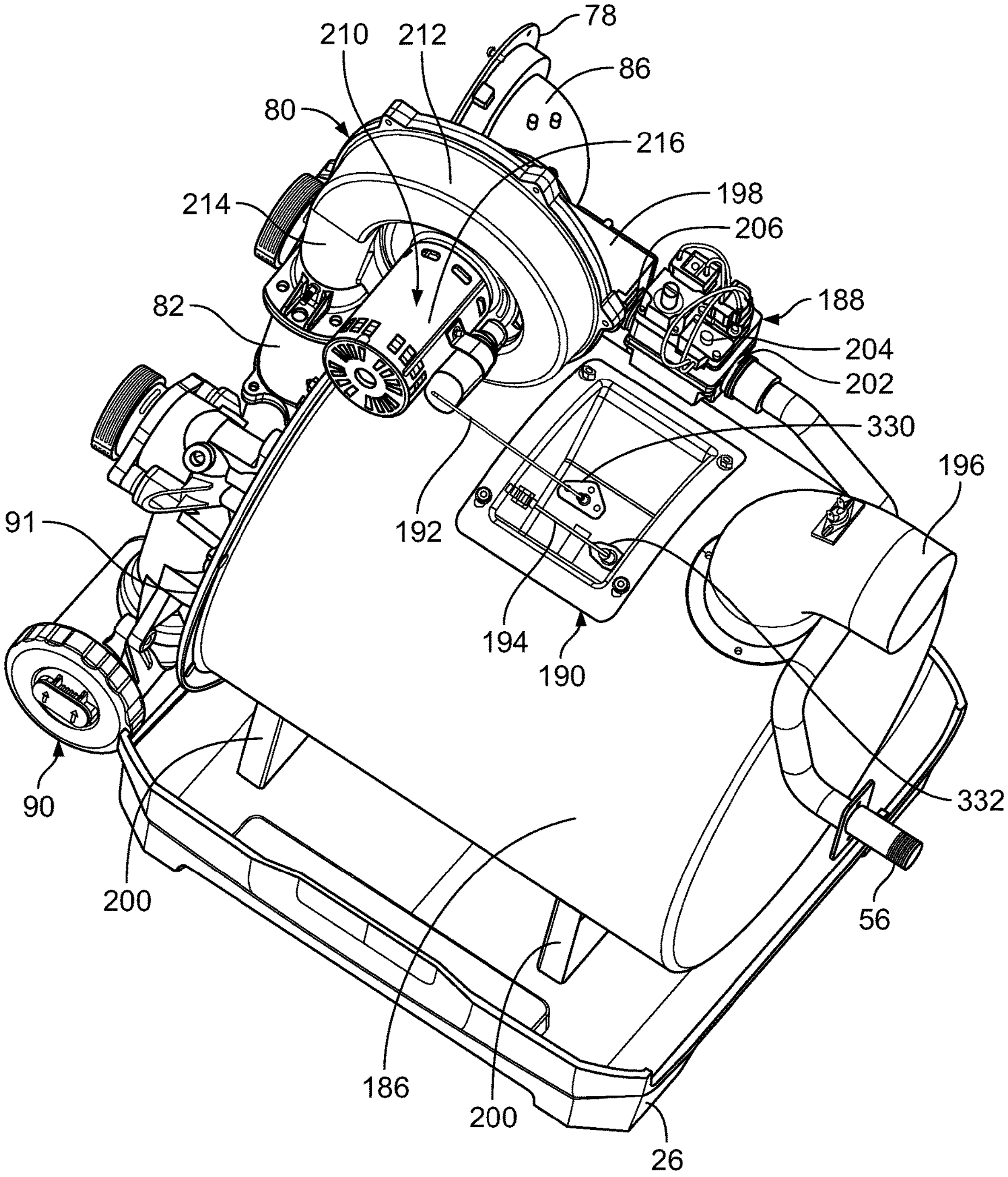
FIG. 15 is perspective view of the compact universal gas pool heater of FIG. 1 with the cabinet top and side panels removed.
Figure 16A:
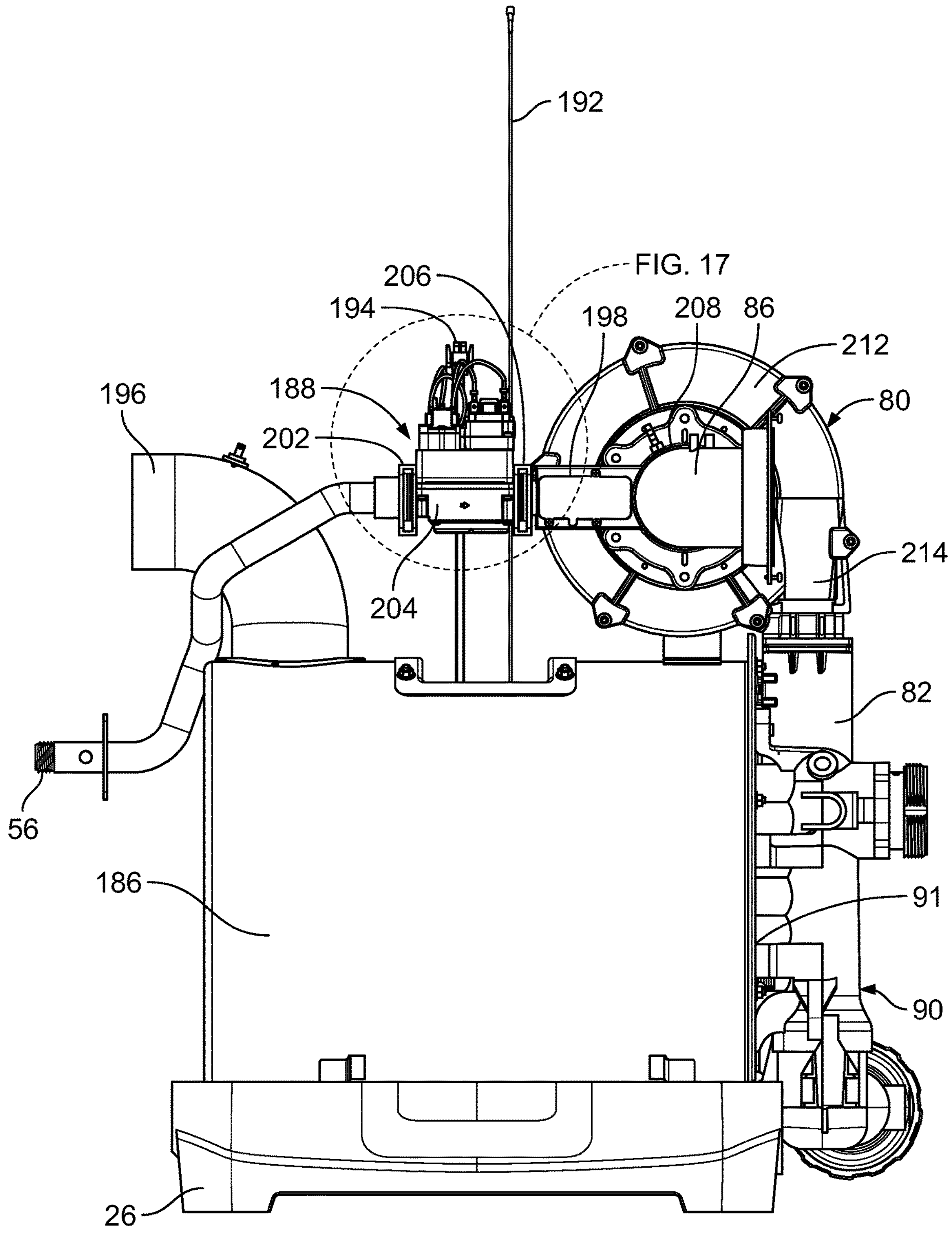
FIG. 16A is a side elevational view of the compact universal gas pool heater of FIG. 15.
Figure 16B:
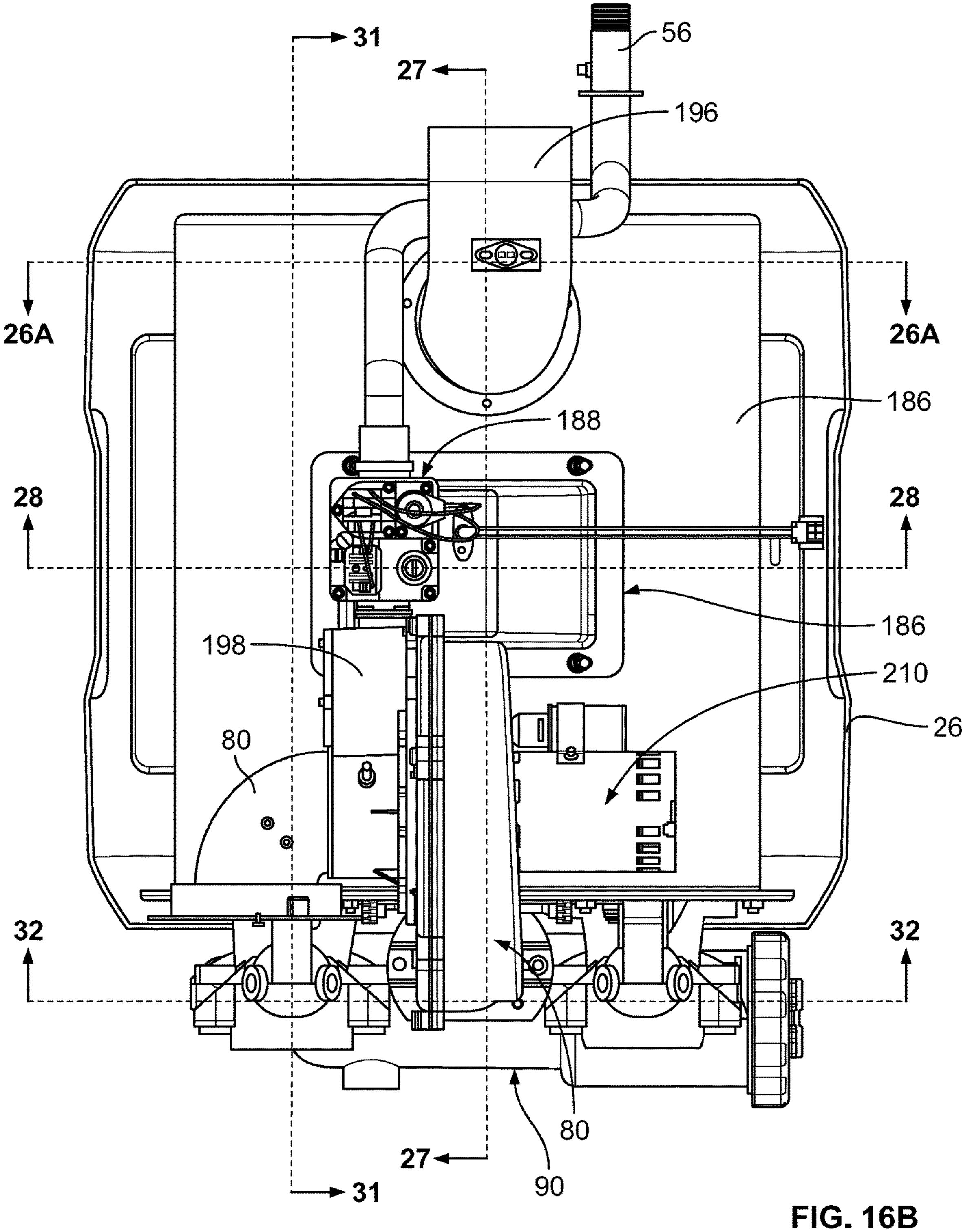
FIG. 16B is a top plan view of the compact universal gas pool heater of FIG. 15.

Turning now to FIGS. 15, 16A, and 16B, the gas heater 10 is shown in greater detail with the panels 14, 18, 20, 22, 24 of the cabinet 12 removed. Specifically, FIGS. 15, 16A, and 16B are, respectively, perspective, side elevational, and top plan views of the compact universal gas pool heater 10 with the panels 14, 18, 20, 22, 24 removed showing the internal components housed by the cabinet 12. The gas heater 10 generally includes the gas inlet pipe 56, the combustion blower 80, the air inlet pipe 86, the tube sheet 91, a combustion chamber canister 186, a gas valve 188, a mount 190 (e.g., an igniter mount), a flame sensor 192, an igniter 194, an exhaust pipe 196 mounted to the combustion chamber canister 186, and a venturi throat 198. The combustion chamber canister 186 is mounted to the tube sheet 91 on the opposite side to which the water header manifold 90 is mounted. The combustion chamber canister 186 includes legs 200 that support the combustion chamber canister 186 on the base 26. The mount 190 is secured to the combustion chamber canister 186, with the flame sensor 192 and igniter 194 mounted thereto and extending therethrough into the combustion chamber canister 186. The mount 190 is discussed in greater detail below in connection with FIGS. 27-29.

The gas valve 188 generally includes an inlet 202, a valve body 204, and an outlet 206. The inlet 202 of the gas valve 188 is connected with the gas inlet pipe 56, such that the gas inlet pipe 56 provides gas, e.g., propane or natural gas, to the inlet 202 and thus to the gas valve 188. The gas valve 188 functions to allow, restrict, and/or prevent the flow of gas from the inlet 202 to the outlet 206. The outlet 206 of the gas valve 188 is connected with, and provides gas to, the venturi throat 198, which is in turn connected to the air inlet pipe 86. The air inlet pipe 86 is connected to a blower inlet 210 of the combustion blower 80, and provides a mixture of air drawn from atmosphere and gas drawn from the venturi throat 198 to the combustion blower 80. The venturi throat 198 can be a single gas source venturi throat, or can be configured to switch between multiple gas sources, e.g., propane and natural gas, connected thereto, as disclosed in U.S. Patent Application Publication No. 2018/0038592, the contents of which are hereby incorporated by reference in their entirety.

The combustion blower 80 includes the blower inlet 208, a pump 210, a mixing chamber 212, and an outlet 214. As described above, the air inlet pipe 86 is connected to the blower inlet 208 adjacent the venturi throat 198, such that a mixture of air and gas is provided to the combustion blower 80 through the blower inlet 208. The blower inlet 208 is in fluidic communication with the mixing chamber 212 with the air and gas being provided to the mixing chamber 212. The pump 210 includes a pump impeller (not shown) driven by a motor 216. The pump impeller is housed within the mixing chamber 212 and rotationally driven by the motor 216. The pump 210 draws air and gas into the mixing chamber from the air inlet pipe 86 and the venturi throat 198, mixes the air and gas, and discharges the mixture through the outlet 214 and into the connected gas mixture pipe 82. The gas mixture pipe 82 is mounted to the tube sheet 91, and in fluidic communication with the burner 84, discussed in connection with FIGS. 22-23.

Figure 17:
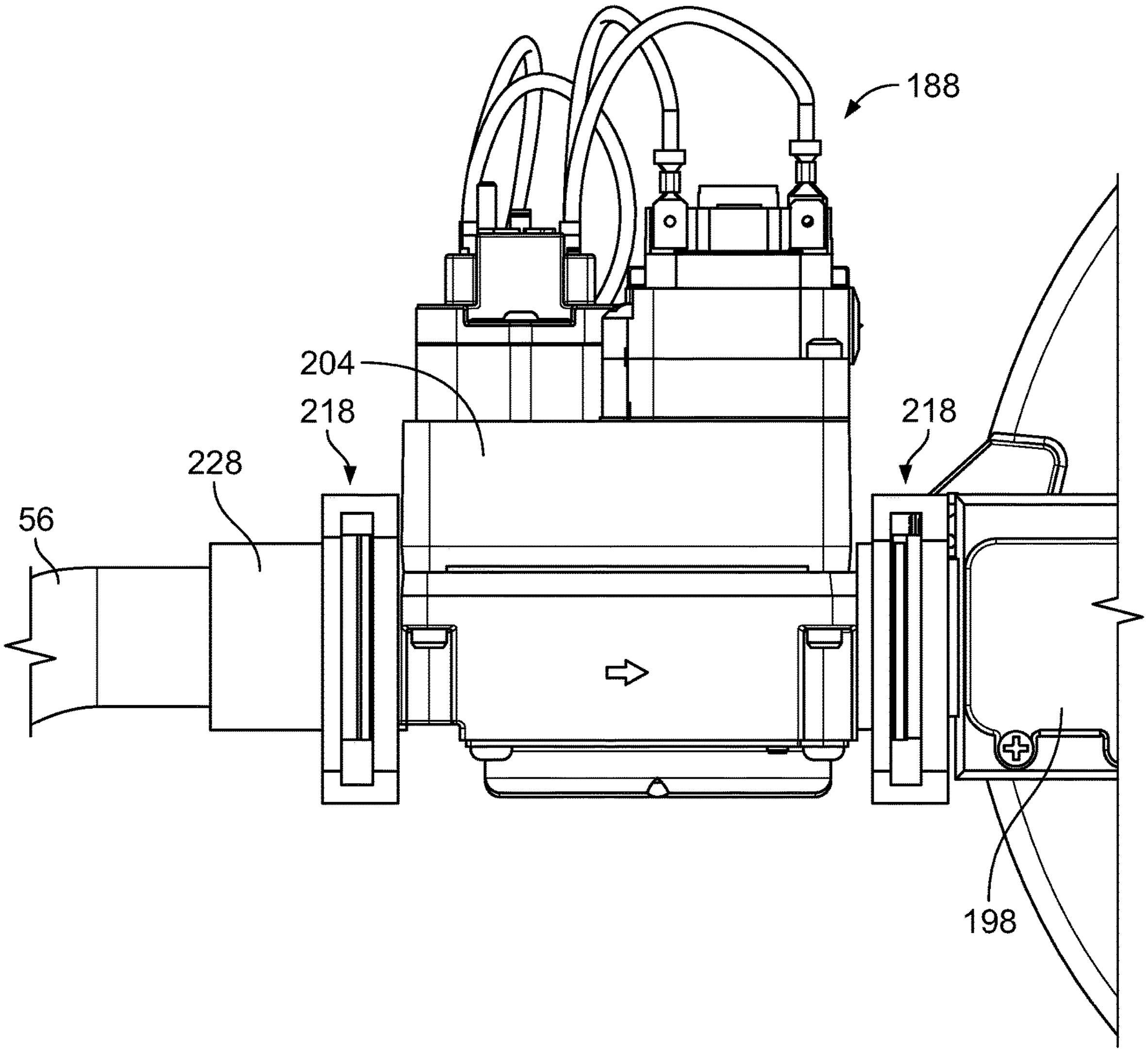
FIG. 17 is an enlarged view of Area FIG. 17 of FIG. 16A showing a gas valve including quick disconnect fittings.
Figure 18:
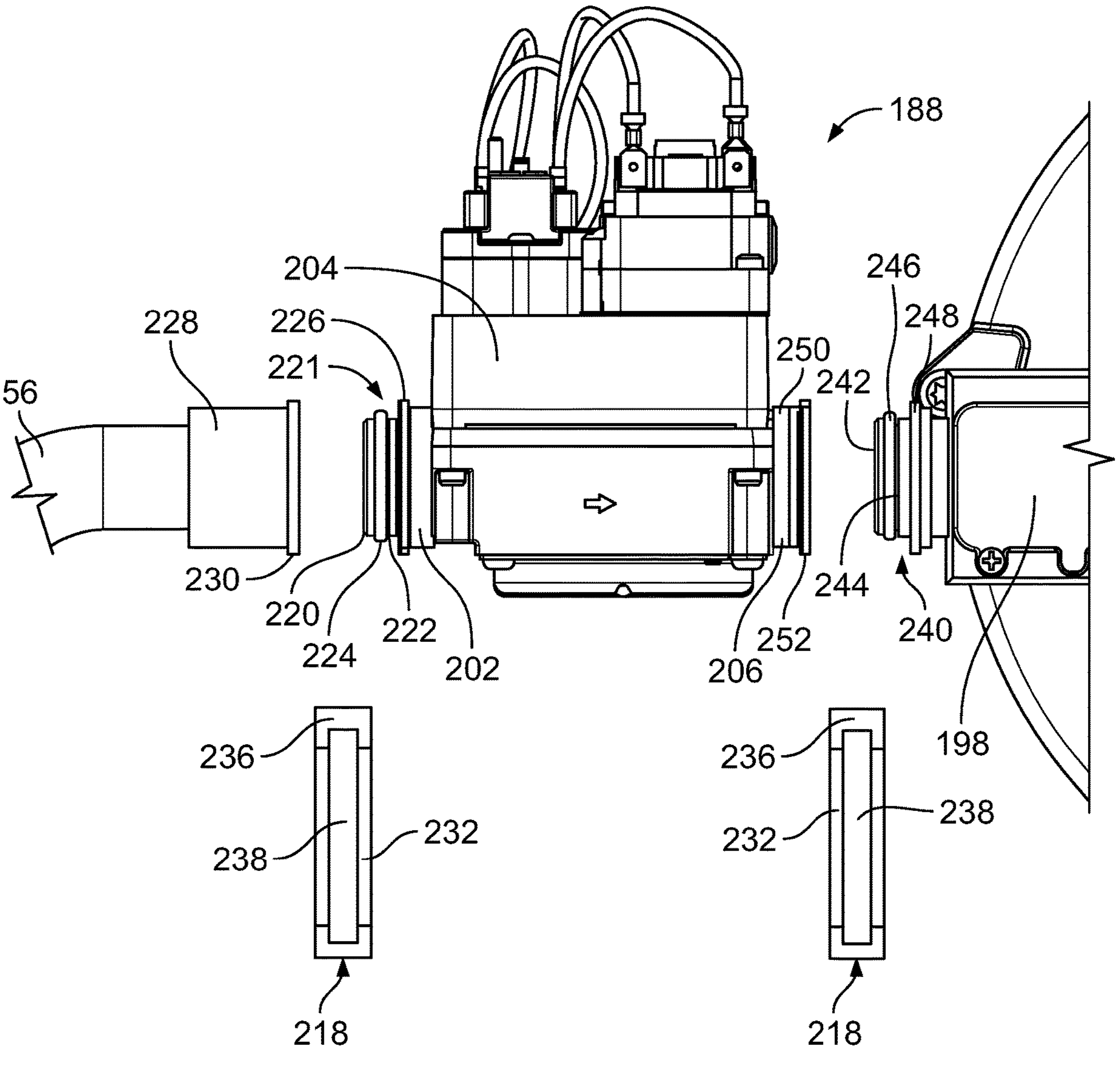
FIG. 18 is an exploded view of the gas valve and quick disconnect fittings of FIG. 17.

FIGS. 17-20 show the gas valve 188 including quick disconnect fittings 218 in greater detail. Specifically, FIG. 17 is an enlarged view of Area FIG. 17 of FIG. 16. FIG. 18 is an exploded view of the gas valve 188 showing the gas valve 188 disconnected from the gas inlet pipe 56 and the venturi throat 198. As shown in FIGS. 17 and 18, the inlet 202 of the gas valve 188 can be connected to the gas inlet pipe 56, e.g., a first component, with a quick disconnect fitting 218, and the outlet 206 of the gas valve 188 can also be connected to the venturi throat 198, e.g., a second component, with a quick disconnect fitting 218. For example, these connections and quick disconnect fittings can be in accordance with the disclosure of U.S. Patent Application Publication No. 2018/0038592, the contents of which are hereby incorporated by reference in their entirety.

The inlet 202 of the gas valve 188 can be a piston-style connector 221 that has a cylindrical protrusion 220 including a circumferential recess 222, a radial o-ring 224 seated in the circumferential recess 222, and an annular flange 226. The gas inlet pipe 56 can have an outlet connector 228 that includes an annular flange 230. The outlet connector 228 of the gas inlet pipe 56 is sized and configured to receive the cylindrical protrusion 220 with the radial o-ring 224 being compressed between an inner wall of the outlet connector 228 and the circumferential recess 222. When the cylindrical protrusion 220 is fully inserted into the outlet connector 228, the annular flange 226 of the piston-style connector 221 will be adjacent the annular flange 230 of the outlet connector 228. The quick disconnect fitting 218 can be clipped over the annular flanges 226, 230 to secure the outlet connector 228 and the piston-style connector 221 together.

Figure 19:
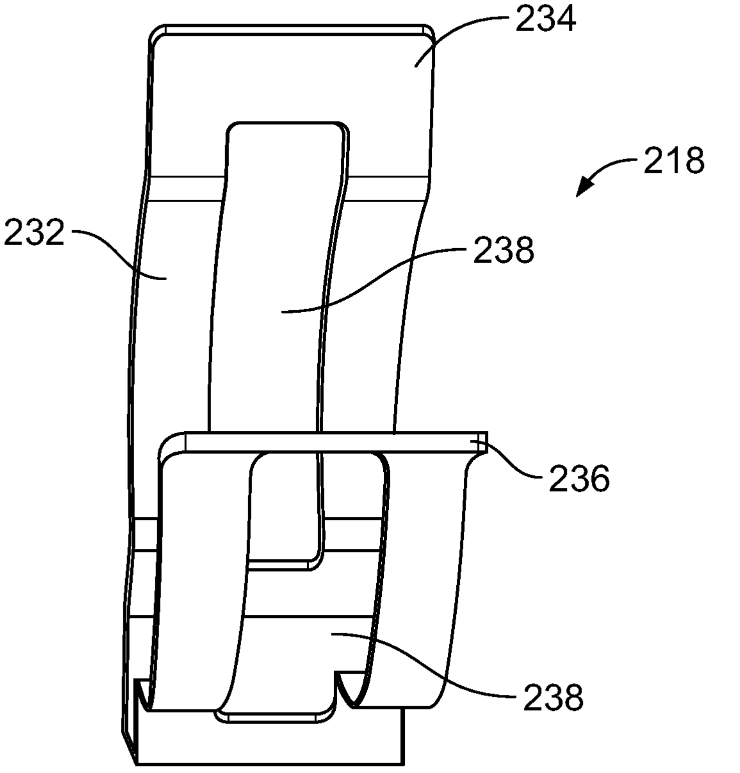
FIG. 19 is a perspective view of the quick disconnect fitting of FIG. 17.
Figure 20:
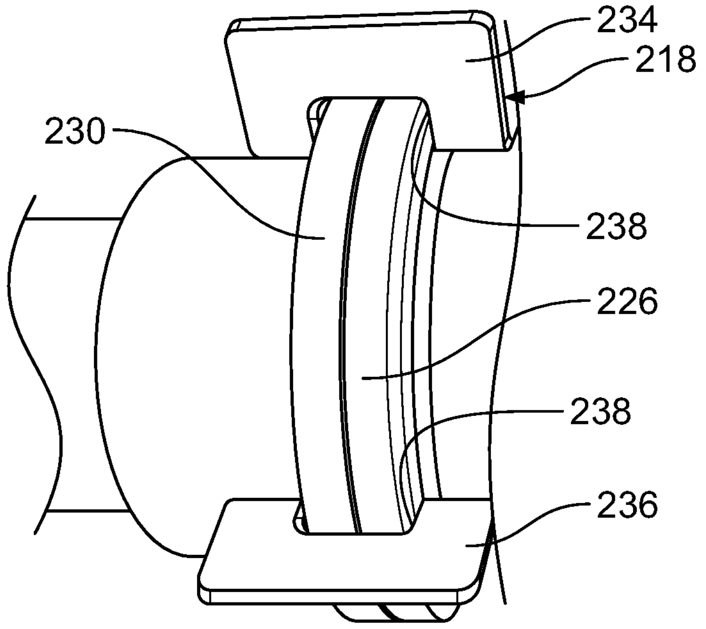
FIG. 20 is a perspective view of the quick disconnect fitting of FIG. 17 assembled on a gas valve.

FIG. 19 is a perspective view of the quick disconnect fitting 218, which includes a body 232, a first end 234, and a second end 236. The quick disconnect fitting 218 can define a substantially C-shaped configuration with the first and second ends 234, 236 biased towards each other. The body 232 includes elongated slots 238 extending between the first and second ends 234, 236. The slots 238 can be configured and dimensioned to at least partially receive therein both of the annular flanges 226, 230. In particular, as shown in FIG. 20, which is a perspective view of the quick disconnect fitting 218 secured over the annular flanges 226, 230 of the piston-style connector 221 and the outlet connector 228, the quick disconnect fitting 218 can be snapped over the abutting annular flanges 226, 230 such that at least a portion of the annular flanges 226, 230 extends into and through the slots 238. Due to the interlocked position of the annular flanges 226, 230 relative to the slots 238, the quick disconnect fitting 218 mechanically retains and prevents separation between the outlet connector 228 (e.g., the gas inlet pipe 56) and the piston-style connector 221 (e.g., the gas valve 204).

Similar to the gas valve inlet 202, the venturi throat 198 can have a piston-style inlet connector 240 that includes a cylindrical protrusion 242 including a circumferential recess 244, a radial o-ring 246 seated in the circumferential recess 244, and an annular flange 248. The outlet 206 of the gas valve 188 can have an outlet connector 250 that includes an annular flange 252. The outlet connector 250 of the gas valve 188 is sized and configured to receive the cylindrical protrusion 242 with the radial o-ring 246 being compressed between an inner wall of the outlet connector 250 and the circumferential recess 244. When the cylindrical protrusion 242 is fully inserted into the outlet connector 250, the annular flange 248 of the piston-style connector 240 will be adjacent the annular flange 252 of the outlet connector 250. The quick disconnect fitting 218 can then be clipped over the annular flanges 248, 252 such that at least a portion of the annular flanges 248, 252 extends into and through the slots 238. Due to the interlocked position of the annular flanges 248, 252 relative to the slots 238, the quick disconnect fitting 218 mechanically retains and prevents separation between the outlet connector 250 (e.g., the gas valve 204) and the piston-style connector 240 (e.g., the venturi throat 198).

Thus, in view of the above, quick disconnect fittings can be used for both inlet and outlet connections of a gas valve, e.g., between a gas valve and a gas inlet pipe as well as between a gas valve and a venturi throat. This quick disconnect fitting provides an efficient and easy-to-use mechanism for coupling and separating the components of the gas heater 10, and advantageously eliminates the potential problem of over-torqueing threads when creating a fluid-tight seal between the components of the assembly.

Figure 21:
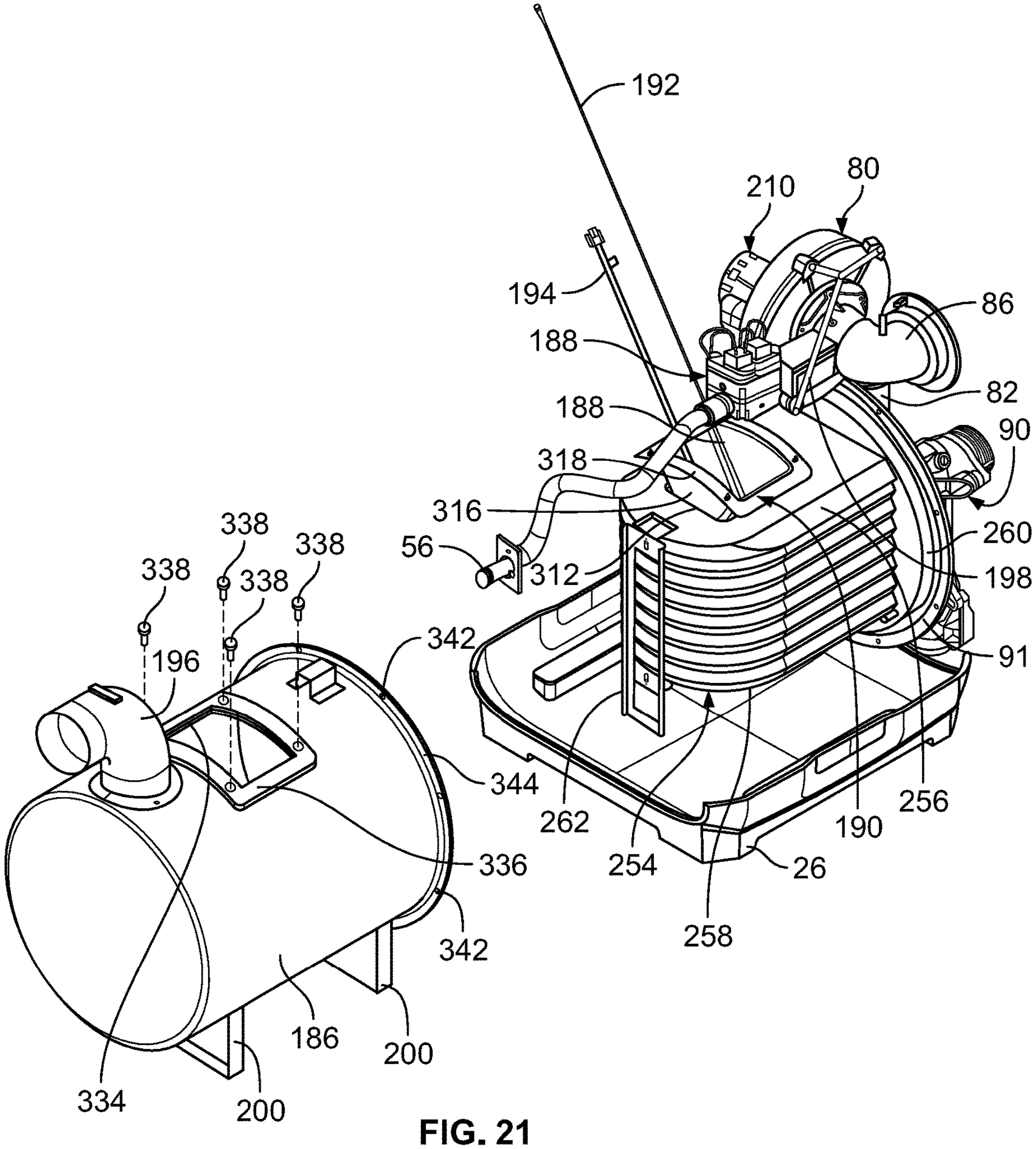
FIG. 21 is a first exploded perspective view of the compact universal gas pool heater of FIG. 1 with the cabinet top and side panels removed.
Figure 22:
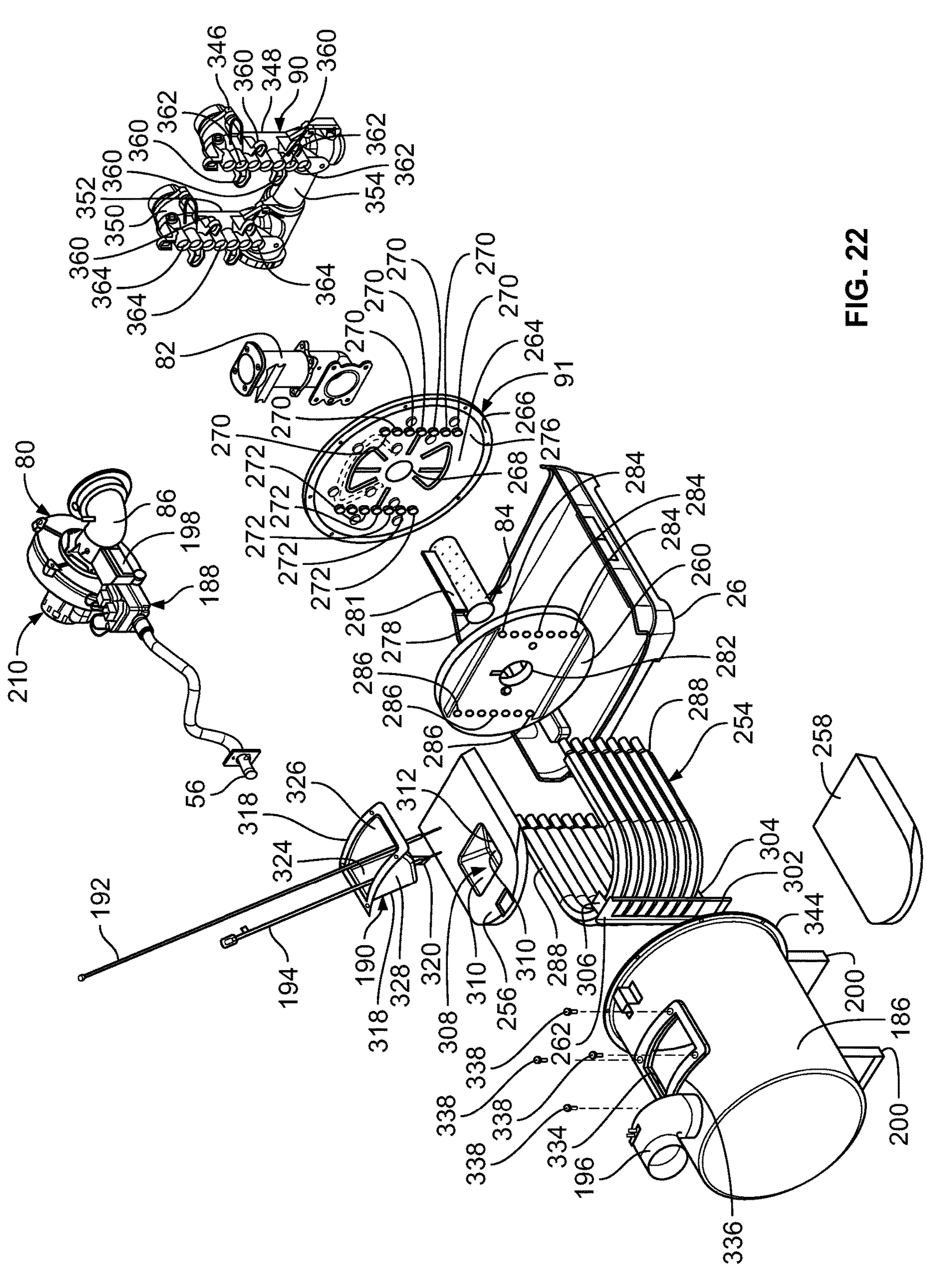
FIG. 22 is a second exploded perspective view of the compact universal gas pool heater of FIG. 1 with the cabinet top and side panels removed.
Figure 23:
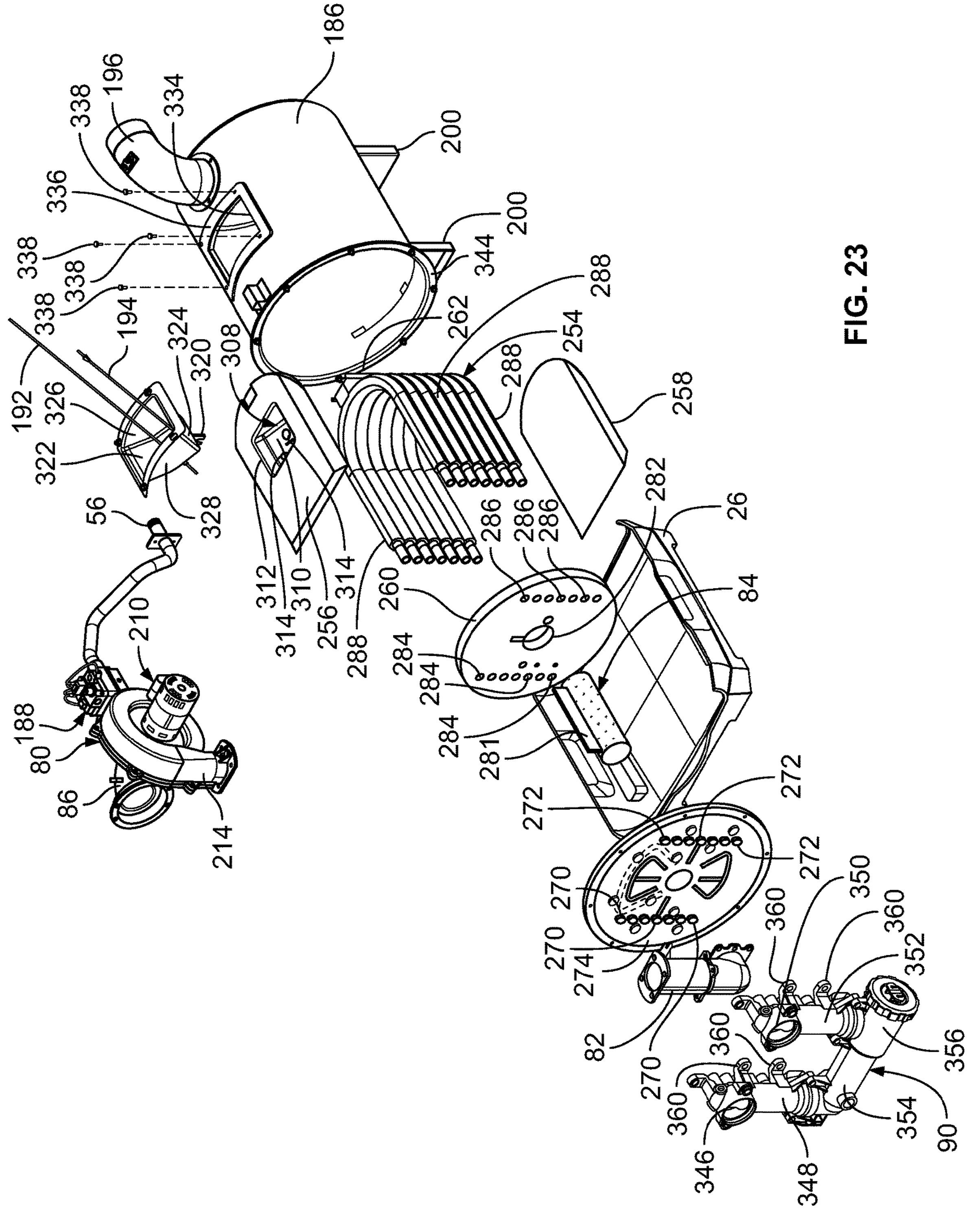
FIG. 23 is a third exploded perspective view of the compact universal gas pool heater of FIG. 1 with the cabinet top and side panels removed.

FIGS. 21-23 are first, second, and third exploded perspective view of the gas heater 10 with the top panel 14 and side panels 18, 20, 22, 24 of the cabinet 12 removed. As described above, the gas heater 10 includes the gas inlet pipe 56, the combustion blower 80, the gas mixture pipe 82, the burner 84, the air inlet pipe 86, the water header manifold 90, the tube sheet 91, the combustion chamber 186, the gas valve 188, the mount 190, the flame sensor 192, the igniter 194, the exhaust pipe 196, and the venturi throat 198. In addition to those components, the gas heater 10 also includes a heat exchanger 254, upper heat exchanger insulation 256, lower heat exchanger insulation 258, tube sheet insulation 260, and a support bracket 262, all of which are generally covered by and contained within the combustion chamber 186.

The tube sheet 91 is generally disc-shaped with a central body 264 surrounded by a radial flange 266. The central body 264 includes a central opening 268, a plurality of inflow tube openings 270, and a plurality of outflow tube openings 272, all of which extend through the central body 264 from an exterior side 274 to an interior side 276 thereof. The central opening 268 is configured to have the burner 84 and the gas mixture pipe 82 mounted adjacent thereto, with the burner 84 being mounted on the interior side 276 and the gas mixture pipe 82 being mounted on the exterior side 274. In this regard, the gas mixture pipe 82 is mounted at a first end to the outlet 214 of the combustion blower 80, and at a second end to the tube sheet 91 adjacent the central opening 268. Accordingly, the air/gas mixture that is pumped into the gas mixture pipe 82 by the combustion blower 80 flows through the gas mixture pipe 82, across the central opening 268 of the tube sheet 91, and into the burner 84.

The burner 84 includes a cylindrical body 278 having a plurality of radial openings 280, and a positioning flange 281 that extends radially from a top, e.g., the 12 o'clock position, of the cylindrical body 278 and extends along the longitudinal axis of the cylindrical body 278. The radial openings 280 allow the air/gas mixture provided to the burner 84 from the gas mixture pipe 82 to dissipate from the burner 84 so that it can be ignited by the igniter 194, which can be a hot-surface igniter, a spark igniter, a pilot igniter, or a combination thereof. While the positioning flange 281 is shown as extending along the length of the burner 84, it should be understood that it can be of a smaller length and only extend along a portion of the burner 84 length.

The tube sheet insulation 260 is generally disc shaped and dimensioned to cover the central body 264 of the tube sheet 91. The tube sheet insulation 260 includes a central opening 282, a plurality of inflow tube openings 284, and a plurality of outflow tube openings 286. The central opening 282 of the tube sheet insulation 260 is dimensioned and configured to receive the burner 84 such that the tube sheet insulation 260 can be slid over the burner 84 and abut the tube sheet 91, with the burner 84 being positioned within the central opening 282 of the tube sheet insulation 260. Additionally, the plurality of inflow tube openings 284 and the plurality of outflow tube openings 286 of the tube sheet insulation 260 are dimensioned and configured to align with the inflow tube openings 270 and the outflow tube openings 272 of the tube sheet 91 when the tube sheet insulation 260 is positioned adjacent the tube sheet 91. The tube sheet insulation 260 mitigates the dissipation of heat through the tube sheet 91, thus forcing heat generated by the gas heater 10 to be absorbed by the heat exchanger 254.

Figure 24A:
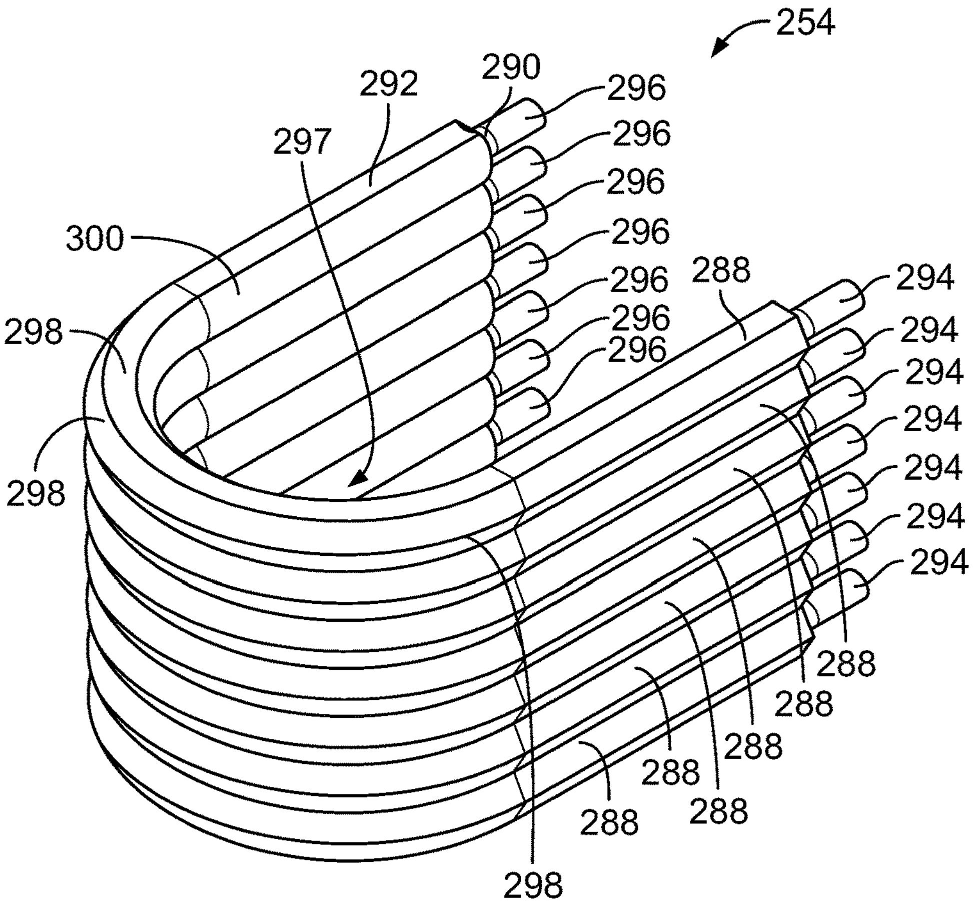
FIG. 24A is a perspective view of a heat exchanger of the compact universal gas pool heater.
Figure 24B:
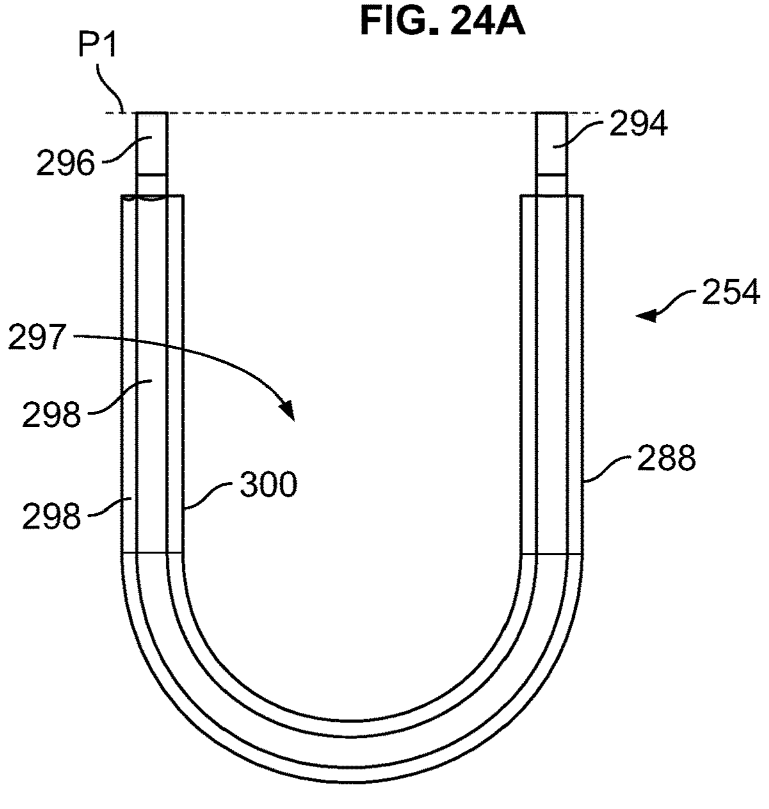
FIG. 24B is a top plan view of the heat exchanger of FIG. 24A.
Figure 25:
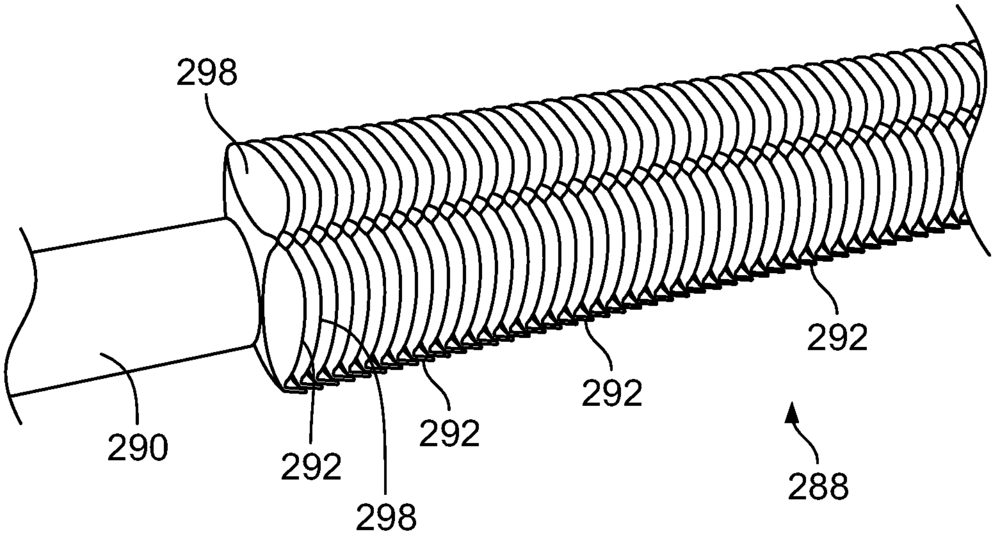
FIG. 25 is a detailed view of a heat exchanger tube of the heat exchanger shown in FIG. 24A.

The heat exchanger 254 includes an array of heat exchanger tubes 288, e.g., seven heat exchanger tubes 288. The heat exchanger 254 is shown in greater detail in FIGS. 24A and 24B, which are perspective and top plan views of the heat exchanger 254, respectively. Each of the heat exchanger tubes 288 includes an interior tube 290 surrounded by a plurality of extruded fins 292 on the surface of the interior tube 290. For the ease of illustration, each individual extruded fin 292 is not shown in FIGS. 24A and 24B, however, the details of the extruded fins 292 are shown in FIG. 25. The interior tube 290 includes an inlet 294 and an outlet 296 such that fluid to be heated, e.g., water, can flow into the inlet 294, through the interior tube 290 and out of the outlet 296. The heat exchanger tubes 288 are formed in a U-shape, such that the array of heat exchanger tubes 288 define a combustion chamber 297 within which the burner 84 is positioned with the exchanger tubes 288 surrounding the burner 84. Due to the U-shape configuration, the inlet 294 and the outlet 296 of each heat exchanger tube 288 will be in the same plane P1 allowing the inlets 294 and the outlets 296 to both be mounted to the tube sheet 91. Specifically, the inlets 294 of the heat exchanger tubes 288 are dimensioned and configured to be inserted into the inflow tube openings 284 of the tube sheet insulation 260 and the inflow tube openings 270 of the tube sheet 91, while the outlets 296 of the heat exchanger tubes 88 are dimensioned and configured to be inserted into the outflow tube openings 286 of the tube sheet insulation 260 and the outflow tube openings 272 of the tube sheet 91. This allows for fluid, e.g., water, to flow across the heat exchanger tubes 288 from the exterior of the tube sheet 91. This U-shaped design provides a compact construction while providing an optimized heat transfer interface between the burner 84 and the heat exchanger 254, which reduces the necessary size of the heat exchanger 254 and thus the total size of the gas heater 10.

The extruded fins 292 of the heat exchanger tubes 288, which are shown in greater detail in FIG. 25, are individual elements mounted adjacent to each other on the exterior of the interior tube 290. The perimeter of each extruded fin 292 includes four bent edges 298 and a single rounded edge 300. The four bent edges 298 can encompass two-thirds of the total circumference of the extruded fin 292, while the single rounded edge 300 can encompass one-third of the total circumference of the extruded fin 292. The bent edges 298 aid in heat transfer, and allow the heat exchanger tubes 288 to be more closely stacked with less space between adjacent heat exchanger tubes 28. Regarding the heat transfer, the rounded edge 300 allows hot air to enter the extruded fins 292 without disruption, while the bent edges 298 slow the hot air as it passes across the heat exchanger tubes 288 during operation of the gas heater 10, which increases the heat transferred to the fluid flowing through the interior tubes 290.

Figure 26A:
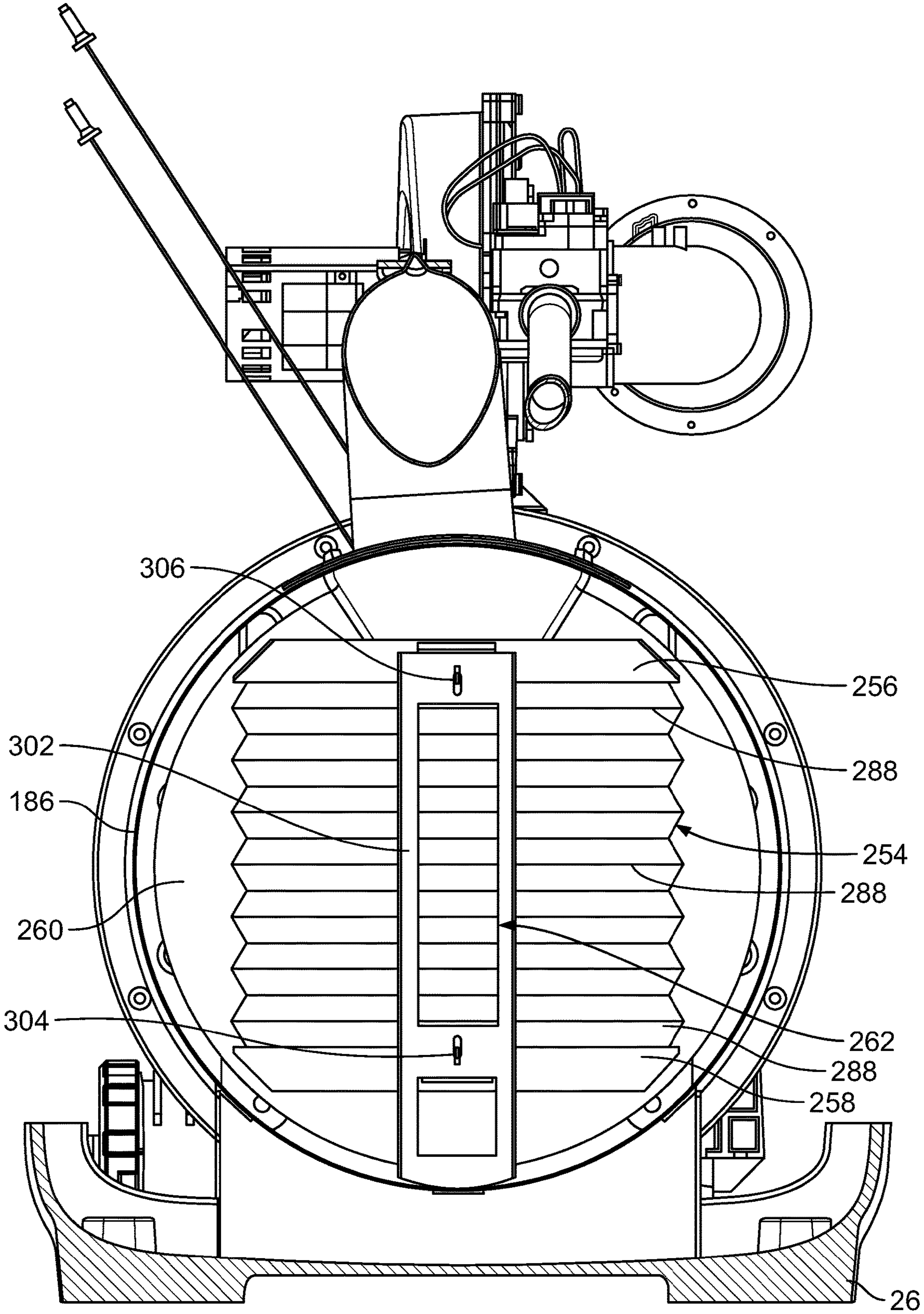
FIG. 26A is a sectional view taken along Line 26A-26A of FIG. 16B showing the interior of a combustion chamber canister.
Figure 26B:
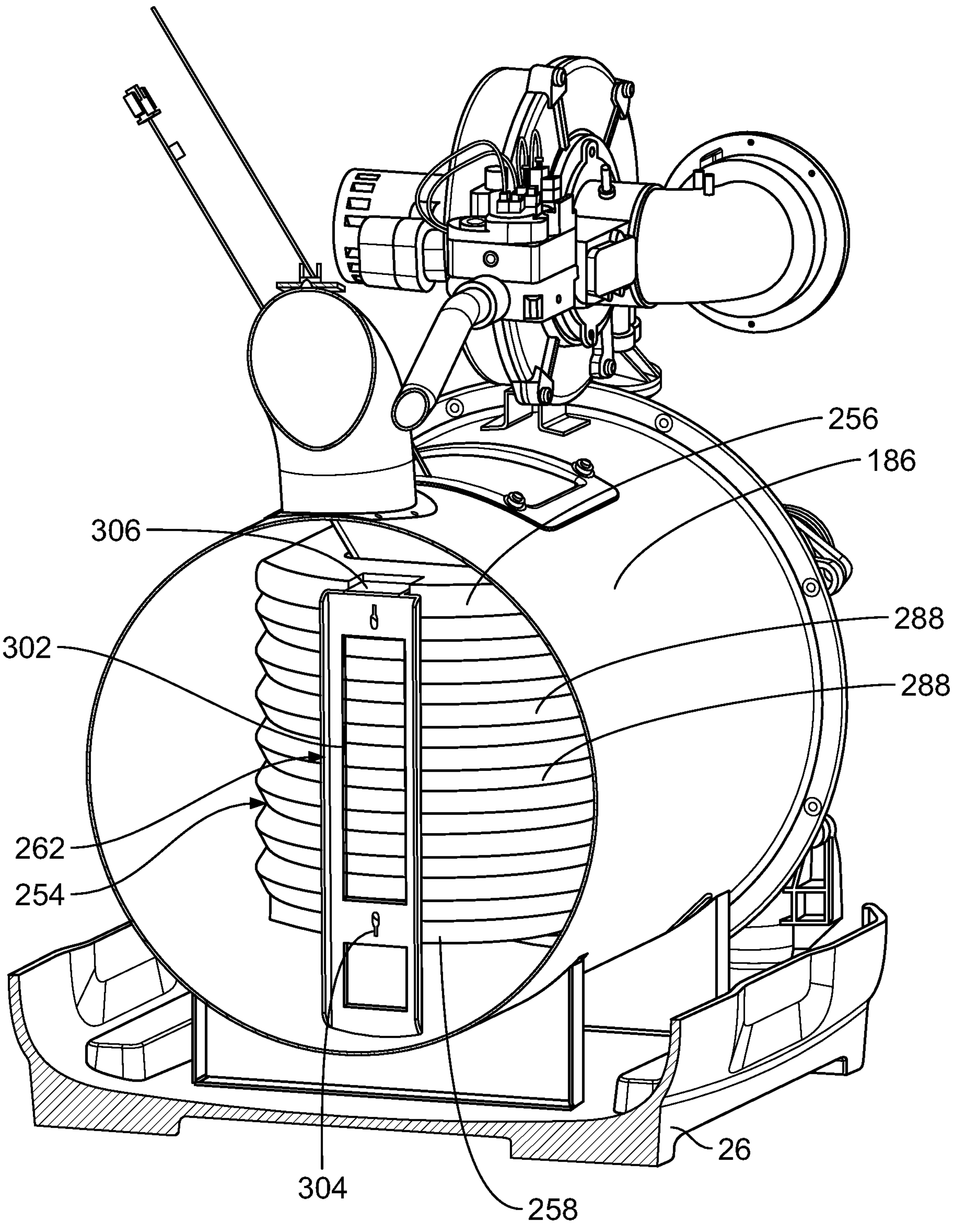
FIG. 26B is a perspective sectional view corresponding to the sectional view shown in FIG. 26B.

FIG. 26A is a sectional view taken along Line 26A-26A of FIG. 16B, and FIG. 26B is a perspective sectional view taken along Line 26A-26A of FIG. 16B. FIGS. 26A and 26B show the U-shaped design of the heat exchanger 254 and the heat exchanger 254 being supported by the support bracket 262.

As shown in FIGS. 21-23, 26A, and 26B, the support bracket 262 includes a body 302, a lower brace 304, and an upper brace 306. The lower and upper braces 304, 306 extend out from the body 302 and are configured to engage the curved end of the heat exchanger 254 opposite the tube sheet 91. This engagement secures the heat exchanger 254 to the support bracket 262. The support bracket 262 rests on the interior wall of the combustion chamber canister 186 and thus supports the otherwise cantilevered heat exchanger 254.

Turning back to FIGS. 21-23, The upper heat exchanger insulation 256 is positioned on top of the heat exchanger 254, and the lower heat exchanger insulation 258 is positioned on the bottom of the heat exchanger 254. The upper and lower heat exchanger insulation 256, 258 close off the combustion chamber 297 formed by the heat exchanger tubes 288. Accordingly, the upper and lower heat exchanger insulation 256, 258 reduce heat loss and direct hot gases across the heat exchanger tubes 288 by preventing the hot gasses from dissipating out from the combustion chamber 297 without first passing across the heat exchanger tubes 288. The upper and lower heat exchanger insulation 256, 258 can be secured in place by the support bracket 262. The upper heat exchanger insulation 256 also includes a cavity 308 defined by walls 310 and an opening 312. The cavity 308 is dimensioned and configured to receive a portion of the mount 190. The walls 310 extend into the combustion chamber 297 and include openings 314 that the flame sensor 192 and igniter 194 can extend through and into the combustion chamber 297.

The mount 190 includes a mount body 316, a mounting flange 318 extending about the perimeter of the canister body 316, and a spacing flange 320. The canister body 316 includes a sensor mounting wall 322, a back wall 324, and first and second sidewalls 326, 328. The spacing flange 320 can be substantially V-shaped and can extend from the exterior of the sensor mounting wall 322 and/or the back wall 324. The sensor mounting wall 322 can have a flame sensor mount 330 and an igniter mount 332 (see FIG. 21) mounted thereto, e.g., by screws or other fastening means. The flame sensor mount 330 and the igniter mount 332 can extend through the sensor mounting wall 322. The flame sensor 192 can extend through and be mounted to the flame sensor mount 330, e.g., by screws or other fastening means, while the igniter 194 can extend through and be mounted to the igniter mount 332, e.g., by screws or other fastening means. In some aspects, the spacing flange 320 can extend from the igniter mount 332. The mount 190 is configured to be at least partially inserted into a top opening 334 of the combustion chamber canister 186, with a portion of the canister body 316 extending into the interior of the combustion chamber canister 186 and the cavity 308 of the upper heat exchanger insulation 256, and the mounting flange 318 abutting a gasket 336 that surrounds the top opening 334. The gasket 336 can be a soft rubber gasket made from, for example, silicone. The mount 190 can be secured to the combustion chamber canister 186 by a plurality of fasteners 336, thus compressing the gasket 336 between the combustion chamber canister 186 and the mounting flange 318 of the mount 190.

Figure 27:
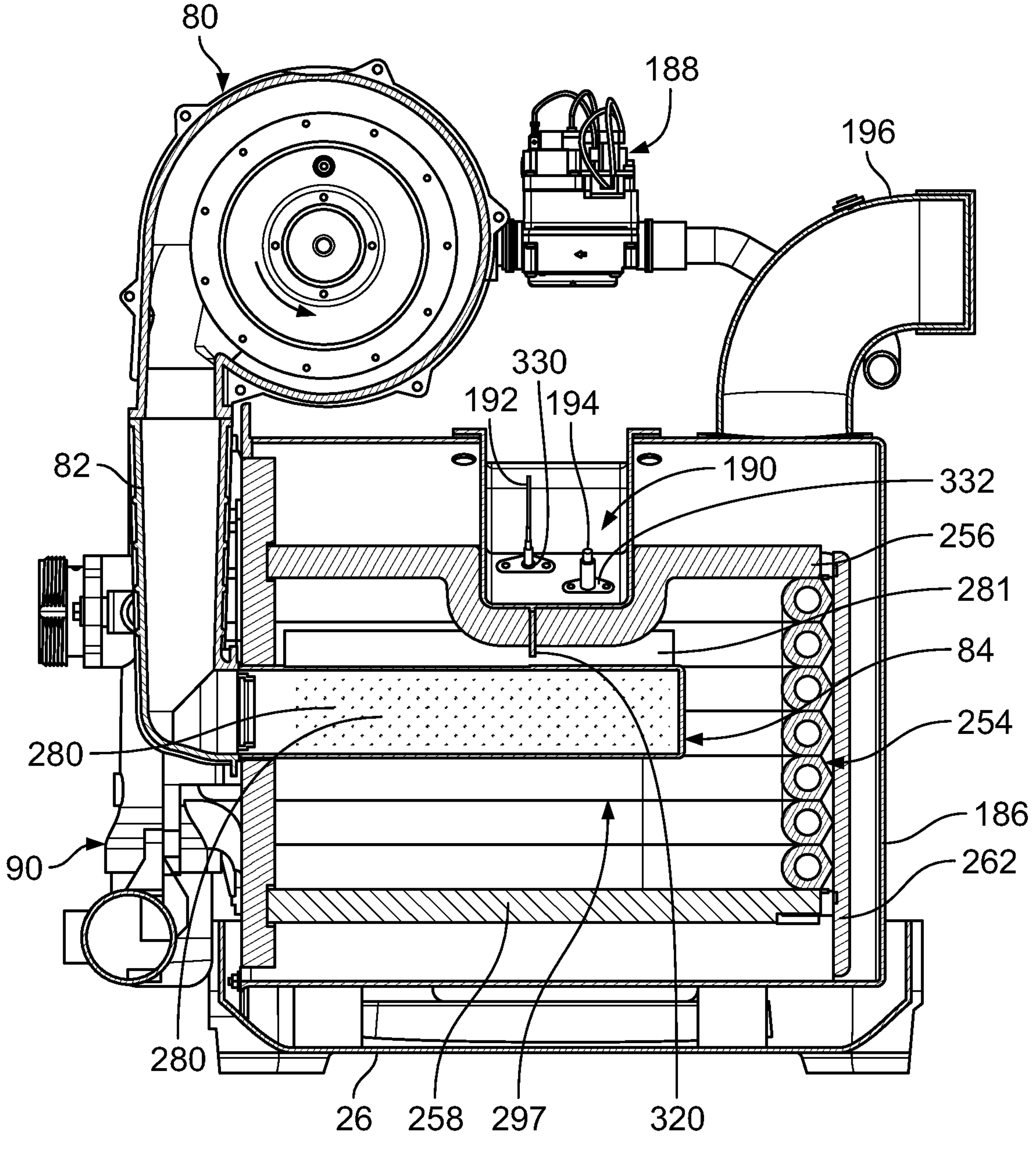
FIG. 27 is a sectional view taken along Line 27-27 of FIG. 16B showing the interior of the combustion chamber canister and heat exchanger.
Figure 28:
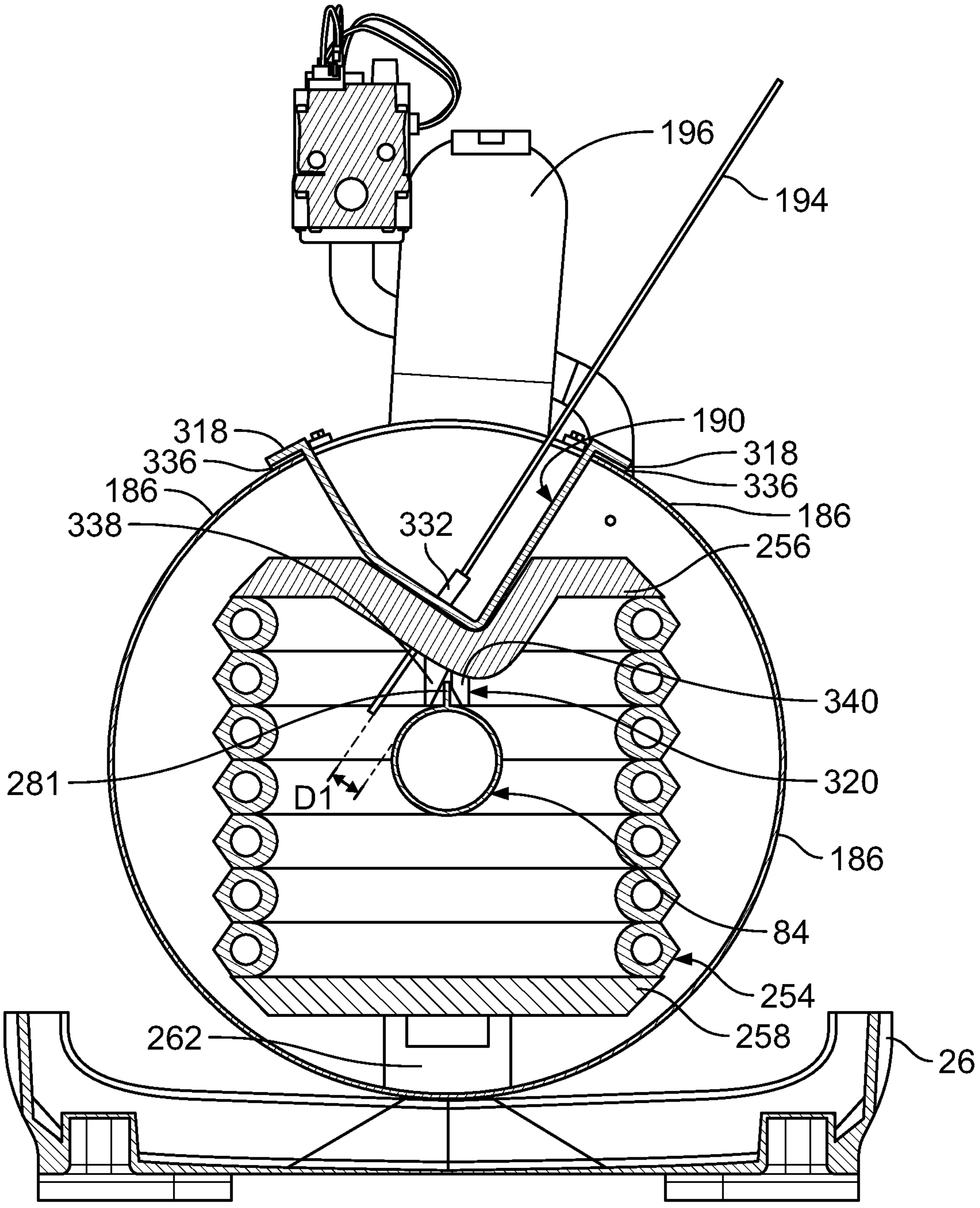
FIG. 28 is a sectional view taken along Line 28-28 of FIG. 16B showing the interior of the combustion chamber canister and heat exchanger.
Figure 29:
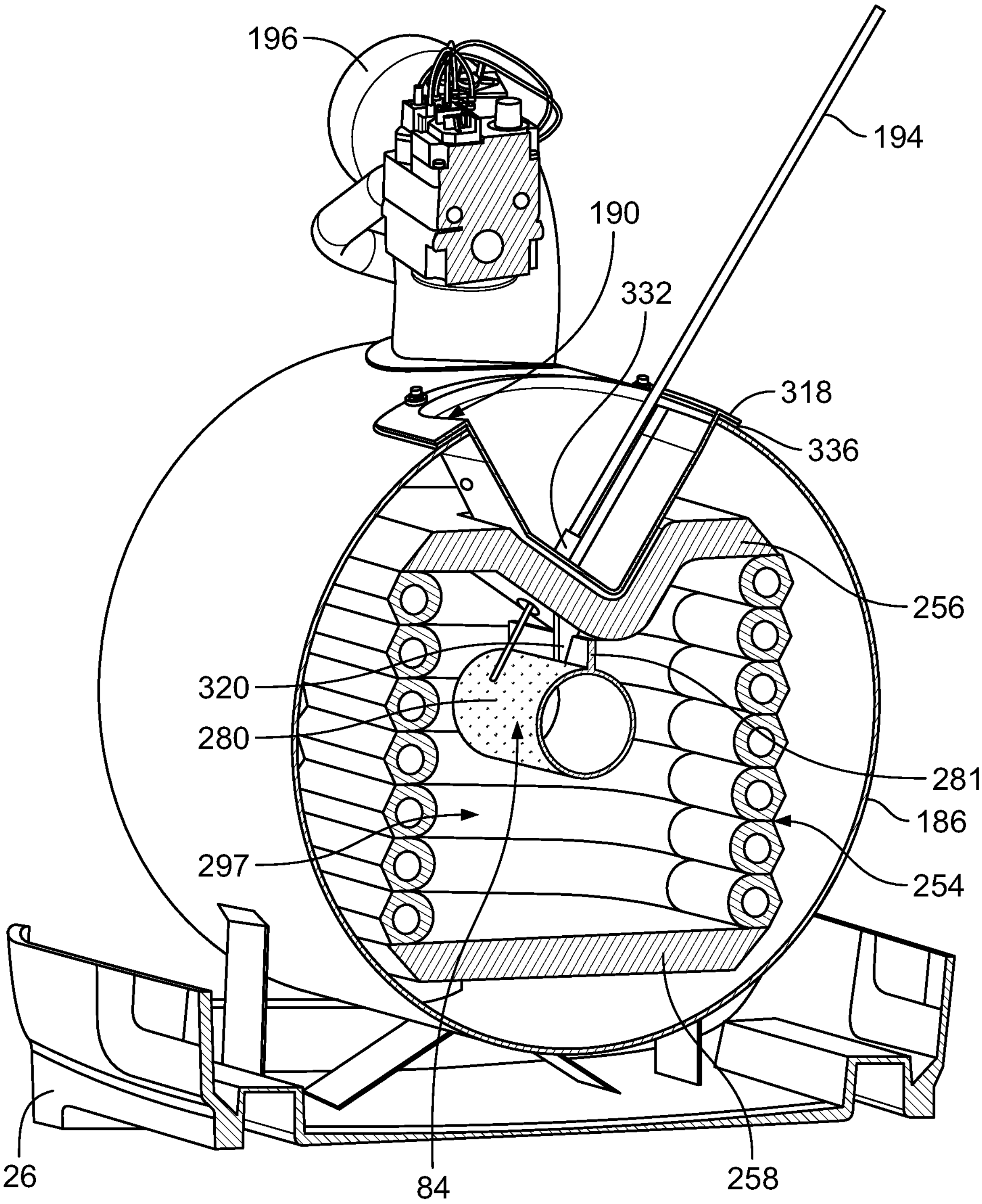
FIG. 29 is a perspective sectional view corresponding to the sectional view shown in FIG. 28.

When the body 316 of the mount 190 is inserted into the top opening 334 of the combustion chamber canister 186 and the mount 190 is secured to the combustion chamber canister 186, the body 316 will be positioned within the cavity 308 of the upper heat exchanger insulation 256. In this position, the spacing flange 320, the flame sensor 192, and the igniter 194 will extend through the upper heat exchanger insulation 256 and into the combustion chamber 297. This is shown, for example, in FIGS. 27-29. FIG. 27 is a sectional view taken along Line 27-27 of FIG. 16B. FIG. 28 is a sectional view taken along Line 28-28 of FIG. 16B. FIG. 29 is a perspective sectional view taken along Line 28-28 of FIG. 16B. As can be seen in FIGS. 27-29, the spacing flange 320, the flame sensor 192, and the igniter 194 extend through the upper heat exchanger insulation 256 and into the combustion chamber 297. The spacing flange 320 engages and interfaces with the positioning flange 281 of the burner 84 such that the positioning flange 281 is seated within the space between first and second legs 338, 340 of the spacing flange 320, thus preventing vertical and lateral movement of the burner 84, but permitting movement of the burner 84 along its longitudinal axis. The igniter 194, when mounted with the igniter mount 332, extends into the combustion chamber canister 186 and is placed at a distance D1 (see FIG. 28) from the surface of the burner 84 where the radial openings 280 are located and the gas mixture dissipates from. Distance D1 is the desired spacing distance between the igniter 194 and the burner 84 to achieve efficient and safe ignition of the gas mixture dissipating from the burner 84. If the distance D1 is too large, then there may be an excessive explosion accompanies by a loud noise resulting from the ignition of accumulated gas, which is not desirable. For example, distance D1 can be 0.25"+/−0.02". Accordingly, engagement of the positioning flange 281 with the spacing flange 320 allows movement of the burner 84 along the burner's 84 longitudinal axis, which would not affect the distance D1 nor the performance of the igniter 194, but restricts the dimensional spacing between the burner 84 and the igniter mount 332 that would impact the distance D1 and thus the performance of the igniter 194. Similarly, the flame sensor 194 is maintained in its position due to being mounted to the flame sensor mount 330 that is tied to the mount 190.

This dimensional consistency is achieved by mounting the igniter mount 332, the igniter 194, the flame sensor mount 330, and the flame sensor 192 to the mount 190, whose position is tied to the burner 84, which reduces the number of components that contribute to the "stack-up" of tolerances, as well as allowing the accumulation of tolerance variations to be absorbed by the gasket 336 placed in the gap between the mounting flange 318 of the mount 190 and the combustion chamber canister 186. That is, the present configuration allows the igniter mount 332 to "bottom out" on the positioning flange 281 through the spacing flange 320, which ties the igniter mount 332, and therefore placement of the igniter 194, to the burner 84. This limits the number of components that contribute to the stack-up of tolerances to, for example, the height of the positioning flange 281, the spacing flange 320, the mount 190, and the igniter 194, most of which can vary due to manufacturing. However, each of these tolerance variations is tied together and manifest at the gap between the mounting flange 318 of the mount 190 and the combustion chamber canister 186 where the gasket 336 is placed in order to absorb the tolerances. In furtherance of this, the gasket 336 is designed to be thick enough to absorb the accumulation of tolerance variations in all of the parts. By tying these tolerances together, and permitting the gasket 336 to absorb the accumulation of tolerance variations, the stack-up is essentially reduced to the depth of the igniter mount 332.

In contrast, if the igniter mount 332 was constructed to bottom-out at the connection to the combustion chamber, then it would not be tied to the burner 84 and additional components would contribute to the tolerance variations and overall "stack-up," which would negatively affect the dimensional consistency between the igniter 194, the flame sensor 192, and the burner 84. In essence, this would result in the tolerance variations being comprised of all tolerance variations relating to the igniter mount 332 in addition to all tolerance variations relating to placement of the burner 84. However, tying the igniter mount 332 to the burner 84 mitigates this additive consequence.

Furthermore, by mounting the igniter mount 332, the igniter 194, the flame sensor mount 330, and the flame sensor 192 to the mount 190, which is a separate panel from where the burner 84 is mounted, the mount 190 can be placed at a top of the combustion chamber canister 186 so that it can be accessed and serviced from above, e.g., through the top panel 14. This results in an easier installation and replacement procedure for a servicing technician, while the spacing flange 320 and the positioning flange 281 reduces the dimensional variability.

Still further, by having the spacing flange 320 contact the positioning flange 281 of the burner 84, the heat exchanger 254 including mount 190 can be more easily replaced. Generally, these components are replaced by a technician operating in the blind (e.g., without being able to see where they are positioned). However, in the present aspect, the technician will be able to feel when the spacing flange 320 contacts the positioning flange 281, and will therefore know that the heat exchanger 254 including mount 190 are in the correct location.

In another aspect of the present disclosure, the spacing flange 320 can be a cup, while the positioning flange 281 can be a pin. The cup and pin would function substantially the same as the spacing flange 320 and the positioning flange 281, respectively, in that they would engage each other to tie the igniter mount 330 to the burner 84. However, the pin and cup configuration would restrict movement of the burner 84 in three axes as opposed to two with the spacing flange 320 and the positioning flange 281.

As discussed above, by having the igniter 194 and flame sensor 330 mounted to the mount 190, which is mounted separately from the burner 84 and to a top of the combustion chamber canister 186, all of the electronics are accessible through the top of the gas heater 10 by removing the top panel 14. This is in contrast to prior art pool heaters that require a technician to go to multiple sides of the cabinet to service the electronics of the heater. Accordingly, all side panels of such prior art heaters must be accessible, and therefore must be spaced from any adjacent fences, walls of the house or equipment room, etc. In addition to requiring clearance for service, clearance is often needed to prevent the heater from raising the temperature of nearby walls too much. For example, pool heaters will often be spaced 6-18 inches from a nearby wall so as not to increase the temperature of the wall more than is permitted. Accordingly, these clearances serve two purposes: 1) to maintain a suitable low temperature of nearby walls, and 2) to allow a technician access to service the heater.

However, the gas heater 10 of the current disclosure allows the electronics and other components to be accessed through the top of the gas heater 10, and thus the first side panel 18 and the second side panel 20 need not be accessible to a technician. Instead, only the top 12, the exhaust side panel 22, and the water header side panel 24 need to be accessible.

Figure 30:
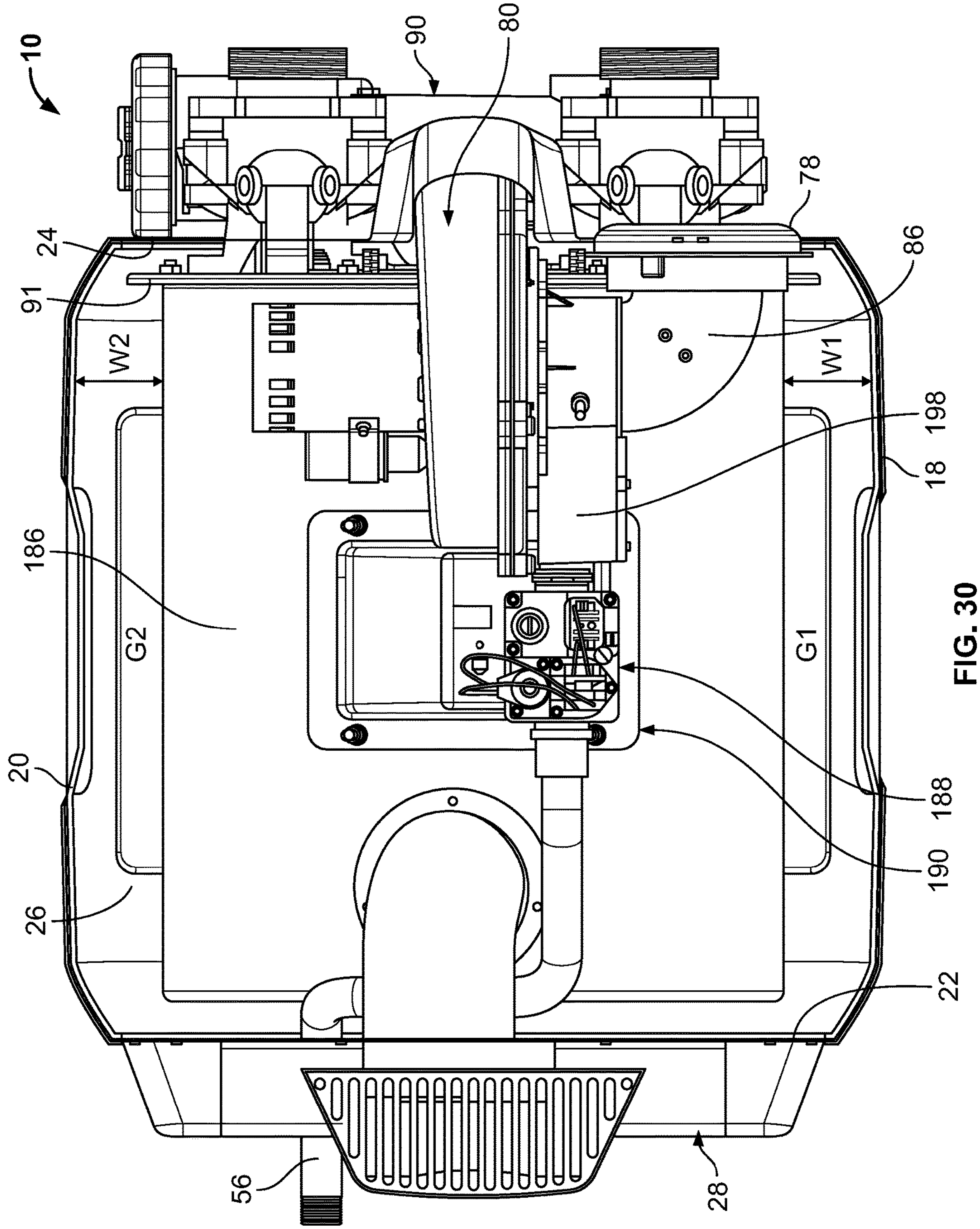
FIG. 30 is a top plan view of the compact universal gas pool heater of FIG. 1 with the cabinet top panel removed.

FIG. 30 is a top plan view of the gas heater 10 with the top panel 14 removed showing the internal components housed by the cabinet 12, and the relative spacing of these components from the cabinet 12. In particular, the gas heater 10 is designed with a first gap G1, e.g., first internal clearance, between the combustion chamber canister 186 and the first side panel 18, and a second gap G2, e.g., second internal clearance, between the combustion chamber canister 186 and the second side panel 20. The first gap G1 can have a first width W1, which is the distance between the combustion chamber canister 186 and the first side panel 18, and the second gap G2 can have a second width W2, which is the distance between the combustion chamber canister 186 and the second side panel 20. The first and second gaps G1, G2 can be air gaps, or they can be filled with insulation. The gaps G1, G2 reduce the amount of heat transferred to, and thus minimize the temperature of, the first and second side panels 18, 20. Furthermore, heat is removed from the cabinet 12 due to natural convection occurring through the plurality of lower vents 34 and the plurality of upper vents 36 in the exhaust side panel 22, and the plurality of lower vents 79*a* and the plurality of upper vents 79*b* in the water header side panel 24, which allow for the circulation of fresh cooler air through the cabinet 12 and particularly across the first and second gaps G1, G2. This construction allows the gas heater 10 to be installed with very small clearance between the first and second side panels 18, 20 and an adjacent fence, wall, or other structure. For example, the gas heater 10 can be installed within 0-6 inches of a nearby wall.

Returning to FIGS. 21-23, the water header manifold 90 can be a single unitary structure or can include multiple components interconnected. The water header manifold 90 can be formed from plastic due to economy of materials and corrosion resistance. For example, the water header manifold can be similar in construction to the disclosure of U.S. Pat. No. 7,971,603, the contents of which are hereby incorporated by reference in their entirety. The water header manifold 90 generally includes an inlet 346, an inflow tube 348, an outlet 350, an outflow tube 352, a bypass port 354, a service cartridge housing 356, a service cartridge 358 (see, e.g., FIG. 32), and a plurality of mounts 360. The inflow tube 348 can include a plurality of inflow ports 362 on a rear thereof, while the outflow tube 352 can include a plurality of outflow ports 364. The inflow ports 362 are dimensioned and configured to match the dimensions and configuration of the inflow tube openings 270 of the tube sheet 91, and the outflow ports 364 are dimensioned and configured to match the dimensions and configuration of the outflow tube openings 272 of the tube sheet 91. The water header manifold 90 can be mounted to the tube sheet 91 via the mounts 360 with the inflow ports 362 aligned with the inflow tube openings 270 and the outflow ports 364 aligned with the outflow tube openings 272, which places the water header manifold in fluidic communication with the heat exchanger tubes 288 of the heat exchanger 254.

Figure 31:
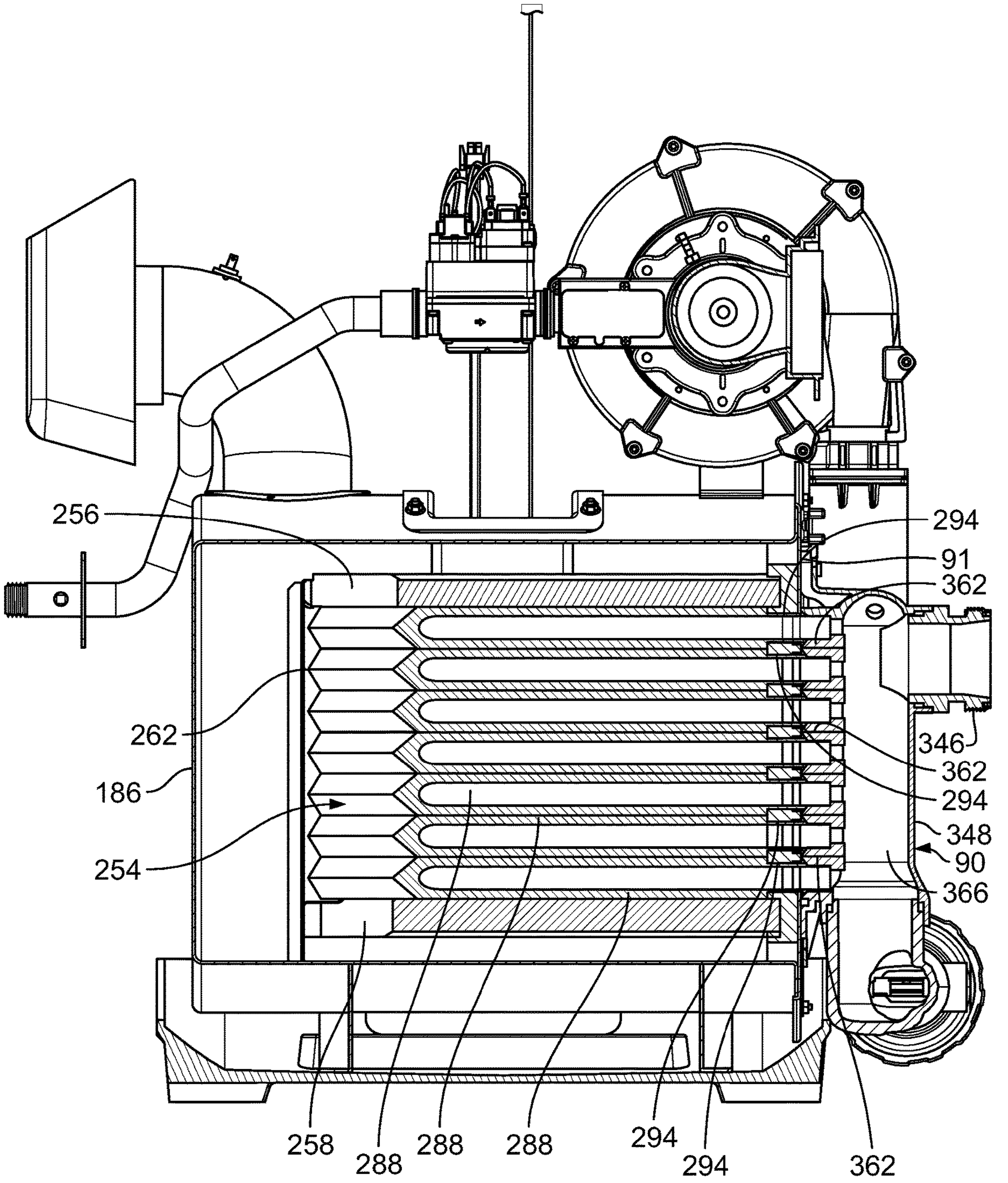
FIG. 31 is a sectional view taken along Line 31-31 of FIG. 16B showing the flow path between the heat exchanger and a water manifold header.
Figure 32:
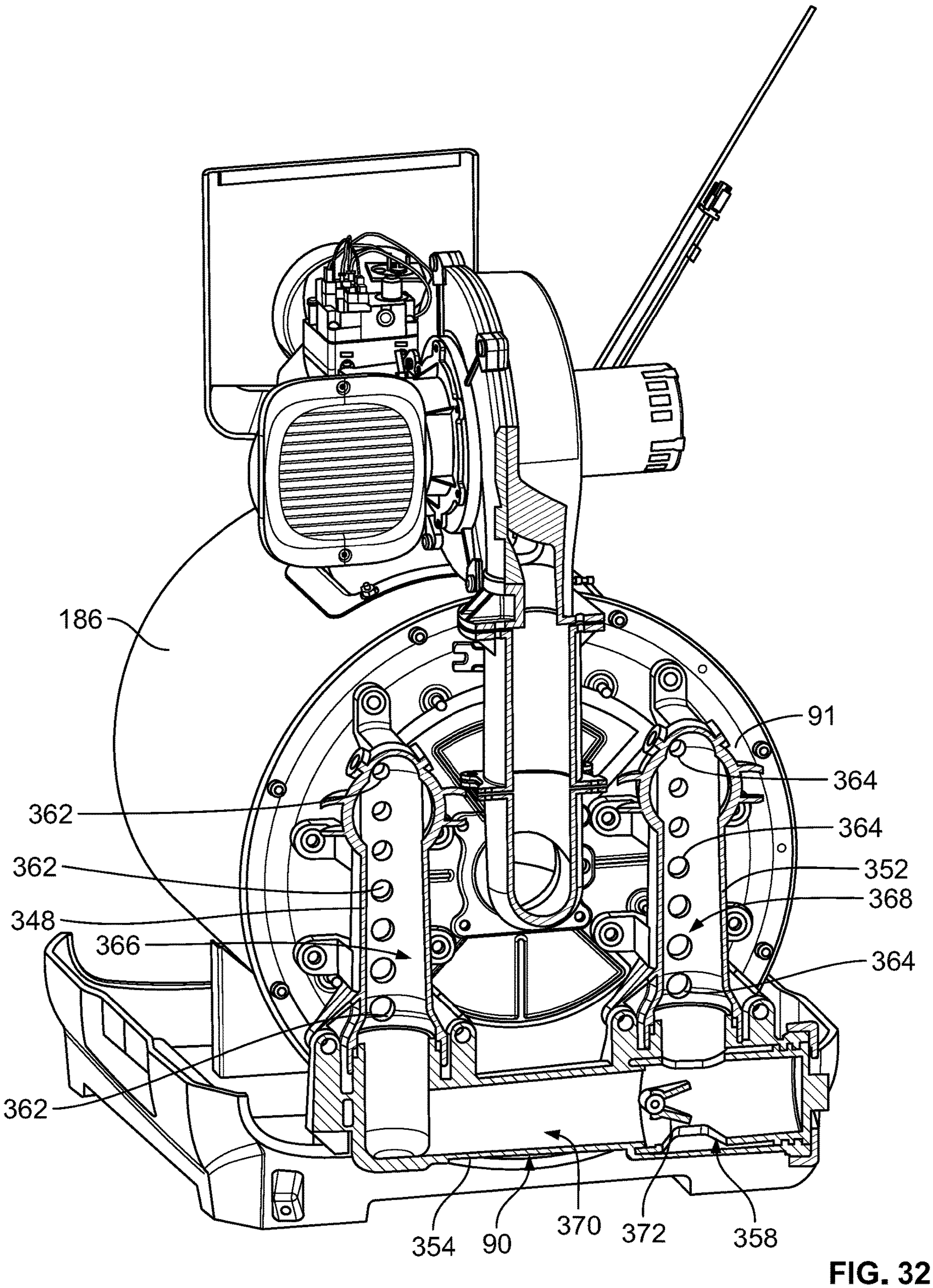
FIG. 32 is a sectional view taken along Line 32-32 of FIG. 16B showing the interior of the water manifold header in perspective.

FIG. 31 is a sectional view taken along Line 31-31 of FIG. 16B, generally illustrating the flow path between the water header manifold 90 and the heat exchanger 254. FIG. 32 is a sectional view taken along Line 32-32 of FIG. 16B, generally showing the flow path within the water header manifold 90. The inflow tube 94 forms an inflow chamber 366, the outflow tube 352 forms an outflow chamber 368, and the bypass port 354 forms a bypass chamber 370. The inlet 346 is in fluidic communication with the inflow chamber 366 such that fluid supplied to the inlet 346 to be heated flows into the inflow chamber 366, which is in fluidic communication with the inflow ports 362 and the bypass chamber 370. As shown in FIG. 31, the water header manifold 90 is in fluidic communication with the heat exchanger tubes 288. Particularly, each inflow port 352 is in fluidic communication with a heat exchanger tube inlet 294, and each outflow port 364 is in fluidic communication with a heat exchanger tube outlet 296. The outflow chamber 368 is in fluidic communication with the outflow ports 364 and the outlet 350. Accordingly, fluid flows into the inlet 346 from a pool or spa, into the inflow chamber 366, through the inflow ports 362, into the inlet 294 of the heat exchanger tubes 288, through the heat exchanger tubes 288 where it is heated, out of the outlet 296 of the heat exchanger tubes 288, through the outflow ports 364, into the outflow chamber 368, and out of the outlet 350 back to the pool or spa. The pool or spa water is continuously cycled in this fashion while the gas heater 10 is operational.

As noted above, the inflow chamber 366 is in fluidic communication with the bypass chamber 370. The bypass chamber 370 is capable of being switched into and out of fluidic communication with the outflow chamber 368 by the service cartridge 358, which includes a pressure valve 372 that opens when the pressure in the bypass chamber 370 is above a predetermined value and closes when the pressure is below a predetermined value. When the pressure valve 372 is open, the inflow chamber 366 is in fluidic communication with the outflow chamber 368 by way of the bypass chamber 370, which allows a portion of the water to bypass the heat exchanger 254, resulting in a reduction in pressure in the system. The water header manifold 90, along with the bypass chamber 370, service cartridge housing 356, service cartridge 358, and associated functionality, can be in accordance with U.S. Pat. No. 7,971,603, the contents of which are hereby incorporated by reference in their entirety.

Figure 33:
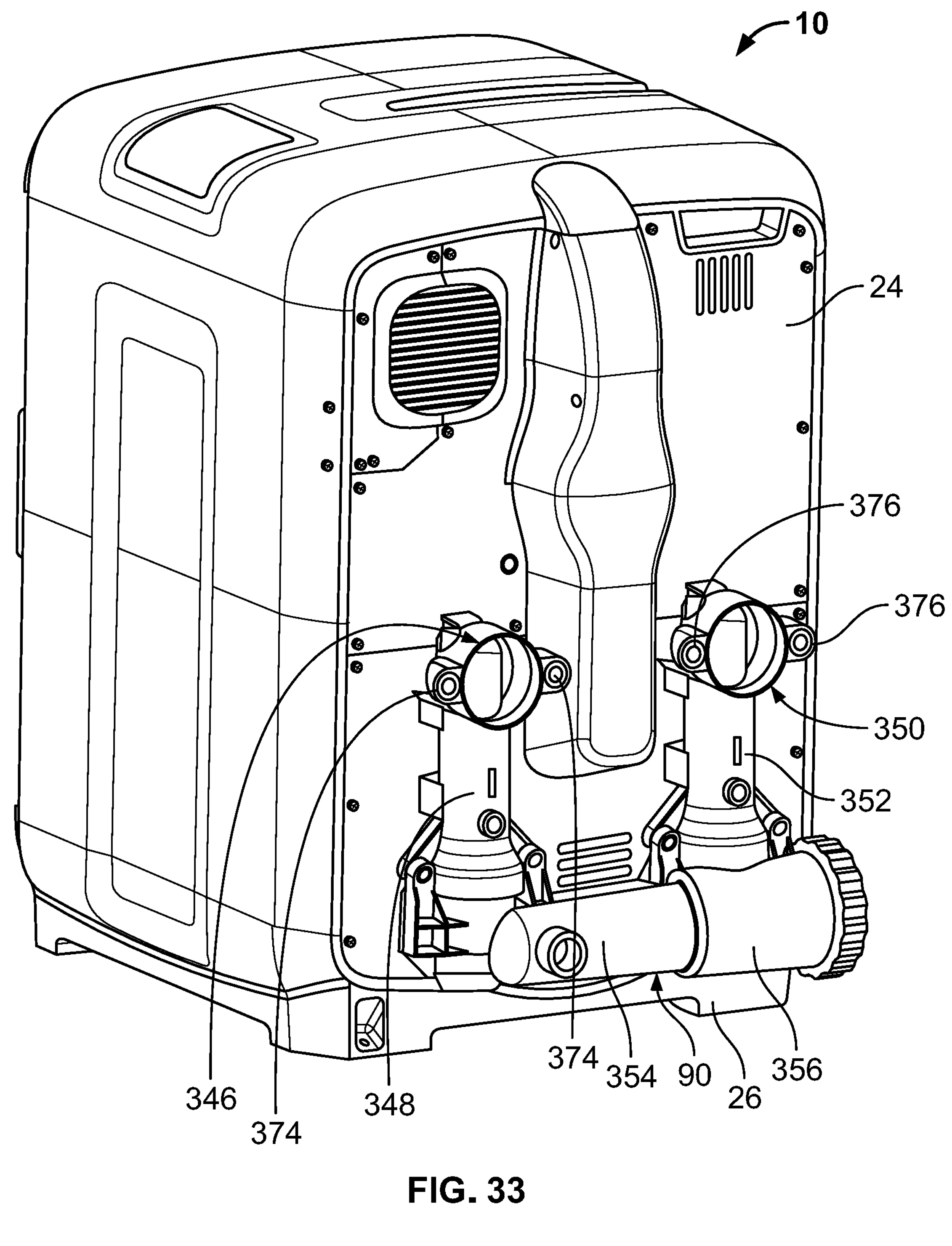
FIG. 33 is a perspective view of the compact universal gas pool heater of FIG. 1 showing the water manifold header without fittings connected.
Figure 34:
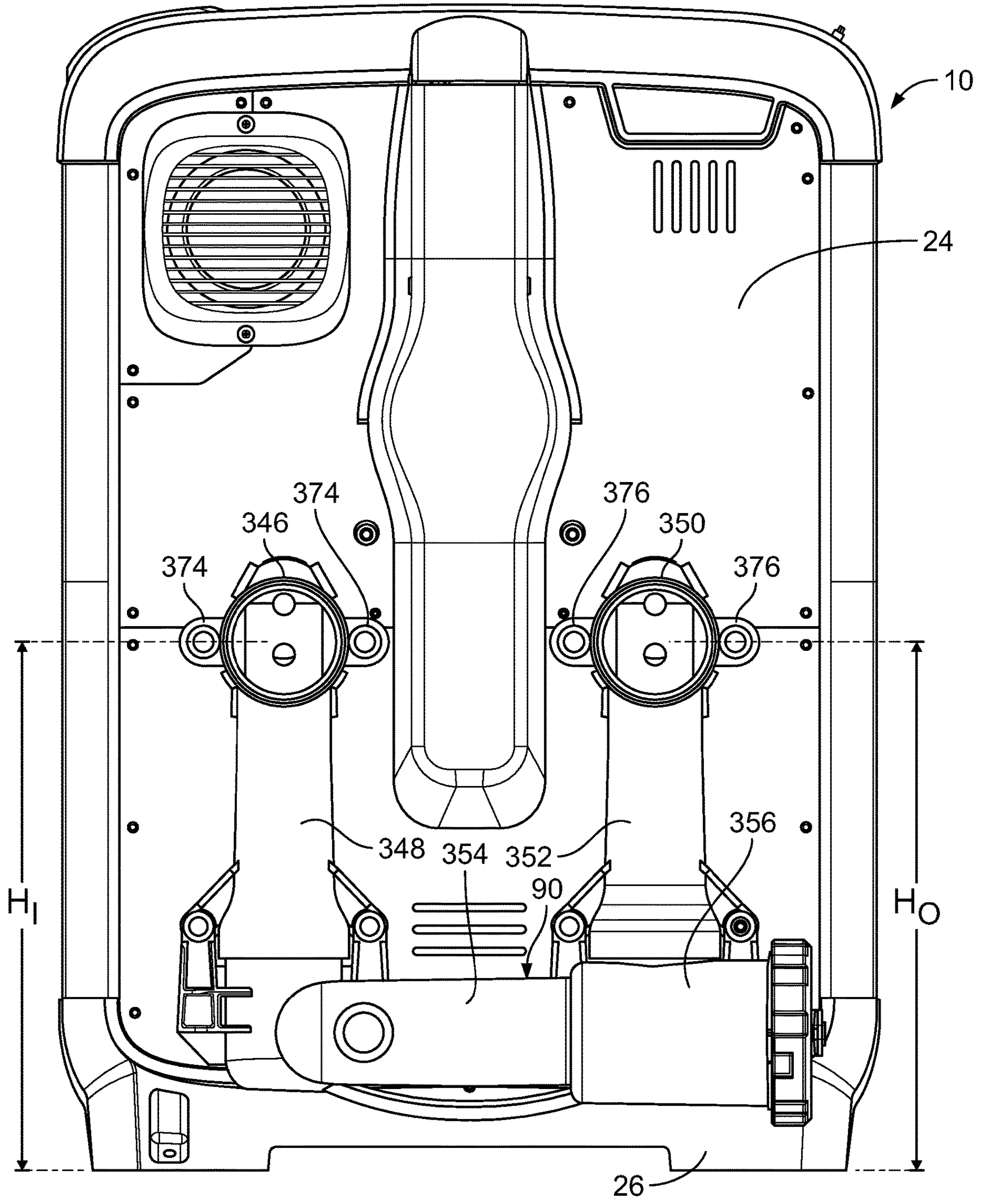
FIG. 34 is an elevational view of the compact universal gas pool heater of FIG. 1 showing the water manifold header without fittings connected.

FIGS. 33-38 illustrate adaptable aspects of the water header manifold 90 of the present disclosure. FIGS. 33 and 34 are, respectively, perspective and elevational views of the gas heater 10 without fittings attached. The water header manifold 90 was described in detail in connection with FIGS. 21-23 and 31-32 above, which is hereby referenced and need not be repeated. In addition to those components discussed above, e.g., the inlet 346, the inflow tube 348, the outlet 350, the outflow tube 352, the bypass port 354, the service cartridge housing 356, etc., the water header manifold 90 includes one or more inlet mounts 374 (e.g., inlet mounting flanges) adjacent the inlet 346, and one or more outlet mounts 376 (e.g., outlet mounting flanges) adjacent the outlet 350. The inlet 346 is positioned at an inlet position, and the outlet 350 is positioned at an outlet position. In this regard, the center of the inlet 346, along with the inlet mounting flanges 374, are spaced an inlet height $H_1$ from the bottom of the base 26, while the center of the outlet 350, along with the outlet mounting flanges 376, are spaced an outlet height $H_O$ from the bottom of the base 26. The inlet height $H_1$ and the outlet height $H_O$ are substantially the same. The inlet 346 and inlet mounting flanges 374 are configured to receive multiple adapters or fittings that can be used to adjust the inlet height $H_1$ and the position of the inlet 346 to match preexisting pool plumbing that was connected to a water inlet of a prior heater that the present gas heater 10 is replacing. Similarly, the outlet 350 and outlet mounting flanges 376 are configured to receive multiple adapters or fittings that can be used to adjust the outlet height $H_O$ and the position of the outlet 350 to match preexisting pool plumbing that was connected to a water outlet of prior heater that the present gas heater 10 is replacing.

Figure 35:
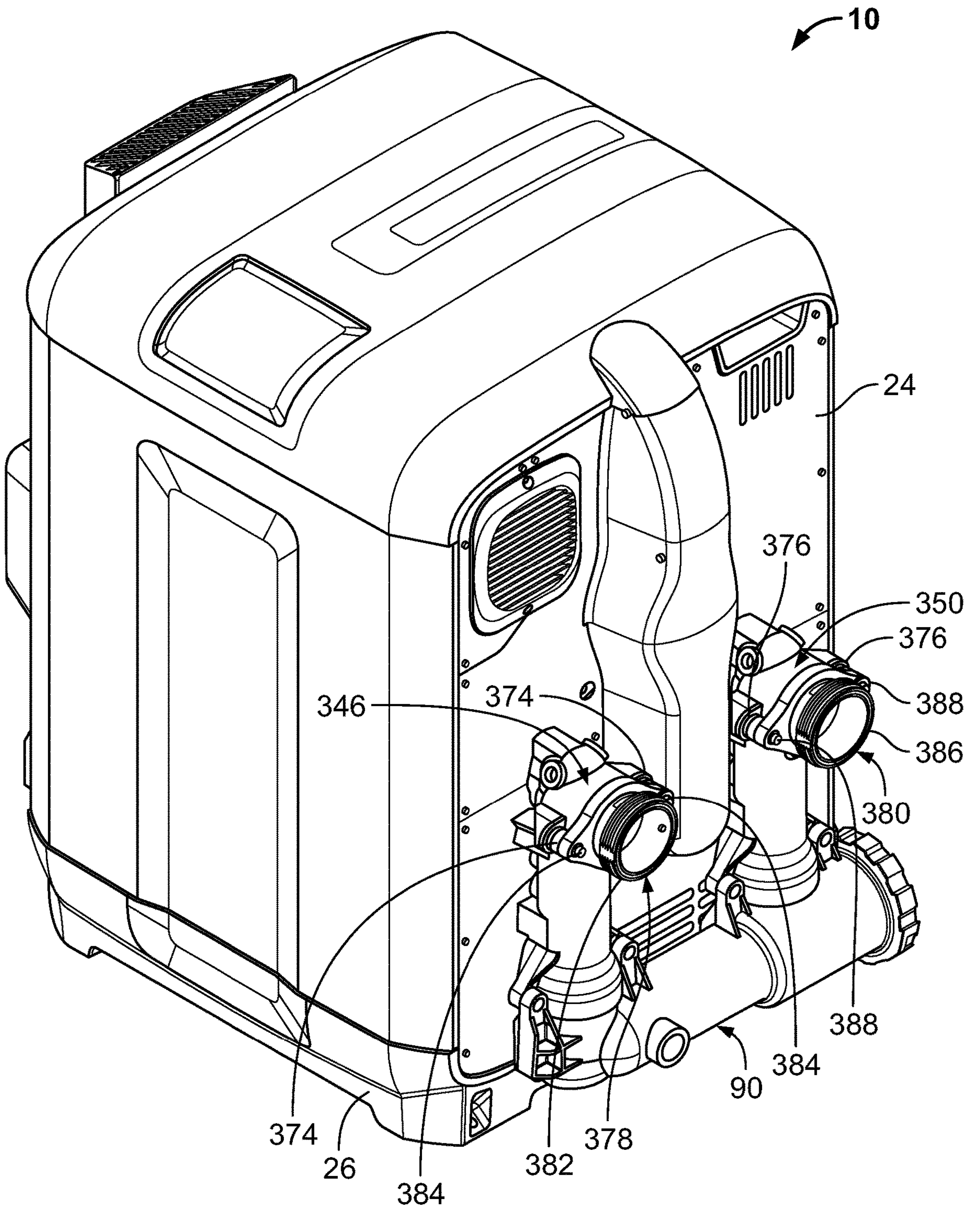
FIG. 35 is a perspective view of the compact universal gas pool heater of FIG. 1 showing the water manifold header with a first inlet fitting and a first outlet fitting connected.
Figure 36:
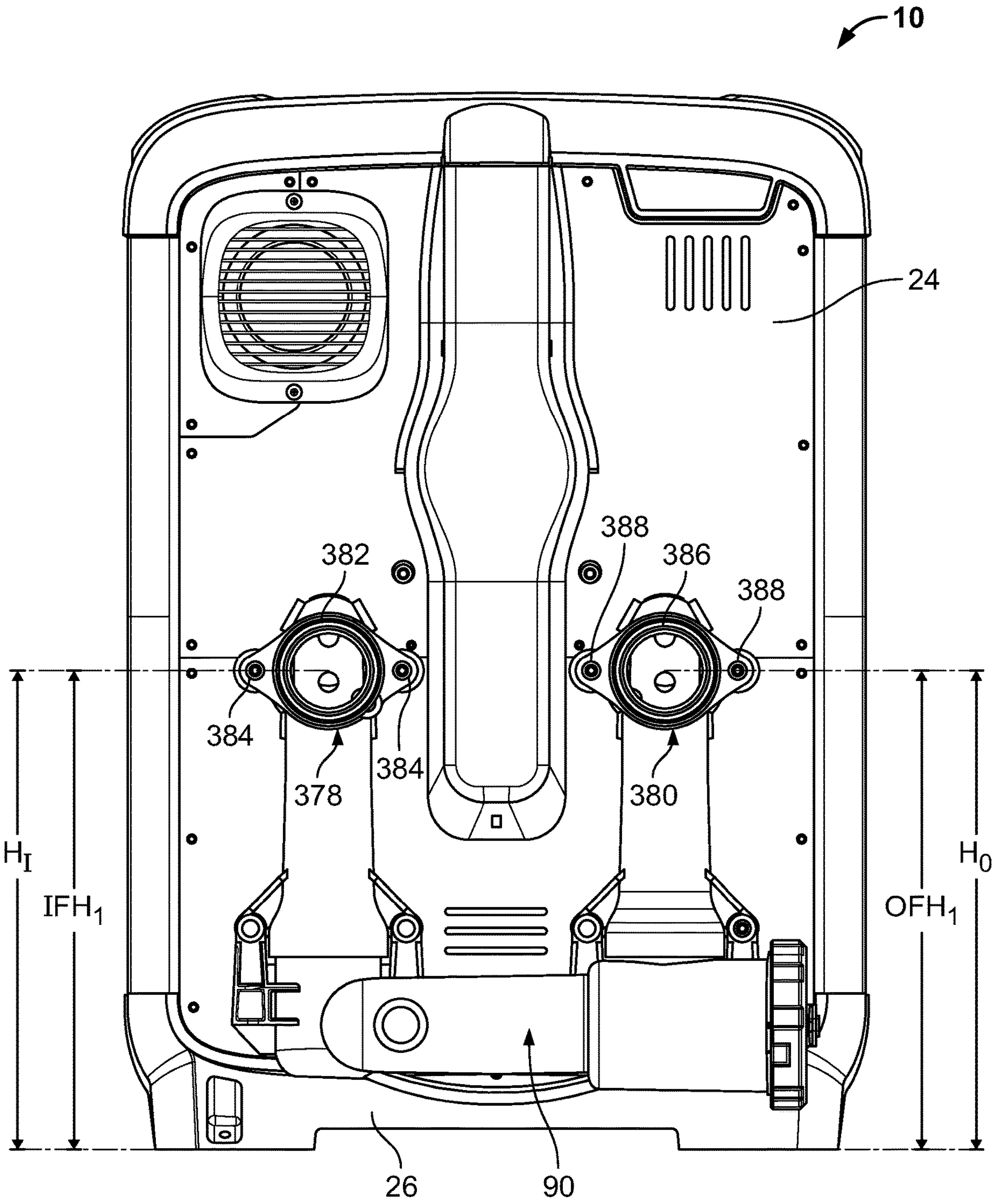
FIG. 36 is an elevational view of the compact universal gas pool heater of FIG. 1 showing the water manifold header with the first inlet and first outlet fittings connected.

FIGS. 35 and 36 are, respectively, perspective and elevational views of the gas heater 10 with a first inlet fitting 378 and a first outlet fitting 380 mounted to the water header manifold 90. The first inlet fitting 378 includes a first inlet fitting inlet 382 and one or more first inlet fitting mounts 384 adjacent the first inlet fitting inlet 382. Similarly, the first outlet fitting 380 includes a first outlet fitting outlet 386 and one or more first outlet fitting mounts 388 adjacent the first outlet fitting outlet 386. The first inlet fitting 378 is configured to be secured to the inlet 346 as well as pre-existing pool plumbing without the need for the plumbing to be modified. Similarly, the first outlet fitting 380 is configured to be secured to the outlet 350 as well as pre-existing pool plumbing without the need for the plumbing to be modified.

The first inlet fitting 378 can be secured to the inlet 346 of the water header manifold 90 by aligning the first inlet fitting mounts 384 with the inlet mounting flanges 374. A bolt or other fastening means can then be inserted through the first inlet fitting mounts 384 and the inlet mounting flanges 374 to secure the two together. A gasket can also be provided between the first inlet fitting 378 and the inlet 346 to help maintain pressure and prevent leakage. This places the inlet 346 in fluidic communication with the first inlet fitting inlet 382.

The first outlet fitting 380 can be secured to the outlet 350 of the water header manifold 90 by aligning the first outlet fitting mounts 388 with the outlet mounting flanges 376. A bolt or other fastening means can then be inserted through the first outlet fitting mounts 388 and the outlet mounting flanges 376 to secure the two together. A gasket can also be provided between the first outlet fitting 380 and the outlet 350 to help maintain pressure and prevent leakage. This places the outlet 350 in fluidic communication with the first outlet fitting outlet 386.

When the first inlet fitting 378 is connected to the inlet 346, the inlet fitting inlet 382 will be at an adjusted inlet position. In this regard, the first inlet fitting 378 will be positioned at a first inlet fitting height $IFH_1$ that is the distance between the center of first inlet fitting inlet 382 and the bottom of the base 26. When the first outlet fitting 380 is connected to the outlet 350, the outlet fitting outlet 386 will be at an adjusted outlet position. In this regard, the first outlet fitting 380 will be positioned at a first outlet fitting height OM that is the distance between the center of first outlet fitting outlet 386 and the bottom of the base 26. The first inlet fitting height $IFH_1$ is the effective height by which the inlet 346 of the water header manifold 90 can be connected to pre-existing pool plumbing and devices. The first outlet fitting height OM is the effective height by which the outlet 350 of the water header manifold 90 can be connected to pre-existing pool plumbing and devices. That is, when the proper inlet and outlet fittings are attached to the water header manifold 90, the first inlet fitting height $IFH_1$ should match the height of the pre-existing water inlet plumbing (e.g., that was connected to the prior heater that the present gas heater 10 is replacing) and the first outlet fitting height OM should match the height of the pre-existing water outlet plumbing (e.g., that was connected to the prior heater that the present gas heater 10 is replacing). Accordingly, the pre-existing water inlet plumbing should align with the first inlet fitting inlet 382 such that it can be connected thereto with minimal modification, and the preexisting water outlet plumbing should align with the first outlet fitting outlet 386 such that it can be connected thereto with minimal modification. This effectively changes the position of the inlet 346 and the outlet 350. In addition to the first inlet fitting inlet 382 and the first outlet fitting outlet 386 being placed in the proper position for connection, they will also have the same size and fitting type, e.g., connector type, as the prior heater.

Essentially, the first inlet fitting 378 adapts the water manifold header 90 inlet 346 to the inlet position of the prior heater that is being replaced, and the first outlet fitting 380 adapts the water manifold header 90 outlet 350 to the outlet position of the prior heater that is being replaced.

Figure 37:
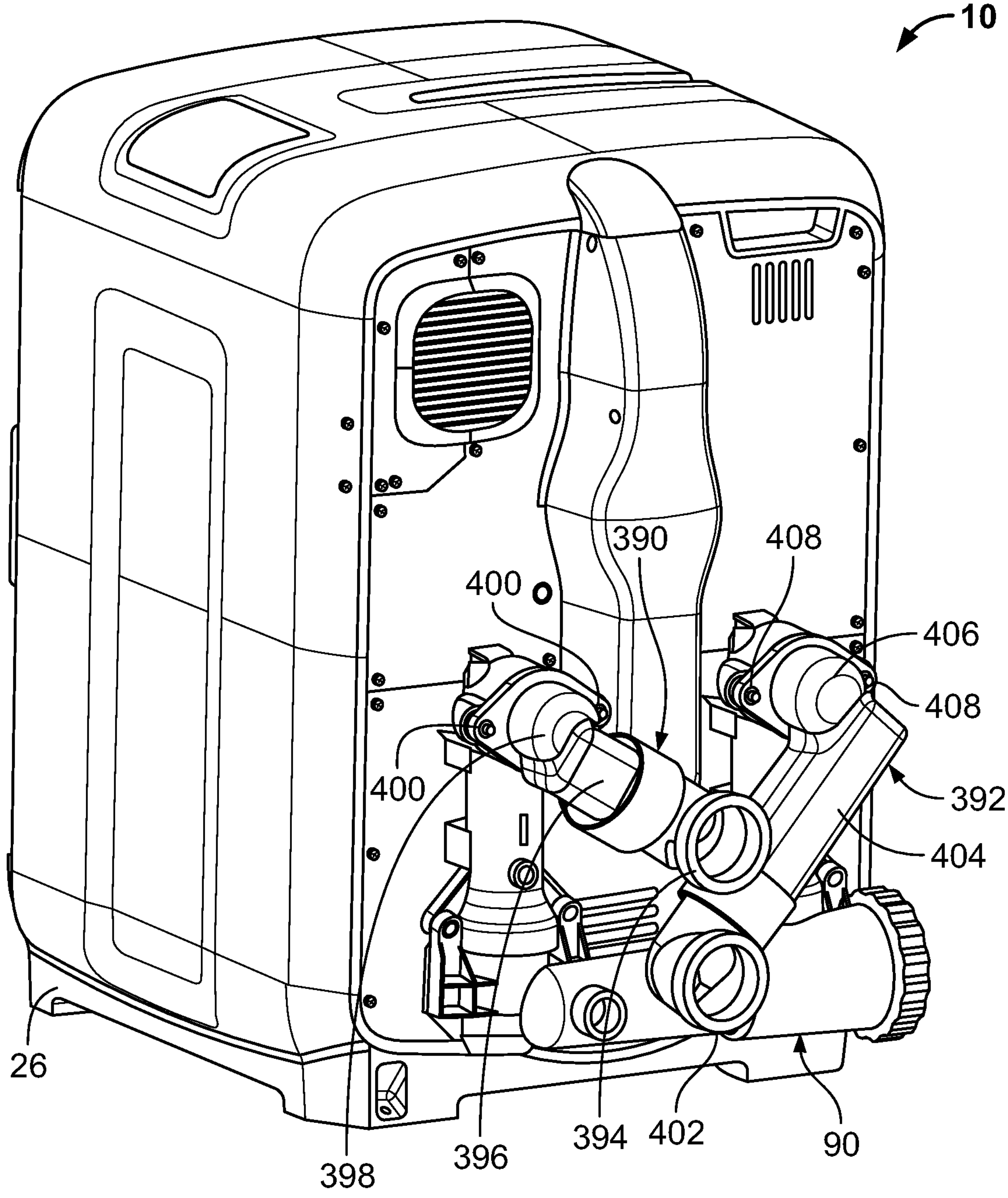
FIG. 37 is a perspective view of the compact universal gas pool heater of FIG. 1 showing the water manifold header with a second inlet fitting and a second outlet fitting connected.
Figure 38:
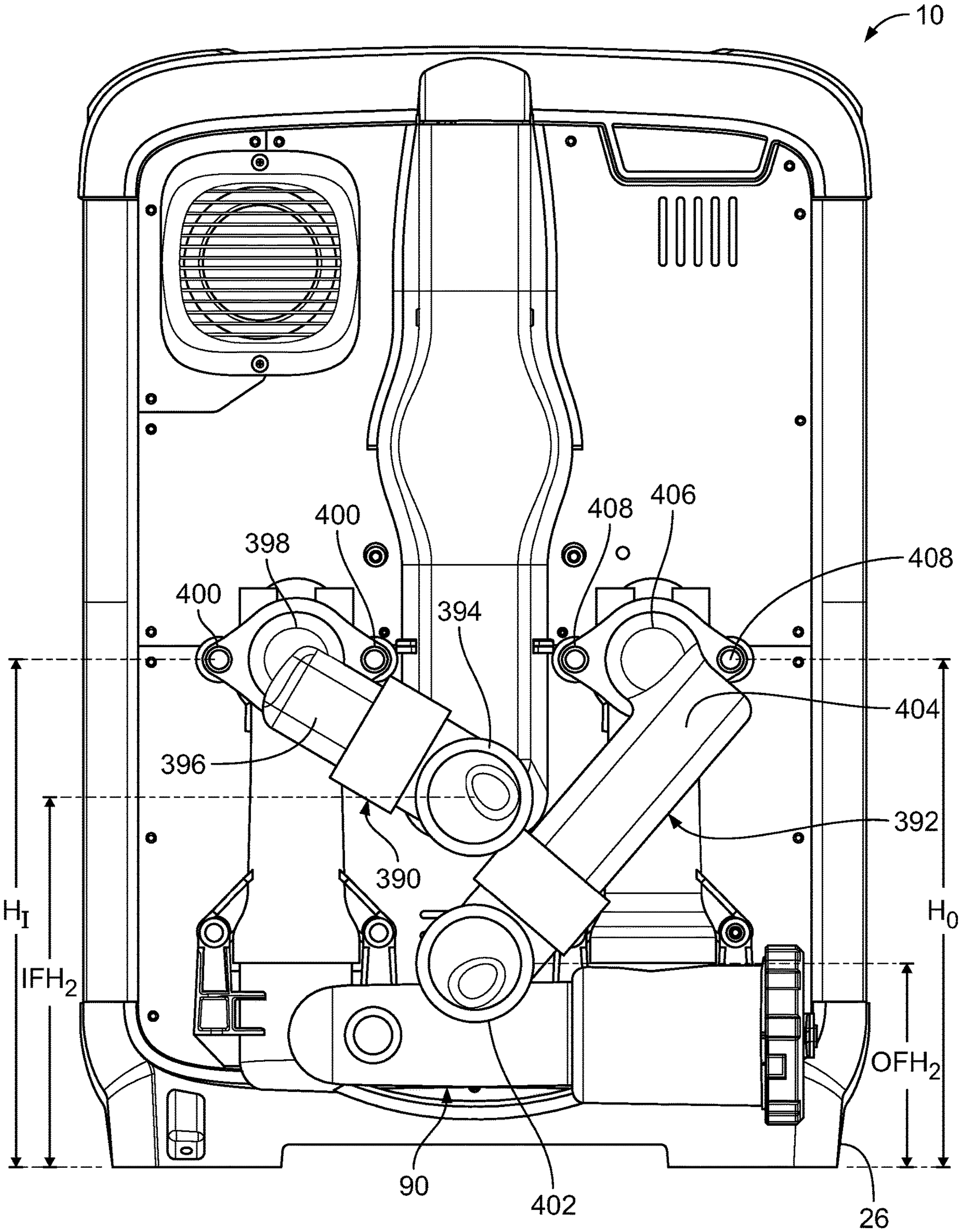
FIG. 38 is an elevational view of the compact universal gas pool heater of FIG. 1 showing the water manifold header with the second inlet and second outlet fittings connected.

FIGS. 37 and 38 are, respectively, perspective and elevational views of the gas heater 10 with a second inlet fitting 390 and a second outlet fitting 392 mounted to the water header manifold 90. The second inlet fitting 390 includes a second inlet fitting inlet 394, a second inlet fitting body 396, a second inlet fitting outlet 398, and one or more second inlet fitting mounts 400. The second inlet fitting 390 forms a fluidic path between the second inlet fitting inlet 394, the second inlet fitting body 396, and the second inlet fitting outlet 398, such that fluid can flow into the second inlet fitting inlet 394, across the second inlet fitting body 396, and out of the second inlet fitting outlet 398. Similarly, the second outlet fitting 392 includes a second outlet fitting outlet 402, a second outlet fitting body 404, a second outlet fitting inlet 406, and one or more second outlet fitting mounts 408. The second outlet fitting 392 forms a fluidic path between the second outlet fitting inlet 406, the second outlet fitting body 404, and the second outlet fitting outlet 402, such that fluid can flow into the second outlet fitting inlet 406, across the second outlet fitting body 404, and out of the second outlet fitting outlet 402. The second inlet fitting 390 is configured to be secured to the inlet 346, as well as pre-existing pool plumbing, without the need for the plumbing to be modified. Similarly, the second outlet fitting 392 is configured to be secured to the outlet 350 as well as pre-existing pool plumbing without the need for the plumbing to be modified.

The second inlet fitting 390 can be secured to the inlet 346 of the water header manifold 90 by aligning the second inlet fitting mounts 400 with the inlet mounting flanges 374. A bolt or other fastening means can then be inserted through the second inlet fitting mounts 400 and the inlet mounting flanges 374 to secure the two together. A gasket can also be provided between the second inlet fitting 390 and the inlet 346 to help maintain pressure and prevent leakage. This places the inlet 346 in fluidic communication with the second inlet fitting inlet 394.

The second outlet fitting 392 can be secured to the outlet 350 of the water header manifold 90 by aligning the second outlet fitting mounts 408 with the outlet mounting flanges 376. A bolt or other fastening means can then be inserted through the second outlet fitting mounts 408 and the outlet mounting flanges 376 to secure the two together. A gasket can also be provided between the second outlet fitting 392 and the outlet 350 to help maintain pressure and prevent leakage. This places the outlet 350 in fluidic communication with the second outlet fitting outlet 402.

When the second inlet fitting 390 is connected to the inlet 346, the second inlet fitting inlet 394 will be at an adjusted inlet position while the second inlet fitting outlet 398 will be at the inlet position. In this regard, the second inlet fitting inlet 394 will be positioned at a second inlet fitting height $IFH_2$ that is the distance between the center of the second inlet fitting inlet 394 and the bottom of the base 26, and the second inlet fitting outlet 398 will be at the inlet height $H_1$. When the second outlet fitting 392 is connected to the outlet 350, the second outlet fitting outlet 402 will be at an adjusted outlet position while the second outlet fitting inlet 406 will be at the outlet position. In this regard, the second outlet fitting outlet 402 will be positioned at a second outlet fitting height $OFH_2$ that is the distance between the center of second outlet fitting outlet 402 and the bottom of the base 26, and the second outlet fitting inlet 406 will be at the outlet height $H_O$.

The second inlet fitting height $IFH_2$ is the effective height by which the inlet 346 of the water header manifold 90 can be connected to pre-existing pool plumbing and devices. The second outlet fitting height $OFH_2$ is the effective height by which the outlet 350 of the water header manifold 90 can be connected to pre-existing pool plumbing and devices. That is, when the second inlet fitting 390 and the second outlet fitting 293 are attached to the water header manifold 90, the second inlet fitting height $IFH_2$ should match the height of the pre-existing water inlet plumbing (e.g., that was connected to the prior heater that the present gas heater 10 is replacing) and the second outlet fitting height $OFH_2$ should match the height of the pre-existing water outlet plumbing (e.g., that was connected to the prior heater that the present gas heater 10 is replacing), so long as the second inlet fitting 390 and the second outlet fitting 293 are the proper fittings (e.g., adapters) that match the previous heater. Accordingly, the pre-existing water inlet plumbing should align with the second inlet fitting inlet 394 such that it can be connected thereto with minimal modification, and the pre-existing water outlet plumbing should align with the second outlet fitting outlet 402 such that it can be connected thereto with minimal modification. This effectively changes the position of the inlet 346 and the outlet 350. In addition to the second inlet fitting inlet 394 and the second outlet fitting outlet 402 being placed in the proper position for connection, they will also have the same size and fitting type, e.g., connector type, as the prior heater.

Essentially, the second inlet fitting 390 adapts the water manifold header 90 inlet 346 to the inlet position of the prior heater that is being replaced, and the second outlet fitting 392 adapts the water manifold header 90 outlet 350 to the outlet position of the prior heater that is being replaced.

Additionally, although the inlet height measurements $H_1$, $IFH_1$, $IFH_2$ are described as a distance with respect to the bottom of the base 26, it should be understood that this is only an example and that the inlet height measurements $H_1$, $IFH_1$, $IFH_2$ can be a distance with respect to any reference elevation point that is common to all inlet height measurements $H_1$, $IFH_1$, $IFH_2$. Similarly, although the outlet height measurements $H_O$, $OFH_1$, $OFH_2$ are described as a distance with respect to the bottom of the base 26, it should be understood that this is only an example and that the outlet height measurements $H_O$, $OFH_1$, $OFH_2$ can be a distance with respect to any reference elevation point that is common to all outlet height measurements $H_O$, $OFH_1$, $OFH_2$.

Figure 39:
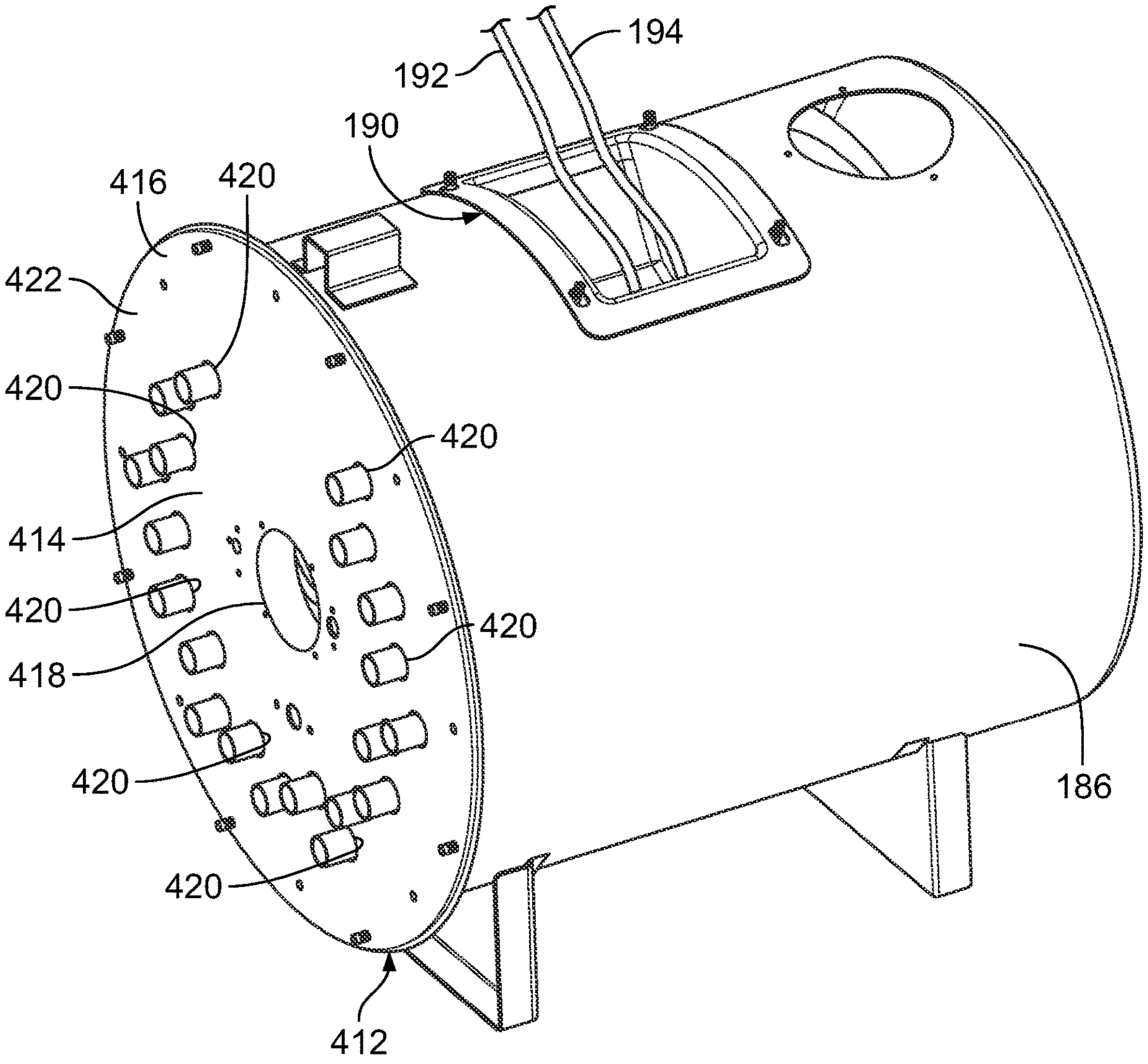
FIG. 39 is a perspective view of the combustion chamber canister and a second tube sheet housing a second heat exchanger according to another aspect of the present disclosure.
Figure 40:
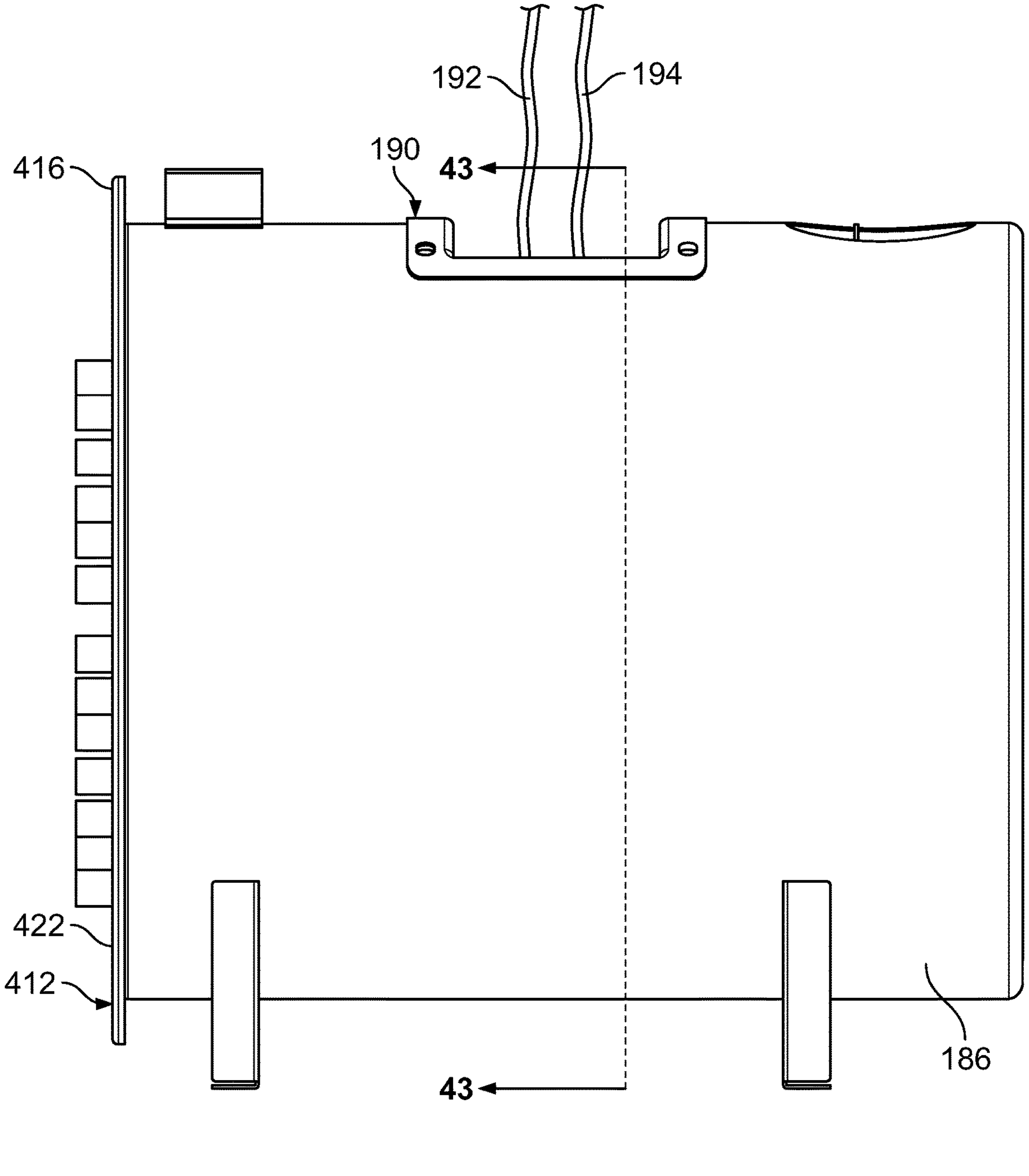
FIG. 40 is an elevational view of the combustion chamber canister and second tube sheet shown in FIG. 39.

FIGS. 39-44 show a second heat exchanger 410 according to another aspect of the present disclosure. FIGS. 39 and 40 are, respectively, perspective and side views of the combustion chamber canister 186 and a second tube sheet 412 housing the second heat exchanger 410. The second heat exchanger 410 is configured to be incorporated into the gas heater 10 in place of the heat exchanger 254 discussed in connection with FIGS. 21-29. Accordingly, it should be understood by a person of ordinary skill in the art that the discussion provided above in connection with the gas heater 10, and the description of the components thereof, hold true for when the second heat exchanger 410 is utilized by the gas heater 10. As such, for the ease of illustration, a vast majority of those components previously shown and described are not reproduced in FIGS. 39-44, and the description of those components need not be reproduced, but should be understood to be incorporated. The combustion chamber canister 186 used in combination with the second heat exchanger 410 can be substantially similar in construction to the combustion chamber canister 186 described in connection with FIGS. 21-29. The second tube sheet 412 is substantially similar in construction to the tube sheet 91 described above in connection with FIGS. 21-29. The second tube sheet 412 is generally disc-shaped with a central body 414 surrounded by a radial flange 416. The central body 414 includes a central opening 418 and a plurality of tube openings 420, half of which are inflow tube openings and half are outflow tube openings. The central opening 418 and the plurality of tube openings 420 extend through the central body 414 from an exterior side 422 to an interior side 424. The central opening 268 is configured to have the burner 84 and the gas mixture pipe 82 mounted adjacent thereto. In this regard, the gas mixture pipe 82 is mounted to the exterior side 422 of the second tube sheet 412 adjacent the central opening 418, while the burner 84 is mounted to the interior side 424 of the second tube sheet 412 adjacent the central opening 418. Accordingly, the air/gas mixture that is pumped into the gas mixture pipe 82 by the combustion blower 80 flows through the gas mixture pipe 82, across the central opening 418 of the second tube sheet 412, and into the burner 84. The combustion chamber canister 186 is mounted to the interior side 424 of the second tube sheet 412 at the radial flange 416 with the second heat exchanger 410 positioned within the combustion chamber canister 186. The mount 190 can be mounted to the combustion chamber canister 186 as described above in connection with FIGS. 27-29, along with the igniter 194 and flame sensor 192 mounted thereto.

Figure 41:
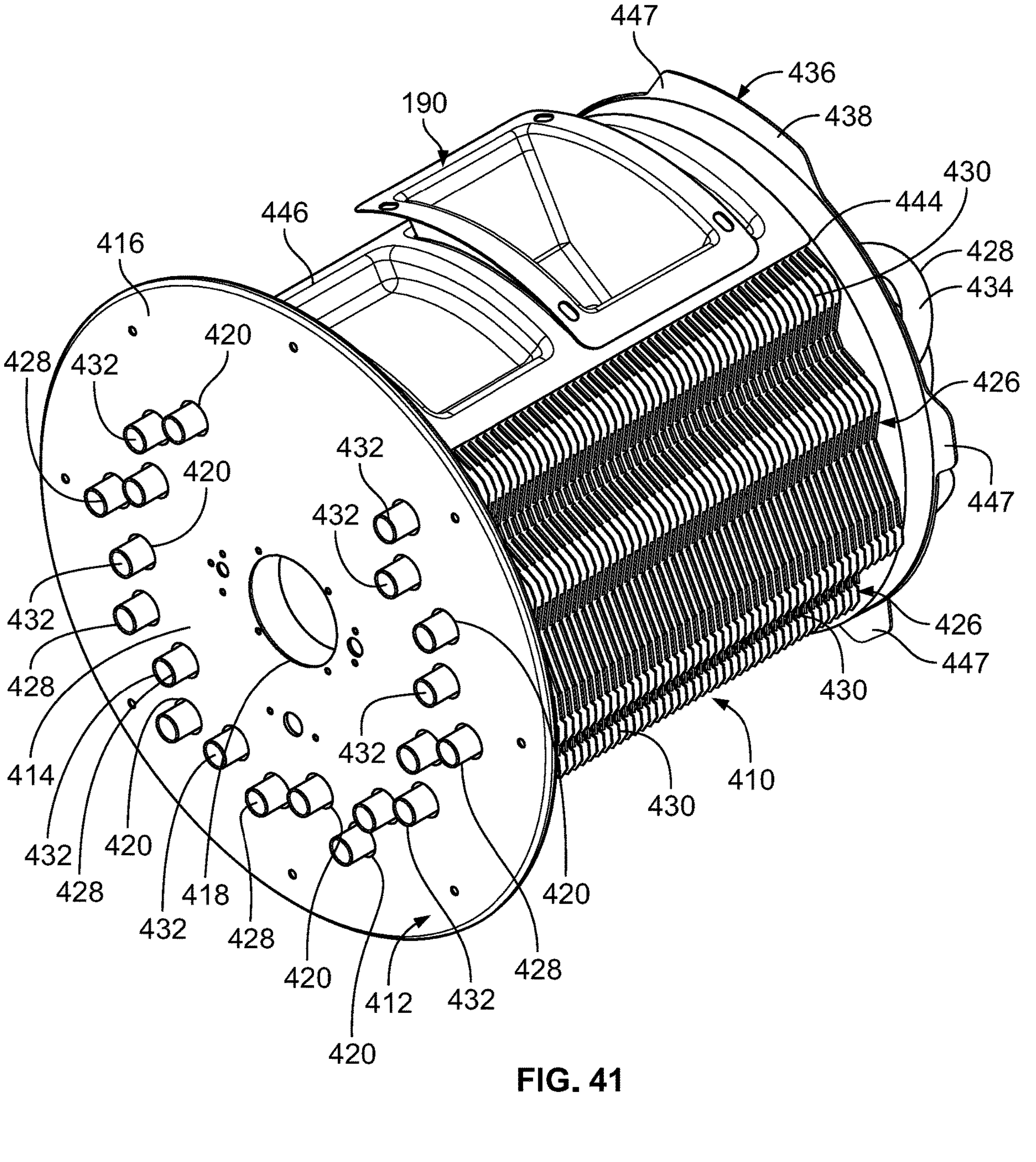
FIG. 41 is a first perspective view of the second heat exchanger mounted to the second tube sheet.
Figure 42:
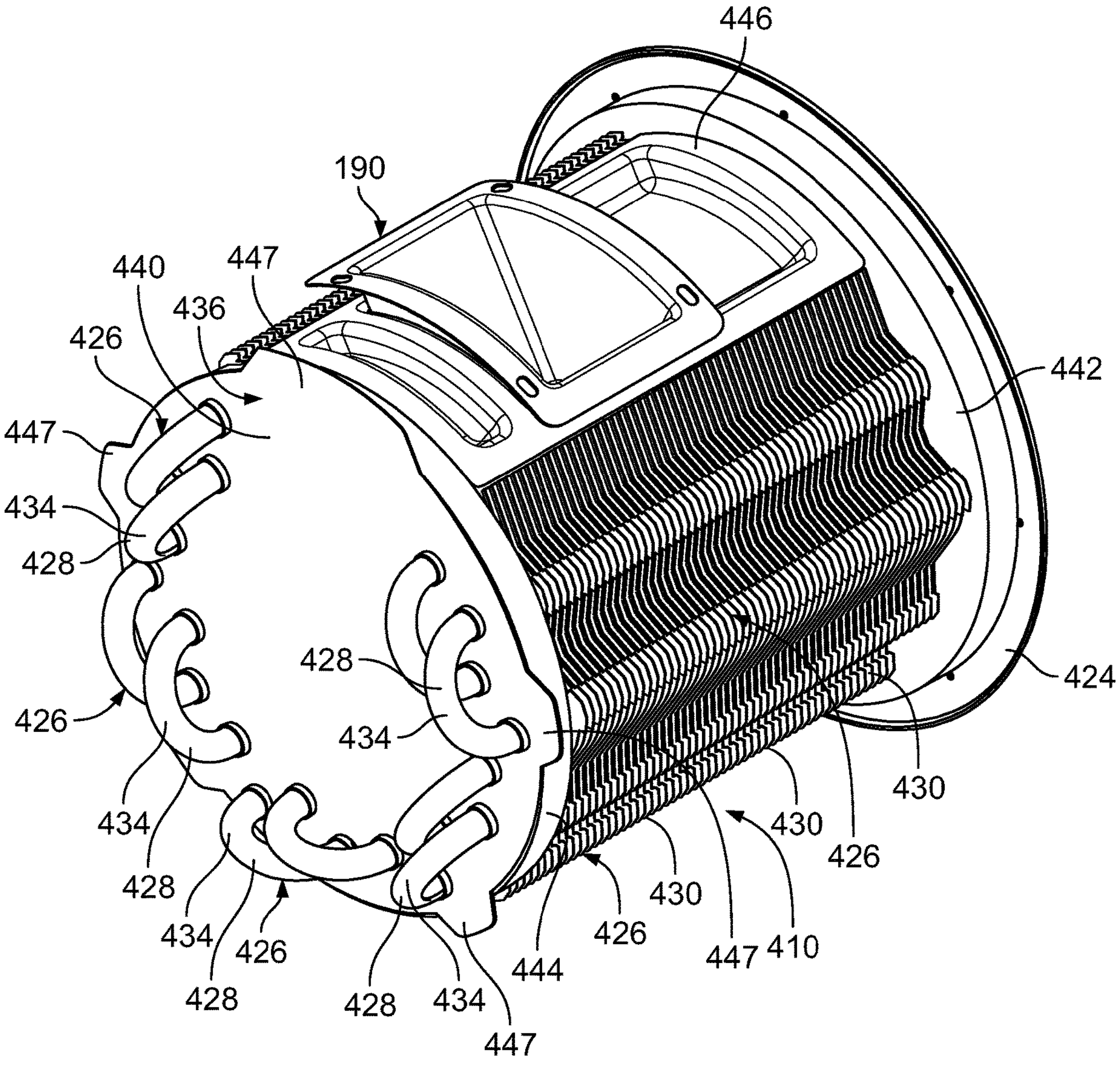
FIG. 42 is a second perspective view of the second heat exchanger mounted to the second tube sheet.
Figure 43:
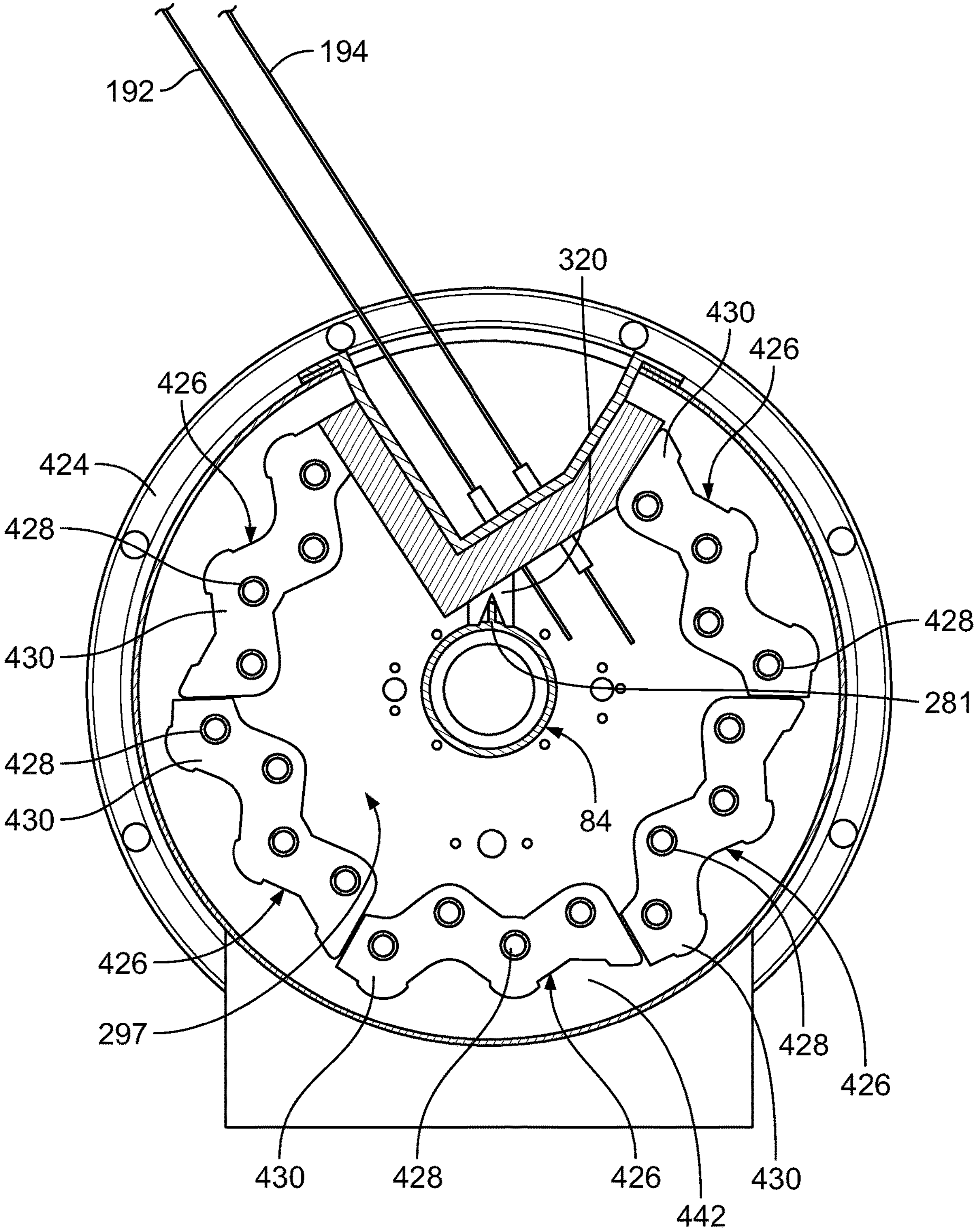
FIG. 43 is a sectional view taken along Line 43-43 of FIG. 40.
Figure 44:
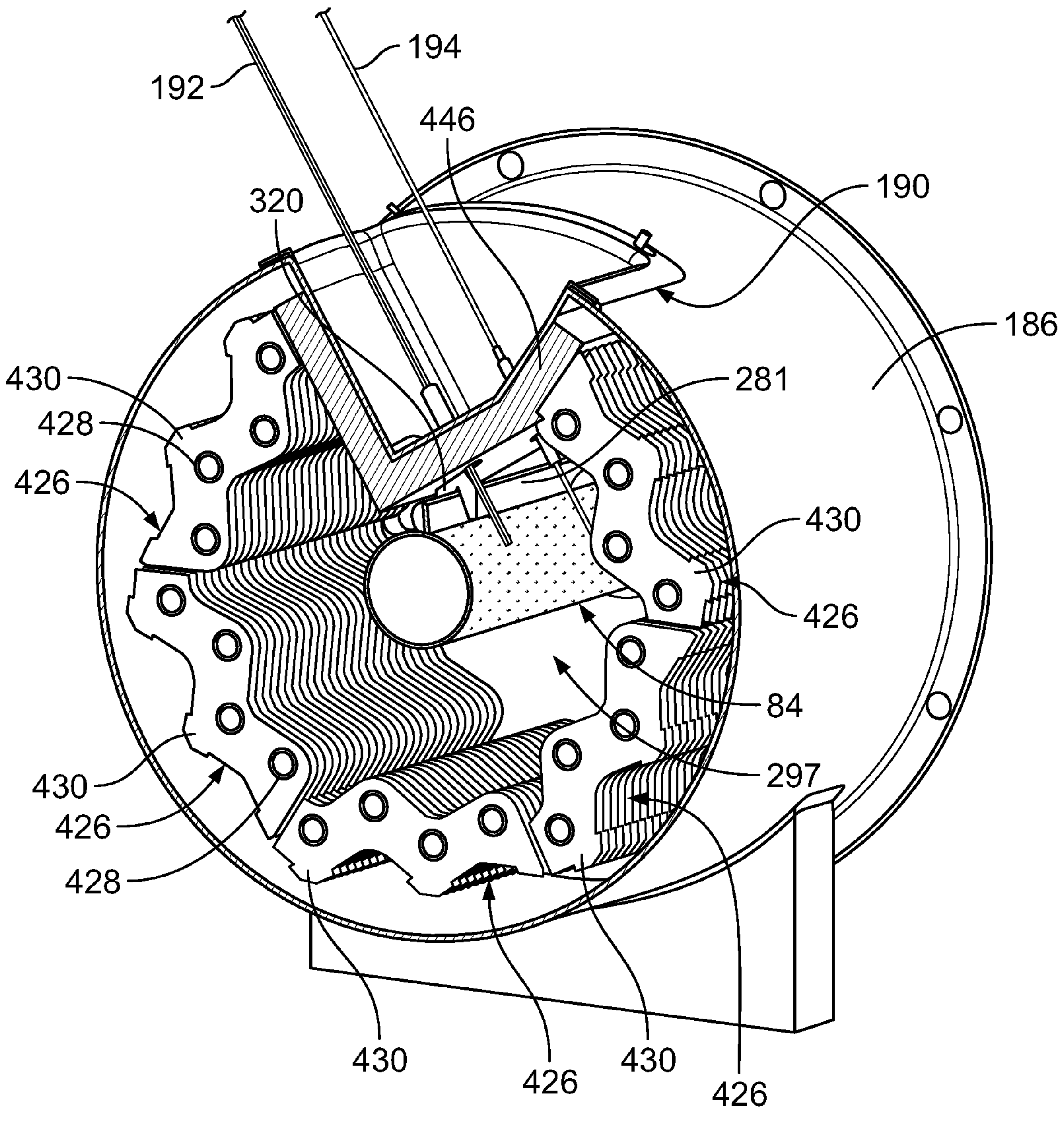
FIG. 44 is a perspective sectional view taken along Line 43-43 of FIG. 40.

FIGS. 41 and 42 are first and second perspective view of the second heat exchanger 410 mounted to the second tube sheet 412. FIGS. 43 and 44 are respectively elevational and perspective sectional views taken along Line 43-43 of FIG. 40. The second heat exchanger 410 is a semi-circular expanded tube and fin heat exchanger having individual fins organized into a circular pattern to optimize heat transfer in a smaller space. The second heat exchanger 410 includes a plurality of tube-and-fin subassemblies 426 that comprise tubes 428 and a plurality of fins 430. The tube-and-fin subassemblies 426 are organized into a semi-circular shape around the burner 84 within the combustion chamber canister 186. The tubes 428 are generally smooth heat exchanger tubes that are bent to form U-shaped “hairpins” and pass through a stack of fins 430. Each of the tubes 428 includes two open ends 432 that are generally positioned in the same plane, and a curved end 434. The tubes 428 can extend through the second tube sheet 412 and a front manifold 436, which has an interior side 438 and an exterior side 440. In this configuration, the fins 430 are positioned between the interior side 438 of the front manifold 436 and the interior side 424 of the second tube sheet 412, the curved ends 434 are positioned adjacent the exterior side 440 of the front manifold 436, and the open ends 432 extend through the tube openings 420 of the second tube sheet 412. One of the open ends 432 functions as an inlet for water to be heated, and the other of the open ends 432 functions as an outlet for heated water to exit. A water header manifold, e.g., water header manifold 90, can be mounted to the second tube sheet 412 covering the open ends 432 of the tubes 428 and configured to route water through the tubes 428.

The interior side 424 of the second tube sheet 412 can be lined with a layer of insulation 442 through which the tubes 428 extend to reduce the temperature near a coupled water header manifold. The interior side 438 of the front manifold 436 can also be lined with a layer of insulation 444 that the tubes 428 extend through to prevent the escape of heat and hot gases. Additionally, a layer of combustion chamber insulation 446 fills a top gap in the semi-circular pattern of fins of the heat exchanger 410 which is provided between two of the tube-and-fin subassemblies 426 to allow for placement of the mount 190 and to permit the igniter 194 and flame sensor 192 to reach the burner 84. The combustion chamber insulation 446 prevents heat and hot gases from escaping through the top gap, thus increasing the efficiency of the heat exchanger 410. The tube-and-fin subassemblies 426 generally form $5/6^{th}$ of a circle while the combustion chamber insulation 446 and mount 190 fill in the remaining $1/6^{th}$. Forming the tube-and-fin subassemblies 426 in a semi-circle eliminates the need for bottom insulation, and optimizes the transfer of heat in the smallest space possible.

The front manifold 436 can additionally include a plurality of radial extensions 447 that are configured to engage and rest on the interior of the combustion chamber canister 186 when the combustion chamber canister 186 is placed over the heat exchanger 410. Accordingly, the radial extensions 447 support the heat exchanger 410 within the combustion chamber canister 186. This eliminates the need for a separate support bracket.

Figure 45:
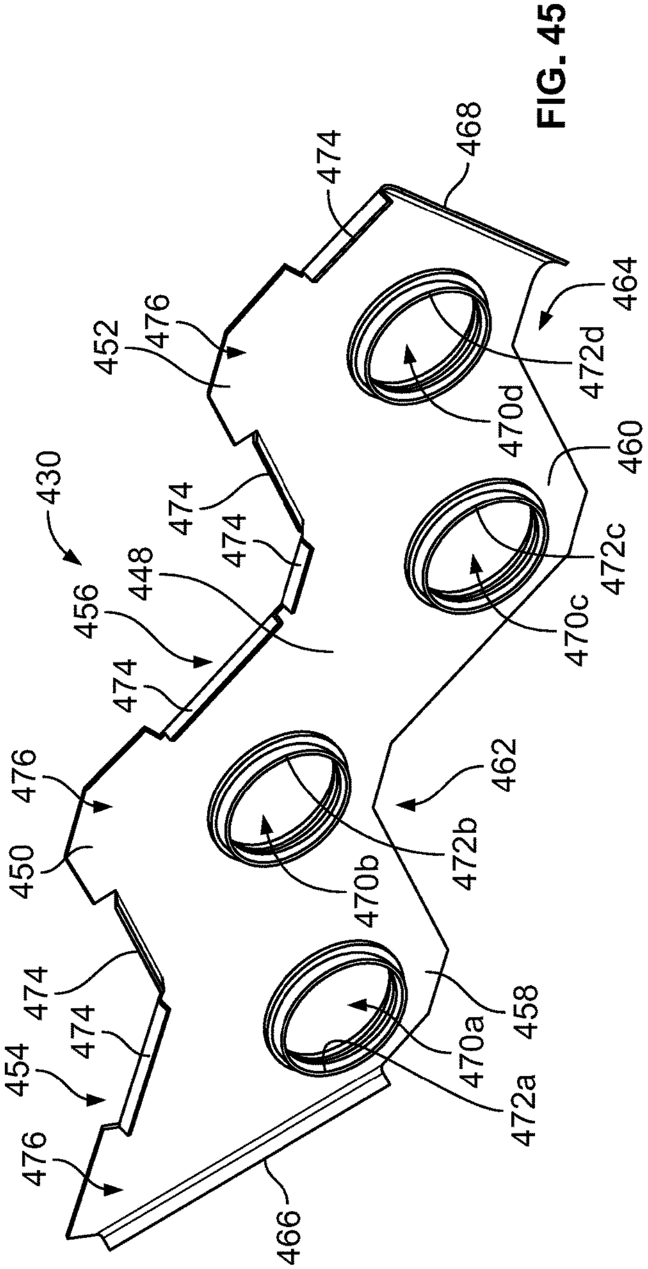
FIG. 45 is a perspective view of a fin of the second heat exchanger of FIG. 41.
Figure 46:
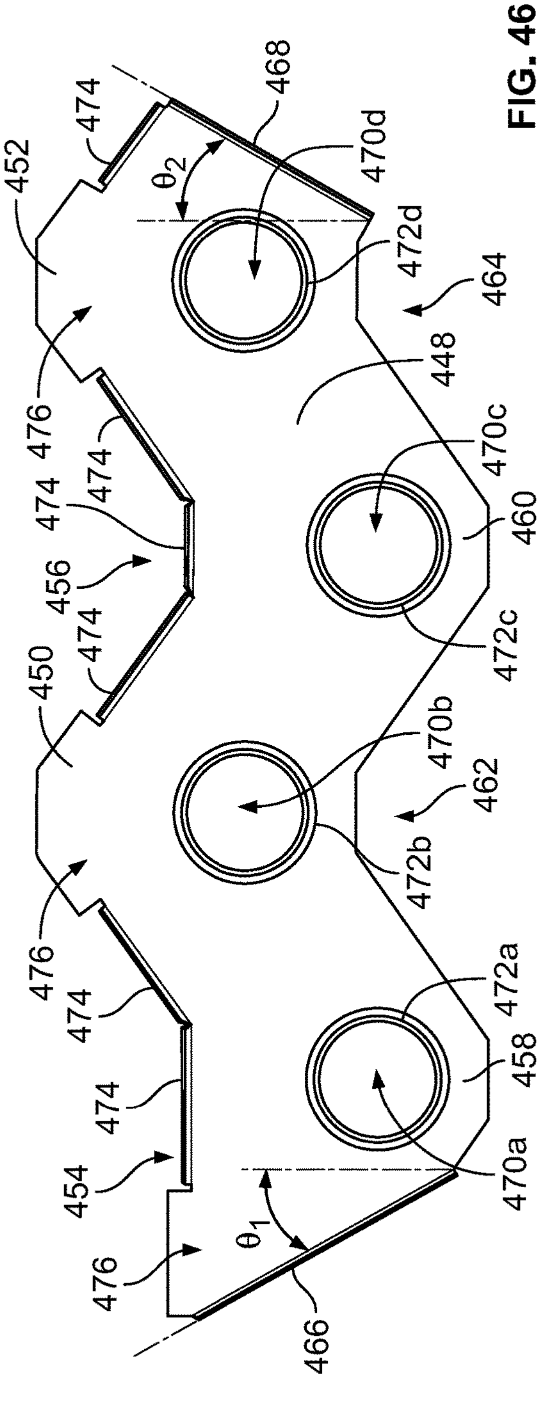
FIG. 46 is an elevational view of the fin of FIG. 45.

FIGS. 45 and 46 are perspective and elevational views, respectively, of the fin 430. Each fin 430 includes a body 448 that includes first and second upper extensions 450, 452, first and second upper gaps 454, 456, first and second lower extensions 458, 460, first and second lower gaps 462, 464, a first sidewall 466, a second sidewall 468, and four tube openings 470*a*, 470*b*, 470*c*, 470*d* each surrounded by a collar 472*a*, 472*b*, 472*c*, 472*d*. The fin 430 additionally includes a plurality of folded flanges 474 adjacent the first and second upper gaps 454, 456, which form upper channels 476 therebetween. The folded flanges 474 are configured to trap hot gases adjacent the fin 430, while the upper channels 476 are configured to allow hot gases to flow across the fin 430. In this regard, the fin 430 is configured to be stacked with other fins 430 along a tube 428. When stacked on a tube 428, the folded flanges 474 and the collars 472*a*, 472*b*, 472*c*, 472*d* function to space the fins 430 apart and create a flow path for hot gases between abutting fins 430.

Additionally, the fins 430 are designed so that two fins 430 can be positioned next to each other with the first sidewall 466 of one fin 430 abutting the second sidewall 468 of a second fin 430, allowing the fins 430 to be arranged in the semi-circle configuration shown in FIG. 43. To achieve this semi-circle configuration, the first sidewall 466 is at a first angle $\Theta_1$ with respect to the vertical axis, and the second sidewall 468 is at a second angle $\Theta_2$ with respect to the vertical axis. To achieve a configuration where six fins 430 complete a full circle, the sum of the first angle $\Theta_1$ and the second angle $\Theta_2$ will have to total 60°. For example $\Theta_1$ and $\Theta_2$ can be equal to each other and both be 30°. It should be understood by a person of ordinary skill in the art that the present disclosure contemplates other configurations in which more or less than six fins 430 form a complete circle, and the corresponding angles for $\Theta_1$ and $\Theta_2$ that would be necessary to achieve a full circle. For example, ten fins 430 could be used in which the sum of $\Theta_1$ and $\Theta_2$ would equal 36°. Generally, the sum of the first and second angles $\Theta_1$ and $\Theta_2$ will be equal to three-hundred and sixty (360) divided by the number of tube-and-fin subassemblies 426 required to form a complete circle.

Furthermore, the fins 430 are dimensioned and configured so that two or more fins 430 can be nested during manufacturing. In this regard, the first and second lower extensions 458, 460 are dimensioned and shaped so as to fit within the first and second upper gaps 454, 456, while the first and second upper extensions 450, 452 are dimensioned and shaped so as to fit within the first and second lower gaps 462, 464. This arrangement saves material during manufacturing of the fins 430.

Figure 47:
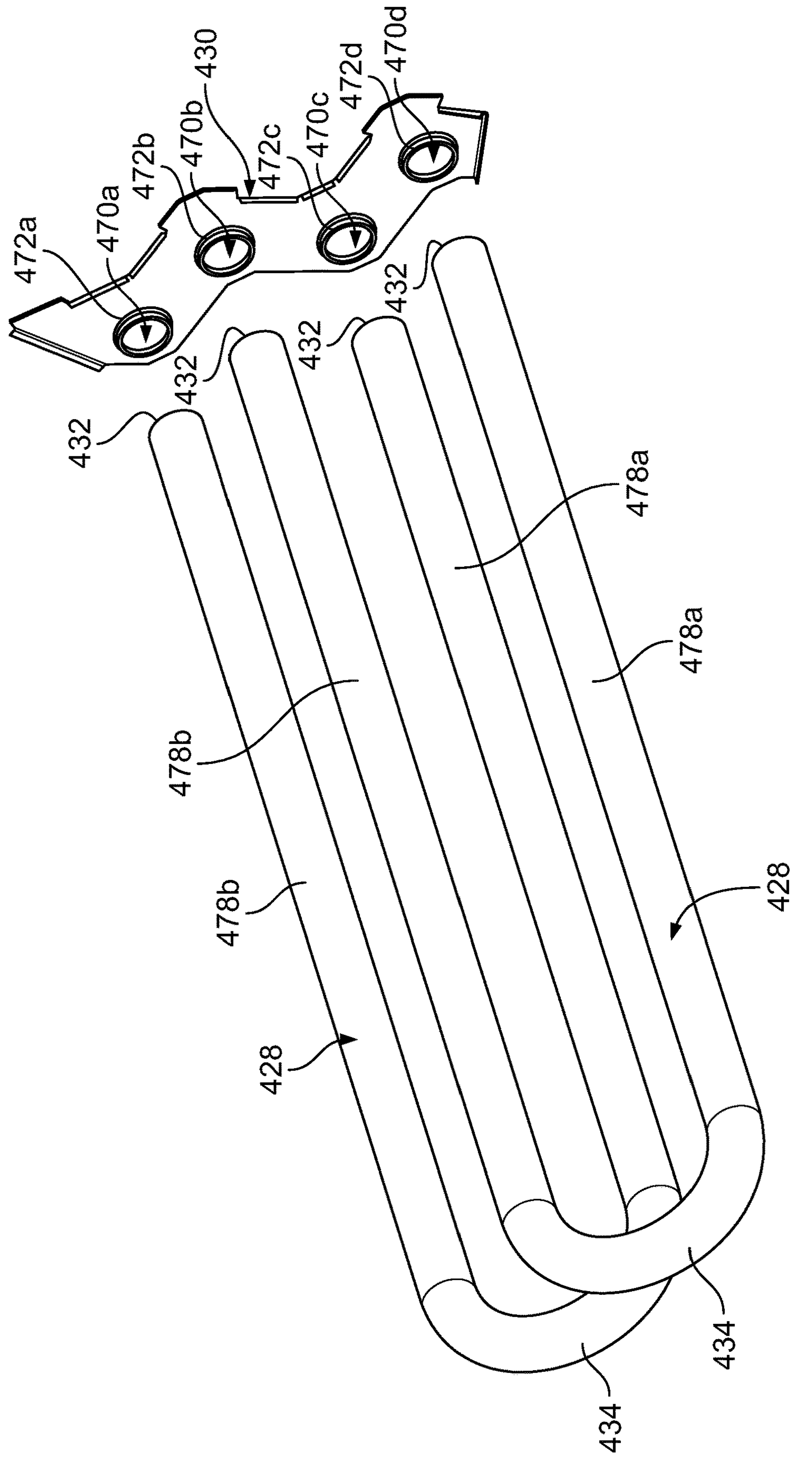
FIG. 47 is a perspective view showing two tubes being inserted into the fin of FIG. 45.
Figure 48:
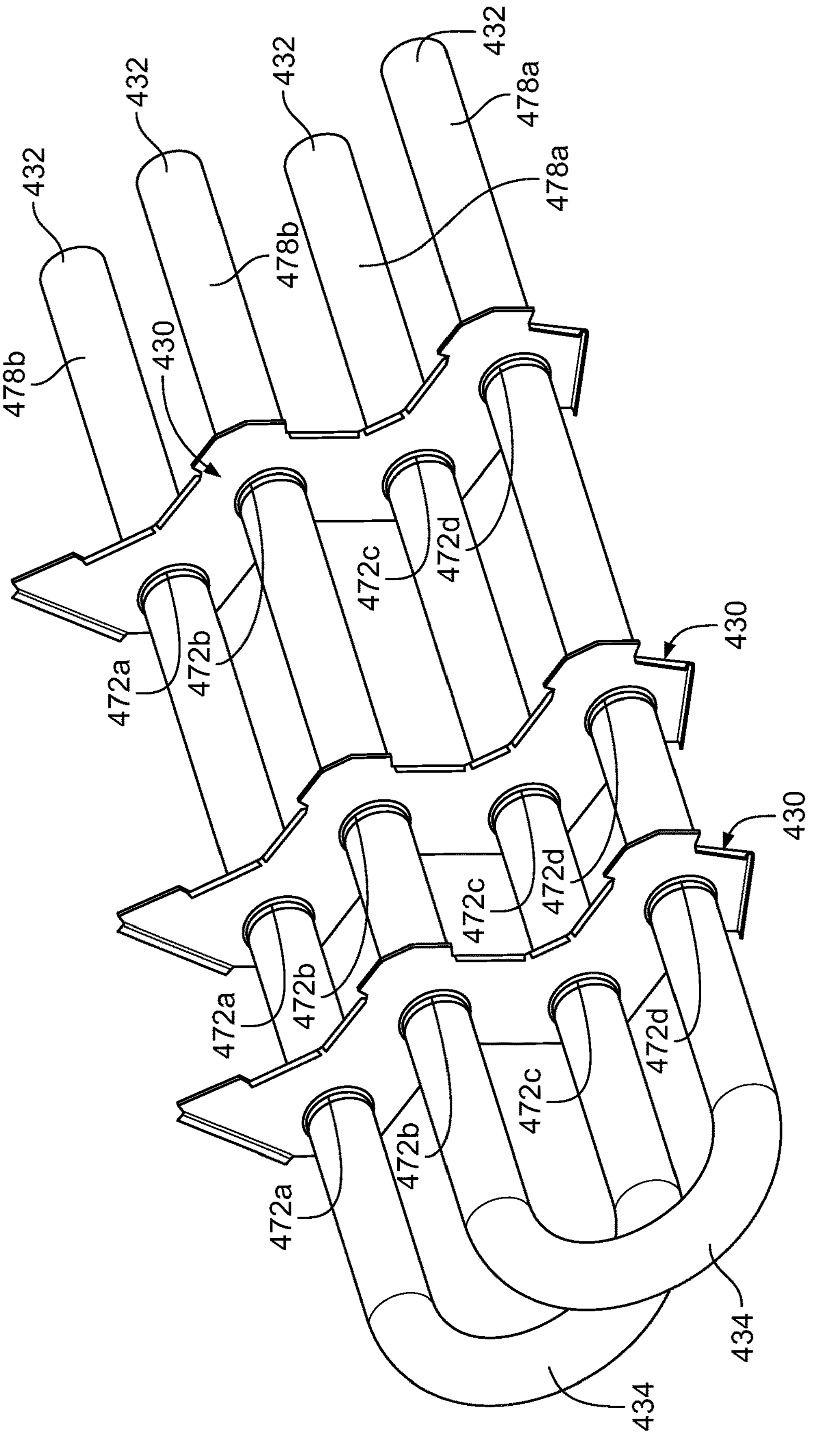
FIG. 48 is a perspective view showing two tubes inserted through three fins in accordance with FIG. 45.

FIGS. 47 and 48 are first and second perspective views illustrating formation of a tube-and-fin subassembly 426. FIG. 47 is a perspective view showing two tubes 428 being inserted into a single fin 430. The tubes 428 have first and second legs 478*a*, 478*b* that extend between the open ends 432 and the curved end 434. The open ends 432 of a the first tube 428 are inserted into the first tube opening 470*a* and the third tube opening 470*c*, while the open ends of the second tube 428 are inserted into the second tube opening 470*b* and the third tube opening 470*d*. There is a small clearance between the collars 472*a*, 472*b*, 472*c*, 472*d* and the tubes 428 allowing the fin 430 to be slid along the first and second legs 478*a*, 478*b* toward the curved end 434. More fins 430 are then added in the same fashion. FIG. 48 is a perspective view showing two tubes 428 inserted through three fins 430. This process is repeated until substantially the entire length of the first and second legs 478*a*, 478*b* of the tubes 428 are filled with fins 430 (see FIG. 42, for example). Once assembled, the tubes 428 are mechanically expanded to place them in tight contact with the fins 430 so that heat can easily transfer from the fins 430 to the tubes 428. This mechanical expansion can be accomplished by several different methods, e.g., bullet expansion where a hydraulic machine pushes a round tool through the tube 428 or hydro expansion where a fluid is pressurized inside the tubes 428.

The tube-and-fin subassemblies 426 can have advantages over tubes having extruded fins. Particularly, the tube-and-fin subassemblies 426 are more cost effective at least in part because the fins 430 can be manufactured from a lower-cost metal alloy than the tubes 428. For example, the tubes 428 can be made of a material that is more robust against damage from pool water, for example, cupronickel, stainless steel, or titanium, while the fins 430 can be made of a material that conducts heat well, but is not as robust though less expensive, for example, copper.

During operation, water is continuously routed through the tubes 428 between the open ends 432 by the water header manifold 90. While water is routed through the tubes 428, the burner 84 generates a flame from the gas mixture provided thereto. Hot gases generated by the flames then dissipate outward from the combustion chamber 297 and across the fins 430. As discussed above, the folded flanges 474 of the fins 430 trap the hot gases in contact with the fins 430 and force the hot gases to pass over the tubes 428 and out from the upper channels 476. The fins 430 capture heat and transfer it to the tubes 428, which themselves capture heat as well. The tubes 428 transfer the heat to the water flowing therethrough, which exits the tubes into the water header manifold 90 where it is rerouted back to the pool or spa.

Figure 49:
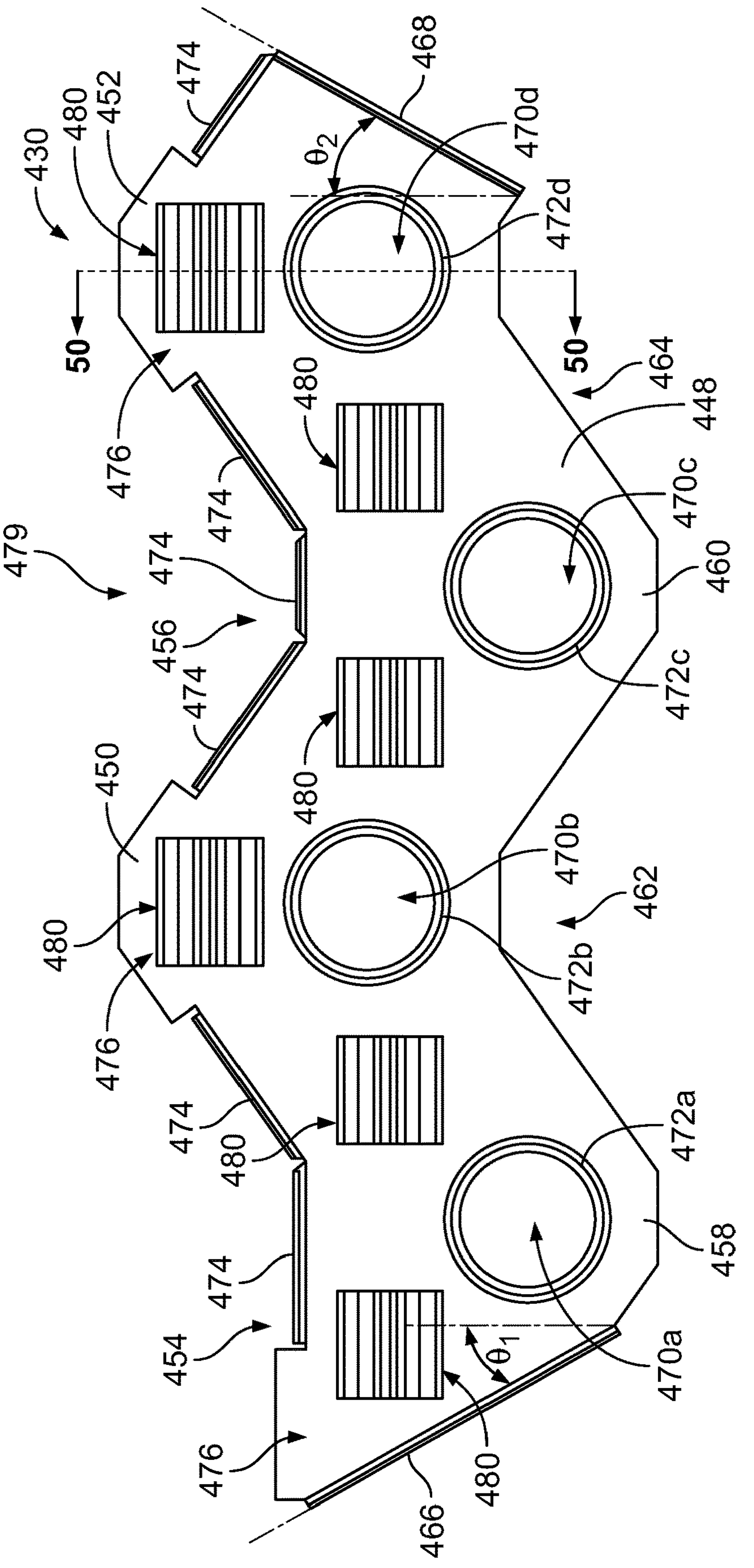
FIG. 49 is an elevational view of an alternative fin according to aspects of the present disclosure.
Figure 50:
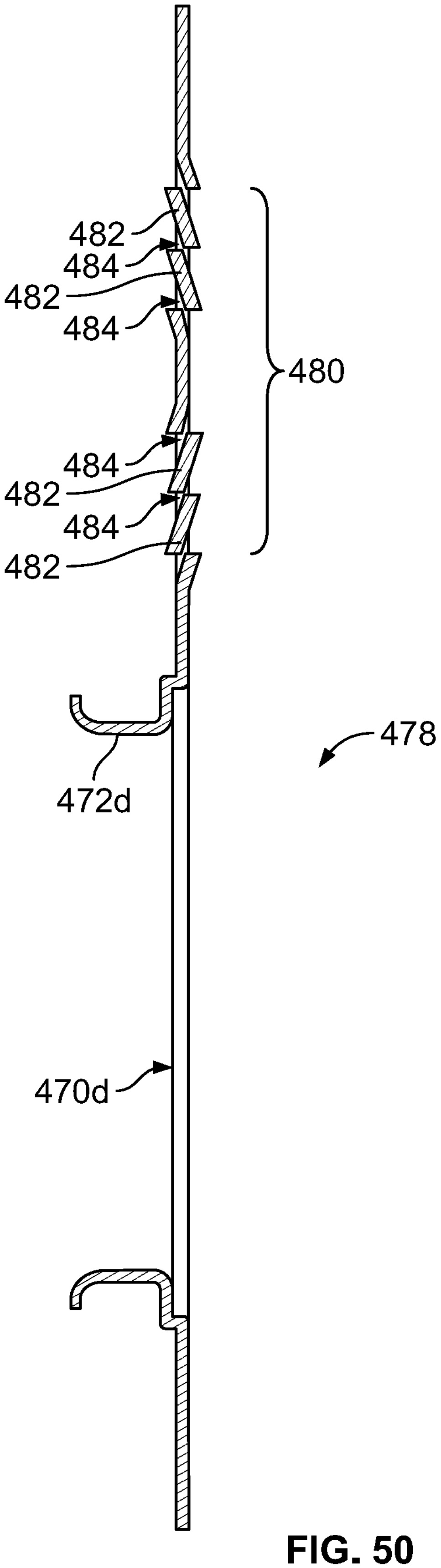
FIG. 50 is a sectional view taken along Line 50-50 of FIG. 49.

FIGS. 49-50 show an alternative fin 479 that includes flow directors 480, e.g., louvers, that enhance heat transfer. FIG. 49 is an elevational view of the alternative fin 479. FIG. 50 is a sectional view taken along Line 50-50 of FIG. 49. Alternative fin 479 is substantially identical in construction to fin 430, but with the inclusion of flow directors 480 on the body 448. Accordingly, it should be understood that the alternative fin 479 is constructed in accordance with fin 430, and such description need not be repeated. Furthermore, elements that are the same between the alternative fin 479 and the fin 430 are labeled with like element numbers. As shown in FIGS. 45 and 46, the alternative fin 479 has a plurality of flow directors 480, e.g., six. The flow directors 480 include a plurality of inclined slats 482 that form a plurality of channels 484 through the body 448 of the alternative fin 479. The slats 482 force a portion of hot gases through the channels 484 and into contact with adjacent fins 479. This results in enhanced heat transfer between the hot gases and the alternative fins 479. While the flow directors 480 are illustrated as louvers in FIGS. 59 and 50, it should be understood that other geometries could be used for the flow directors to enhance the transfer of heat. For example, lances, bumps, holes, extrusions, embosses, ribs, and/or other geometry can be included on the body 448 of the alternative fin 479 in addition to or in place of the flow directors 480 to enhance heat transfer.

Figure 51:
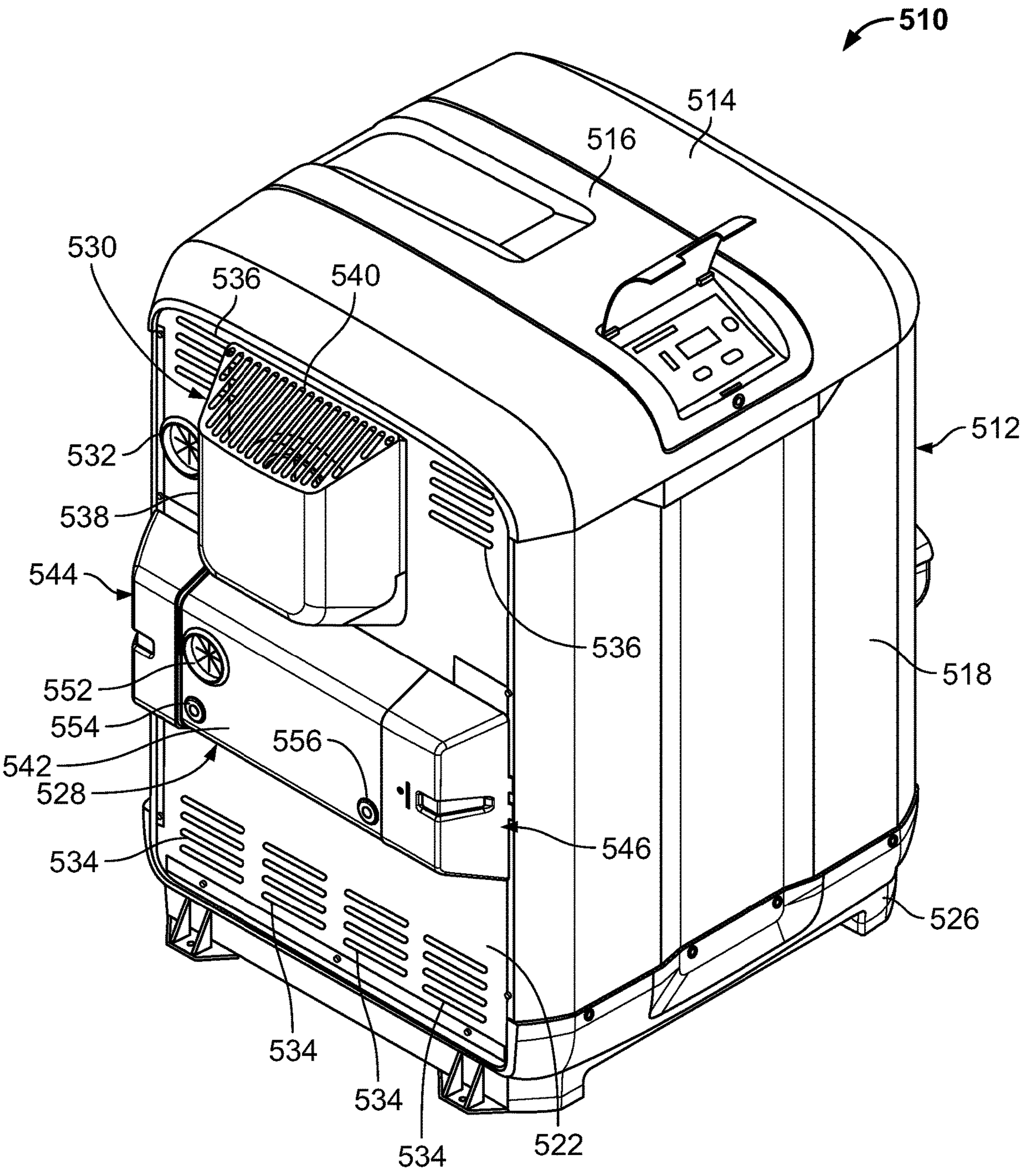
FIG. 51 is a first perspective view of an exemplary compact universal gas pool heater in accordance with embodiments of the present disclosure.
Figure 52:
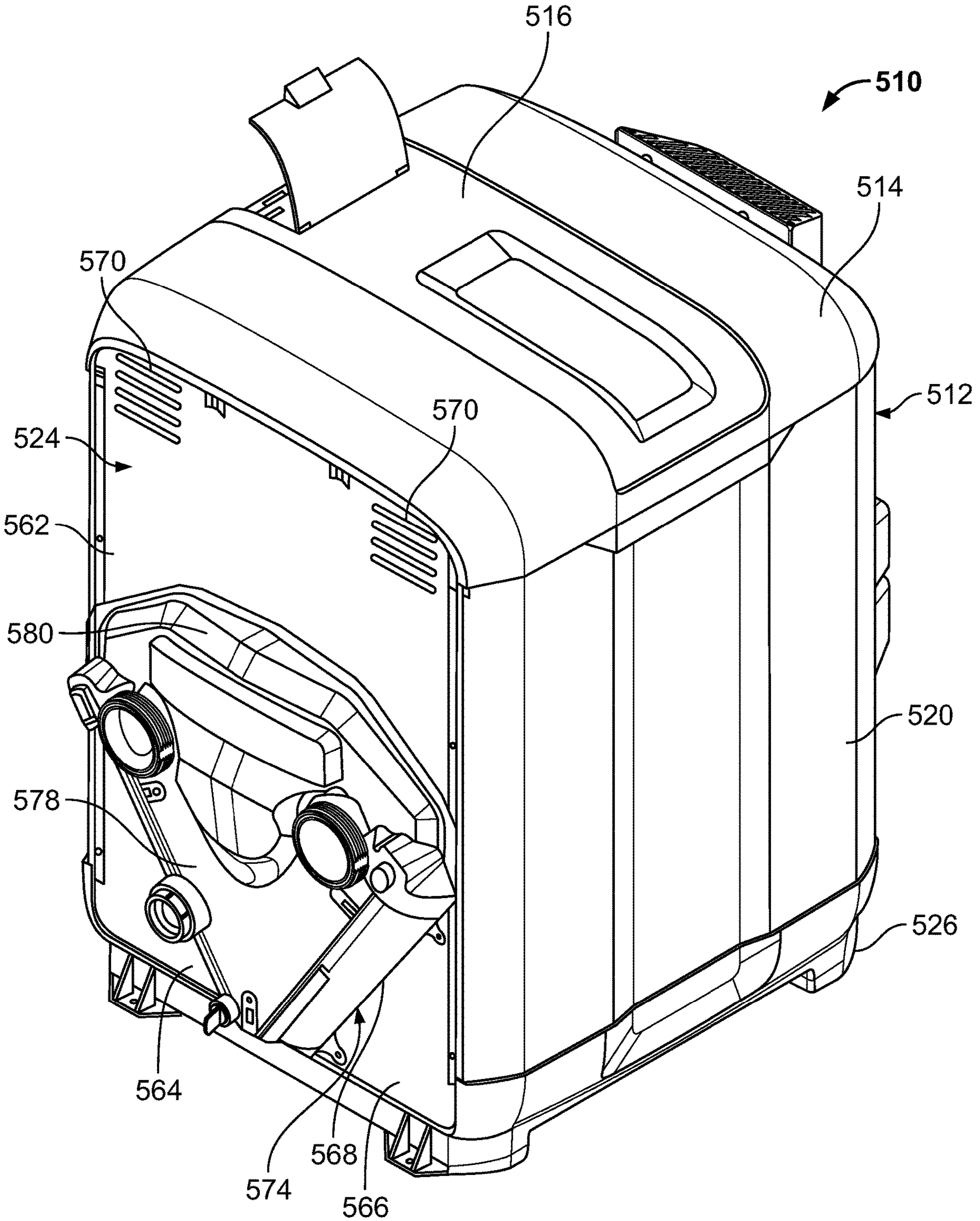
FIG. 52 is a second perspective view of the compact universal gas pool heater of FIG. 51.
Figure 53:
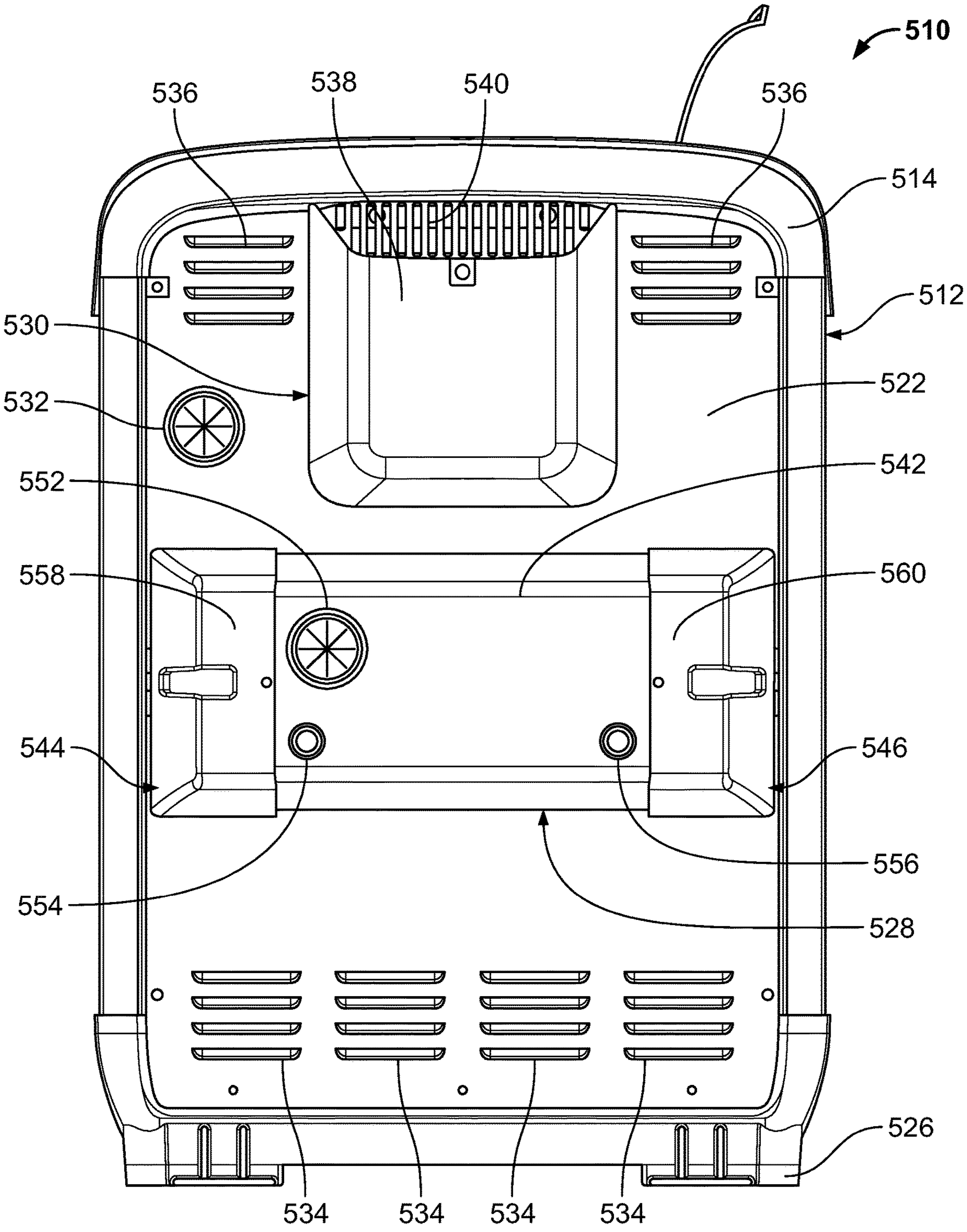
FIG. 53 is a first elevational view of the compact universal gas pool heater of FIG. 51 showing an exhaust side panel having an exhaust vent, a gas inlet, and a dual electrical junction box.

FIGS. 51-54 illustrate another exemplary compact universal gas pool heater 510 in accordance with embodiments of the present disclosure. The compact universal gas pool heater 510 shown in FIGS. 51-54 is substantially similar to the compact universal gas pool heater 10 shown in FIGS. 1-4, and any differences will be discussed in greater detail below. The compact universal gas pool heater 510 (hereinafter "gas heater 510") includes a cabinet 512 having a top panel 514 (e.g., a top), a user interface module 516, a first side panel 518 (e.g., a first side), a second side panel 520 (e.g., a second side), an exhaust side panel 522 (e.g., an exhaust side or a third side), a water header side panel 524 (e.g., a water header side or a fourth side), and a base 526 (e.g., a bottom). The first side panel 518, the second side panel 520, the exhaust side panel 522, and the water header side panel 524 can generally form a main body of the cabinet 512. As shown in FIGS. 51 and 53, which are, respectively, a first perspective view of the gas heater 510 and an elevational view of the exhaust side panel 522, the exhaust side panel 522 includes a dual junction box 528, an exhaust vent 530, a gas pipe opening 532, a plurality of lower vents 534, and a plurality of upper vents 536. A gas inlet pipe (not shown), such as the gas inlet pipe 56 shown in FIG. 1, can extend through the gas pipe opening 532 and into the interior of the cabinet 512 from the exterior where it can connect to a gas valve, for example.

The exhaust vent 530 is substantially similar to the exhaust vent 30, and is generally positioned at, and extends outward from, an upper portion of the exhaust side panel 522. The exhaust vent 530 includes a body 538 having upper vents 540, and is configured to receive a portion of an exhaust pipe from the interior of the cabinet 512, allowing for exhaust fumes to exit the exhaust pipe and dissipate from the gas heater 510 through the top vents 540.

The dual junction box 528 includes an elongated body 542, a first cover 544, and a second cover 546. The elongated body 542 has a first open side 548 (see, e.g., FIG. 60) and a second open side 550 (see, e.g., FIG. 60) opposite the first open side 548. The elongated body 542 also includes a second gas pipe opening 552, through which a second gas inlet pipe, such as the gas inlet pipe 56 shown in FIG. 1, can extend into the interior of the cabinet 512 from the exterior. The two gas pipe openings 532, 552 allow for two different sources of gas to be provided to the gas heater 510. The elongated body 542 also includes first and second holes 554, 556 that extend through the elongated body 542. The first and second holes 554, 556 can each include a grommet therein. The holes 554, 556 permit wires, electrical conducts, cables, etc., to extend into the dual junction box 528 and connect with high-voltage and low-voltage electrical wires of the gas heater 510. The first and second covers 544, 546 each respectively includes a body 558, 560. The first cover 544 can be inserted into, or placed over, the first open side 548 (see, e.g., FIG. 60) of the elongated body 542, while, similarly, the second cover 546 can be inserted into, or placed over, the second open side 550 (see, e.g., FIG. 60) of the elongated body 542. The dual junction box 528 is discussed in greater detail in connection with FIGS. 60-62.

Figure 54:
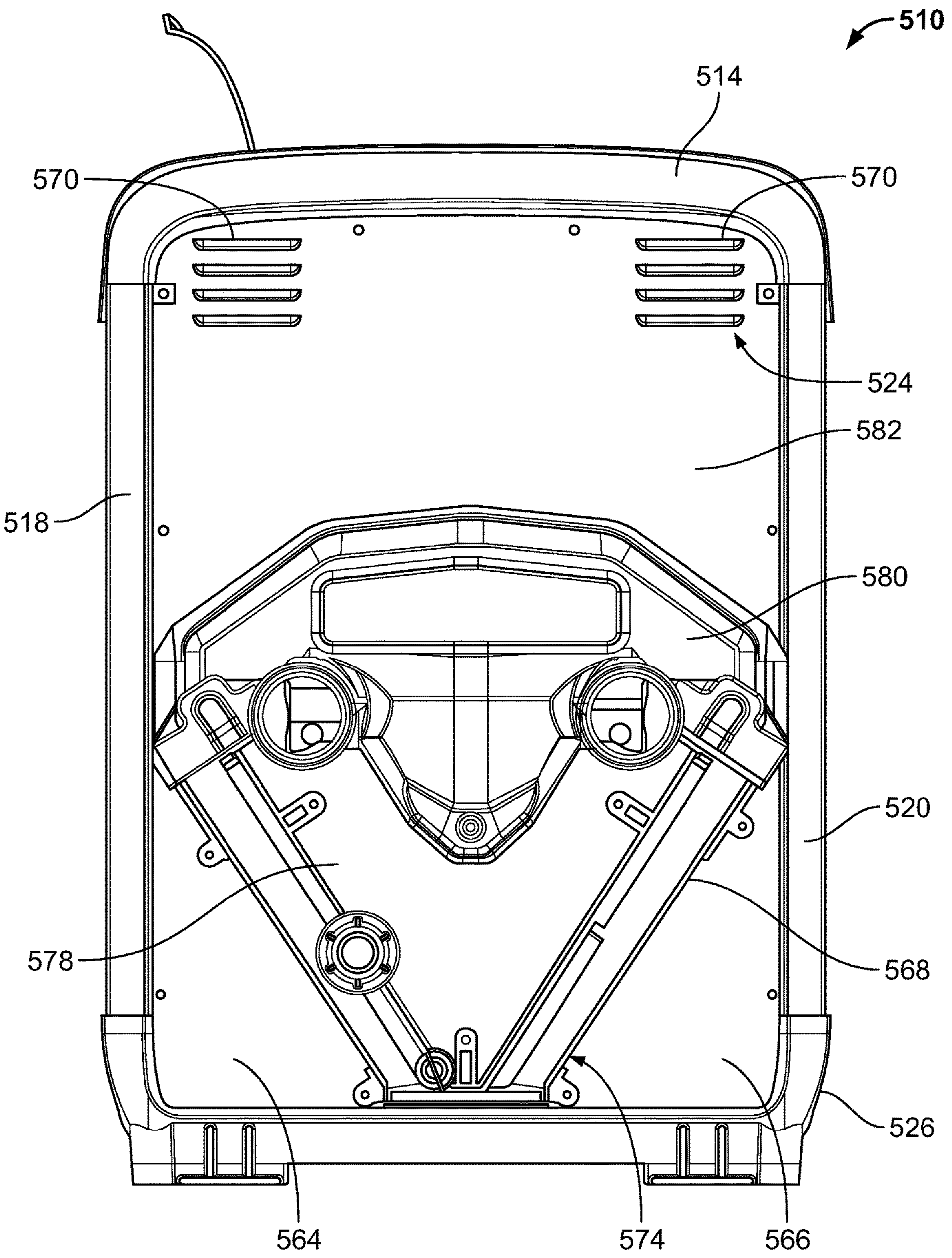
FIG. 54 is a second elevational view of the compact universal gas pool heater of FIG. 51 showing a water header side panel.

As shown in FIGS. 52 and 54, which are a second perspective view of the gas heater 510 and an elevational view of the water header side panel 524, respectively, the water header side panel 524 can include multiple separate panels, including, for example, an upper panel 562, a first bottom panel 564, and a second bottom panel 566 defining an opening 568. The upper panel 562 includes a plurality of upper vents 570, which allow for exterior air to be drawn into the cabinet 512 and into a combustion blower 572 (see, e.g., FIG. 58) to be used for combustion. The opening 568 allows for a second water header manifold 574 to extend into the interior of the cabinet 512 and be mounted to a tube sheet 576 (see, e.g., FIG. 67). The second water header manifold 574 is discussed in greater detail in connection with FIGS. 79-83. First and second manifold covers 578, 580 can be placed over the second water header manifold 574 and secured in place, e.g., to the water header side panel 524 or the second water header manifold 574 itself, in order to cover the second water header manifold 574 and any openings to the cabinet 512.

Figure 55:
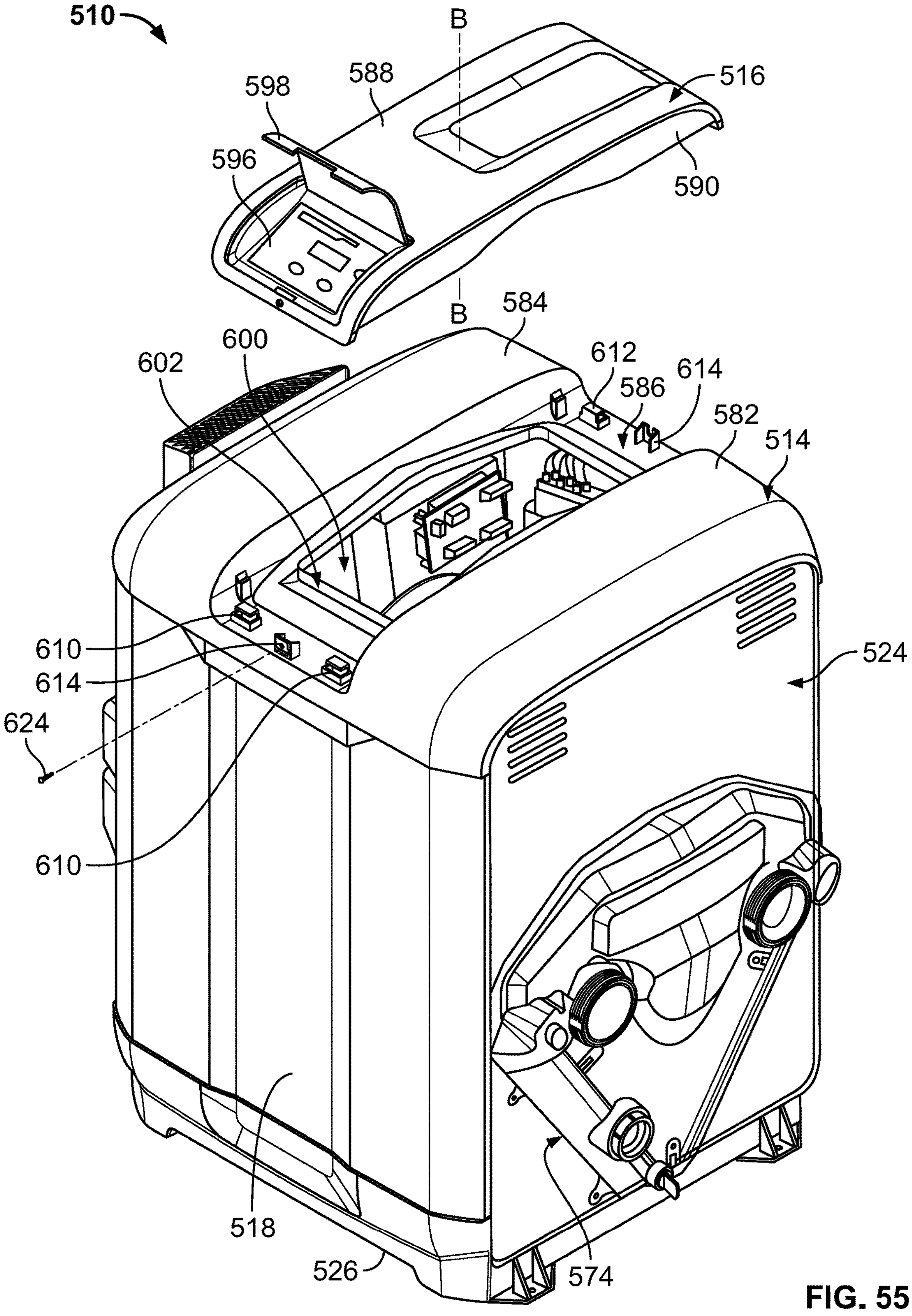
FIG. 55 is an exploded perspective view of the compact universal gas pool heater of FIG. 51 showing a user interface module separated from a cabinet top panel.
Figure 56:
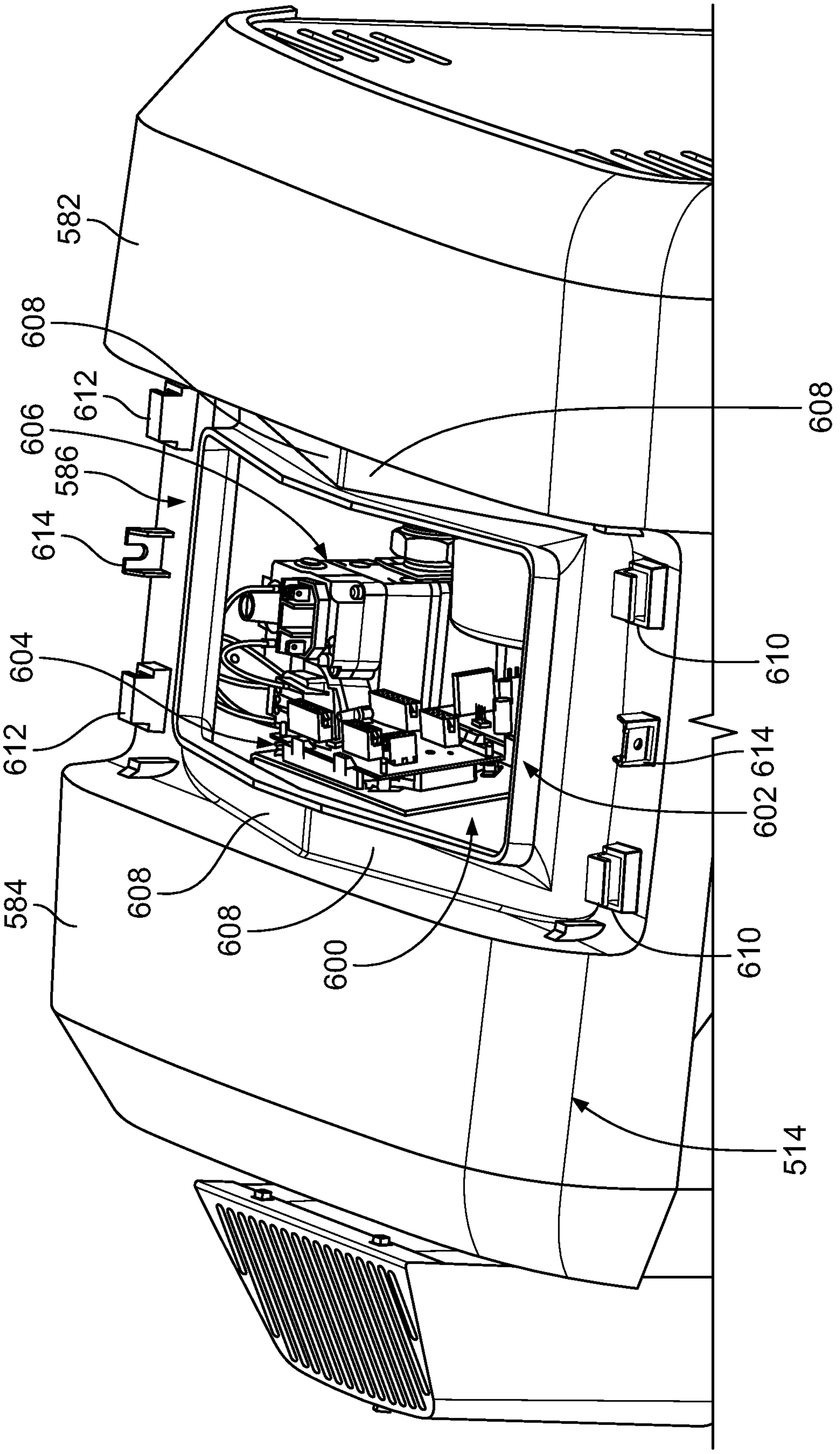
FIG. 56 is a partial perspective view of the gas pool heater of FIG. 51 with the user interface module removed from the cabinet top panel.
Figure 57:
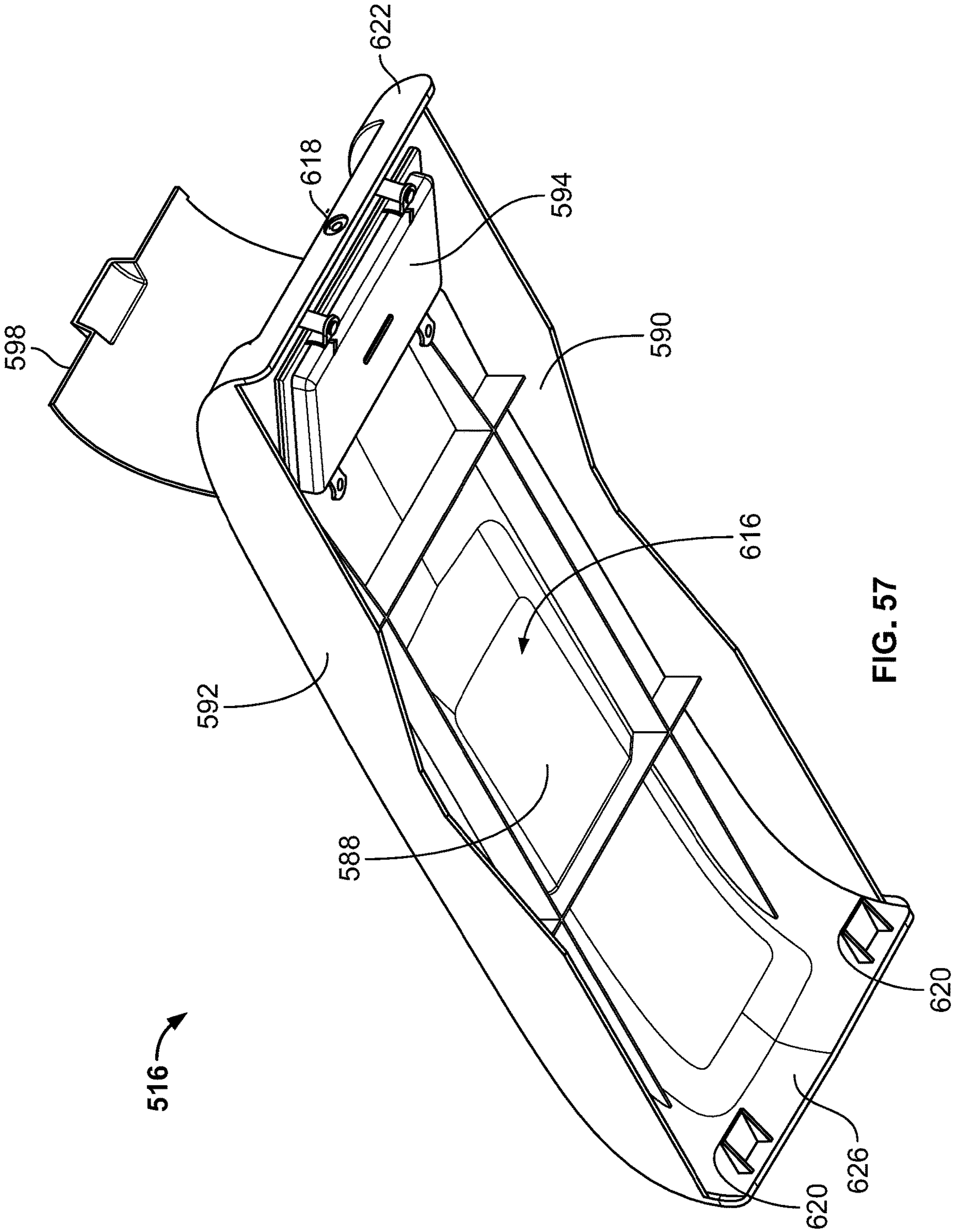
FIG. 57 is a bottom perspective view of the user interface module of FIG. 55.

FIGS. 55-57 show the top panel 514 and user interface module 516 in greater detail. FIG. 55 is an exploded perspective view of the gas heater 510 showing the user interface module 516 separated from the top panel 514. FIG. 56 is a partial perspective view of the top panel 514 with the user interface module 516 removed therefrom. FIG. 57 is a bottom perspective view of the user interface module 516. The top panel 514 generally includes a first lateral side 582, a second lateral side 584, and a central channel 586 that extends substantially the length of the top panel 514 between the first and second lateral sides 582, 584. The central channel 586 can be a recess that extends between the first and second lateral sides 582, 584, and which is sized and configured to receive the user interface module 516. The user interface module 516 includes an elongated body 588, first and second sidewalls 590, 592, an electronics housing 594, a user interface 596, and a cover 598. The user interface module 616 is sized and shaped to fit within the central channel 586 of the top panel 514.

According to aspects of the present disclosure, the orientation of the user interface module 516 on the top panel 514 can be reversed in order to suit different installation positions and requirements. As shown in FIGS. 55 and 56, the top panel 514 includes an access window 600 positioned within the central channel 586 and surrounded by a perimeter wall 602. The access window 600 extends through the top panel 514 in to the interior of the cabinet 512, allowing a user or service technician to access the interior of the cabinet 512 without having to remove the entire top panel 514. For example, a user or service technician can remove the user interface module 516 in order to access or service the blower 572, main printed circuit boards (PCBs) 604, a gas valve 606, or other components within the cabinet 512. Additionally, the access window 600 allows for a multi-conductor cable (not shown) to be routed therethrough and connected to the user interface module 516, thus placing the user interface module 516 in electrical communication with the interior electronics and controls of the gas heater 510, e.g., the main PCBs 604 which can include one or more controllers.

Additionally, the central channel 586 includes a plurality of declined surfaces 608 positioned between the perimeter wall 602 and the first and second lateral sides 582, 584. The declined surfaces 608 decline from a generally central portion of the central channel 586 to the outside of the central channel 586. The perimeter wall 602 prevents water, e.g., rain water, from flowing into the access window 600 and entering the cabinet 512, while the declined surfaces 608 direct water toward the perimeter of the top panel 514 to flow outward and off of the top panel 514, to prevent and/or inhibit pooling. Accordingly, the cabinet 512 is resistant to the entry of water, which it may be exposed to due to the gas heater 510 being located outdoors and in contact with the elements, such as rain and snow. The top panel 514 also includes first and second sets of engagement mechanisms 610, 612 (e.g., hooks) on opposite ends of the central channel 586, along with two fastener mounts 614. The engagement mechanisms 610, 612 and fastener mounts 614 are configured to assist with securing the user interface module 516 to the top panel 514. While reference is made herein to sets of engagement mechanisms 610, 612, it should be understood that a set could comprise a single engagement mechanism.

As shown in FIG. 57, the body 588 and sidewalls 590, 592 of the user interface module 516 define a cavity 616 that is sized to receive the perimeter wall 602 of the top panel 514 when the user interface module 516 is mounted on the top panel 514. The cavity 616 allows for the multi-conductor cable extending out from the access window 600 to extend into the electronics housing 594 and electrically connect with the electronics of the user interface module 516 with the main PCBs 604. Additionally, the sidewalls 590, 592 are contoured so as to match the shape of the declined surfaces 608 so that the user interface module 516 lies flush with the top panel 514. The user interface module 516 additionally includes a fastener hole 618 and a set of user interface engagement mechanisms 620 (e.g., hooks or extensions). The fastener hole 618 is generally positioned adjacent the cover 598 and extends through a curved front wall 622 of the elongated body 588. When the user interface module 516 is positioned on the top panel 514, the fastener hole 618 of the user interface module 516 will be aligned with either one of the fastener mounts 614 of the top panel 514 such that a fastener 624, e.g., a screw, a Christmas tree retainer, etc., can be inserted through the fastener hole 618 and the fastener mount 614 to secure the user interface module 516 to the top panel 514. The user interface engagement mechanisms 620 extend inward from a curved rear wall 626 of the elongated body 588, and are sized and shaped to extend into and engage the engagement mechanisms 610, 612 of the top panel 514.

To secure the user interface module 516 to the top panel 514, a user first engages the user interface engagement mechanisms 620 with one set of the engagement mechanisms 610, 612, e.g., the second set of engagement mechanisms 612, of the top panel 514. The user then lowers the user interface module 516 into the central channel 586 so that the fastener hole 618 of the user interface module 516 is aligned with the fastener mount 614 of the top panel 514 to prevent the user interface module 516 from longitudinal movement. At this point, the user interface module 516 is positioned between the first and second lateral sides 582,

584 of the top panel 514, which prevent the user interface module 516 from moving laterally. The user then inserts the fastener 624 into the fastener hole 618 and the fastener mount 614 to fully secure the user interface module 516 to the top panel 514. Specifically, the fastener 624 prevents vertical and rotational movement of the user interface module 516 as well as movement across the channel 586. At this point, the user interface module 516 is in a first position. To change the orientation of the user interface module 516 to a second position, a user removes the fastener 624, lifts the user interface module 516 vertically off of the top panel 514, and rotates the user interface module 516 one-hundred and eighty (180) degrees about central axis B. The user then repeats the steps for securing the user interface module 516 to the top panel 514, but instead of placing the user interface engagement mechanisms 620 in the second set of engagement mechanisms 612, the user interface engagement mechanisms 620 are engaged with the first set of engagement mechanisms 610. The user then lowers the user interface module 516 until it rests in the central channel 586, and inserts the fastener 624 into the fastener hole 618 and the fastener mount 614 to fully secure the user interface module 516 to the top panel 514. Thus, the user interface module 516 can be placed in two different configurations that are one-hundred and eighty (180) degrees opposite of each other without requiring the entire top panel 514 to be removed and rotated. That is, in the first position, the user interface 596 of the user interface module 516 is easily accessible by a user standing at the first side panel 518 of the cabinet 512, while in the second position the user interface 596 of the user interface module 516 is easily accessible by a user standing at the second side panel 520 of the cabinet 512.

When the user interface module 516 is secured to the top panel 514, the top portion of the elongated body 588 lies flush with first and second lateral sides 582, 584 of the top panel 514. However, the fit between the user interface module 516 and the first and second lateral sides 582, 584 of the top panel 514 need not be a rain-proof seal, instead a small gap can be provided that allows for water, e.g., rain water, to flow around and below the user interface module 516, where it is channeled to the edges of the top panel 514 and runs off the gas heater 510. As discussed above, the perimeter wall 602 and declined surfaces 608 prevent the ingress of water into the cabinet 612.

Figure 58:
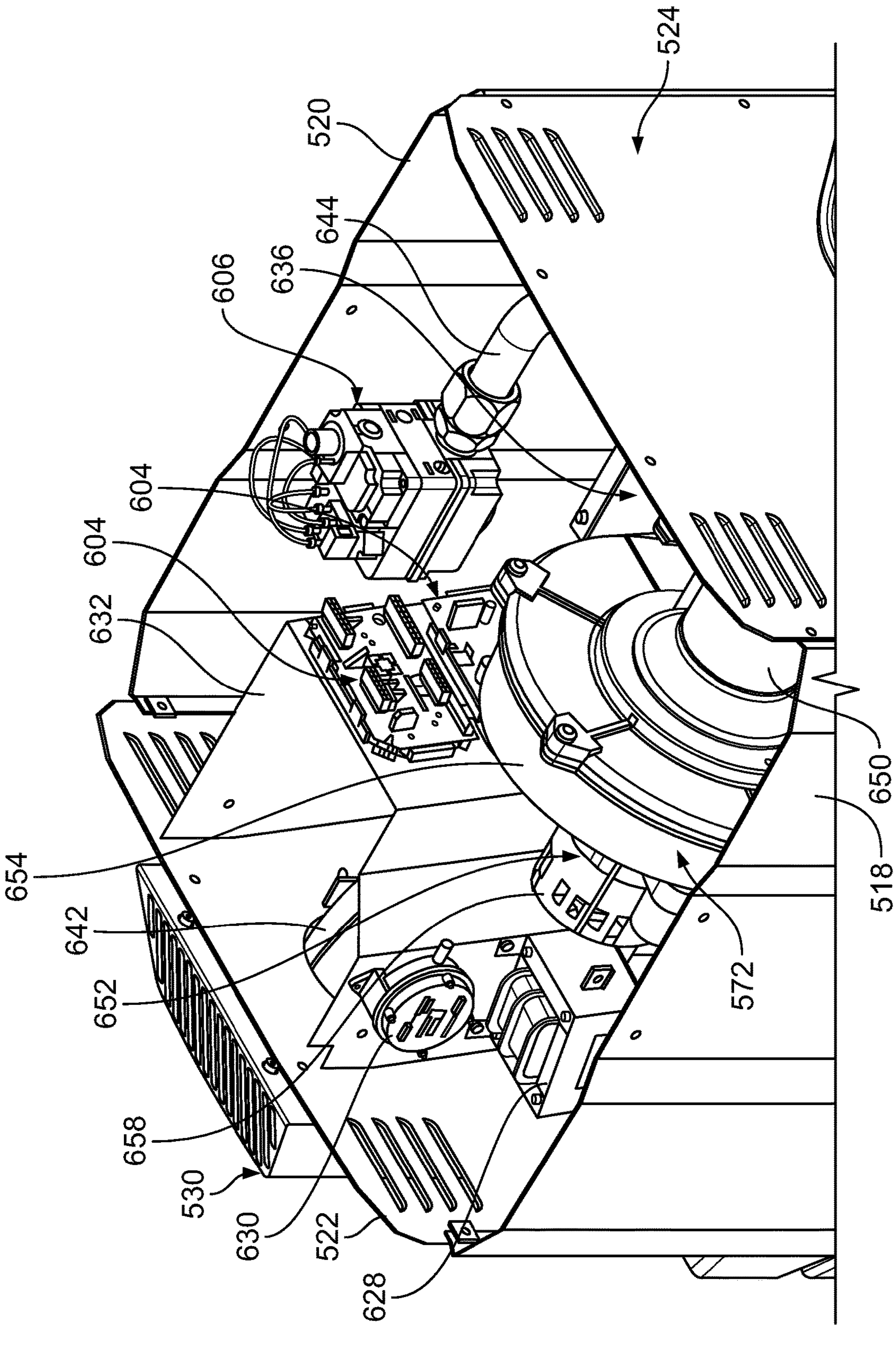
FIG. 58 is a partial perspective view of the gas pool heater of FIG. 51 with the cabinet top panel removed.
Figure 59:
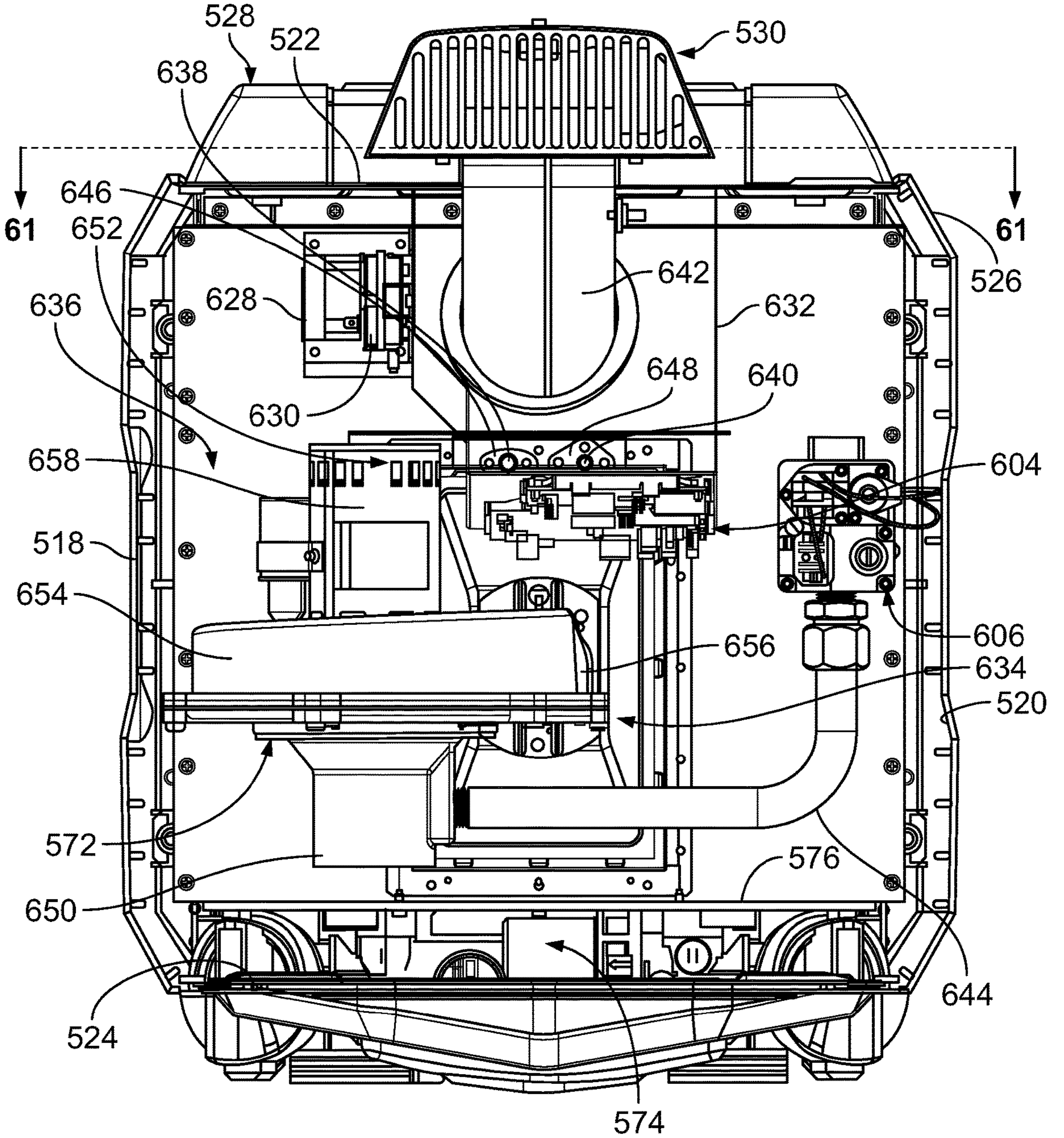
FIG. 59 is a top plan view of the gas pool heater of FIG. 51 with the cabinet top panel removed.

FIGS. 58 and 59 show the interior of the gas heater 510 in greater detail. Specifically, FIGS. 58 and 59 are, respectively, partial perspective and top plan views of the gas heater 510 with the top panel 514 removed showing the internal components housed by the cabinet 512. As shown in FIGS. 58 and 59, the cabinet 512 of the gas heater 510 generally houses the combustion blower 572, the second water header manifold 574 (at least partially), the tube sheet 576, the main PCBs 604, the gas valve 606, a transformer 628, a blower vacuum switch 630, a control panel 632 mounted to the interior of the exhaust side panel 522 and supporting the main PCBs 604, a burner 634, a combustion chamber enclosure 636 (e.g., a combustion chamber), an igniter 638, a flame sensor 640, an exhaust pipe 642 mounted to the combustion chamber enclosure 636, and a gas pipe 644 extending from an outlet of the gas valve 606 to the combustion blower 572. The combustion chamber enclosure 636 is mounted to the tube sheet 576 adjacent the second water header manifold 574, which is discussed in greater detail below. The igniter 638 and the flame sensor 640 are mounted to the combustion chamber enclosure 636 by mounts 646, 648 adjacent the burner 634 and extend into the combustion chamber enclosure 636, which is discussed in greater detail below. It should be understood that the gas valve 606 can be substantially similar in construction and functionality to gas valve 188 shown and described, for example, in FIGS. 16A-18, and which description need not be repeated. Additionally, while a gas inlet pipe is not shown connected to the gas valve 606, it should be understood that a gas inlet pipe, such as the gas inlet pipe 56 shown in FIGS. 16A-18, could be connected to the gas valve 606 to provide gas thereto.

It should also be understood that the combustion blower 572 can be substantially similar in construction and functionality to the combustion blower 80 shown and described, for example, in FIGS. 15-16B. The combustion blower 572 includes a blower inlet 650, a pump 652, a mixing chamber 654, and an outlet 656. Air can be drawn into the combustion blower 572 through the blower inlet 650. The gas pipe 644, which extends from the outlet of the gas valve 606, connects to the combustion blower 572 at the blower inlet 650 such that a mixture of air and gas is provided to the combustion blower 572. The combustion blower 572 can also include a venturi throat (not shown) such as the venturi throat 198 shown in FIG. 16B. The blower inlet 650 is in fluidic communication with the mixing chamber 654 with the air and gas being provided to the mixing chamber 654. The pump 652 includes a pump impeller (not shown) driven by a motor 658. The pump impeller is housed within the mixing chamber 654 and rotationally driven by the motor 658. The pump 652 draws air and gas into the mixing chamber 654 from the air inlet pipe 650 and the gas pipe 644, mixes the air and gas, and discharges the mixture through the outlet 656 and into the connected burner 634, discussed in connection with FIGS. 67-68.

Figure 60:
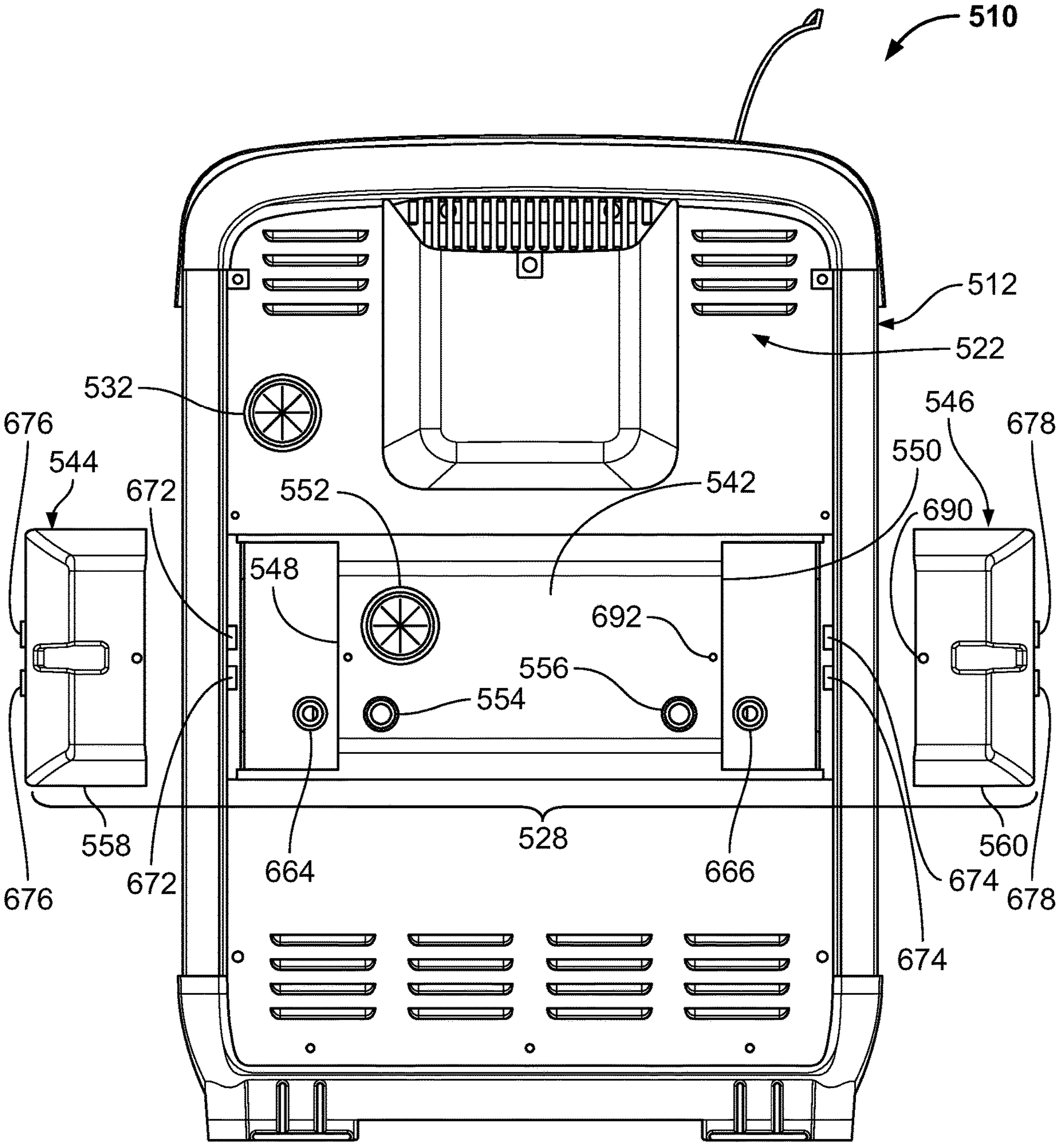
FIG. 60 is a partially exploded elevational view of the compact universal gas pool heater of FIG. 51 showing the exhaust side panel with first and second covers of the dual junction box exploded.
Figure 61:
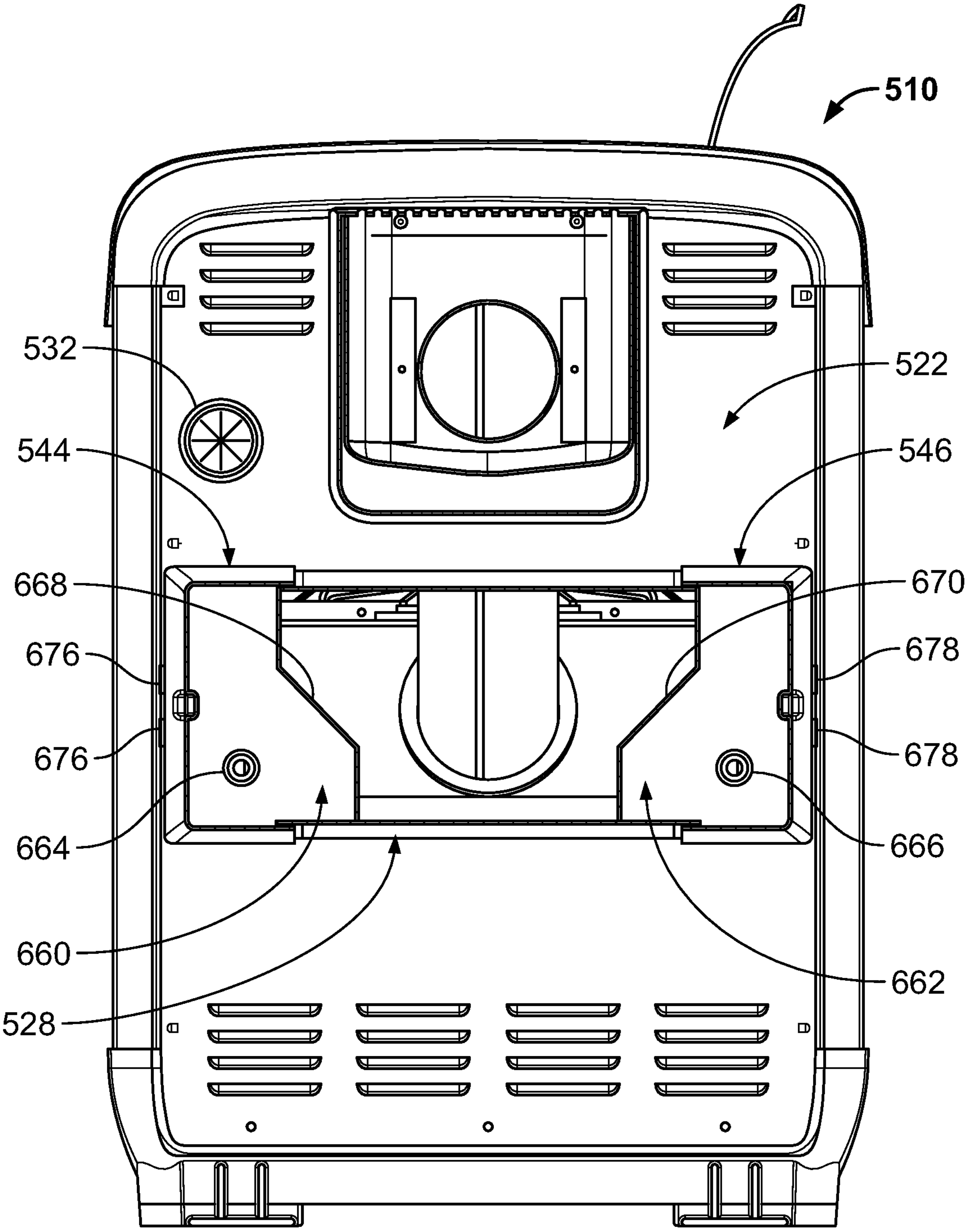
FIG. 61 is a sectional view of the compact universal gas pool heater taken along Line 61-61 of FIG. 59.
Figure 62:
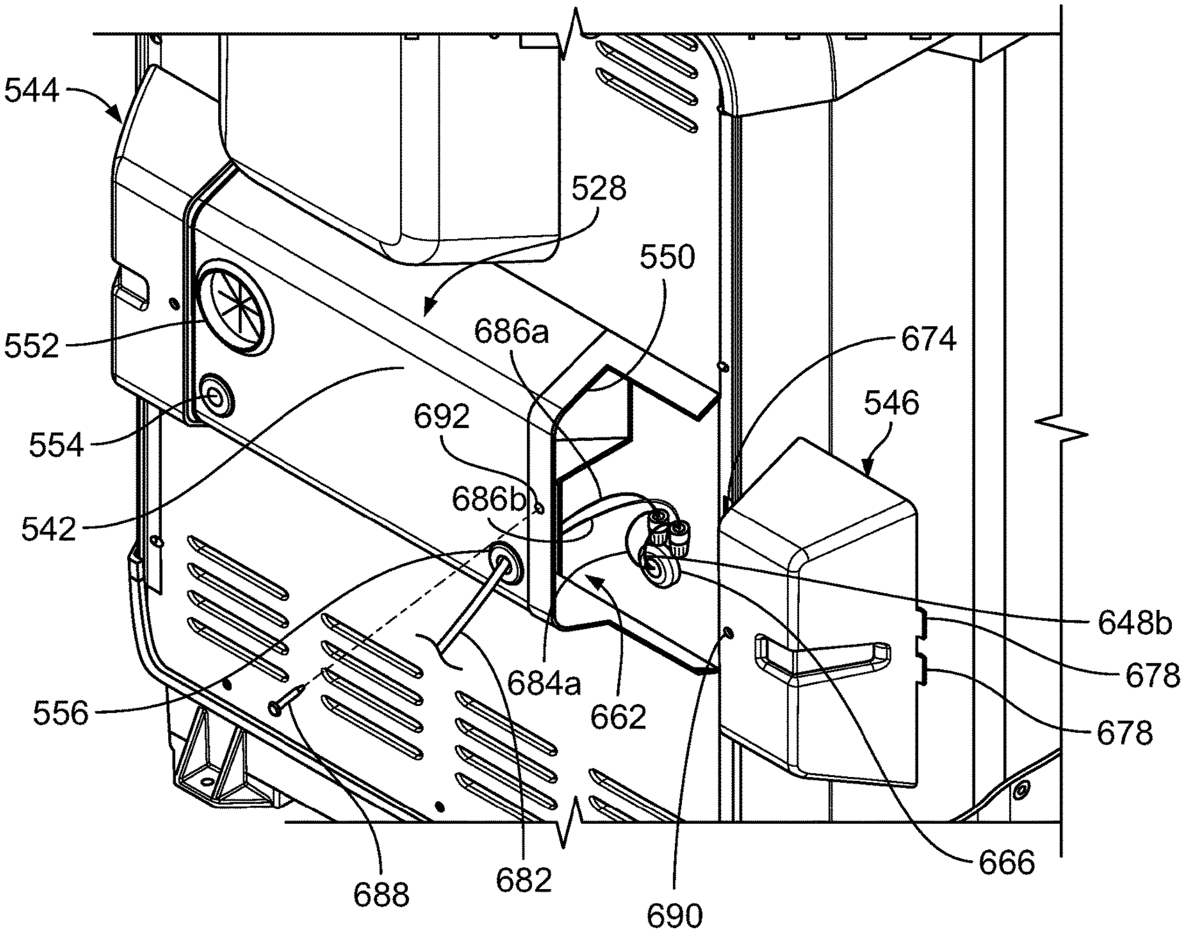
FIG. 62 is an exploded partial perspective view showing details of the dual junction box of the compact universal gas pool heater of FIG. 51 with the second cover exploded.

Turning to FIGS. 60-62, the dual junction box 528 is shown in greater detail. It is noted that the dual junction box 528 can be similar in construction to the dual junction box 28 shown and described in connection with FIGS. 12-14. FIG. 60 is a partially exploded elevational view of the gas heater 510 showing the exhaust side panel 522 with the first and second covers 544, 546 exploded from the elongated body 542 of the dual junction box 528. FIG. 61 is a sectional view of the compact universal gas pool heater 510 taken along line 61-61 of FIG. 59 showing the interior of the dual junction box 528. As discussed in detail above in connection with FIGS. 51 and 53, the dual junction box 528 includes the elongated body 542, the first cover 544, and the second cover 546. The first and second open sides 548, 550 are on opposite sides of the elongated body 542, with the first open side 548 providing access to a first chamber 660, e.g., a low-voltage chamber, and the second open side 550 providing access to a second chamber 662, e.g., a high-voltage chamber. As discussed above in connection with FIGS. 51 and 53, the first cover 44 can be inserted into, or placed over, the first open side 548 of the elongated body 542. Thus, when the first cover 544 is inserted into or placed over the elongated body 542. it can form part of the low-voltage chamber 660. Similarly, the second cover 546 can be inserted into, or placed over, the second open side 550 of the elongated body 542. Thus, when the second cover 546 is inserted into or placed over the elongated body 542 it can form part of the high-voltage chamber 662.

The exhaust side panel 522 includes a first wire port 664, e.g., a low-voltage wire port, and a second wire port 666, e.g., a high-voltage wire port, that extend therethrough and into the interior of the cabinet 512. The low-voltage wire port 664 is generally positioned in the low-voltage chamber 660 such that low-voltage wires can extend into the low-voltage chamber 660 from the interior of the cabinet 512.

The high-voltage wire port 666 is generally positioned in the high-voltage chamber 662 such that high-voltage wires can extend into the high-voltage chamber 662 from the interior of the cabinet 512. As shown in FIG. 61, the dual junction box 528 includes interior walls 668, 670 that separate and isolate the low-voltage chamber 660 and the high-voltage chamber 662. The interior walls 668, 670 and the elongated body 542 of the dual junction box 528 can be constructed of metal, while the first and second covers 544, 546 can be constructed of plastic.

Additionally, the first and second covers 544, 546 are configured to removably engage the exhaust side panel 522 through an engagement mechanism. Specifically, the exhaust side panel 522 can include first and second sets of slots 672, 674 on opposite sides of the elongated body 542, while the first and second covers 544, 546 can each have one or more locking protrusions 676, 678, respectively. The locking protrusions 676, 678 are configured to be inserted into the first and second sets of slots 672, 674 during installation of the first and second covers 544, 546, and prevent movement of the first and second covers 544, 546 when installed.

As discussed above, when the first and second covers 544, 546 are inserted into, or placed over, the elongated body 542, they respectively cover the first and second open sides 548, 550 of the elongated body 542, and isolate the low-voltage chamber 660 and the high-voltage chamber 662. The first hole 554 allows for low-voltage electrical cables external to the gas heater 510 to be inserted into the low-voltage chamber 660 of the dual junction box 528 and connected with low-voltage electrical wires internal to the gas heater 510. The second hole 556 allows for high-voltage electrical cables external to the gas heater 510 to be inserted into the high-voltage chamber 662 of the dual junction box 528 and connected with high-voltage electrical wires internal to the gas heater 510.

FIG. 62 is a partially exploded perspective view of the dual junction box 528 with the second cover 546 exploded and showing installation of a high voltage cable 682. As shown in FIG. 62, to install the high voltage cable 682 the second cover 546 is removed from the elongated body 542, thus exposing high-voltage interior wires 684*a*, 684*b* that extend out from the high-voltage wire port 666. The high-voltage cable 682, which includes high-voltage exterior wires 686*a*, 686*b*, can extended through and be retained by the second hole 556 of the elongated body 542. Once an installer connects the high-voltage interior wires 684*a*, 684*b* with the high-voltage exterior wires 686*a*, 686*b* and wiring is complete, the installer can cover the wire connection with the second cover 546 by inserting the locking protrusions 678 into the slots 674 and placing the second cover 546 over the elongated body 542. A fastener 688 (e.g., a screw, Christmas tree retainer, etc.) can be inserted through a hole 690 of the second cover 546 and a hole 692 of the elongated body 542 to secure the second cover 546 and the elongated body 542 together. It should be understood by a person of ordinary skill in the art that a similar installation procedure can be performed for the first cover 544 and associated low-voltage wires. It should be understood to those skilled in the art that any reference herein to cable, wire, cord, etc., encompasses any cable, wire, cord, or conductor known in the art capable of conducting electricity, conducting power, and/or transferring signals (e.g., control signals).

Figure 63:
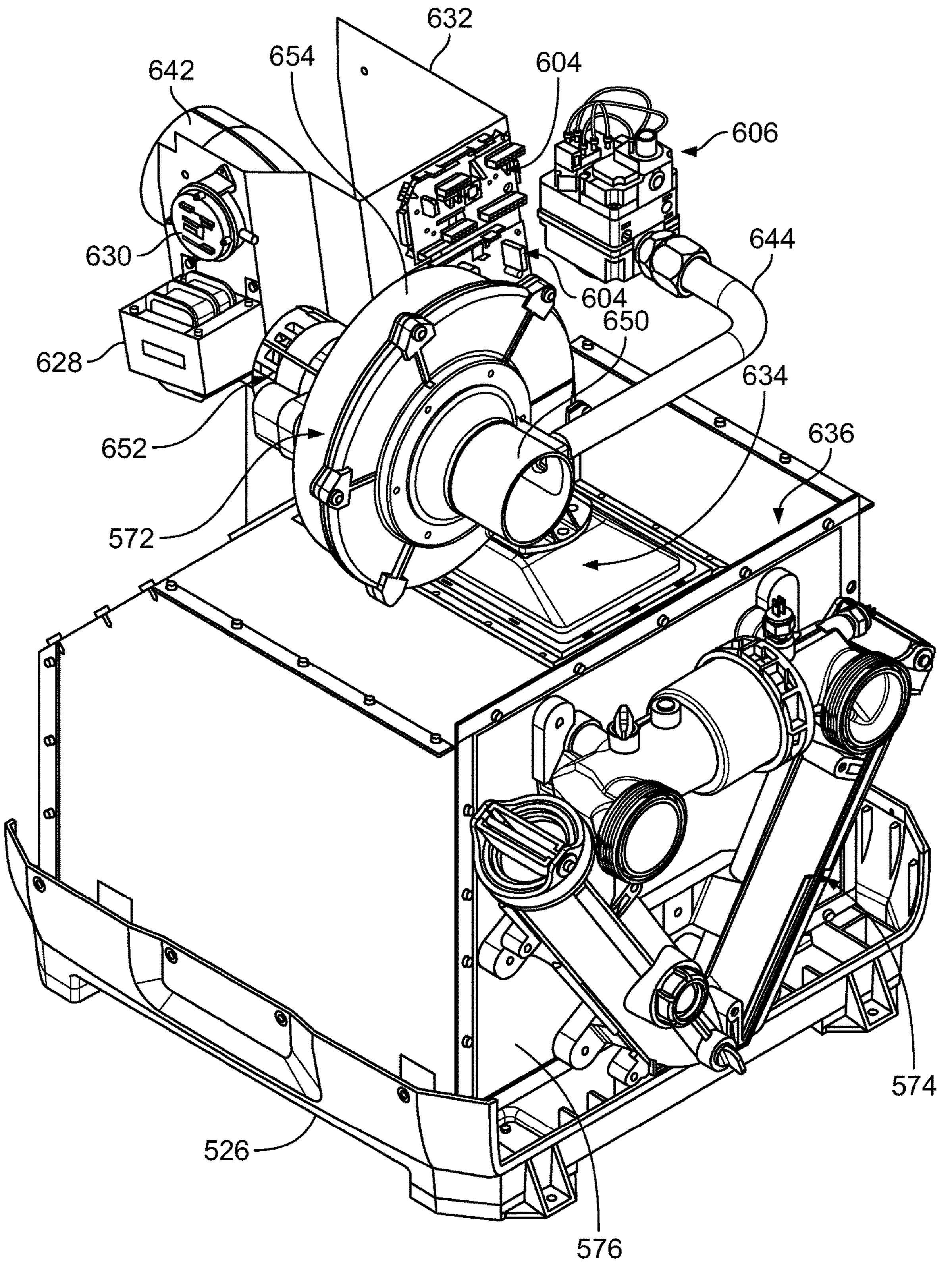
FIG. 63 is a first perspective view of the compact universal gas pool heater of FIG. 51 with the cabinet top and side panels removed.
Figure 64:
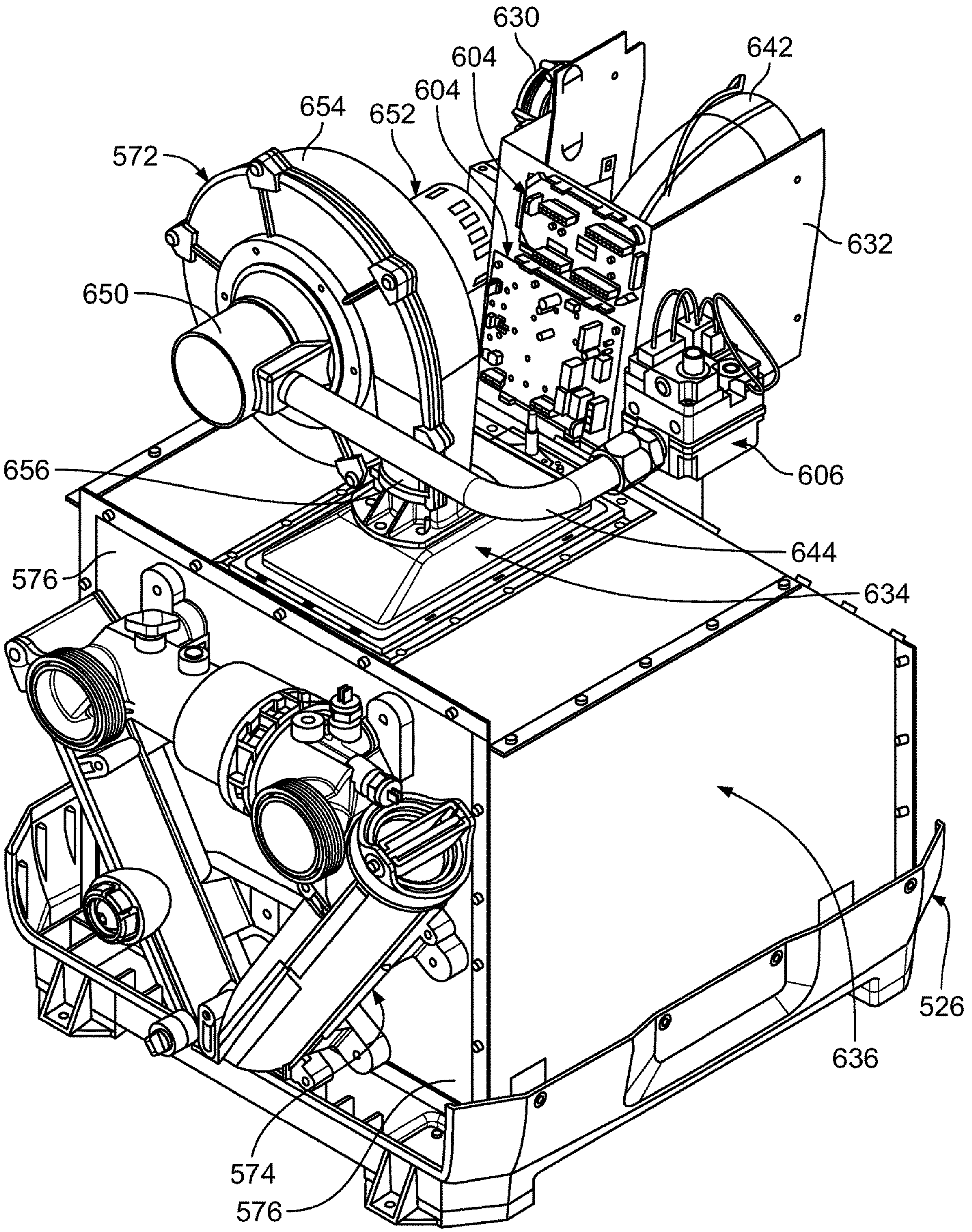
FIG. 64 is a second perspective view of the compact universal gas pool heater of FIG. 51 with the cabinet top and side panels removed.
Figure 65:
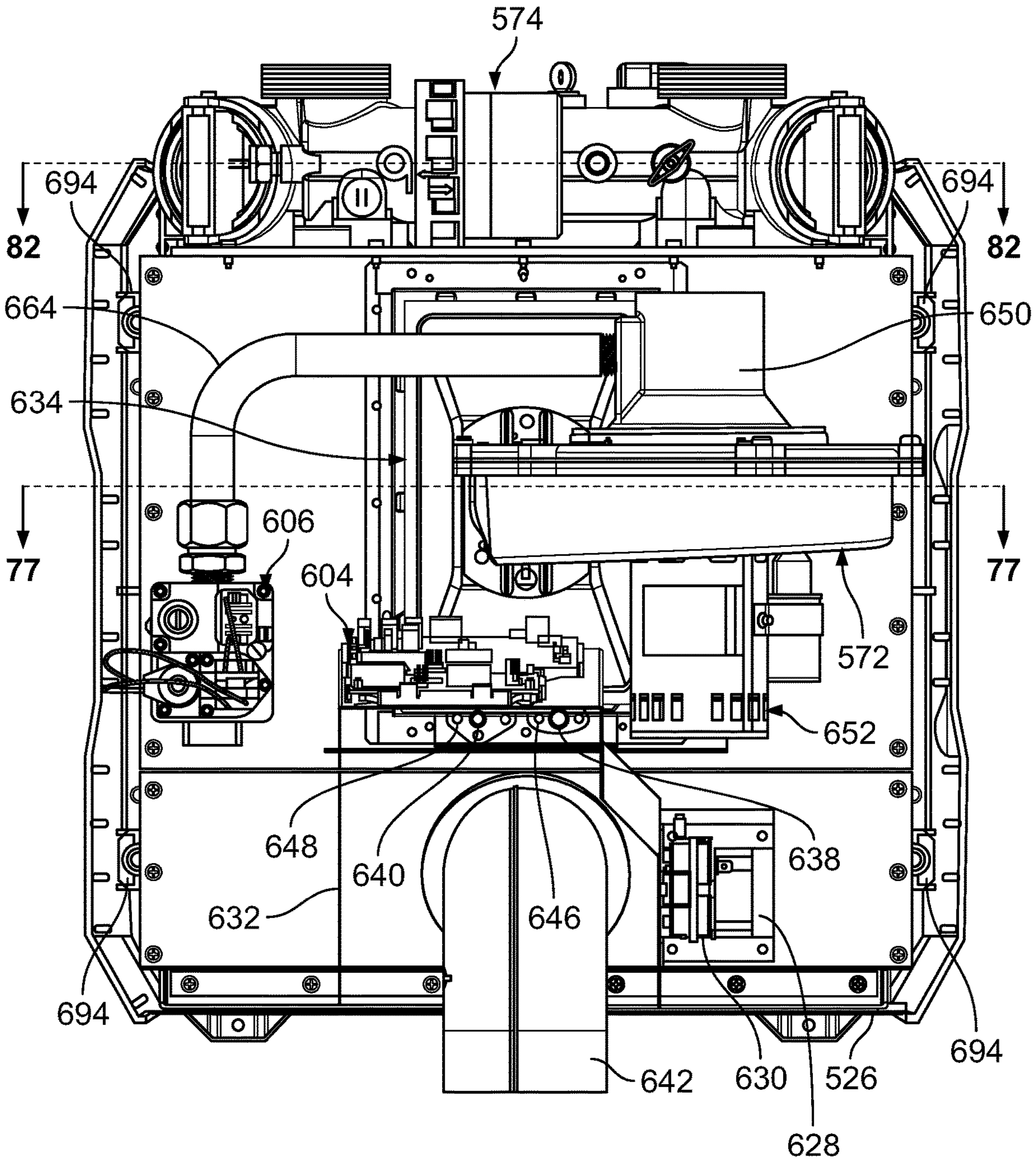
FIG. 65 is a top plan view of the compact universal gas pool heater of FIG. 51 with the cabinet top and side panels removed.

Turning now to FIGS. 63-65, the gas heater 510 is shown in greater detail with the panels 514, 518, 520, 522, 524 of the cabinet 512 removed. As discussed above in connection with FIGS. 58 and 59, the gas heater 510 generally includes the combustion blower 572, the second water header manifold 574, the tube sheet 576, the main PCBs 604, the gas valve 606, the transformer 628, the blower vacuum switch 630, the control panel 632, the burner 634, the combustion chamber enclosure 636, the igniter 638, the flame sensor 640, the exhaust pipe 642, and the gas pipe 644. The main PCBs 604, the transformer 628, and the blower vacuum switch 630 can be mounted to the control panel 632, and positioned so as to be easily accessible through the access window 600 of the top panel 514, as discussed in connection with FIGS. 55 and 56. Additionally, the combustion chamber enclosure 636 can include legs 694 that support the combustion chamber enclosure 636 on the base 526.

Figure 66:
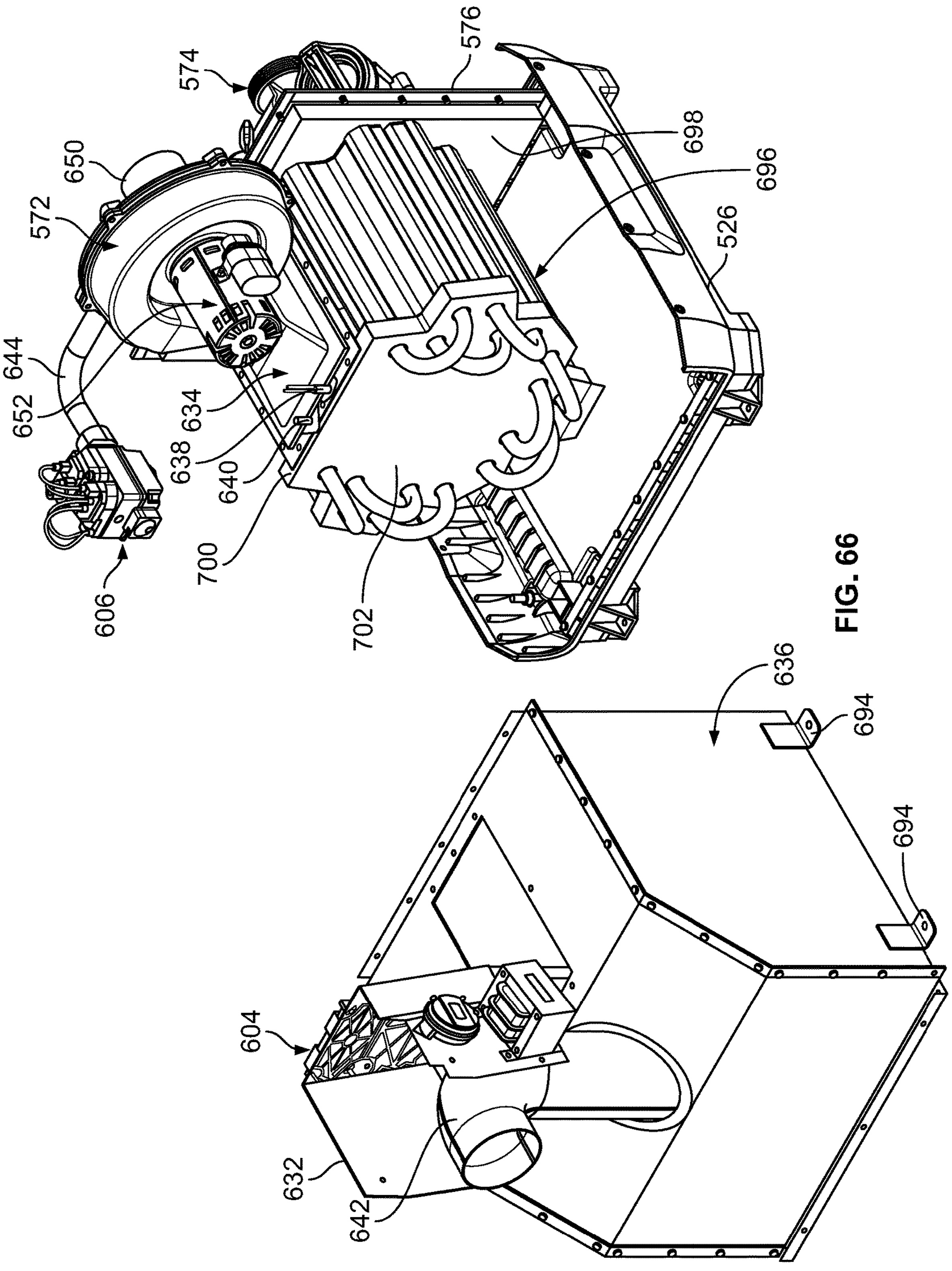
FIG. 66 is a first exploded perspective view of the compact universal gas pool heater of FIG. 51 with the cabinet top and side panels removed.
Figure 67:
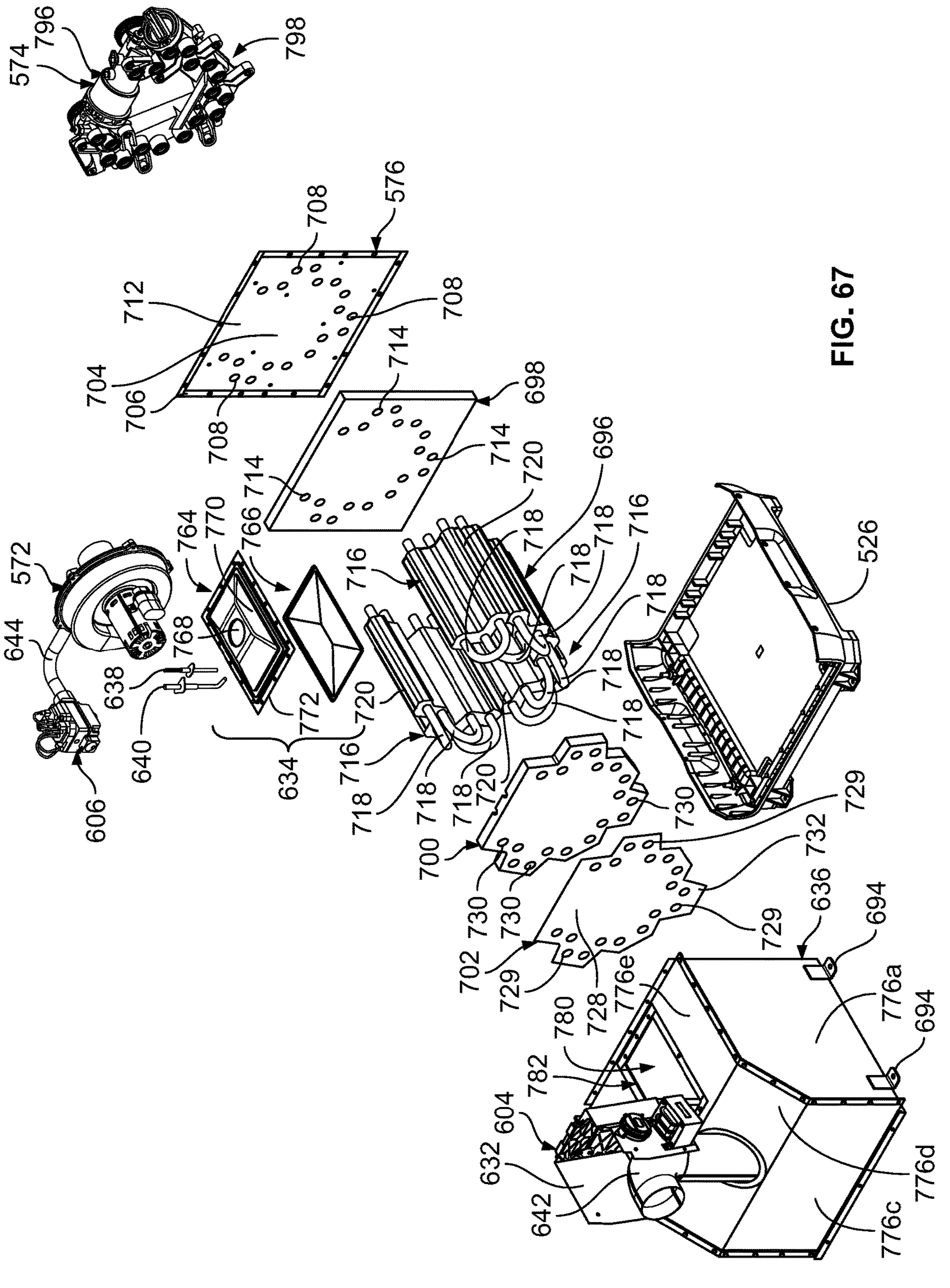
FIG. 67 is a second exploded perspective view of the compact universal gas pool heater of FIG. 51 with the cabinet top and side panels removed.
Figure 68:
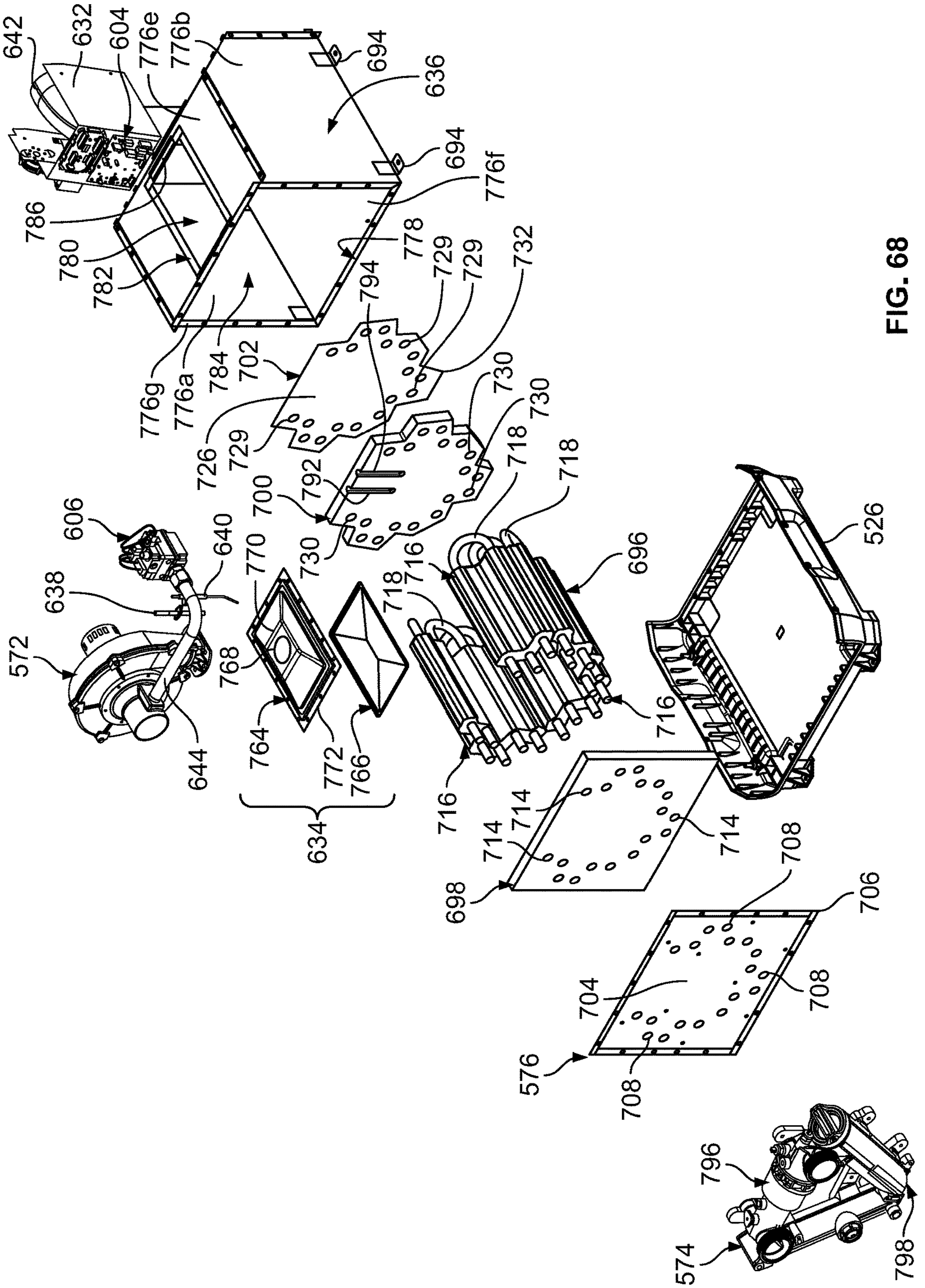
FIG. 68 is a third exploded perspective view of the compact universal gas pool heater of FIG. 51 with the cabinet top and side panels removed.
Figure 69:
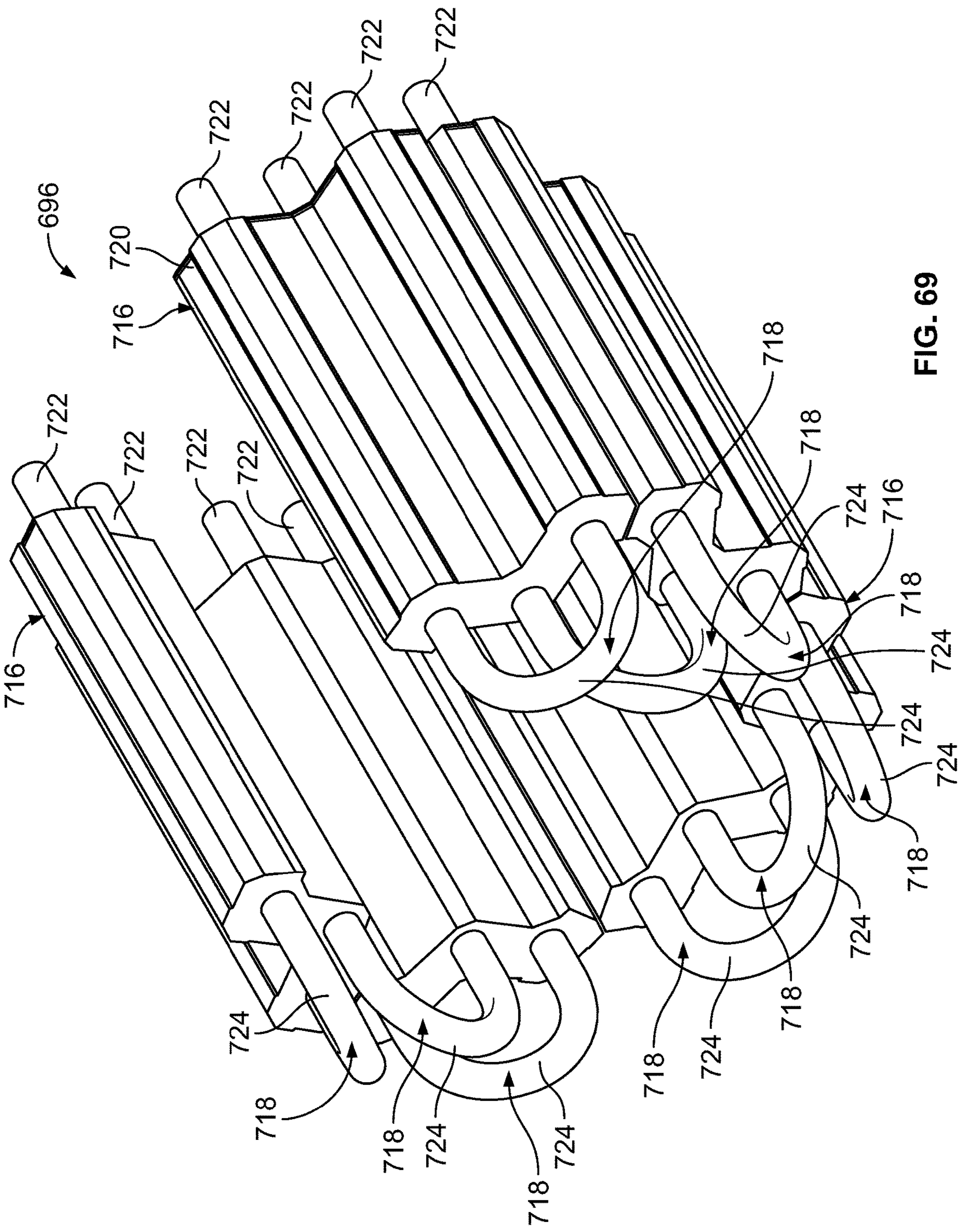
FIG. 69 is a perspective view of a heat exchanger of the compact universal gas pool heater of FIG. 51.
Figure 70:
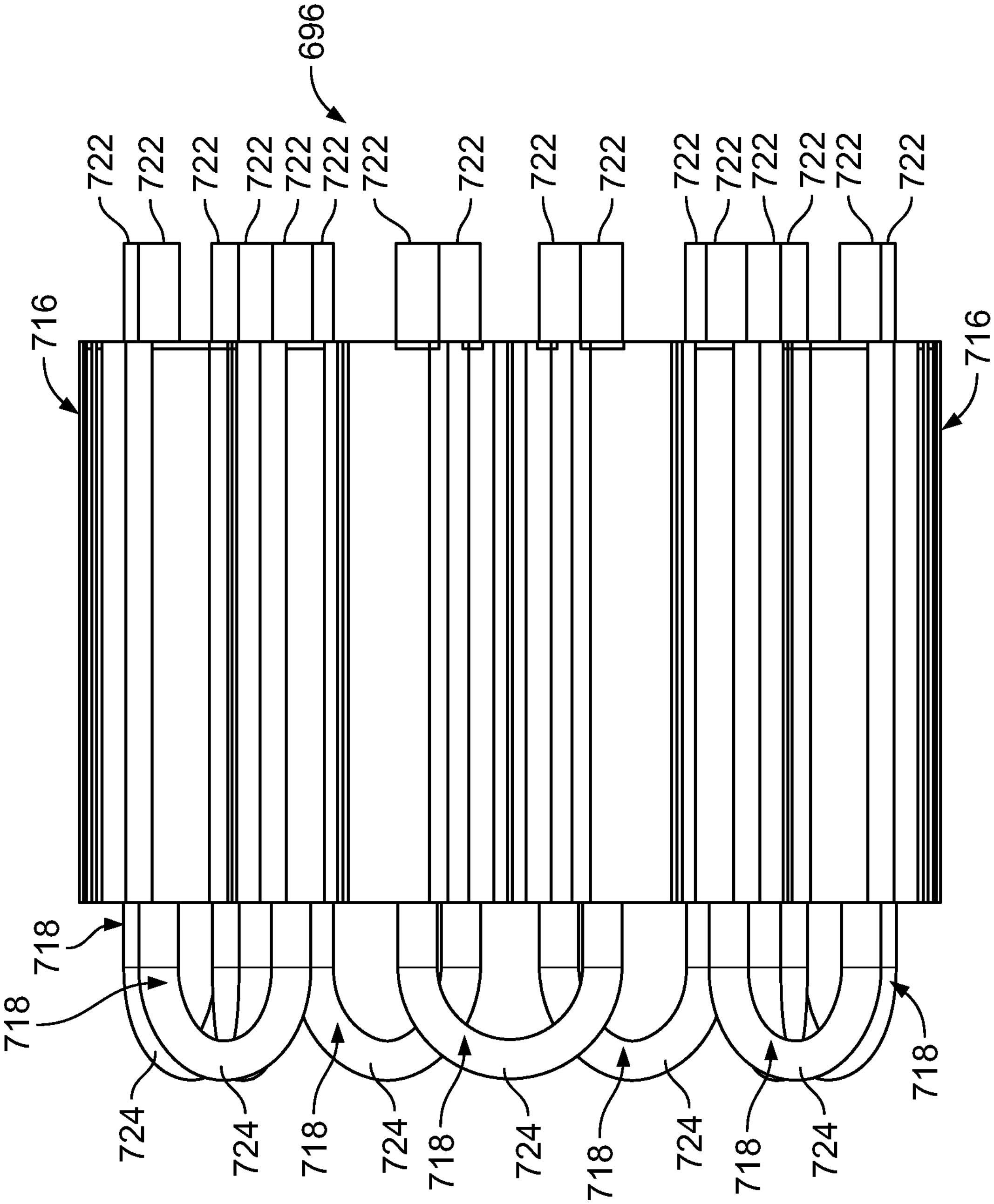
FIG. 70 is a top plan view of the heat exchanger of FIG. 69.
Figure 71:
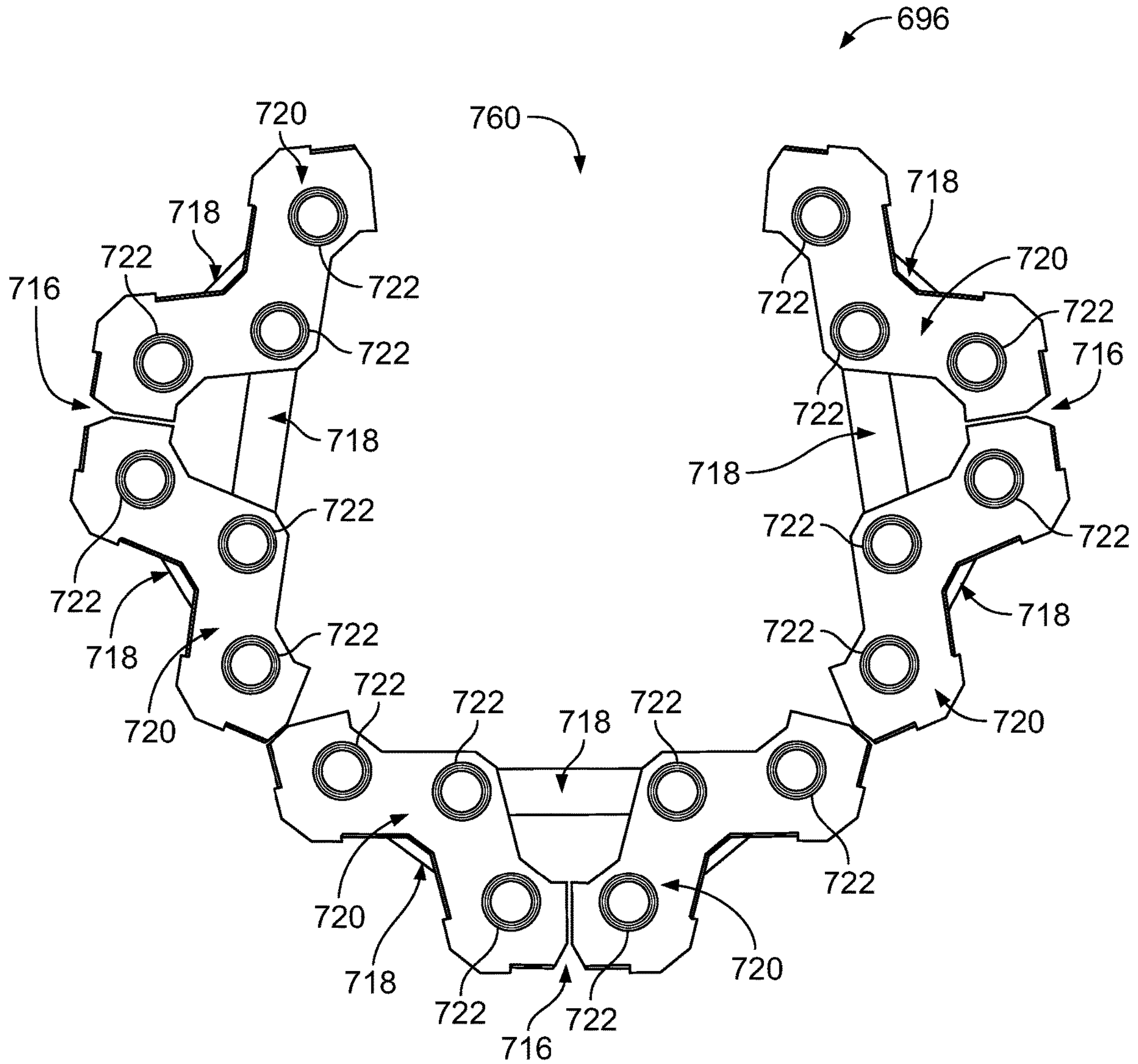
FIG. 71 is a front elevational view of the heat exchanger of FIG. 69.
Figure 72:
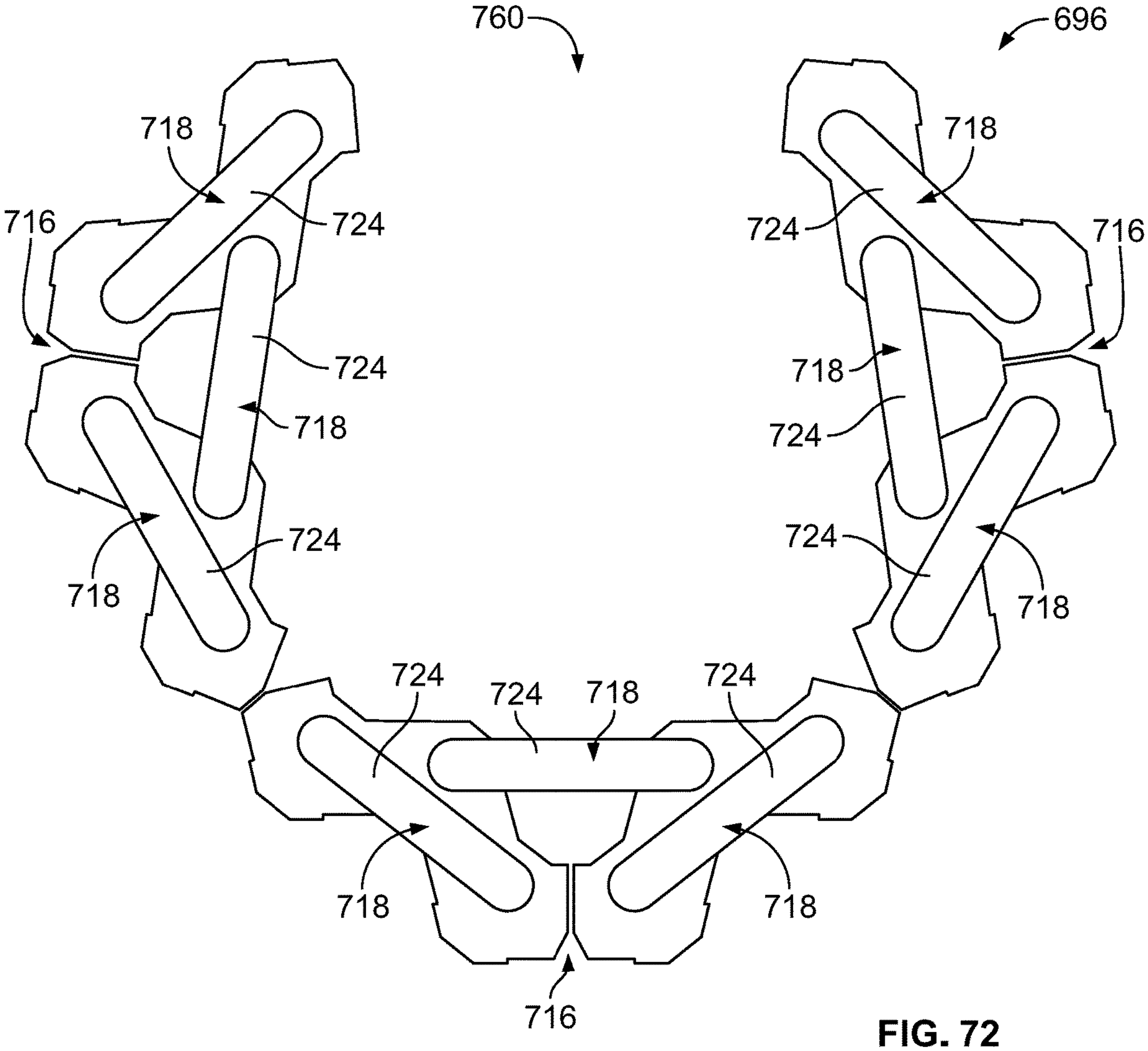
FIG. 72 is a rear elevational view of the heat exchanger of FIG. 69.

FIGS. 66-68 are first, second, and third exploded perspective view of the gas heater 510 with the top panel 514 and side panels 518, 520, 522, 524 of the cabinet 512 removed. In addition to those components previously enumerated and described, the gas heater 510 also includes a third heat exchanger 696, tube sheet insulation 698, front heat exchanger insulation 700, and a front manifold 702, all of which are generally covered by and contained within the combustion chamber enclosure 636. It should be understood that various combinations of components of the gas heater 510 contained within the cabinet 512 can form a heater subassembly. For example, the combustion chamber enclosure 636, the third heat exchanger 696, the burner 634, and the main PCBs 604 might be referred to as a heater subassembly. However, more or less components may be included in the heater subassembly.

The tube sheet 576 can be square-shaped with a central body 704 surrounded by a perimeter flange 706. The central body 704 includes a plurality of tube openings 708 that extend through the central body 704 between an exterior side 710 to an interior side 712 thereof. The tube sheet insulation 698 is generally square-shaped and dimensioned to cover the central body 704 of the tube sheet 576. The tube sheet insulation 698 includes a plurality of tube openings 714, which are dimensioned and configured to align with the tube openings 708 of the tube sheet 576 when the tube sheet insulation 698 is positioned adjacent the tube sheet 576. The tube sheet insulation 698 mitigates the dissipation of heat through the tube sheet 576, thus forcing heat generated by the gas heater 510 to be absorbed by the third heat exchanger 696.

Figure 73:
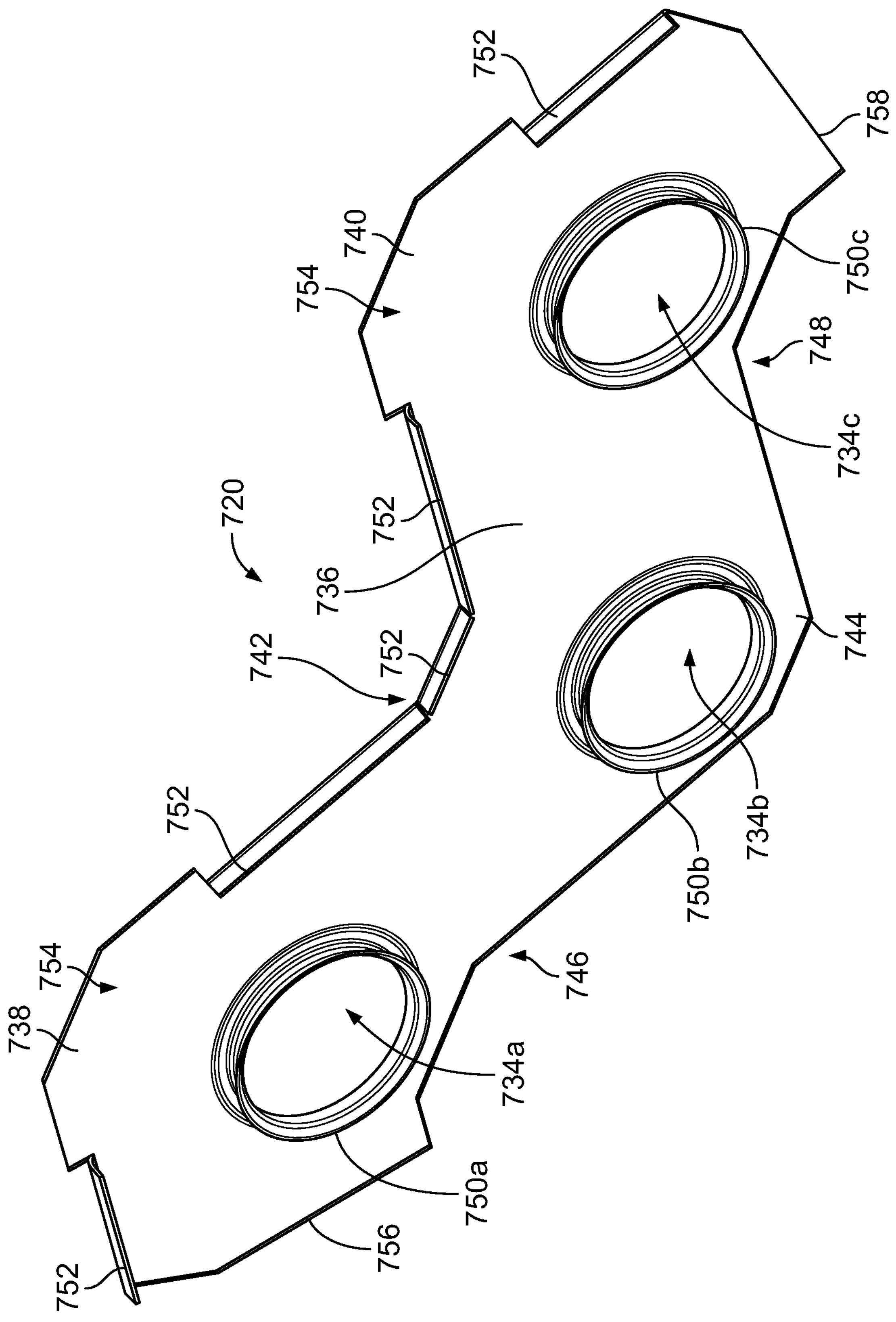
FIG. 73 is a perspective view of a fin of the second heat exchanger of FIGS. 69-72.
Figure 74:
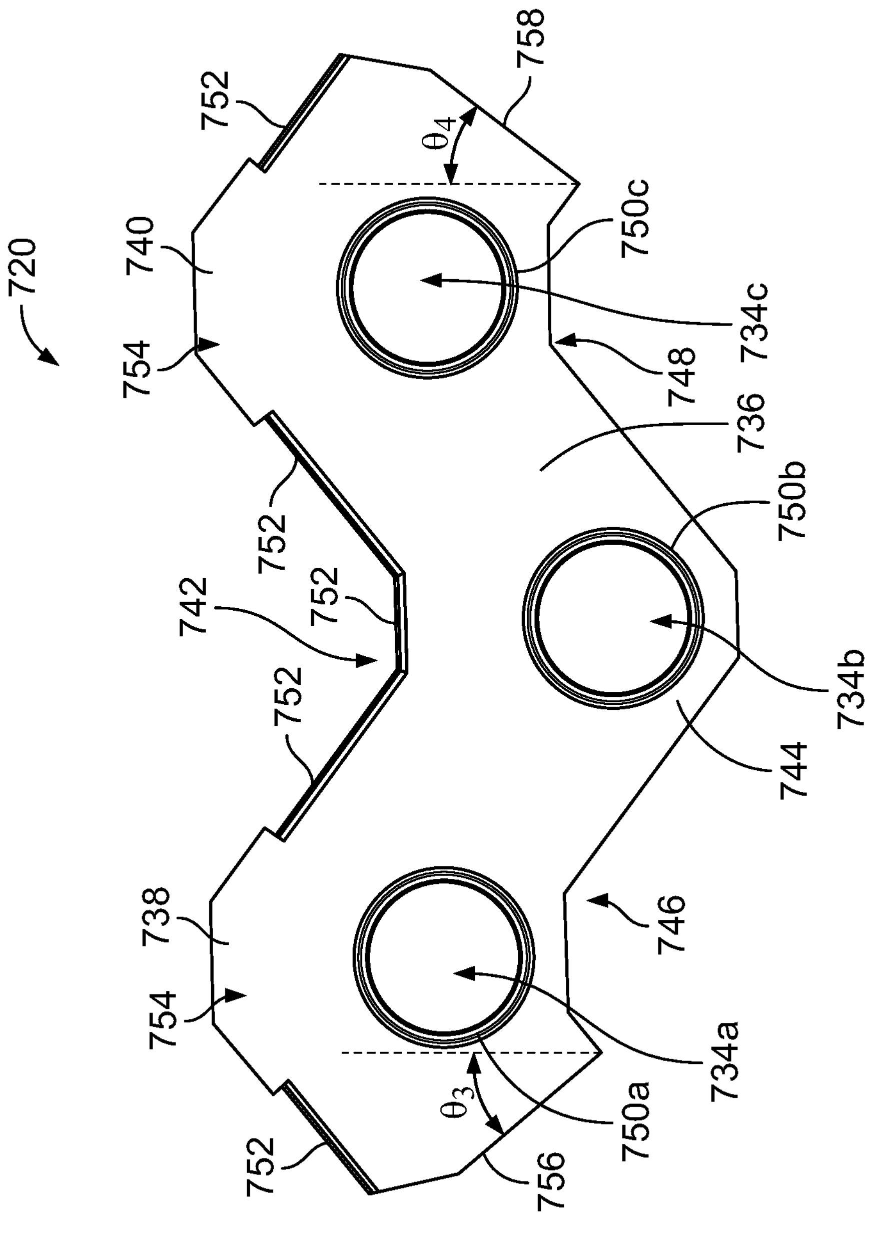
FIG. 74 is an elevational view of the fin of FIG. 73.

The third heat exchanger 696 can be similar in construction to the second heat exchanger 410 shown in, and described in connection with, FIGS. 41-44. The third heat exchanger 696 is shown in greater detail in FIGS. 69-72, which are perspective, top plan, front elevational, and rear elevational views of the third heat exchanger 696, respectively. The third heat exchanger 696 is a semi-circular expanded tube-and-fin heat exchanger that has individual fins organized into a semi-circular or circular pattern to optimize heat transfer in a smaller space. The third heat exchanger 696 includes a plurality of tube-and-fin subassemblies 716, e.g., three, that each comprises three tubes 718 and a plurality of fins 720. For the ease of illustration, each individual fin 720 is not shown in FIGS. 67-72, however, the details of the fins 720 are shown in FIGS. 73-74. The tube-and-fin subassemblies 716 are organized into a semi-circular shape within the combustion chamber enclosure 636. The tubes 718 are generally smooth heat exchanger tubes that are bent to form U-shaped “hairpins” and pass through a stack of fins 720. Each of the tubes 718 includes two open ends 722 that are generally positioned in the same plane, and a curved end 724. The tubes 718 can extend through the tube sheet 576, the front heat exchanger insulation 700, and the front manifold 702, which has an interior side 726, an exterior side 728, and a plurality of tube openings 729, half of which are inflow tube openings and half are outflow tube openings. The tube openings 729 extend through the front manifold 702 from the exterior side 728 to the interior side 726. In this configuration, the fins 720 are positioned between the interior side 726 of the front manifold 702 and the interior side 712 of the tube sheet 576, the curved ends 724 are positioned adjacent the exterior side 728 of the front manifold 702, and the open ends 722 extend through the tube openings 708 of the tube sheet 576. For each tube 718, one of the open ends 722 functions as an inlet for water to be heated, and the other of the open ends 722 functions as an outlet for heated water to exit. The second water header manifold 574 can be mounted to the tube sheet 576 covering the open ends 722 of the tubes 718 and configured to route water through the tubes 718, which is discussed in greater detail in connection with FIGS. 79-83.

As previously noted, the interior side 712 of the tube sheet 576 can be lined with the tube sheet insulation 698 which includes a plurality of tube openings 714 that the tubes 718 can extend through. The tube sheet insulation 698 functions to reduce the temperature near the coupled water header manifold 574. The interior side 726 of the front manifold 702 can be lined with the front heat exchanger insulation 700, which includes a plurality of tube openings 730 that the tubes 718 extend through to prevent the escape of heat and hot gases. Forming the tube-and-fin subassemblies 716 in a semi-circle eliminates the need for bottom insulation, and optimizes the transfer of heat in the smallest space possible.

The front manifold 702 can additionally include a bottom extension 732 that is configured to engage and rest on the interior of the combustion chamber enclosure 636 when the combustion chamber enclosure 636 is placed over the heat exchanger 696. Accordingly, the bottom extension 732 supports the heat exchanger 696 within the combustion chamber enclosure 636. This eliminates the need for a separate support bracket.

Figure 75:
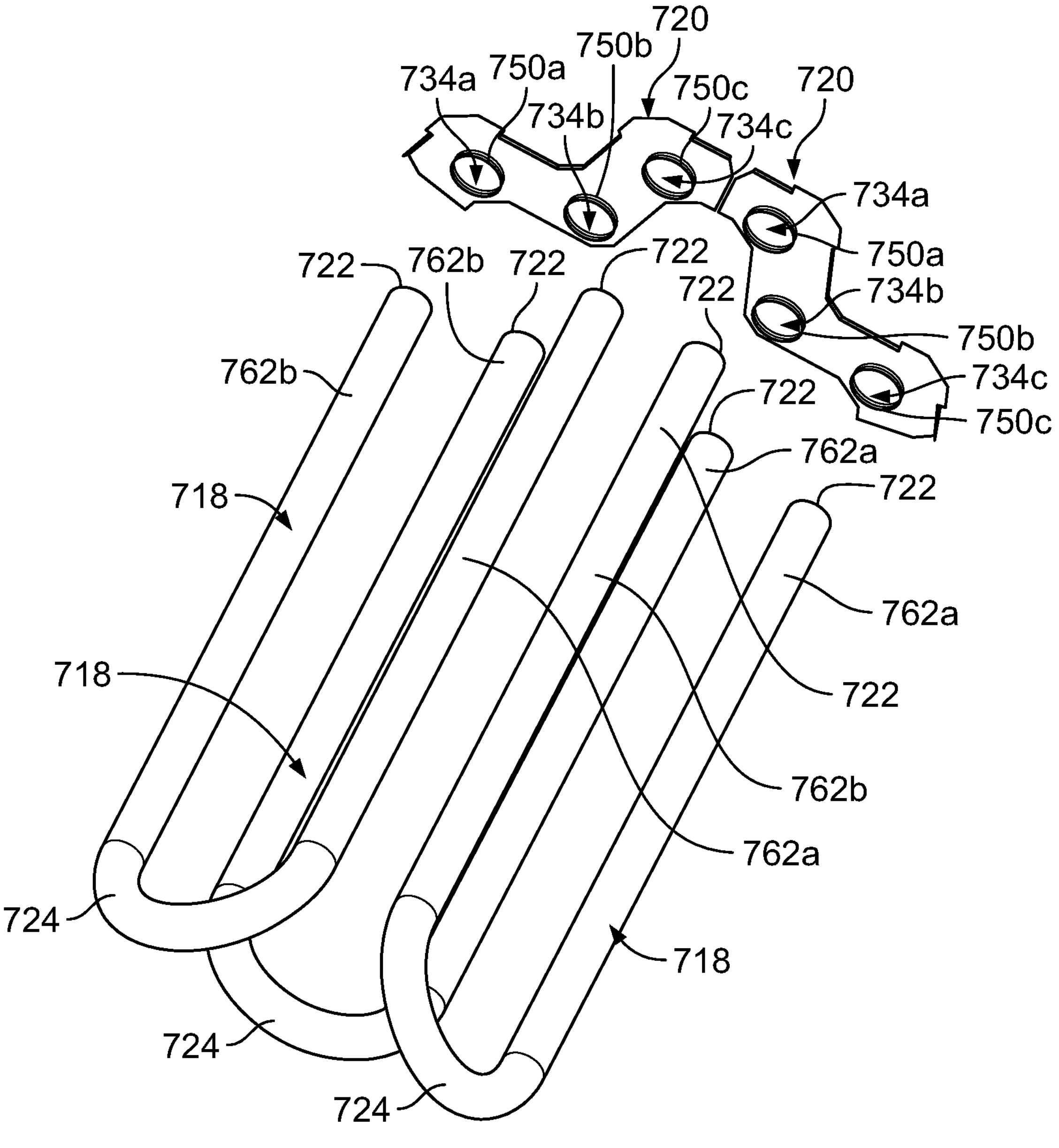
FIG. 75 is a perspective view showing three tubes being inserted into two fins in accordance with FIG. 73.
Figure 76:
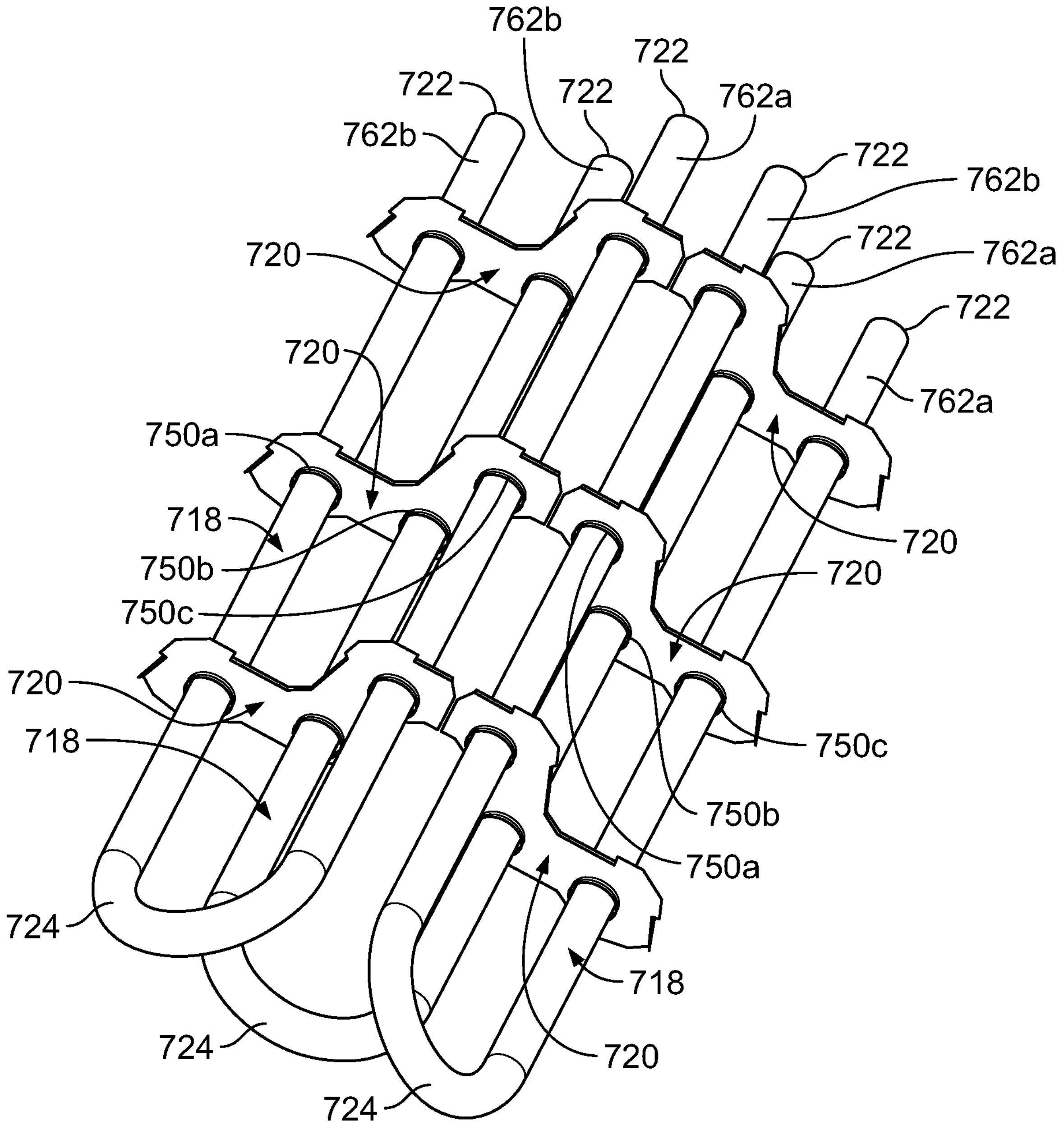
FIG. 76 is a perspective view showing three tubes inserted through nine fins in accordance with FIG. 73.

Turning to FIGS. 73-76, the fins 720 are shown in greater detail in FIGS. 73 and 74, while formation of the tube-and-fin subassemblies is shown in FIGS. 75 and 76. Specifically, FIGS. 73 and 74 are perspective and elevational views, respectively, of the fin 720. The fin 720 is similar to the fin 420 illustrated in FIGS. 45-46, but includes three tube openings 734*a*, 734*b*, 734*c* instead of four, among other differences. Each fin 720 includes a body 736 that includes first and second upper extensions 738, 740, an upper gap 742, a lower extension 744, first and second lower gaps 746, 748, and the three tube openings 734*a*, 734*b*, 734*c* that are each surrounded by a collar 750*a*, 750*b*, 750*c*. The fin 720 additionally includes a plurality of folded flanges 752 adjacent the first and second upper gaps 738, 740, which form upper channels 754 therebetween. The folded flanges 752 are configured to trap hot gases adjacent the fin 720, while the upper channels 754 are configured to allow hot gases to flow across the fin 720. In this regard, the fin 720 is configured to be stacked with other fins 720 along a tube 718. When stacked on a tube 718, the folded flanges 752 and the collars 750*a*, 750*b*, 750*c* function to space the fins 720 apart and create a flow path for hot gases between abutting fins 720.

Additionally, the fins 720 are designed so that two fins 720 can be positioned next to each other with a first side 756 of one fin 720 abutting a second side 758 of a second fin 720, allowing the fins 720 to be arranged in the semi-circle configuration shown in FIGS. 69-72. To achieve this semi-circle configuration, the first side 756 can be at an angle $\Theta_3$ with respect to the vertical axis, and the second side 758 can be set at an angle $\Theta_4$ with respect to the vertical axis, as shown in FIG. 74. To achieve a configuration where six fins 430 complete a full circle, the sum of the angle $\Theta_3$ and the angle $\Theta_4$ will have to total 60°. For example $\Theta_3$ and $\Theta_4$ can be equal to each other and both be 30°. It should be understood by a person of ordinary skill in the art that the present disclosure contemplates other configurations in which more or less than six fins 720 form a complete circle, and the corresponding angles for $\Theta_3$ and $\Theta_4$ that would be necessary to achieve a full circle. For example, ten fins 720 could be used in which the sum of $\Theta_3$ and $\Theta_4$ would equal 36°. Generally, the sum of the angles $\Theta_3$ and $\Theta_4$ will be equal to three-hundred and sixty (360) divided by the number of tube-and-fin subassemblies 716 required to form a complete circle. However, it is also contemplated that the fins 720 can be configured so as to not form a complete circle, but instead designed to leave a space of a desired size, e.g., a top gap 760, between two of the tube-and-fin subassemblies 716 (see FIGS. 69-72), which can be positioned adjacent the burner 634 and receive a portion of a burner (e.g., the burner 774 shown and described in connection with FIGS. 84-87) or gas.

Furthermore, the fins 720 are dimensioned and configured so that two or more fins 720 can be nested during manufacturing. In this regard, the upper gap 742 can be dimensioned and shaped so as to fit into the lower extension 744, while the upper extensions 738, 740 can be dimensioned and shaped so as to fit into the first and second lower gaps 746, 748. This arrangement saves material during manufacturing of the fins 720.

FIGS. 75 and 76 are first and second perspective views illustrating formation of a tube-and-fin subassembly 716. FIG. 75 is a perspective view showing three tubes 718 being inserted into two fins 720. The tubes 718 have first and second legs 762*a*, 762*b* that extend between the open ends 722 and the curved end 724. The open ends 722 of the first tube 718 are inserted into the first tube opening 734*a* and the third tube opening 734*c* of the first of the two fins 720, the open ends 722 of the second tube 718 are inserted into the first tube opening 734*a* and the third tube opening 734*c* of the second of the two fins 720, and the open ends 722 of the third tube 718 are inserted into the second tube opening 734*b* of the first of the two fins 720 and the second tube opening 734*b* of the second of the two fins 720. There is a small clearance between the collars 750*a*, 750*b*, 750*c* and the tubes 718 allowing the fins 720 to be slid along the first and second legs 762*a*, 762*b* toward the curved ends 724. More fins 720 are then added in the same fashion. In this configuration, two fins 720 are linked by one of the three tubes 718, which provides for added support and rigidity of each tube-and-fin subassembly 716. FIG. 75 is a perspective view showing three tubes 718 inserted through six fins 720. This process is repeated until substantially the entire length of the first and second legs 762*a*, 762*b* of the tubes 718 are filled with fins 720 (see FIG. 69, for example). Once assembled, the tubes 718 are mechanically expanded to place them in tight contact with the fins 720 so that heat can easily transfer from the fins 720 to the tubes 718. This mechanical expansion can be accomplished by several different methods, e.g., bullet expansion where a hydraulic machine pushes a round tool through the tubes 718 or hydro expansion where a fluid is pressurized inside the tubes 718.

The tube-and-fin subassemblies 716 can have advantages over tubes having extruded fins. Particularly, the tube-and-fin subassemblies 716 are more cost effective at least in part because the fins 720 can be manufactured from a lower-cost metal alloy than the tubes 718. For example, the tubes 718 can be made of a material that is more robust against damage from pool water, for example, cupronickel, stainless steel, or titanium, while the fins 720 can be made of a material that conducts heat well, but is not as robust though less expensive, for example, copper.

During operation, water is continuously routed through the tubes 718 between the open ends 722 by the second water header manifold 574. While water is routed through the tubes 718, the burner 634 generates a flame from the gas mixture provided thereto. Hot gases generated by the flames then dissipate outward across the fins 720. As discussed above, the folded flanges 752 of the fins 720 trap the hot gases in contact with the fins 720 and force the hot gases to pass over the tubes 718 and out from the upper channels 754. The fins 720 capture heat and transfer it to the tubes 718, which themselves capture heat as well. The tubes 718 transfer the heat to the water flowing therethrough, which exits the tubes into the second water header manifold 574 where it is ultimately rerouted back to the pool or spa.

Turning back to FIGS. 67 and 68, in one aspect, the burner 634 can include an upper mounting plate 764 and a lower discharge mesh plate 766 positioned below the upper mounting plate 764. The upper mounting plate 764 includes a central opening 768 (e.g., a gas opening), a tapered body 770, and a perimeter flange 772 that extends about the perimeter of the tapered body 770. The lower discharge mesh plate 766 is shown as being a solid component for the ease of illustration, but should be understood to be a mesh or perforated element that allows for the dissipation of the air/gas mixture provided to the burner 634, discussed below. The burner 634 can be mounted to the combustion chamber enclosure 636 by way of the perimeter flange 772, while the outlet 656 of the combustion blower 572 can be mounted about the central opening 768 of the upper mounting plate 764. This configuration allows for the air/gas mixture discharged from the outlet 656 of the combustion blower 572 to flow into the burner 634 through the central opening 768. The air/gas mixture is then dissipated from the lower discharge mesh plate 766 into the combustion chamber canister 636 to be ignited by the igniter 638 (e.g., a hot-surface igniter, a spark igniter, a pilot igniter, or a combination thereof), which is discussed in greater detail in connection with FIGS. 77 and 78. The burner 634 can also include a distributor plate (not shown) internal thereto adjacent the central opening 768, which functions to evenly distribute the air/gas mixture provided by the combustion blower 572 to the burner 634 allowing for a normalized ignition of the air/gas mixture. It should be understood that while the burner 634 is shown as a substantially "flat" configuration in FIGS. 67 and 68, the burner can be a "box"-shaped burner, such as the burner 774 shown and described in connection with FIGS. 84-87 that extends into the combustion chamber enclosure 636. That is, it should be understood that the burner 634 shown in FIGS. 67-68 and the burner 774 shown in FIGS. 84-87 are for the most part interchangeable based on a user's desired configuration.

The combustion chamber enclosure 636 can include a first sidewall 776*a*, a second sidewall 776*b*, a front 776*c*, a chamfered wall 776*d*, a top 776*e*, a bottom 776*f*, and a rear mounting flange 776*g* surrounding a rear opening 778. However, it should be understood that other configurations of the combustion chamber enclosure 636 are contemplated by the present enclosure. The top 776*e* can include a burner opening 780 surrounded by a gasket 782. The burner opening 780 is configured to receive a portion of the burner 634, 774, e.g., a portion of the lower discharge mesh plate 766 can extend through the burner opening 780 and into a combustion chamber cavity 784 defined by the combustion chamber enclosure 636. This configuration allows for the air/gas mixture dissipated by the lower discharge mesh plate 766 to dissipate into the combustion chamber cavity 784 of the combustion chamber enclosure 636 and be ignited by the igniter 638. The heat exchanger 696 can be positioned within the combustion chamber cavity 784 of the combustion chamber enclosure 636, while the tube sheet 576 can be secured to the rear mounting flange 776*g* to secure the heat exchanger 696 and the second water header manifold 574 to the combustion chamber enclosure 636 with the bottom extension 732 of the front manifold 702 resting on the bottom 776*f* and supporting the heat exchanger 696. The tube sheet 576 functions as the back of the combustion chamber enclosure 636 and seals the combustion chamber cavity 784. Additionally, the perimeter flange 772 of the burner's upper mounting plate 764 can rest on the gasket 782 and create a seal therewith to prevent any portion of the air/gas mixture from escaping the combustion chamber enclosure 636. The top 776*e* can also include a mounting section 786 adjacent the burner opening 780 which the igniter 638 and flame sensor 640 can be mounted to and extend into the combustion chamber cavity 784 of the combustion chamber enclosure 636. This is shown, for example, in FIGS. 77 and 78. Alternatively, the mounting section 786 can be positioned on the burner 634, e.g., on the perimeter flange 772 of the burner's upper mounting plate 764, so that the igniter 638 and the flame sensor 640 are directly mounted to, and interlocked with, the burner 634.

Figure 77:
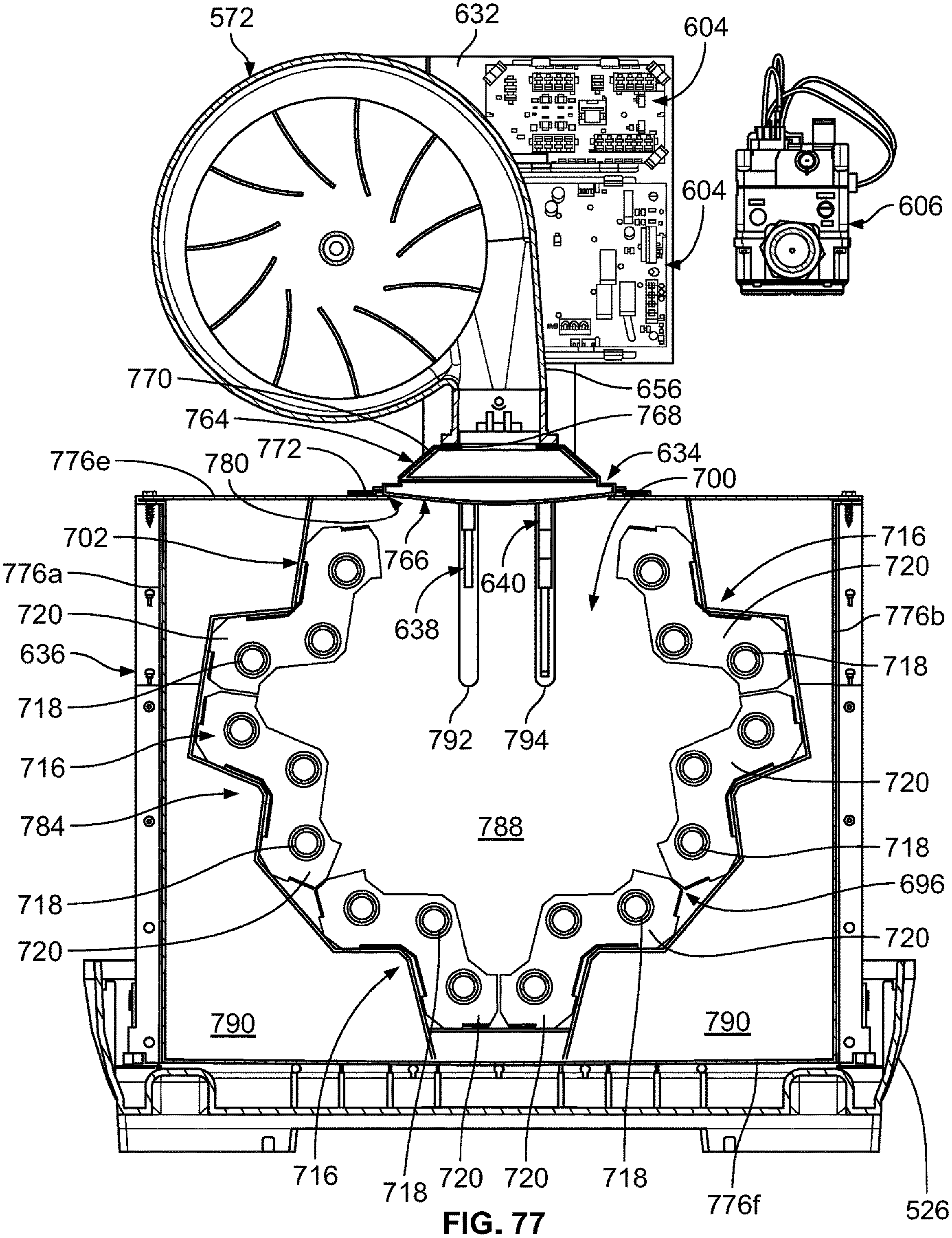
FIG. 77 is a sectional view taken along Line 77-77 of FIG. 65 showing the interior of a combustion chamber enclosure and the heat exchanger.
Figure 78:
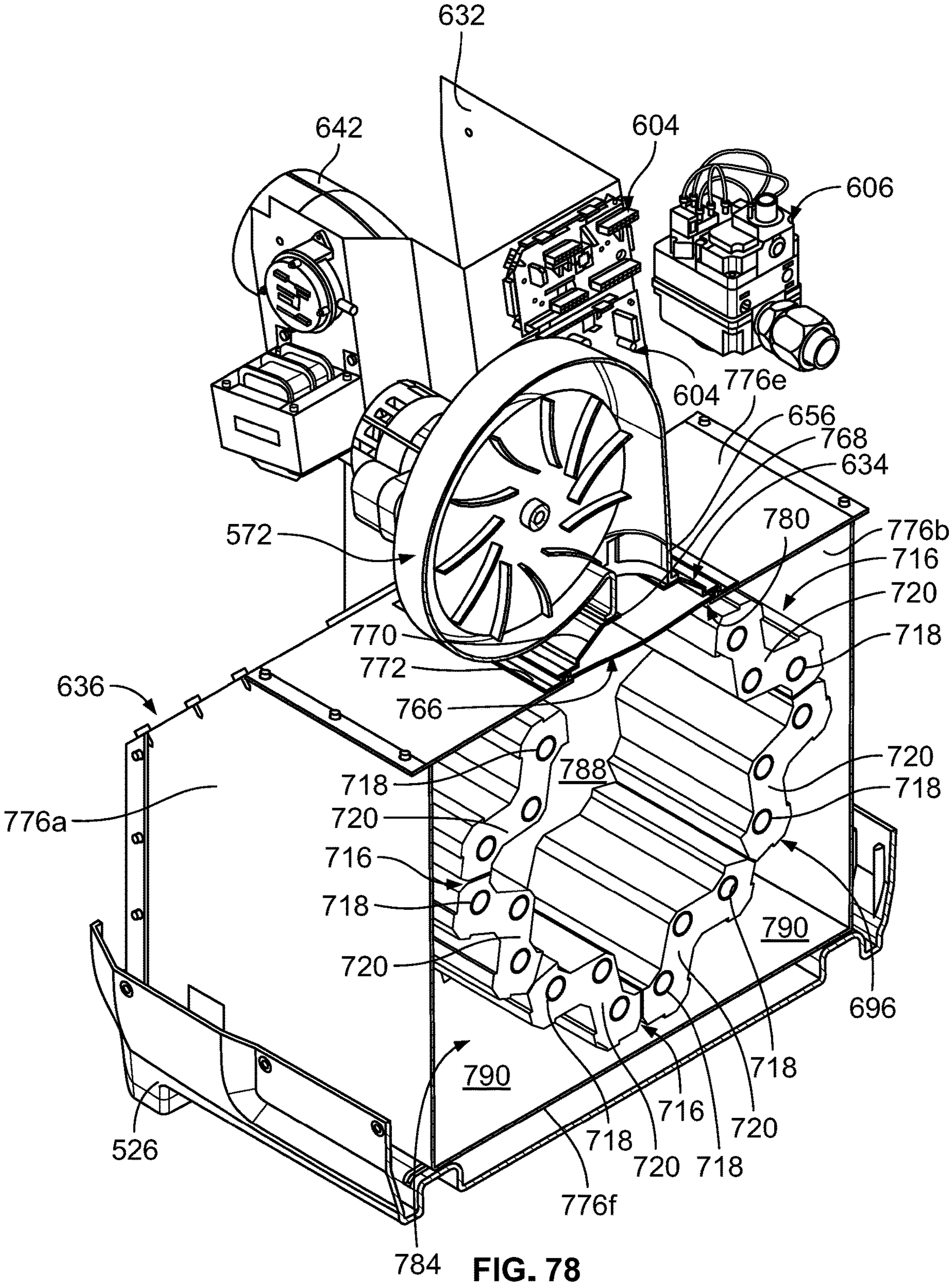
FIG. 78 is a perspective sectional view corresponding to the sectional view shown in FIG. 77.

FIG. 77 is a sectional view taken along Line 77-77 of FIG. 65. FIG. 78 is a perspective sectional view taken along Line 77-77 of FIG. 65. As can be seen in FIGS. 77 and 78, the burner 634 can be mounted adjacent the burner opening 780 of the combustion chamber enclosure 636 such that the lower discharge mesh plate 766 is positioned over the burner opening 780. Additionally, the lower discharge mesh plate 766 can extend at least partially into the burner opening 780. The lower discharge mesh plate 766 is configured to dissipate the air/gas mixture provided thereto by the combustion blower 572 into a combustion region 788 within the combustion chamber cavity 784 of the combustion chamber enclosure 636. The combustion region 788 is generally in the center of the heat exchanger 696 and surrounded by the tube-and-fin subassemblies 716 thereof. This configuration forces hot gas created due to combustion of the air/gas mixture to dissipate outward through the heat exchanger 696 and across the fins 720 of the heat exchanger 696, thus allowing the fins 720 to absorb heat from the hot gas, transfer the heat absorbed to the tubes 718, and into the water being circulated through the tubes 718. Furthermore, the box-shaped configuration of the combustion chamber enclosure 636 allows for lower pockets 790 within the combustion chamber cavity 784 of the combustion chamber enclosure 636 exterior to the heat exchanger 696. The lower pockets 790 can have baffles (not shown) positioned therein, which can evenly distribute hot gas that has passed across the heat exchanger 696 and into the lower pockets 790. Additionally, the baffles (not shown) can force the hot gas that has passed into the lower pockets 790 back upward and through the heat exchanger 696 a second time, which allows for additional heat to be extracted and increases efficiency of the heat exchanger 696.

Moreover, as referenced above, the igniter 638 and the flame sensor 640 can be mounted to the mounting section 786 adjacent the burner opening 780 so as to extend vertically into the combustion region 788 of the combustion chamber enclosure 636. The front heat exchanger insulation 700 can include first and second cutouts 792, 794 configured to receive the igniter 638 and the flame sensor 640. When the igniter 638 and the flame sensor 640 are mounted to the mounting section 786, and the burner 634 is mounted to the combustion chamber enclosure 636 adjacent the burner opening 780, the igniter 638 and the flame sensor 640 will be at a pre-set desired distance from the lower discharge mesh plate 766 from which the air/gas mixture is dissipated. This distance is the desired distance to achieve efficient and safe ignition of the air/gas mixture dissipated from the burner 634. If the distance is too large then there may be an excessive explosion accompanied by a loud noise resulting from the ignition of accumulated gas, which is not desirable. Accordingly, it is desired to maintain the distance between the igniter 638 and the lower discharge mesh plate 766 as constant. This dimensional consistency is achieved by mounting both the igniter 638 (and the flame sensor 640) and the burner 634 to the top 776*e* of the combustion chamber enclosure 636, or by mounting both the igniter 638 (and the flame sensor 640) directly to the burner 634, which drastically reduces the number of components that contribute to the "stack-up" of tolerances. In essence, this reduces the tolerance stack to the hole through which the igniter 638 extends. Additionally, by mounting the igniter 638, the flame sensor 640, and the burner 634 to the top 776*e* of the combustion chamber enclosure 636, each of these components can be accessed and serviced from above, e.g., through the top panel 514 or through the access window 600 that extends through the top panel 514. This results in an easier installation and replacement procedure for a servicing technician.

Alternatively, the igniter 638 and/or the flame sensor 640 can be mounted to the tube sheet 576 at a position adjacent the burner 634 near the top of the tube sheet 576, e.g., at a position that is above the water manifold header 574 and between the water manifold header 574 and the top of the tube sheet 576. In such a configuration, the igniter 638 and/or the flame sensor 640 extends horizontally through the tube sheet 576 and the tube sheet insulation 698, and into the combustion region 788 of the combustion chamber enclosure 636 with the igniter 638 positioned adjacent the lower discharge mesh plate 766 of the burner 634. This configuration allows for reliable positioning of the igniter 638 with respect to the burner 634, and positions the igniter 638 perpendicular to the flow of gas, which exposes the igniter 638 to a greater surface area of gas and allows for more reliable ignition.

Returning to FIGS. 67 and 68, the second water header manifold 574 can be a single unitary structure or can include multiple components interconnected. The second water header manifold 574 can be formed from plastic due to economy of materials and corrosion resistance. For example, the water header manifold 574 can be similar in construction to the disclosure of U.S. Pat. No. 7,971,603, the contents of which are hereby incorporated by reference in their entirety. The second water header manifold 574 can include a main body 796 and a circulation body 798. The second water header manifold 574 is shown in greater detail in FIGS. 79-81.

Figure 79:
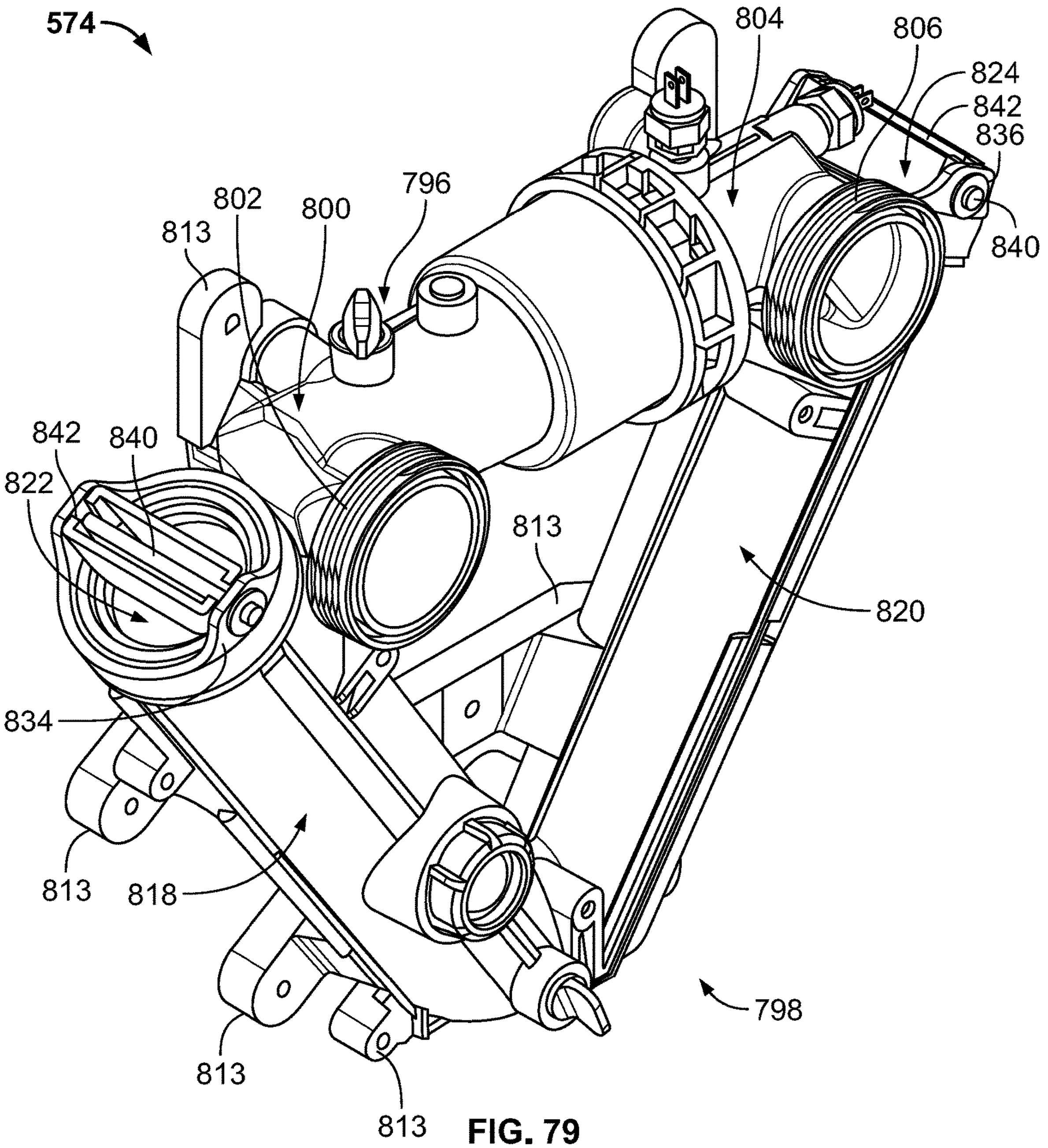
FIG. 79 is a front perspective view of a second water manifold header of the present disclosure.
Figure 80:
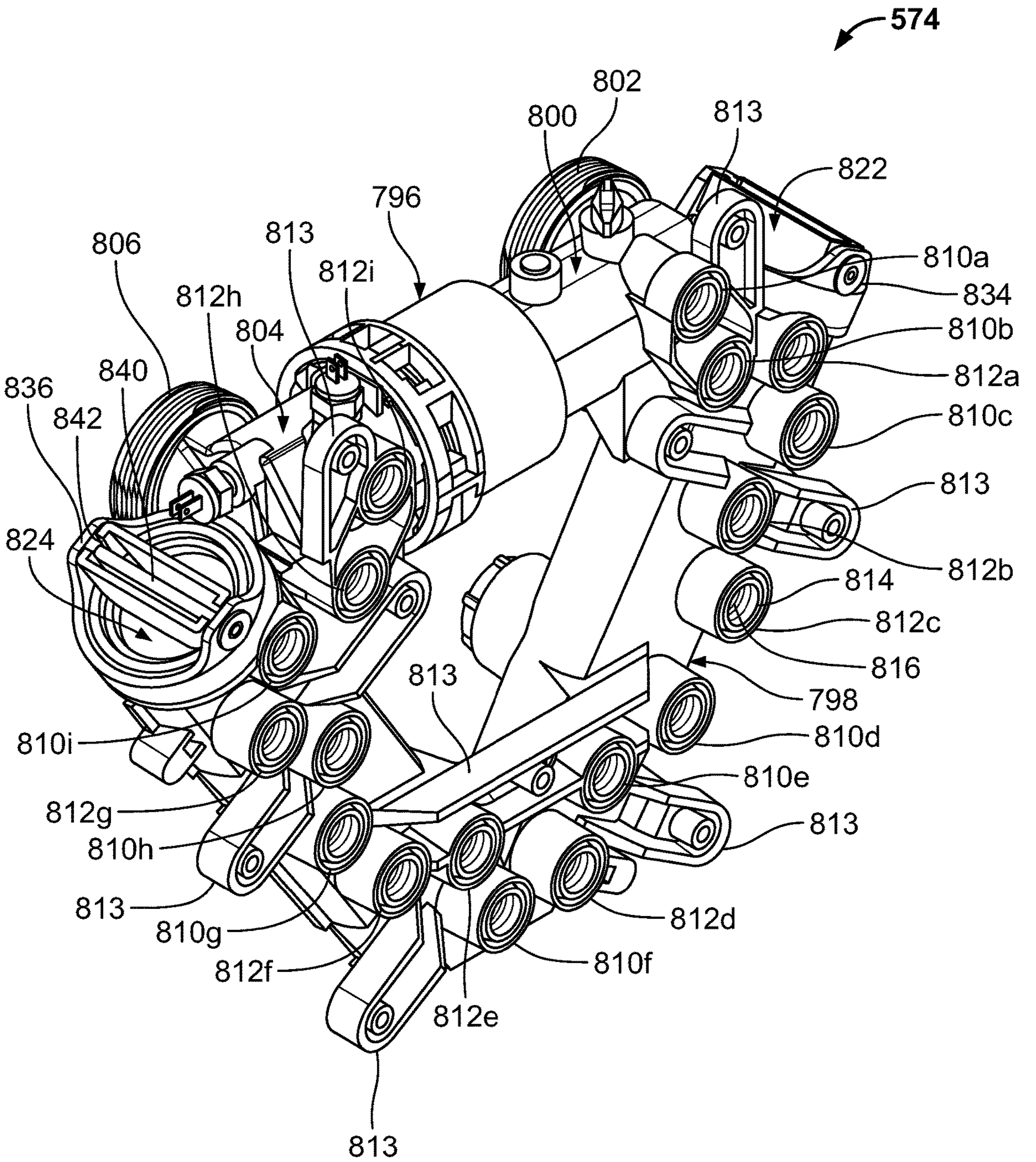
FIG. 80 is a rear perspective view of the second water manifold header of FIG. 79.
Figure 81:
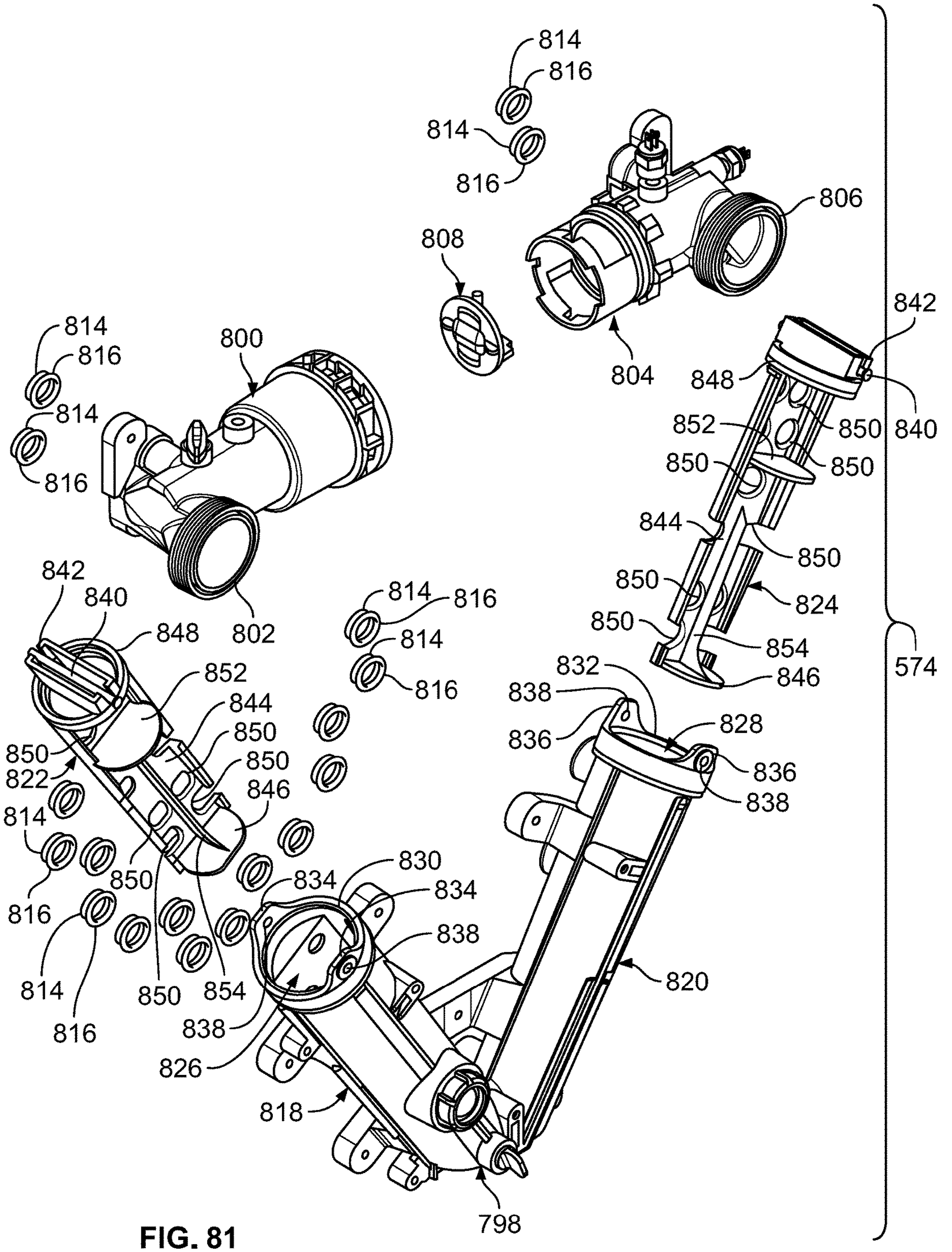
FIG. 81 is an exploded perspective view of the second water manifold header of FIGS. 79 and 80.

FIGS. 79 and 80 are first and second perspective views of the second water manifold header 574. FIG. 81 is an exploded perspective view of the second water manifold header 574. The main body 796 of the second water manifold header 574 can include an first portion 800 having an inlet 802 and a second portion 804 having an outlet 806. The inlet 802 and the outlet 806 can be threaded to assist with connection of an inlet fitting 888 and an outlet fitting 890, respectively, as shown and described in connection with FIG. 88. The first and second portions 800, 804 can be detachably engaged to each other with a pressure valve 808 positioned therebetween, which can act as a bypass valve that opens when the pressure in the main body 796 is greater than a predetermined threshold (e.g., pounds per square inch) and closes when the pressure is below a predetermined threshold, which is discussed in greater detail below. The main body 796 also includes a first inlet port 810*a*, a second inlet port 810*b*, an eight outlet port 812*h*, and a ninth outlet port 812*i* (the third, fourth, fifth, sixth, seventh, eighth, and ninth inlet ports 810*c*, 810*d*, 810*e*, 810*f*, 810*g*, 810*h*, 810*i*, and the first, second, third, fourth, fifth, sixth, and seventh outlet ports 812*a*, 812*b*, 812*c*, 812*d*, 812*e*, 812*f*, 812*g* are discussed below) that are in fluidic communication with pipes 718 of the heat exchanger 696, and discussed in greater detail below. A spacer 814 and an o-ring 816 can be placed in each of the inlet ports 810 and outlet ports 812 to create a proper watertight seal with the open end 722 of the pipe 718 engaged therewith.

The circulation body 798 includes a first arm 818, a second arm 820, a first cartridge 822, and a second cartridge 824. The first arm 818 defines a first inner cavity 826 and the second arm 820 defines a second inner cavity 828, such that the first cartridge 822 can be removably inserted into the first inner cavity 826 through a first top opening 830 in the first arm 818 and the second cartridge 824 can be removably inserted into the second inner cavity 828 through a second top opening 832 in the second arm 820. The first and second arms 818, 820 additionally include upper securing collars 834, 836 adjacent the first top opening 830 and the second top opening 832, respectively. The upper securing collars 834, 836 each includes a through-hole 838 that assists in securing the first and second cartridges 822, 824 within the first and second arms 818, 820. Specifically, when the first and second cartridges 822, 824 are removably placed within the first and second arms 818, 820, locking mechanisms 840 (e.g., locking rods) can be inserted through the through-holes 838 of the upper securing collars 834, 836 and placed within a channel 842 that extends across a top of each of the first and second cartridges 822, 824. The locking rods 840 can be secured in placed by a standard fastener or insert known in the art, e.g., a hairpin. This also aligns the cartridges 822, 824 within the first and second arms 818, 820. This configuration allows for the first and second cartridges 822, 824 to be removed from the circulation body 798 to be serviced, cleaned, replaced, etc. For example, if it is determined that the circulation body 798 is clogged, e.g., there is poor circulation through the heat exchanger 696, then a user can remove the cartridges 822, 824 and clean the circulation body 798 or the cartridges 822, 824 themselves.

The circulation body 798 additionally includes a plurality of inlet ports and outlet ports on a rear thereof. Specifically, the circulation body 798 includes the third inlet port 810*c*, the fourth inlet port 810*d*, the fifth inlet port 810*e*, the sixth inlet port 810*f*, the seventh inlet port 810*g*, the eighth inlet port 810*h*, the ninth inlet port 810*i*, the first outlet port 812*a*, the second outlet port 812*b*, the third outlet port 812*c*, the fourth outlet port 812*d*, the fifth outlet port 812*e*, the sixth outlet port 812*f*, and the seventh outlet port 812*g*. The fluid circuits between the inlet ports 810*a*-810*i* and the outlet ports 812*a*-812*i* is discussed in greater detail in connection with FIGS. 82 and 83. The inlet ports 810*a*-810*i* and the outlet ports 812*a*-812*i* are dimensioned and configured to match the dimensions and configuration of the tube openings 708 of the tube sheet 576, such that the open ends 722 of the tubes 718 can extend through the tube openings 708 of the tube sheet 576 and into the respective inlet ports 810*a*-810*i* and outlet ports 812*a*-812*i*. The water header manifold 574 can be mounted to the tube sheet 576 via a plurality of mounts 813 with the inlet ports 810*a*-810*i* and outlet ports 812*a*-812*i* aligned with the tube openings 708, which places the water header manifold 574 in fluidic communication with the heat exchanger tubes 718 of the heat exchanger 696.

The first and second cartridges 822, 824 are identical in construction such that they are interchangeable. The first and second cartridges 822, 824 include a body 844 that extends between a bottom plate 846 and a top cap 848. The body 844 includes a plurality of openings 850 extending therethrough that are configured to align with the third inlet ports 810*c*-810*i* and the outlet ports 812*a*-812*g* of the circulation body 798 when the first and second cartridges 822, 824 are inserted into the first and second arms 818, 820 of the circulation body 798, which allows for fluid to circulate into and out of the first and second inner cavities 826, 828 of the first and second arms 818, 820. The plurality of openings 850 are sized, shaped, and positioned so that the first and second cartridges 822, 824 can be placed in either of the first or second arms 818, 820. Additionally, the first and second cartridges 822, 824 each includes a horizontal divider 852 that is used to divide the first and second inner cavities 826, 828 of the first and second arms 818, 820 into chambers, as discussed in connection with FIGS. 82 and 83, and a vertical baffle 854 that is used to mix water paths in order to normalize the water temperature and prevent hot spots.

Figure 82:
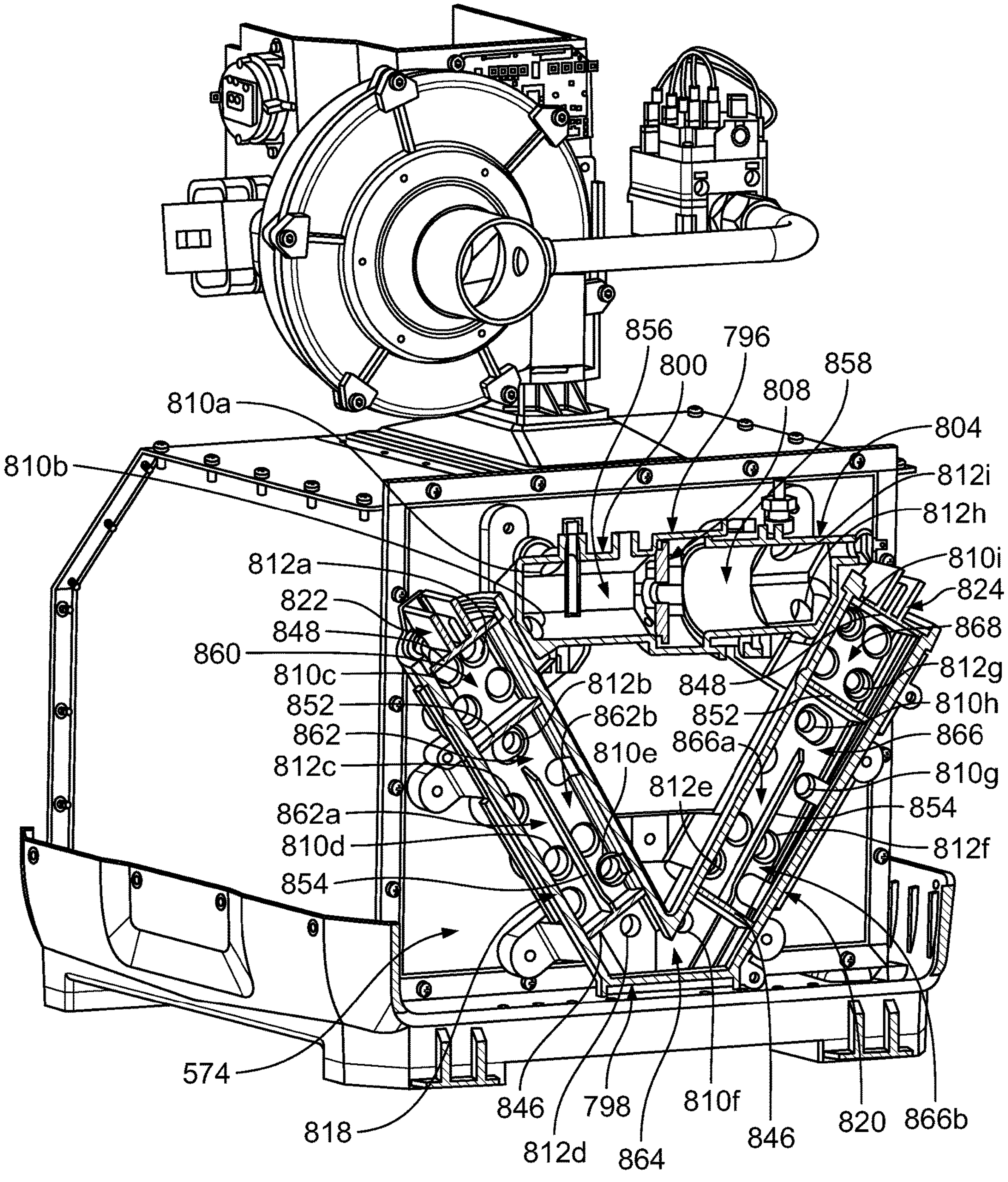
FIG. 82 is a sectional view taken along Line 82-82 of FIG. 65 showing the interior of the second water manifold header in perspective.
Figure 83:
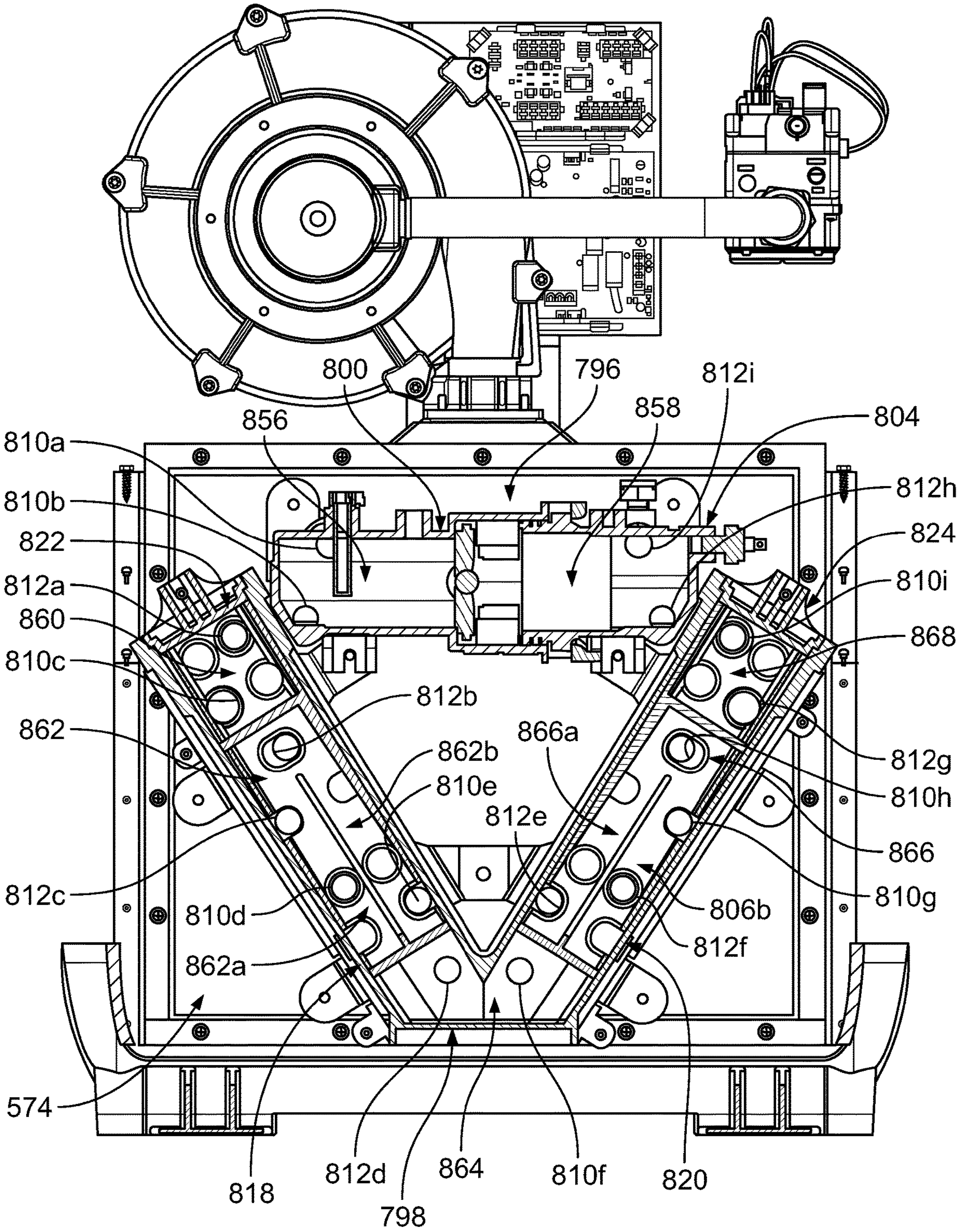
FIG. 83 is a sectional view taken along Line 82-82 of FIG. 65 showing the interior of the second water manifold header.

FIGS. 82 and 83 are perspective sectional and sectional views taken along Line 82-82 of FIG. 65 generally showing the flow chambers within the second water header manifold 90. The first portion 800 of the main body 796 forms an inflow chamber 856 and the second portion 804 forms an outflow chamber 858, which are separated by the valve 808. The inlet 802 (see FIG. 79) is in fluidic communication with the inflow chamber 856 such that fluid supplied to the inlet 802 to be heated flows into the inflow chamber 856, which is in fluidic communication with the first and second inlet ports 810*a*, 810*b*. On the other hand, the outlet 806 (see FIG. 79) is in fluidic communication with the outflow chamber 858 such that fluid that has been circulated through the heat exchanger 696, and has been heated, flows into the outflow chamber 858 via the eighth and ninth outlet ports 812*h*, 812*i*. The inflow chamber 856 and the outflow chamber 858 are capable of being switched into and out of fluidic communication by way of the pressure valve 808, which opens when the pressure in the inflow chamber 856 is greater than a predetermined threshold (e.g., pounds per square inch) and closes when the pressure is below a predetermined threshold. When the pressure valve 808 is open, the inflow chamber 856 is in fluidic communication with the outflow chamber 858, which allows a portion of the water to bypass the heat exchanger 696 resulting in a reduction in pressure in the system. Such functionality can be implemented in accordance with U.S. Pat. No. 7,971,603, the contents of which are hereby incorporated by reference in their entirety.

When the first and second cartridges 818, 820 are installed in the circulation body 798, the circulation body 798 is divided into five chambers 860, 862, 864, 866, 868. The first chamber 860 is defined between the top cap 848 of the first cartridge 818 and the horizontal divider 852 of the first cartridge 818, and is in fluid communication with the first outlet 812*a* and the third inlet 810*c*. The second chamber 862 is defined between the horizontal divider 852 of the first cartridge 818 and the bottom plate 846 of the first cartridge 818, and is in fluid communication with the second outlet 812*b*, third outlet 812*c*, fourth inlet 810*d*, and fifth inlet 810*e*. The second chamber 862 can be divided into first and second sections 862*a*, 862*b* by the vertical baffle 854 with the third outlet 812*c* and the fourth inlet 810*d* positioned in the first section 862*a*, and the fifth inlet 810*e* positioned in the second section 862*b*. By dividing the second chamber 862 into the two sections 862*a*, 862*b* the water flowing through the different water paths can be mixed, which normalizes the temperature between the tubes 718, e.g., prevents the outside tubes 718 from getting hotter than the inside tubes 718. The third chamber 864 is defined between the bottom plate 846 of the first cartridge 818 and the bottom plate 846 of the second cartridge 820, and is in fluid communication with the fourth outlet 812*d* and the sixth inlet 810*f*. The fourth chamber 866 is defined between the horizontal divider 852 of the second cartridge 820 and the bottom plate 846 of the second cartridge 820, and is in fluid communication with the fifth outlet 812*e*, sixth outlet 812*f*, seventh inlet 810*g*, and eight inlet 810*h*. The fourth chamber 866 can be divided into first and second sections 866*a*, 866*b* by the vertical baffle 854 with the fifth outlet 812*e* positioned in the first section 866*a*, and the sixth outlet 812*f* and the seventh inlet 810*g* positioned in the second section 862*b*. By dividing the fourth chamber 866 into the two sections 866*a*, 866*b* the water flowing through the different water paths can be mixed, which normalizes the temperature between the tubes 718, e.g., prevents the outside tubes 718 from getting hotter than the inside tubes 718.

It should be understood that the first inlet 810*a* is connected and in fluidic communication with the first outlet 812*a* by a tube 718, the second inlet 810*b* is connected and in fluidic communication with the second outlet 812*b* by a tube 718, the third inlet 810*c* is connected and in fluidic communication with the third outlet 812*c* by a tube 718, the fourth inlet 810*d* is connected and in fluidic communication with the fourth outlet 812*d* by a tube 718, the fifth inlet 810*e* is connected and in fluidic communication with the fifth outlet 812*e* by a tube 718, the sixth inlet 810*f* is connected and in fluidic communication with the sixth outlet 812*f* by a tube 718, the seventh inlet 810*g* is connected and in fluidic communication with the seventh outlet 812*g* by a tube 718, the eighth inlet 810*h* is connected and in fluidic communication with the eighth outlet 812*h* by a tube 718, and the ninth inlet 810*i* is connected and in fluidic communication with the ninth outlet 812*i* by a tube 718.

Accordingly, water flows through the water header manifold 574 in the following fluid circuit: fluid enters the water header manifold 574 through the inlet 802 and into the inflow chamber 856; from the inflow chamber 856 the fluid flows into the first inlet 810*a* and the second inlet 810*a*; the fluid that enters into the first inlet 810*a* flows through a tube 718 and exits from the first outlet 812*a* into the first chamber 860 while the fluid that enters into the second inlet 810*b* flows through a tube 718 and exits from the second outlet 812*b* in the second chamber 862; the fluid that exits from the first outlet 812*a* into the first chamber 860 next enters the third inlet 810*c*, flows through a tube 718, and exits from the third outlet 812*c* in the first section 862*a* of the second chamber 862; the fluid that enters the second chamber 862 from the second outlet 812*b* and the third outlet 812*c* mix and enter the fourth inlet 810*d* (in the first section 862*a* of the second chamber 862) and the fifth inlet 810*e* (in the second section 862*b* of the second chamber 862); the fluid that enters into the fourth inlet 810*d* flows through a tube 718 and exits from the fourth outlet 812*d* into the third chamber 864 while the fluid that enters into the fifth inlet 810*e* flows through a tube 718 and exits from the fifth outlet

812*e* into the first section 866*a* of the fourth chamber 866; the fluid that exits from the fourth outlet 812*d* into the third chamber 864 next enters into the sixth inlet 810*f*, flows through a tube 718, and exits from the sixth outlet 812*f* in the second section 866*b* of the fourth chamber 866; the fluid that enters the fourth chamber 866 from the fifth outlet 812*e* and the sixth outlet 812*f* mix and enter the seventh inlet 810*g* and the eight inlet 810*h*; the fluid that enters into the seventh inlet 810*g* flows through a tube 718 and exits from the seventh outlet 812*g* in the fifth chamber 868 while the fluid that enters into the eight inlet 810*h* flows through a tube 718 and exits from the eight outlet 812*h* into the outflow chamber 858; the fluid that exits the seventh outlet 812*g* into the fifth chamber 868 next enters the ninth inlet 810*i*, flows through a tube 718, and exits from the ninth outlet 812*i* into the outflow chamber 858; and the fluid that enters the outflow chamber 858 through the eighth outlet 812*h* and the ninth outlet 812*i* exits the water header manifold 574 through the outlet 806. As the water is circulated through the tubes 718 of the heat exchanger 696, and between the inlets 810*a-i* and outlets 812*a-i*, it is heated and recirculated to the pool or spa.

Figure 84:
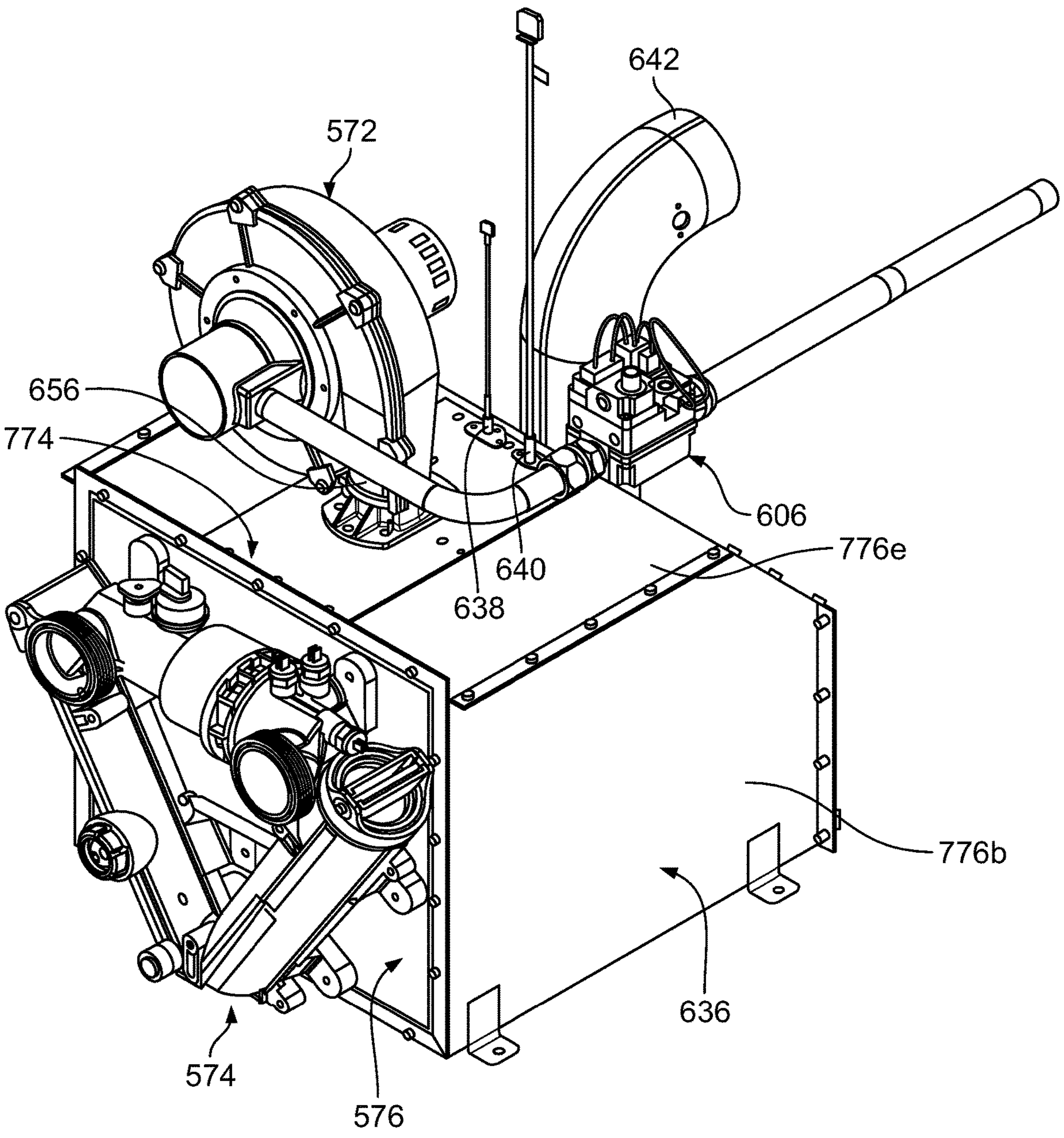
FIG. 84 is a partial perspective view of a gas heater of the present disclosure incorporating an alternative burner connected with the blower and the combustion chamber enclosure of FIG. 63.
Figure 85:
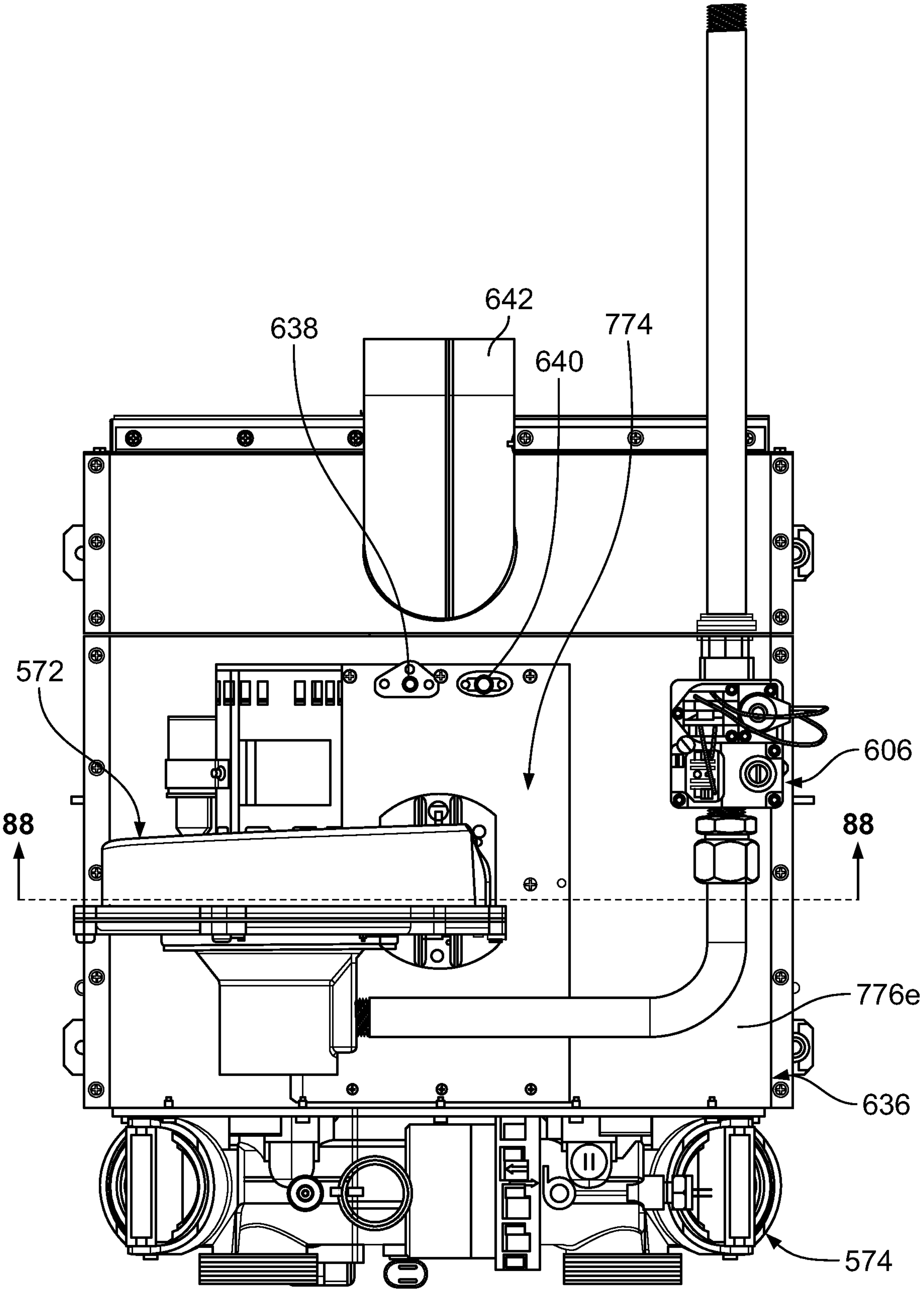
FIG. 85 is a top plan view of the gas heater of FIG. 84.
Figure 86:
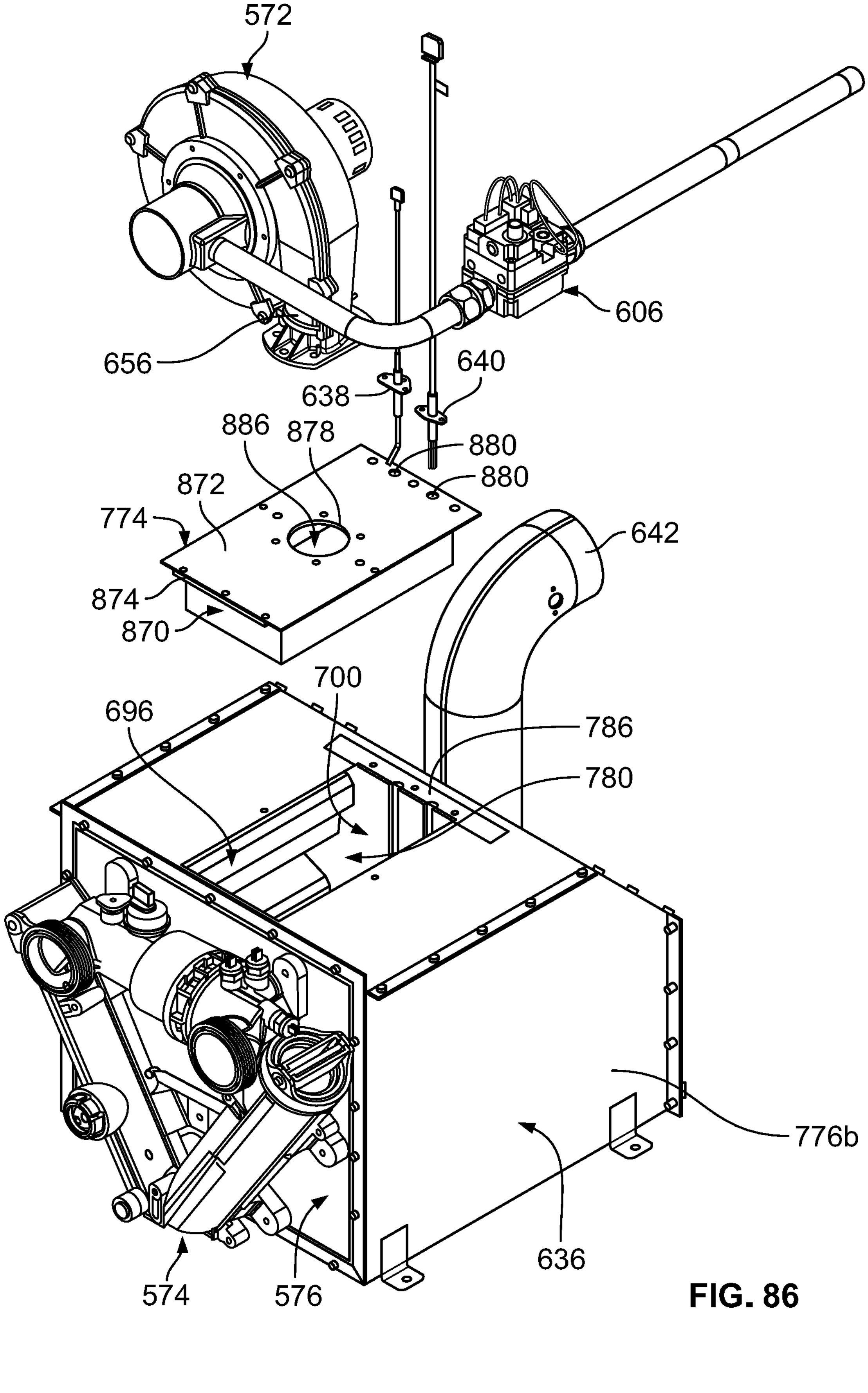
FIG. 86 is a partially exploded perspective view of the blower, combustion chamber enclosure, and burner of FIG. 84.
Figure 87:
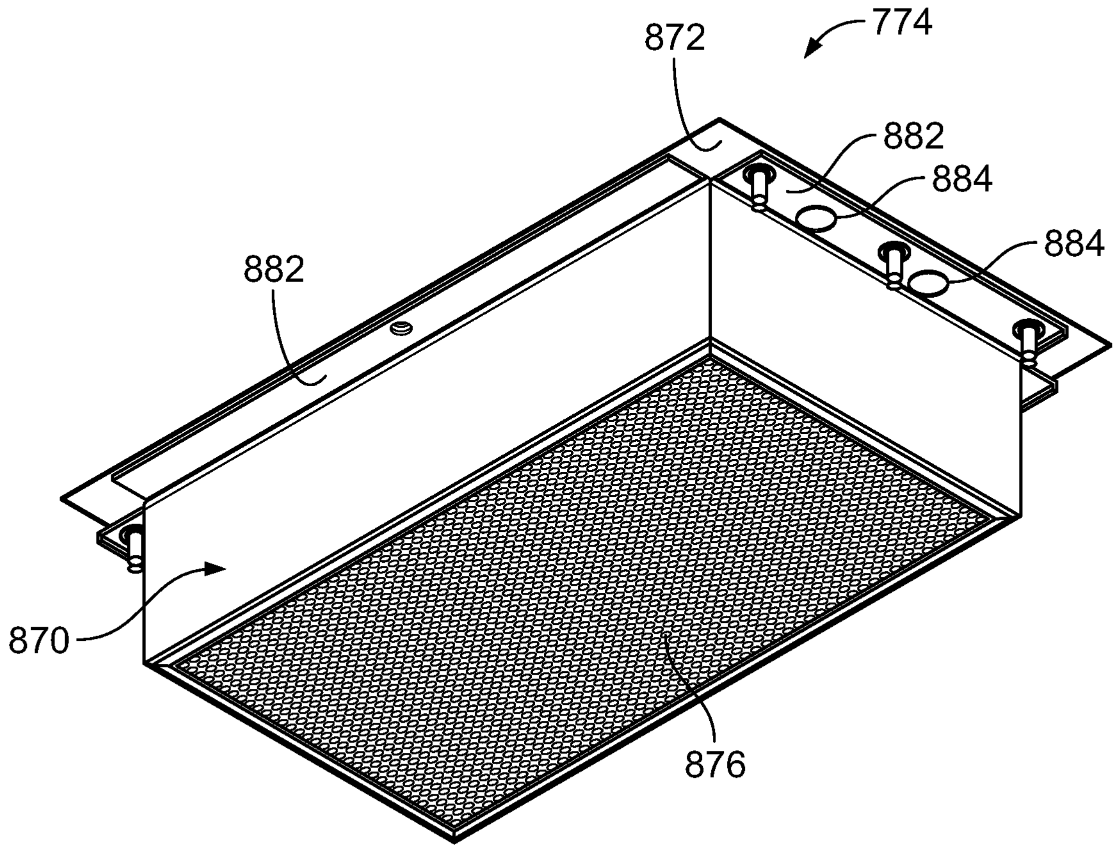
FIG. 87 is a bottom perspective view of the burner of FIGS. 84-86.

As referenced above, FIGS. 84-88 show the alternative burner 774 in greater detail. FIG. 84 is a partial perspective view illustrating the burner 774 connected with the combustion blower 572 and the combustion chamber enclosure 636, FIG. 85 is a top plan view illustrating the burner 774 connected with the combustion blower 572 and the combustion chamber enclosure 636, and FIG. 86 is a partially exploded perspective view of the combustion blower 572, combustion chamber enclosure 636, and burner 774 of FIGS. 84 and 85. FIG. 87 is a bottom perspective view of the burner 774. As previously noted, the burner 774 shown and described in connection with FIGS. 84-88 can be used in place of the burner 634 shown and described in connection with FIGS. 67 and 68, such that the burner 634 shown in FIGS. 67-68 and the burner 774 shown in FIGS. 84-87 are interchangeable based on a user's desired configuration.

The burner 774 includes a body 870, a top mounting plate 872, a gasket 874, and a perforated bottom plate 876. The top mounting plate 872 includes a central opening 878 and perimeter holes 880 that the igniter 638 and flame sensor 640 can extend through. The body 870 can be a rectangular-shaped box and can include an upper mounting flange 882 that assists with mounting the burner 774 to the top 776*e* of the combustion chamber enclosure 636. A plurality of holes 884 can be provided in the upper mounting flange 882 that the igniter 638 and flame sensor 640 can extend through.

The burner 774 can be mounted to the top 776*e* of the combustion chamber enclosure 636 with the body 870 extending through the burner opening 780 into the combustion chamber cavity 784 of the combustion chamber enclosure 636. Furthermore, when the burner 774 is mounted to the top 776*e* of the combustion chamber enclosure 636, the body 870 can be positioned within the top gap 760 of the heat exchanger 696 mounted within the combustion chamber enclosure 36. This can be seen, for example, in FIG. 88, which is a sectional view taken along Line 88-88 of FIG. 85. The combustion blower 572 can be mounted to the mounting plate 872 of the burner 774 with the outlet 656 of the combustion blower 572 positioned over the central opening 878. This configuration allows for the air/gas mixture discharged from the outlet 656 of the combustion blower 572 to flow through the central opening 878 and into an internal cavity 886 defined by the body 870 of the burner 774. The air/gas mixture to be ignited by the igniter 638 is then dissipated from the internal cavity 886 and through the lower perforated bottom plate 876 into the combustion chamber canister 636. The burner 774 can also include a distributor plate (not shown) positioned within the internal cavity 886 adjacent the central opening 878, which functions to evenly distribute the air/gas mixture provided by the combustion blower 572 to the burner 774, allowing for a normalized ignition of the air/gas mixture. The igniter 638 and the flame sensor 640 can be inserted through the perimeter holes 880 of the top mounting plate 872 and the holes 884 in the upper mounting flange 882 of the burner body 870, and mounted to the top mounting plate 827.

When inserted through the holes 880, 884, the igniter 638 and the flame sensor 640 extend vertically into the first and second cutouts 792, 794 of the front heat exchanger insulation 700 and into the combustion region 788 of the combustion chamber enclosure 636. When the igniter 638 and the flame sensor 640 are mounted to the top mounting plate 872, and the burner 774 is mounted to the combustion chamber enclosure 636 within the burner opening 780, the igniter 638 and the flame sensor 640 will be at a pre-set desired distance from the perforated bottom plate 876 from which the air/gas mixture is dissipated. As previously discussed, this distance is the desired distance to achieve efficient and safe ignition of the air/gas mixture dissipated from the burner 774. Consistency of this spacing is achieved by mounting the igniter 638 (and the flame sensor 640) to the burner 774, and mounting both the igniter 638 and the burner 774 to the top 776*e* of the combustion chamber enclosure 636, which drastically reduces the number of components that contribute to the "stack-up" of tolerances. In essence, this reduces the tolerance stack to the holes 880, 884 through which the igniter 638 extends.

Figure 88:
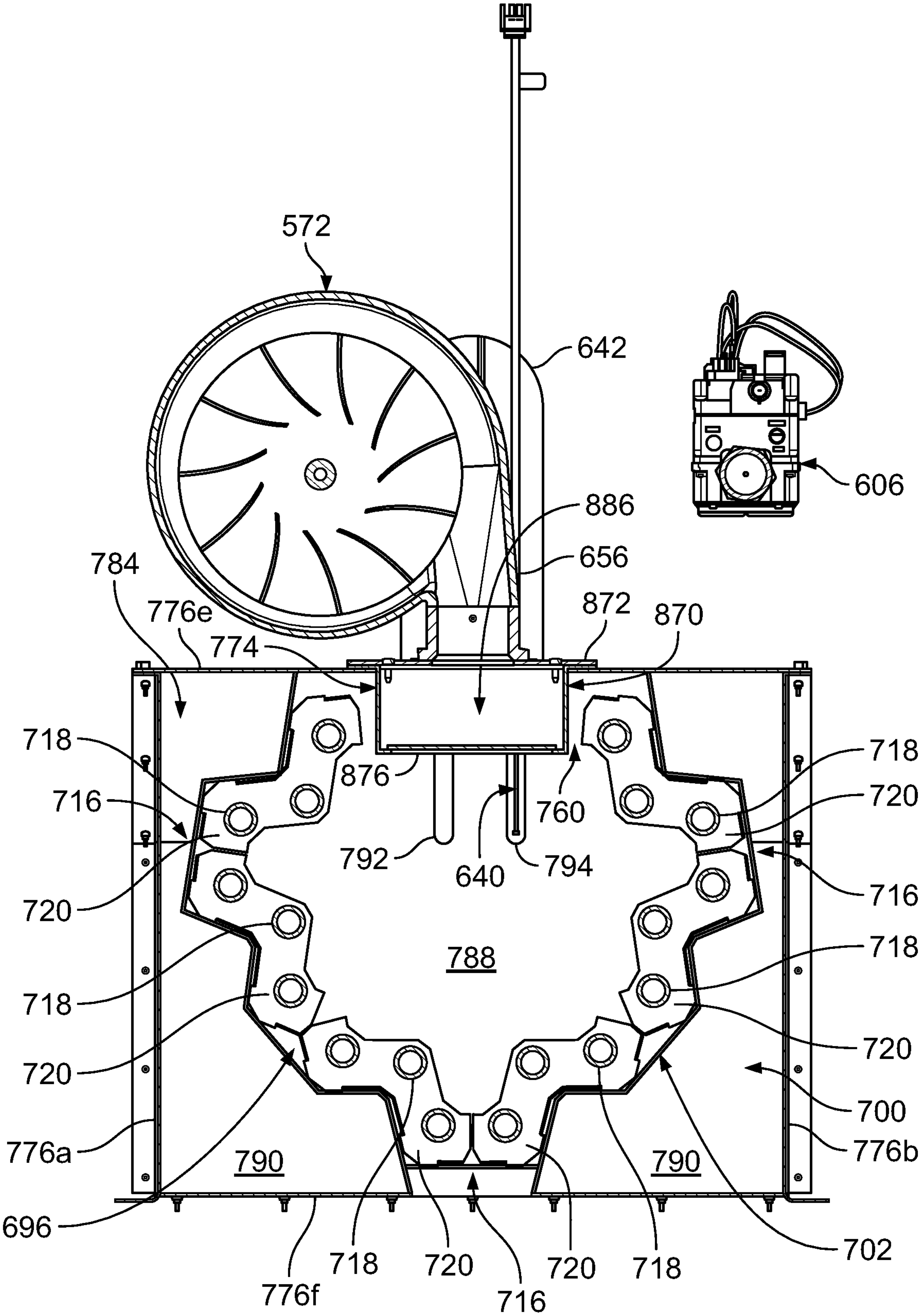
FIG. 88 is a sectional view taken along Line 88-88 of FIG. 85.
Figure 89:
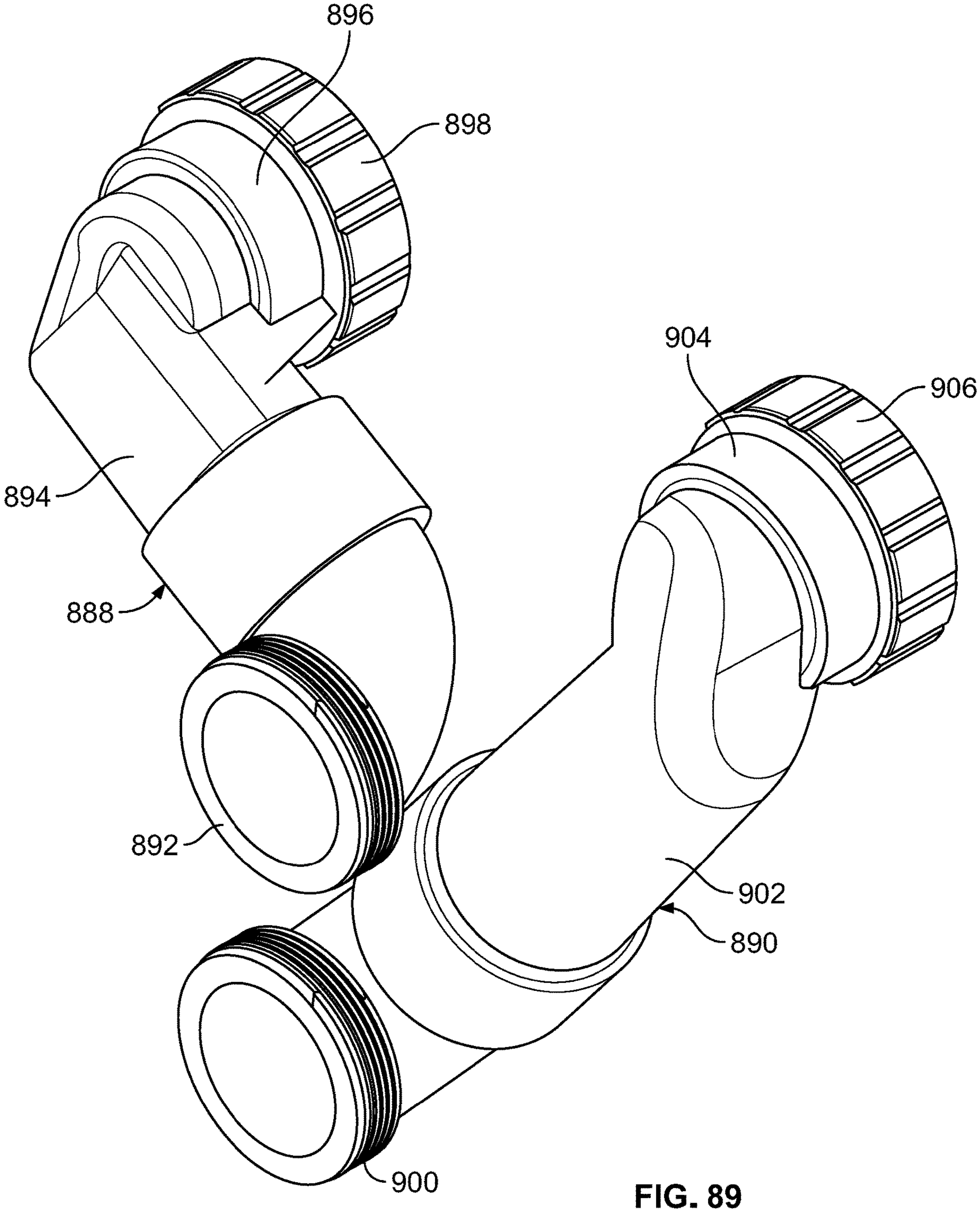
FIG. 89 is a perspective view showing a third inlet fitting and a third outlet fitting of the present disclosure.

FIG. 89 is a perspective view showing a third inlet fitting 888 and a third outlet fitting 890 of the present disclosure. The third inlet fitting 888 and the third outlet fitting 890 shown in FIG. 88 are similar in construction and functionality to the second inlet fitting 390 and the second outlet fitting 392 shown and described in connection with FIGS. 37 and 38. Accordingly, it should be understood that the third inlet fitting 888 can be utilized to adapt the water manifold header 574 inlet 802 to the inlet position of a prior heater that is being replaced, and the third outlet fitting 890 can be utilized to adapt the water manifold header 574 outlet 806 to the outlet position of the prior heater that is being replaced, in the same fashion as the second inlet fitting 390 and the second outlet fitting 392.

The third inlet fitting 888 includes a third inlet fitting inlet 892, a third inlet fitting body 894, a third inlet fitting outlet 896, and a third inlet fitting fastener 898. The third inlet fitting 888 forms a fluidic path between the third inlet fitting inlet 892, the third inlet fitting body 894, and the third inlet fitting outlet 896, such that fluid can flow into the third inlet fitting inlet 892, across the third inlet fitting body 888, and out of the third inlet fitting outlet 896. Additionally, the third inlet fitting inlet 892 can be threaded to allow for connection with a corresponding threaded fastener associated with pre-existing plumbing in order to connect the water manifold header 574 to the pre-existing plumbing. The third inlet fitting fastener 898 can be a threaded nut that can be captured/retained on the third inlet fitting 888 adjacent the third inlet fitting outlet 896. The third inlet fitting fastener 898 is configured to threadedly engage the threaded inlet 802 of the water manifold header 574 in order to secure the third inlet fitting 888 to the water manifold header 574. The third inlet fitting fastener 898 allows for increased positional freedom of the third inlet fitting inlet 892. Specifically, the third inlet fitting 888 can be secured to the threaded inlet 802 of the water header manifold 574 by aligning the third inlet fitting fastener 898 with the threaded inlet 802, partially tightening the third inlet fitting fastener 898 on the threaded inlet 802, rotating the third inlet fitting 888 to adjust the horizontal and vertical placement of the third inlet fitting inlet 892 to the desired position (e.g., to the second inlet fitting height $IFH_2$ as shown in FIG. 38), and then fully tightening the third inlet fitting fastener 898 once the third inlet fitting inlet 892 is in the desired position to fix the third inlet fitting inlet 892 in that position, which places the threaded inlet 802 in fluidic communication with the third inlet fitting inlet 892. This capability allows for a user to account for variations that may be present in the position of pre-existing water outlet plumbing (e.g., that was connected to the prior heater that gas heater 10, 510 is replacing) with which the user wishes to align the third inlet fitting inlet 892. When the third inlet fitting 888 is connected to the water header manifold 574, the third inlet fitting inlet 892 will be at an adjusted inlet position that is associated with the inlet of a second heater, e.g., a water manifold of a second heater, that is different than the new heater being installed 10, 510. That is, the third inlet fitting inlet 892 will be at substantially the same position as the inlet of the previously installed second heater that is being replaced so that the third inlet fitting inlet 892 can be easily connected to pre-existing plumbing to which the second heater was connected, e.g., piping that extends from a pump.

The third outlet fitting 890 includes a third outlet fitting outlet 900, a third outlet fitting body 902, a third outlet fitting inlet 904, and a third outlet fitting fastener 906. The third outlet fitting 890 forms a fluidic path between the third outlet fitting inlet 904, the third outlet fitting body 902, and the third outlet fitting outlet 900, such that fluid can flow into the third outlet fitting inlet 904, across the third outlet fitting body 902, and out of the third outlet fitting outlet 900. Additionally, the third outlet fitting outlet 900 can be threaded to allow for connection with a corresponding threaded fastener associated with pre-existing plumbing in order to connect the water manifold header 574 to the pre-existing plumbing. The third outlet fitting fastener 906 can be a threaded nut that can be captured/retained on the third outlet fitting 890 adjacent the third outlet fitting inlet 904. The third outlet fitting fastener 906 is configured to threadedly engage the threaded outlet 806 of the water manifold header 574 in order to secure the third outlet fitting 890 to the water manifold header 574. The third outlet fitting fastener 906 allows for increased positional freedom of the third outlet fitting outlet 900. Specifically, the third outlet fitting 890 can be secured to the threaded outlet 806 of the water header manifold 574 by aligning the third outlet fitting fastener 906 with the threaded outlet 806, partially tightening the third outlet fitting fastener 906 on the threaded outlet 806, rotating the third outlet fitting 890 to adjust the horizontal and vertical placement of the third outlet fitting outlet 900 to the desired position (e.g., to the second outlet fitting height $OFH_2$ as shown in FIG. 38), and then fully tightening the third outlet fitting fastener 906 once the third outlet fitting outlet 900 is in the desired position to fix the third outlet fitting outlet 900 in that position, which places the threaded outlet 806 in fluidic communication with the third outlet fitting outlet 900. This capability allows for a user to account for variations that may be present in the position of pre-existing water inlet plumbing (e.g., that was connected to the prior heater that gas heater 10, 510 is replacing) with which the user wishes to align the third outlet fitting outlet 900. When the third outlet fitting 890 is connected to the water header manifold 574, the third outlet fitting outlet 900 will be at an adjusted outlet position that is associated with the outlet of the second heater, e.g., the water manifold of the second heater, that is different than the new heater being installed 10, 510. That is, the third outlet fitting outlet 900 will be at substantially the same position as the outlet of the previously installed second heater that is being replaced so that the third outlet fitting outlet 900 can be easily connected to pre-existing plumbing to which the second heater was connected, e.g., piping that extends to a pool water circulation system.

Accordingly, the third inlet fitting 888 can be secured to the water header manifold 574 to adjust the inlet height $H_1$ to the second inlet fitting height $IFH_2$ in the same fashion as the second inlet fitting 390, and the third outlet fitting 890 can be secured to the water header manifold 574 to adjust the outlet height $H_O$ to the second outlet fitting height $OFH_2$ in the same fashion as the second outlet fitting 392. It should also be understood that while reference is made herein to the second inlet fitting 390, the third inlet fitting 888, the second outlet fitting 392, and the third outlet fitting 890 adjusting inlet height and the outlet height to a new effective height, such functionality is capable of adjusting the overall effective position of the water header manifold inlet 346, 802 and water header manifold outlet 350, 806, including the horizontal/lateral position and depth thereof in addition to the vertical position. Such is shown, for example, in FIG. 37 where the effective horizontal/lateral position of the inlet 346 and the outlet 350 is adjusted horizontally/laterally towards the center of the gas heater 10 by the second inlet fitting 390 and the second outlet fitting 392, and in FIG. 35 where the effective depth of the inlet 346 and the outlet 350 is adjusted outward away from the gas heater 10 by the first inlet fitting 378 and the first outlet fitting 380.

While exemplary embodiments have been described herein, it is expressly noted that these embodiments should not be construed as limiting, but rather that additions and modifications to what is expressly described herein also are included within the scope of the disclosure. Moreover, it is to be understood that the features of the various embodiments described herein are not mutually exclusive and can exist in various combinations and permutations, even if such combinations or permutations are not made express herein.

What is claimed is:

1. An adaptable water manifold for a swimming pool or spa heater, comprising:

an inlet, the inlet being positioned at an inlet position when the adaptable water manifold is mounted to the gas heater;

an outlet, the outlet being positioned at an outlet position when the adaptable water manifold is mounted to the gas heater;

an inflow section in fluidic communication with the inlet and configured to provide water to one or more heat exchanger tubes;

an outflow section in fluidic communication with the outlet and configured to receive water from one or more heat exchanger tubes;

an inlet fitting having an inlet fitting inlet in fluidic communication with an inlet fitting outlet, the inlet fitting being connectable to the inlet with the inlet fitting outlet adjacent the inlet; and an outlet fitting having an outlet fitting inlet in fluidic communication with an outlet fitting outlet, the outlet fitting being connectable to the outlet with the outlet fitting inlet adjacent the outlet, wherein when the inlet fitting is connected to the inlet, the inlet fitting outlet is at the inlet position and the inlet fitting inlet is at an adjusted inlet position, and when the outlet fitting is connected to the outlet, the outlet fitting inlet is at the outlet position and the outlet fitting outlet is at an adjusted outlet position, wherein the adjusted inlet position is associated with an inlet of a water manifold of a second heater that is different than the swimming pool or spa gas heater, and the adjusted outlet position is associated with an outlet of the water manifold of the second heater that is different than the swimming pool or spa gas heater.

2. The adaptable water manifold of claim 1, wherein the inlet includes one or more inlet mounts, the outlet includes one or more outlet mounts, the inlet fitting includes one or more inlet fitting mounts, and the outlet fitting includes one or more outlet fitting mounts.

3. The adaptable water manifold of claim 2, wherein the one or more inlet fitting mounts are configured to removably engage the one or more inlet mounts to removably secure the inlet fitting to the inlet, and the one or more outlet fitting mounts are configured to removably engage the one or more outlet fitting mounts to removably secure the outlet fitting to the outlet.

4. The adaptable water manifold of claim 1, wherein the inlet includes inlet threading, the outlet includes outlet threading, the inlet fitting includes inlet fitting threading, and the outlet fitting includes outlet fitting threading, and wherein the inlet fitting threading is configured to removably engage the inlet threading to removably secure the inlet fitting to the inlet, and the outlet fitting threading is configured to removably engage the outlet threading to removably secure the outlet fitting to the outlet.

5. The adaptable water manifold of claim 1, wherein the inlet includes inlet threading, the outlet includes outlet threading, the inlet fitting includes a first nut having first nut threading, and the outlet fitting includes a second nut having second nut threading, and wherein the first nut threading is configured to removably engage the inlet threading to removably secure the inlet fitting to the inlet, and the second nut threading is configured to removably engage the outlet threading to removably secure the outlet fitting to the outlet.

6. The adaptable water manifold of claim 5, wherein the first nut is a captured nut that is secured to the inlet fitting, and the second nut is a captured nut that is secured to the outlet fitting.

7. The adaptable water manifold of claim 5, wherein the position of the inlet fitting inlet can be adjusted when the first nut threading is partially engaged with the inlet threading.

8. The adaptable water manifold of claim 7, wherein the position of the inlet fitting inlet is fixed when the first nut threading is fully engaged with the inlet threading.

9. The adaptable water manifold of claim 5, wherein the position of the outlet fitting outlet can be adjusted when the second nut threading is partially engaged with the outlet threading.

10. The adaptable water manifold of claim 9, wherein the position of the outlet fitting outlet is fixed when the second nut threading is fully engaged with the outlet threading.

11. The adaptable water manifold of claim 1, wherein the inlet fitting inlet includes threading and the outlet fitting outlet includes threading.

12. The adaptable water manifold of claim 1, wherein the adjusted inlet position is configured to align with pre-existing pool or spa plumbing, and the adjusted outlet position is configured to align with pre-existing pool or spa plumbing.

13. The adaptable water manifold of claim 1, wherein the adjusted inlet position is horizontally offset from the inlet position, and the adjusted outlet position is horizontally offset from the inlet position.

14. The adaptable water manifold of claim 1, wherein the adjusted inlet position is vertically offset from the inlet position, and the adjusted outlet position is vertically offset from the inlet position.

15. The adaptable water manifold of claim 1, wherein the adjusted inlet position is at a different depth than the inlet position, and the adjusted outlet position is at a different depth than the inlet position.

* * * * *